US012574644B2

(12) United States Patent
Tasaki et al.

(10) Patent No.: US 12,574,644 B2
(45) Date of Patent: Mar. 10, 2026

(54) ZOOM LENS AND IMAGING APPARATUS

(71) Applicant: Sony Group Corporation, Tokyo (JP)

(72) Inventors: Ryohei Tasaki, Kanagawa (JP); Yuma Kumisawa, Kanagawa (JP); Hiroo Juri, Chiba (JP)

(73) Assignee: Sony Group Corporation, Tokyo (JP)

( * ) Notice: Subject to any disclaimer, the term of this patent is extended or adjusted under 35 U.S.C. 154(b) by 42 days.

(21) Appl. No.: 18/725,621

(22) PCT Filed: Dec. 15, 2022

(86) PCT No.: PCT/JP2022/046159
§ 371 (c)(1),
(2) Date: Jun. 28, 2024

(87) PCT Pub. No.: WO2023/153076
PCT Pub. Date: Aug. 17, 2023

(65) Prior Publication Data
US 2025/0175700 A1     May 29, 2025

(30) Foreign Application Priority Data

Feb. 9, 2022     (JP) ................................. 2022-019115

(51) Int. Cl.
*H04N 23/69*          (2023.01)
*G02B 13/18*          (2006.01)
(Continued)

(52) U.S. Cl.
CPC ............. *H04N 23/69* (2023.01); *G02B 13/18* (2013.01); *G02B 15/20* (2013.01); *H04N 23/55* (2023.01)

(58) Field of Classification Search
CPC ........ H04N 23/69; H04N 23/55; G02B 13/18; G02B 15/20; G02B 15/145129; G02B 15/145113
See application file for complete search history.

(56) References Cited

U.S. PATENT DOCUMENTS

2015/0092279 A1*   4/2015   Abe ....................... G02B 15/16
                                                        359/683
2015/0124127 A1*   5/2015   Iwashita ................ G02B 15/14
                                                        359/683
(Continued)

FOREIGN PATENT DOCUMENTS

JP          2004333770 A     11/2004
JP          2017102323 A      6/2017
(Continued)

OTHER PUBLICATIONS

International Search Report (PCT/ISA/210), International Application No. PCT/JP2022/046159, dated Jan. 24, 2023.

*Primary Examiner* — Christopher K Peterson
(74) *Attorney, Agent, or Firm* — Michael Best & Friedrich LLP

(57) ABSTRACT

A zoom lens of the present disclosure includes a plurality of lens groups including, in order from a side of an object toward a side of an image plane, a first lens group including two or less lenses and having positive refractive power, a second lens group having negative refractive power, a third lens group having positive refractive power, a fourth lens group having positive refractive power, and a fifth lens group having negative refractive power. Upon zooming from a wide-angle end to a telephoto end, at least the first lens group, the third lens group, and the fourth lens group are configured to move to the side of the object, and predetermined conditional expressions are satisfied.

10 Claims, 175 Drawing Sheets

(51) Int. Cl.
    *G02B 15/20*           (2006.01)
    *H04N 23/55*          (2023.01)

(56)                References Cited

U.S. PATENT DOCUMENTS

| | | | |
|---|---|---|---|
| 2017/0075093 A1* | 3/2017 | Sashima | G02B 15/145113 |
| 2022/0121020 A1* | 4/2022 | Makida | G02B 13/18 |
| 2022/0269056 A1* | 8/2022 | Yamashita | G02B 9/64 |

FOREIGN PATENT DOCUMENTS

| | | | |
|---|---|---|---|
| JP | 2017134104 A | 8/2017 | |
| JP | 2020034946 A | 3/2020 | |
| JP | 2020190679 A | 11/2020 | |
| JP | 2020190680 A | 11/2020 | |
| JP | 2021067805 A | 4/2021 | |
| WO | 2015146067 A1 | 10/2015 | |
| WO | 2021039814 A1 | 3/2021 | |

* cited by examiner

EXAMPLE 1・Wide(UPON INFINITY FOCUSING)

EXAMPLE 1 - Mid(UPON INFINITY FOCUSING)

EXAMPLE 1 · Tele(UPON INFINITY FOCUSING)

EXAMPLE 1 - Wide(UPON SHORT-DISTANCE FOCUSING)

EXAMPLE 1・Mid(UPON SHORT-DISTANCE FOCUSING)

EXAMPLE 1・Tele(UPON SHORT-DISTANCE FOCUSING)

FIG. 14

EXAMPLE 2 · Mid(UPON INFINITY FOCUSING)

EXAMPLE 2・Tele(UPON INFINITY FOCUSING)

EXAMPLE 2 · Mid(UPON SHORT-DISTANCE FOCUSING)

EXAMPLE 2 · Tele(UPON SHORT-DISTANCE FOCUSING)

EXAMPLE 3 · Wide (UPON INFINITY FOCUSING)

EXAMPLE 3 - Mid(UPON INFINITY FOCUSING)

EXAMPLE 3・Tele(UPON INFINITY FOCUSING)

EXAMPLE 3 · Wide(UPON SHORT-DISTANCE FOCUSING)

EXAMPLE 3・Mid(UPON SHORT-DISTANCE FOCUSING)

EXAMPLE 3・Tele(UPON SHORT-DISTANCE FOCUSING)

EXAMPLE 4 · Mid(UPON INFINITY FOCUSING)

EXAMPLE 4・Tele(UPON INFINITY FOCUSING)

EXAMPLE 4 · Wide (UPON SHORT-DISTANCE FOCUSING)

EXAMPLE 4 · Mid(UPON SHORT-DISTANCE FOCUSING)

EXAMPLE 4 · Tele(UPON SHORT-DISTANCE FOCUSING)

EXAMPLE 5 · Mid (UPON INFINITY FOCUSING)

EXAMPLE 5 · Tele(UPON INFINITY FOCUSING)

EXAMPLE 5 - Wide(UPON SHORT-DISTANCE FOCUSING)

EXAMPLE 6 · Mid(UPON INFINITY FOCUSING)

EXAMPLE 6 · Tele(UPON INFINITY FOCUSING)

EXAMPLE 6 · Wide (UPON SHORT-DISTANCE FOCUSING)

EXAMPLE 6・Tele(UPON SHORT-DISTANCE FOCUSING)

EXAMPLE 7 · Wide (UPON INFINITY FOCUSING)

EXAMPLE 7 · Mid(UPON INFINITY FOCUSING)

EXAMPLE 7 · Wide(UPON SHORT-DISTANCE FOCUSING)

EXAMPLE 7 · Tele(UPON SHORT-DISTANCE FOCUSING)

TANGENTIAL          1.00 RELATIVE          SAGITTAL
                    FIELD HEIGHT
                    (16.90° )

0.90 RELATIVE
FIELD HEIGHT
(15.38° )

0.69 RELATIVE
FIELD HEIGHT
(12.18° )

0.39 RELATIVE
FIELD HEIGHT
(7.095° )

0.00 RELATIVE
FIELD HEIGHT
(0.000° )

- - - - - - - - - - -  656.2725 nm
———————————— 587.5618 nm
— · — · — · — · — 435.8400 nm

EXAMPLE 8 · Wide (UPON SHORT-DISTANCE FOCUSING)

EXAMPLE 8 · Tele (UPON SHORT-DISTANCE FOCUSING)

FIG. 112

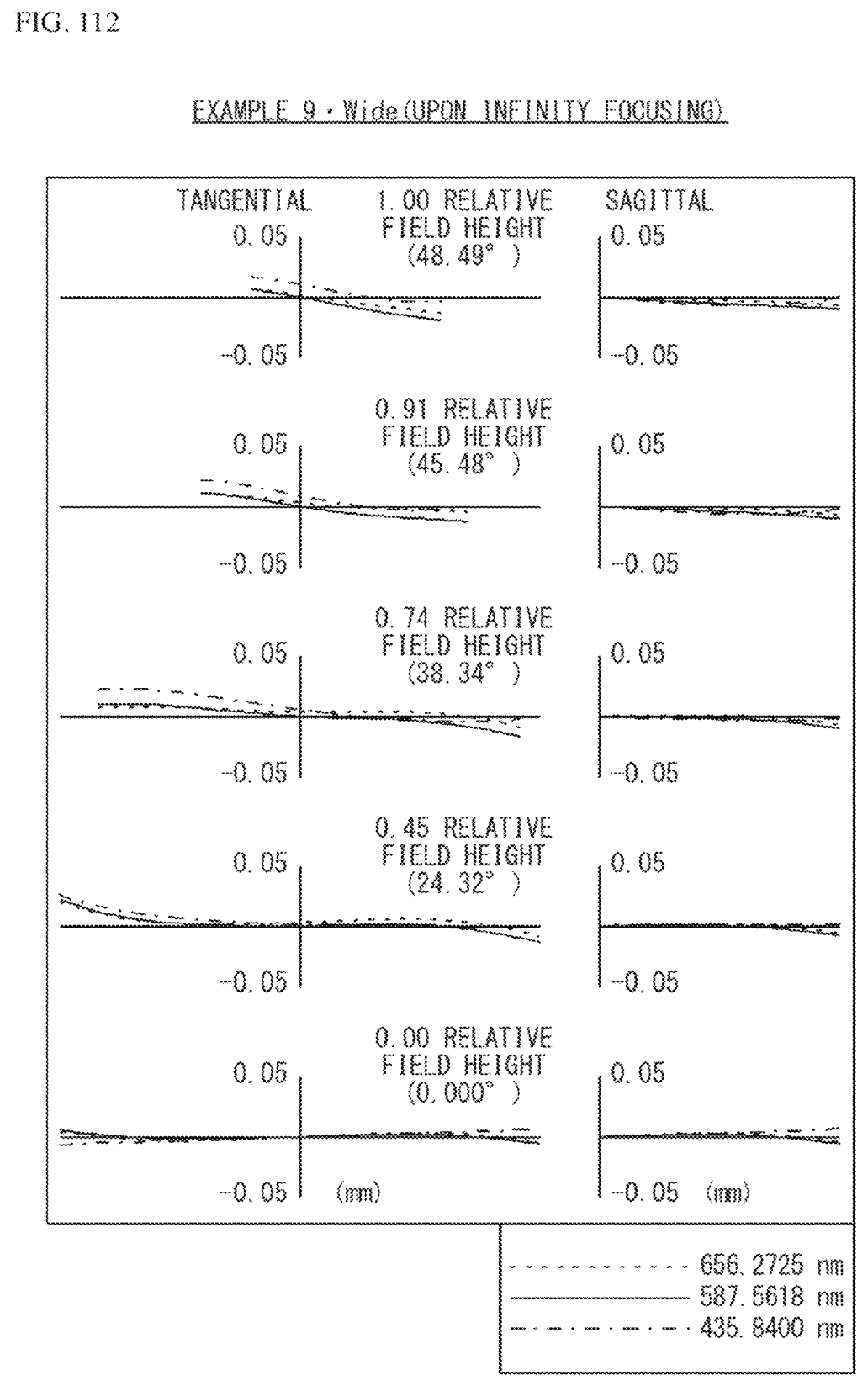

EXAMPLE 9 · Wide(UPON INFINITY FOCUSING)

TANGENTIAL     1.00 RELATIVE FIELD HEIGHT (48.49°)     SAGITTAL 0.91 RELATIVE FIELD HEIGHT (45.48°)

0.74 RELATIVE FIELD HEIGHT (38.34°)

0.45 RELATIVE FIELD HEIGHT (24.32°)

0.00 RELATIVE FIELD HEIGHT (0.000°)

---------- 656.2725 nm
———— 587.5618 nm
—·—·— 435.8400 nm

EXAMPLE 9 - Mid(UPON INFINITY FOCUSING)

EXAMPLE 9 · Wide(UPON SHORT-DISTANCE FOCUSING)

EXAMPLE 9・Tele(UPON SHORT-DISTANCE FOCUSING)

FIG. 125

EXAMPLE 10 - Wide (UPON INFINITY FOCUSING)

- - - - - - - - - - 656.2725 nm
———————— 587.5618 nm
- · — · — · — 435.8400 nm

EXAMPLE 10 - Tele(UPON INFINITY FOCUSING)

EXAMPLE 10 · Wide(UPON SHORT-DISTANCE FOCUSING)

EXAMPLE 10 · Tele (UPON SHORT-DISTANCE FOCUSING)

- - - - - - - - - - 656.2725 nm
———————— 587.5618 nm
— · — · — · — 435.8400 nm

EXAMPLE 11 · Mid(UPON INFINITY FOCUSING)

EXAMPLE 11 · Wide(UPON SHORT-DISTANCE FOCUSING)

EXAMPLE 11 - Mid(UPON SHORT-DISTANCE FOCUSING)

EXAMPLE 11 · Tele (UPON SHORT-DISTANCE FOCUSING)

FIG. 151

EXAMPLE 12 - Wide (UPON INFINITY FOCUSING)

EXAMPLE 12 - Tele(UPON INFINITY FOCUSING)

EXAMPLE 12 - Mid(UPON SHORT-DISTANCE FOCUSING)

EXAMPLE 12 · Tele(UPON SHORT-DISTANCE FOCUSING)

EXAMPLE 13 - Wide(UPON INFINITY FOCUSING)

EXAMPLE 13 · Mid(UPON INFINITY FOCUSING)

EXAMPLE 13 - Tele(UPON INFINITY FOCUSING)

EXAMPLE 13 · Wide(UPON SHORT-DISTANCE FOCUSING)

EXAMPLE 13 - Mid(UPON SHORT-DISTANCE FOCUSING)

EXAMPLE 13 · Tele(UPON SHORT-DISTANCE FOCUSING)

ZOOM LENS AND IMAGING APPARATUS

TECHNICAL FIELD

The present disclosure relates to a zoom lens and an imaging apparatus.

BACKGROUND ART

In recent years, an imaging apparatus such as a digital camera has undergone an increase in size and has higher image quality. Along therewith, an imaging lens to be used for such an imaging apparatus is also required to have higher performance. Meanwhile, an optical system is also required to be miniaturized, while undergoing a shorter flange focal length by a mirrorless camera or the like. In such a background, a high-performance compact zoom lens having a wide angle of view has been proposed (PTL 1). The zoom lens proposed in PTL 1 is of a retrofocus type including a first group of negative refractive power and a rear group of positive refractive power; adopting an optimal power configuration for a short back focus allows for achievement of miniaturization. In addition, PTL 2 proposes a zoom lens similarly adopting a retrofocus type including a first group of negative refractive power, while having a high variable magnification ratio in which a focal distance on a side of a telephoto end is expanded.

CITATION LIST

Patent Literature

PTL 1: Japanese Unexamined Patent Application Publication No. 2020-34946

PTL 2: Japanese Unexamined Patent Application Publication No. 2021-67805

SUMMARY OF THE INVENTION

As for a zoom lens proposed in PTL 1, a compact and high-performance zoom lens having a wide angle of view range is provided, but a variable magnification ratio thereof is insufficient. In addition, a zoom lens proposed in PTL 2 achieves a high variable magnification ratio while adopting a configuration of a retrofocus type similar to that of PTL 1, but has a longer total length and a larger diameter of a first group, resulting in insufficient miniaturization.

It is desirable to provide a compact and high-performance zoom lens having a high variable magnification ratio as well as an imaging apparatus including such a zoom lens.

A zoom lens according to an embodiment of the present disclosure includes a plurality of lens groups including, in order from a side of an object toward a side of an image plane, a first lens group including two or less lenses and having positive refractive power, a second lens group having negative refractive power, a third lens group having positive refractive power, a fourth lens group having positive refractive power, and a fifth lens group having negative refractive power. Upon zooming from a wide-angle end to a telephoto end, at least the first lens group, the third lens group, and the fourth lens group are configured to move to the side of the object. The following conditional expressions are satisfied:

$$f1/f2 < -6.00 \tag{1}$$

$$1.75 < f3/f4 < 4.20 \tag{2}$$

where
f1 denotes a focal distance of the first lens group,
f2 denotes a focal distance of the second lens group,
f3 denotes a focal distance of the third lens group, and
f4 denotes a focal distance of the fourth lens group.

An imaging apparatus according to an embodiment of the present disclosure includes a zoom lens and an imaging element that outputs an imaging signal corresponding to an optical image formed by the zoom lens, and the zoom lens is configured by the zoom lens according to an embodiment of the present disclosure.

In the zoom lens or the imaging apparatus according to an embodiment of the present disclosure, the configuration of each of the lens groups is optimized to enable achievement of compactness, high performance, and a high variable magnification ratio.

BRIEF DESCRIPTION OF THE DRAWINGS

Figure 14:
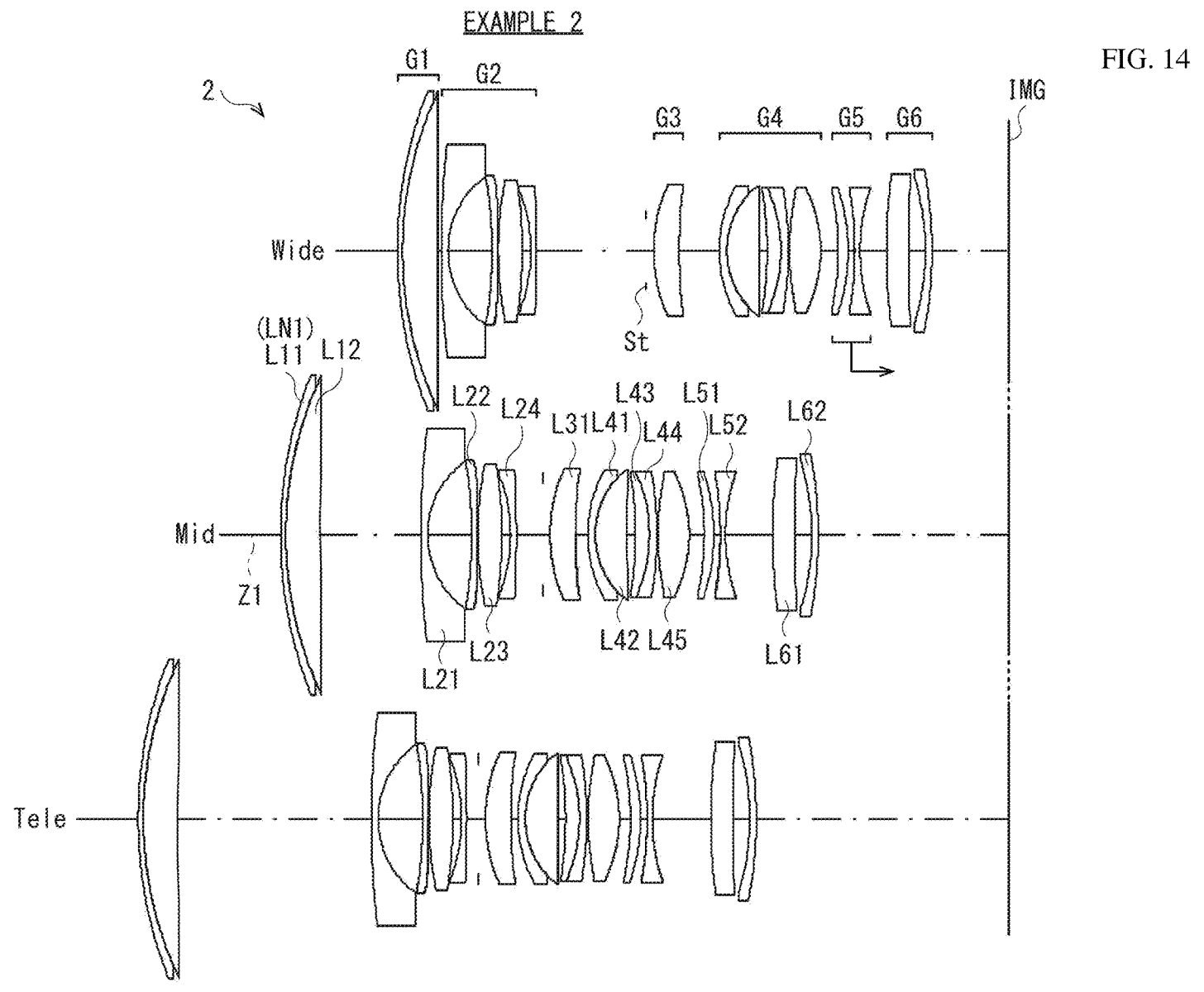

FIG. 14 is a lens cross-sectional view of a second configuration example (Example 2) of a zoom lens according to an embodiment.

FIG. 112 is an aberration diagram illustrating lateral aberration upon infinity focusing at the wide-angle end of the zoom lens according to Example 9.

FIG. 120 is an aberration diagram illustrating longitudinal aberration upon infinity focusing at an intermediate position of the zoom lens according to Example 10.

FIG. 121 is an aberration diagram illustrating longitudinal aberration upon infinity focusing at a telephoto end of the zoom lens according to Example 10.

FIG. 122 is an aberration diagram illustrating longitudinal aberration upon short-distance focusing at the wide-angle end of the zoom lens according to Example 10.

FIG. 123 is an aberration diagram illustrating longitudinal aberration upon short-distance focusing at the intermediate position of the zoom lens according to Example 10.

FIG. 124 is an aberration diagram illustrating longitudinal aberration upon short-distance focusing at the telephoto end of the zoom lens according to Example 10.

Figure 125:
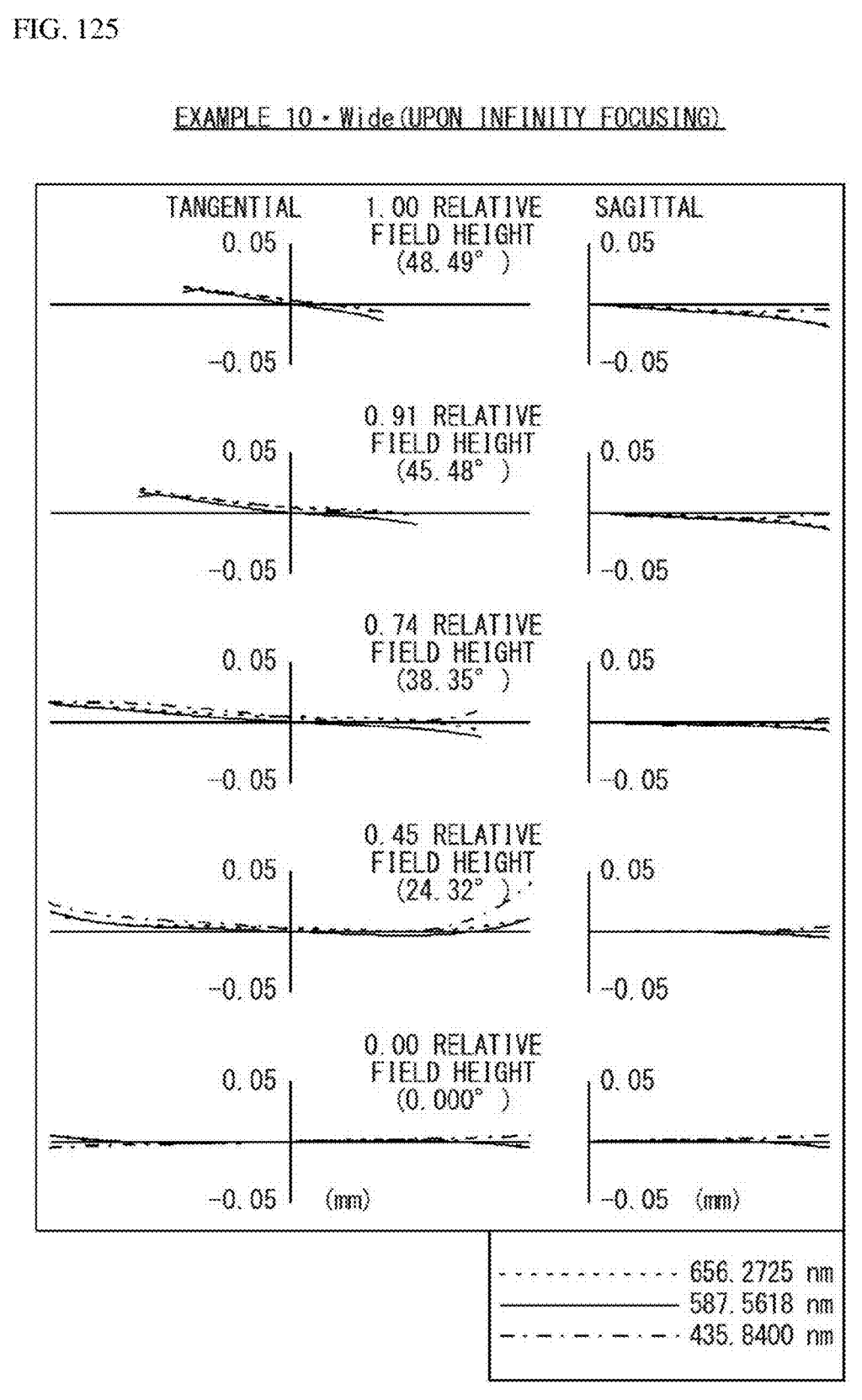

FIG. 125 is an aberration diagram illustrating lateral aberration upon infinity focusing at the wide-angle end of the zoom lens according to Example 10.

FIG. 126 is an aberration diagram illustrating lateral aberration upon infinity focusing at the intermediate position of the zoom lens according to Example 10.

FIG. 127 is an aberration diagram illustrating lateral aberration upon infinity focusing at the telephoto end of the zoom lens according to Example 10.

FIG. 128 is an aberration diagram illustrating lateral aberration upon short-distance focusing at the wide-angle end of the zoom lens according to Example 10.

FIG. 129 is an aberration diagram illustrating lateral aberration upon short-distance focusing at the intermediate position of the zoom lens according to Example 10.

FIG. 130 is an aberration diagram illustrating lateral aberration upon short-distance focusing at the telephoto end of the zoom lens according to Example 10.

FIG. 131 is a lens cross-sectional view of an eleventh configuration example (Example 11) of a zoom lens according to an embodiment.

Figure 132:
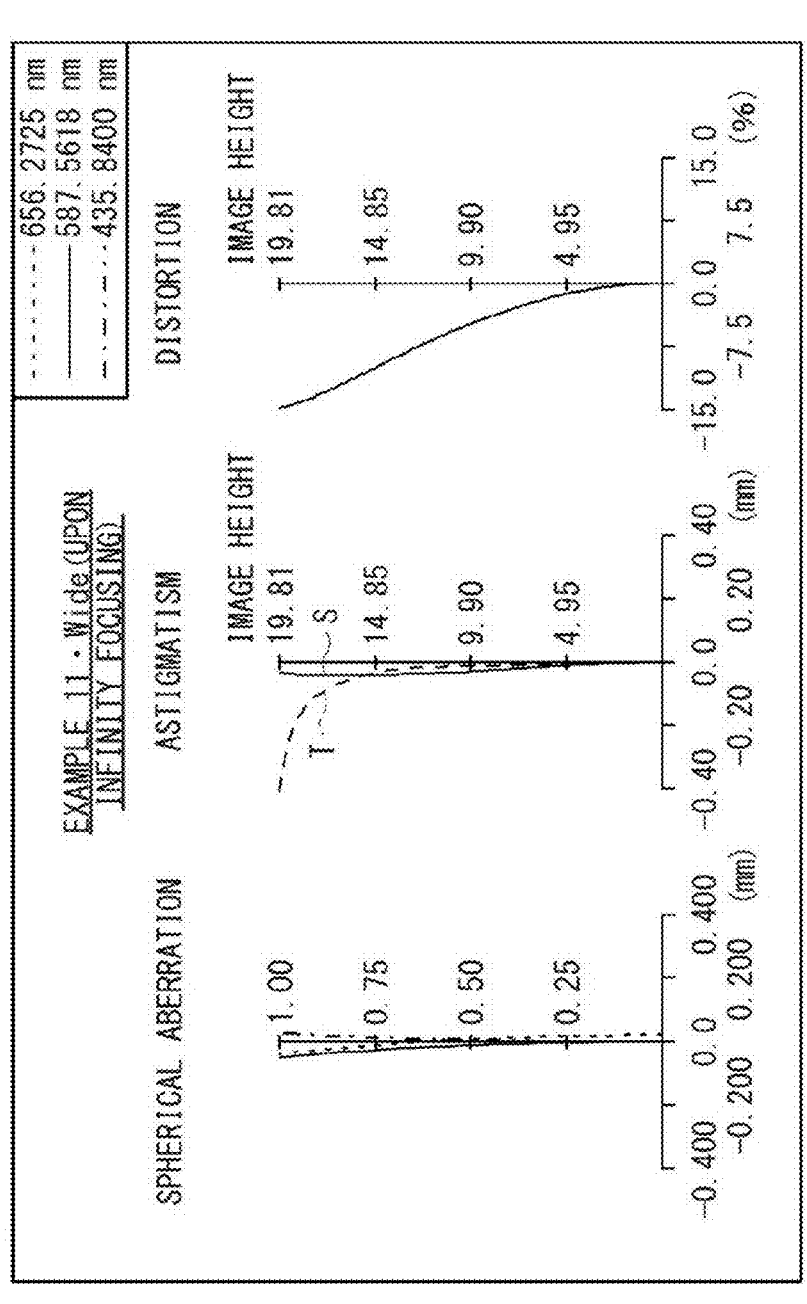

FIG. 132 is an aberration diagram illustrating longitudinal aberration upon infinity focusing at a wide-angle end of the zoom lens according to Example 11.

Figure 133:
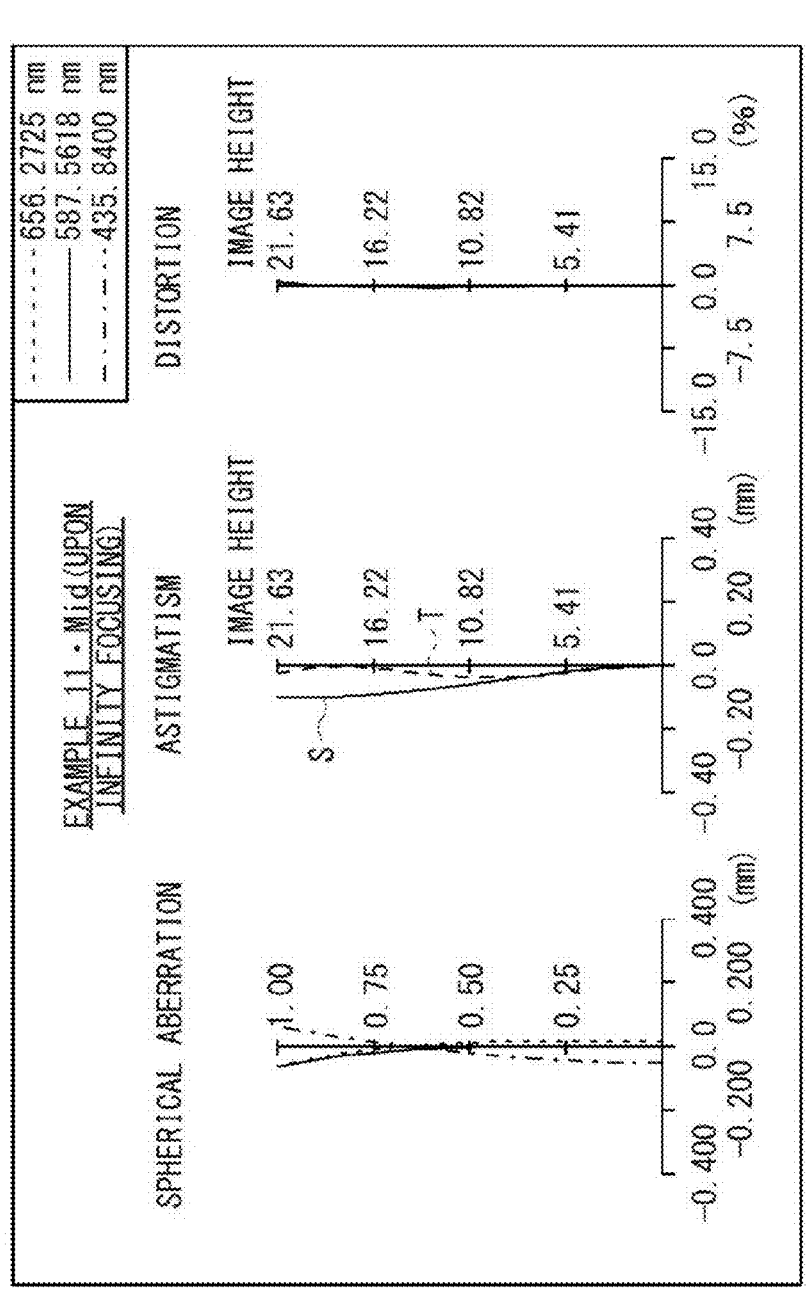

FIG. 133 is an aberration diagram illustrating longitudinal aberration upon infinity focusing at an intermediate position of the zoom lens according to Example 11.

Figure 134:
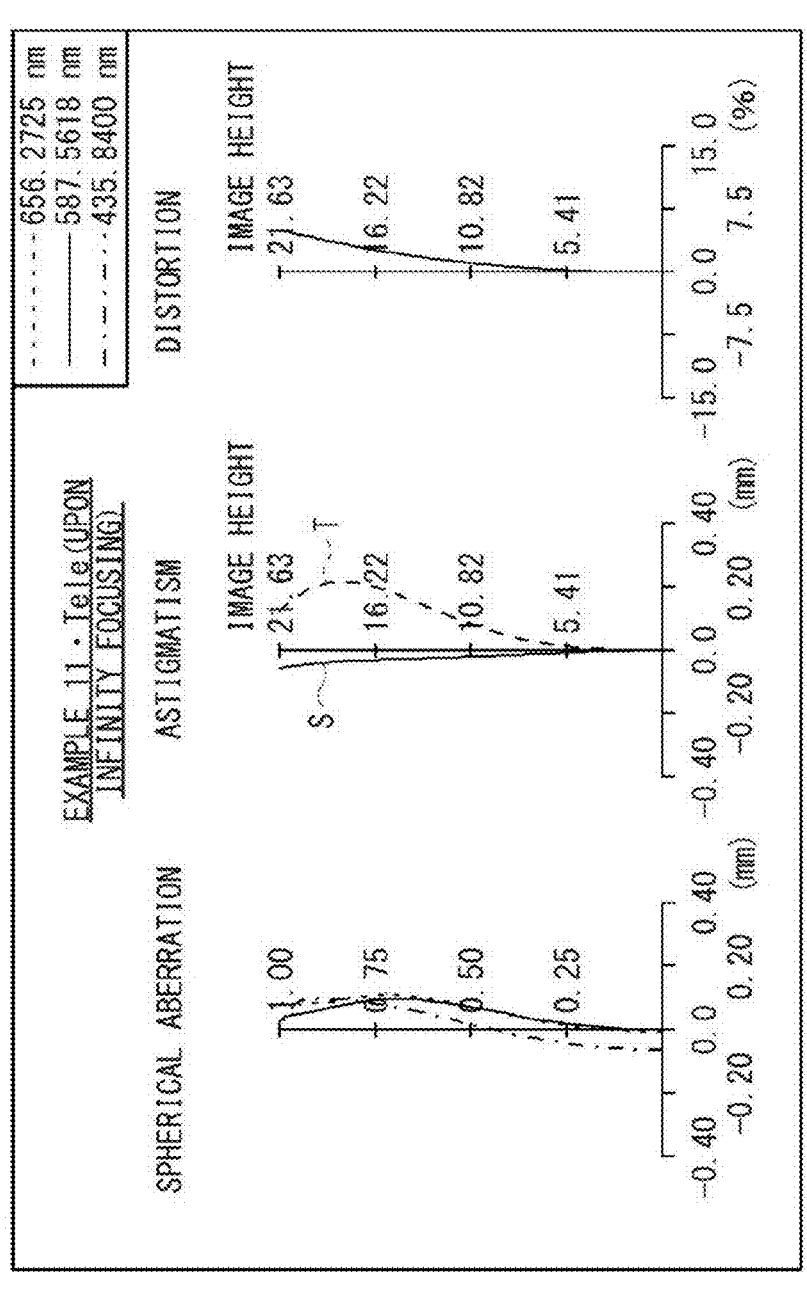

FIG. 134 is an aberration diagram illustrating longitudinal aberration upon infinity focusing at a telephoto end of the zoom lens according to Example 11.

Figure 135:
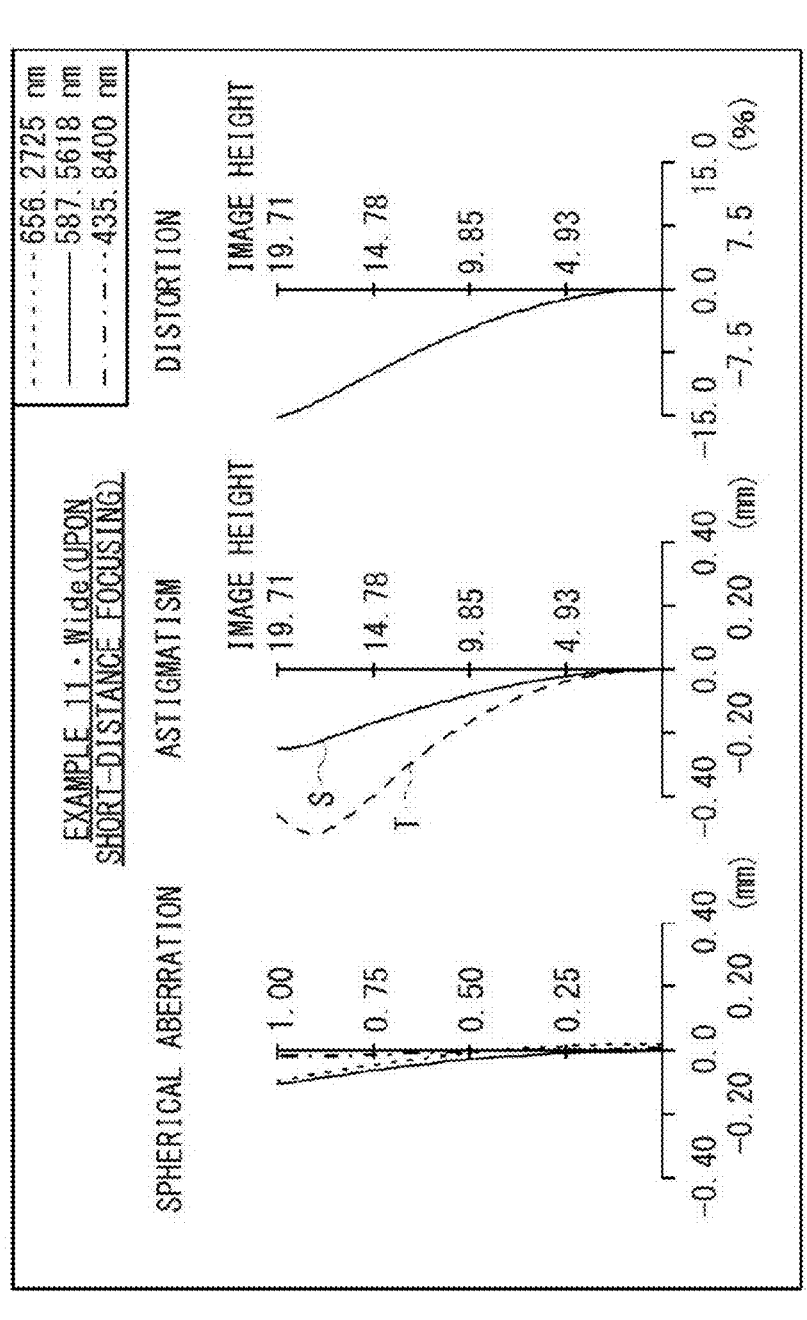

FIG. 135 is an aberration diagram illustrating longitudinal aberration upon short-distance focusing at the wide-angle end of the zoom lens according to Example 11.

Figure 136:
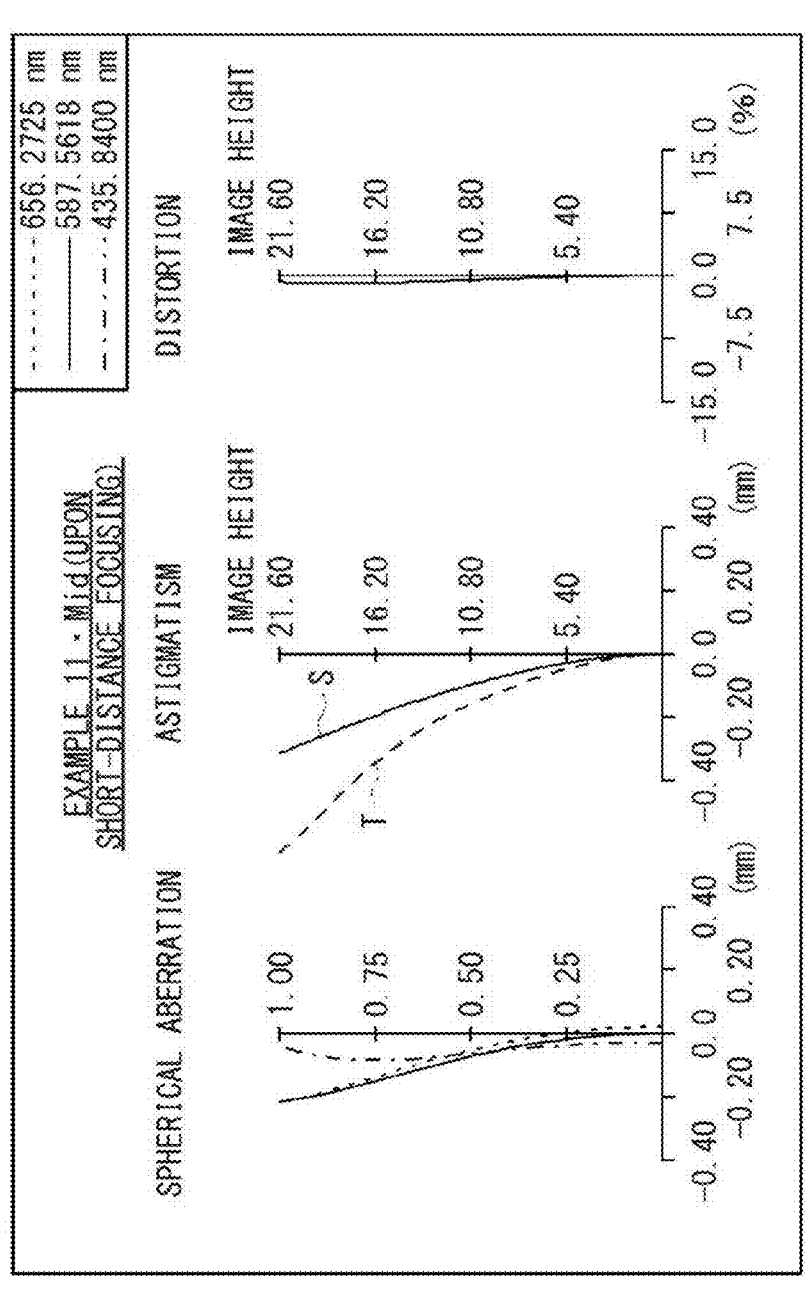

FIG. 136 is an aberration diagram illustrating longitudinal aberration upon short-distance focusing at the intermediate position of the zoom lens according to Example 11.

Figure 137:
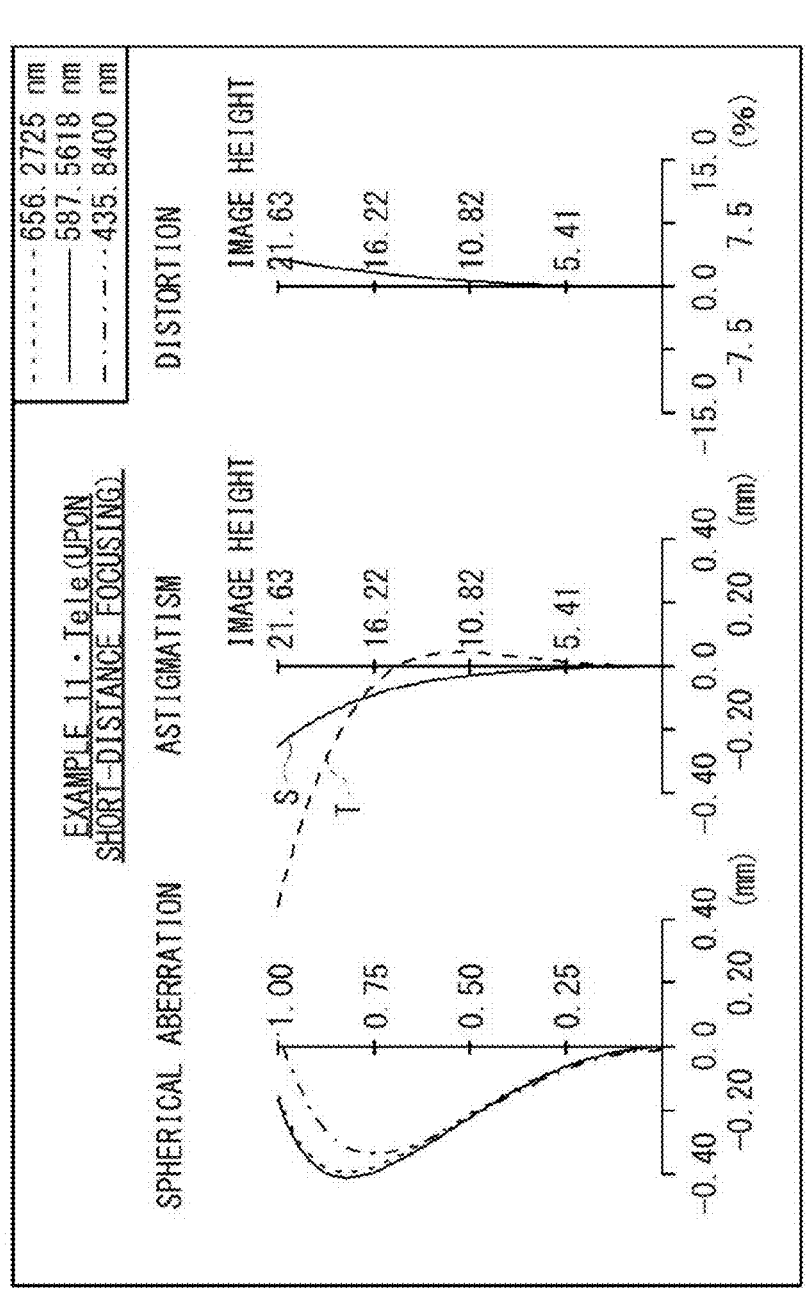

FIG. 137 is an aberration diagram illustrating longitudinal aberration upon short-distance focusing at the telephoto end of the zoom lens according to Example 11.

Figure 138:
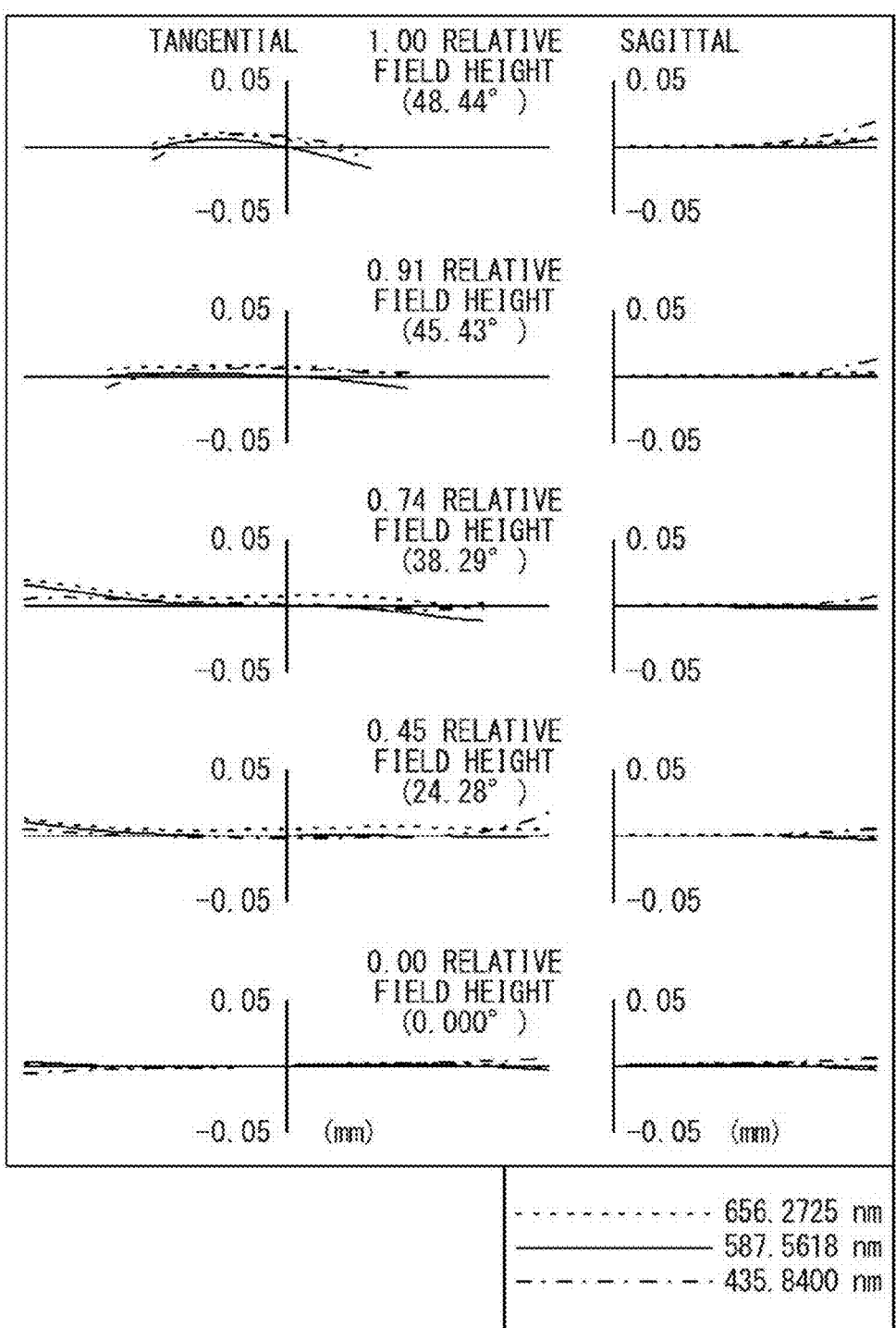

FIG. 138 is an aberration diagram illustrating lateral aberration upon infinity focusing at the wide-angle end of the zoom lens according to Example 11.

Figure 139:
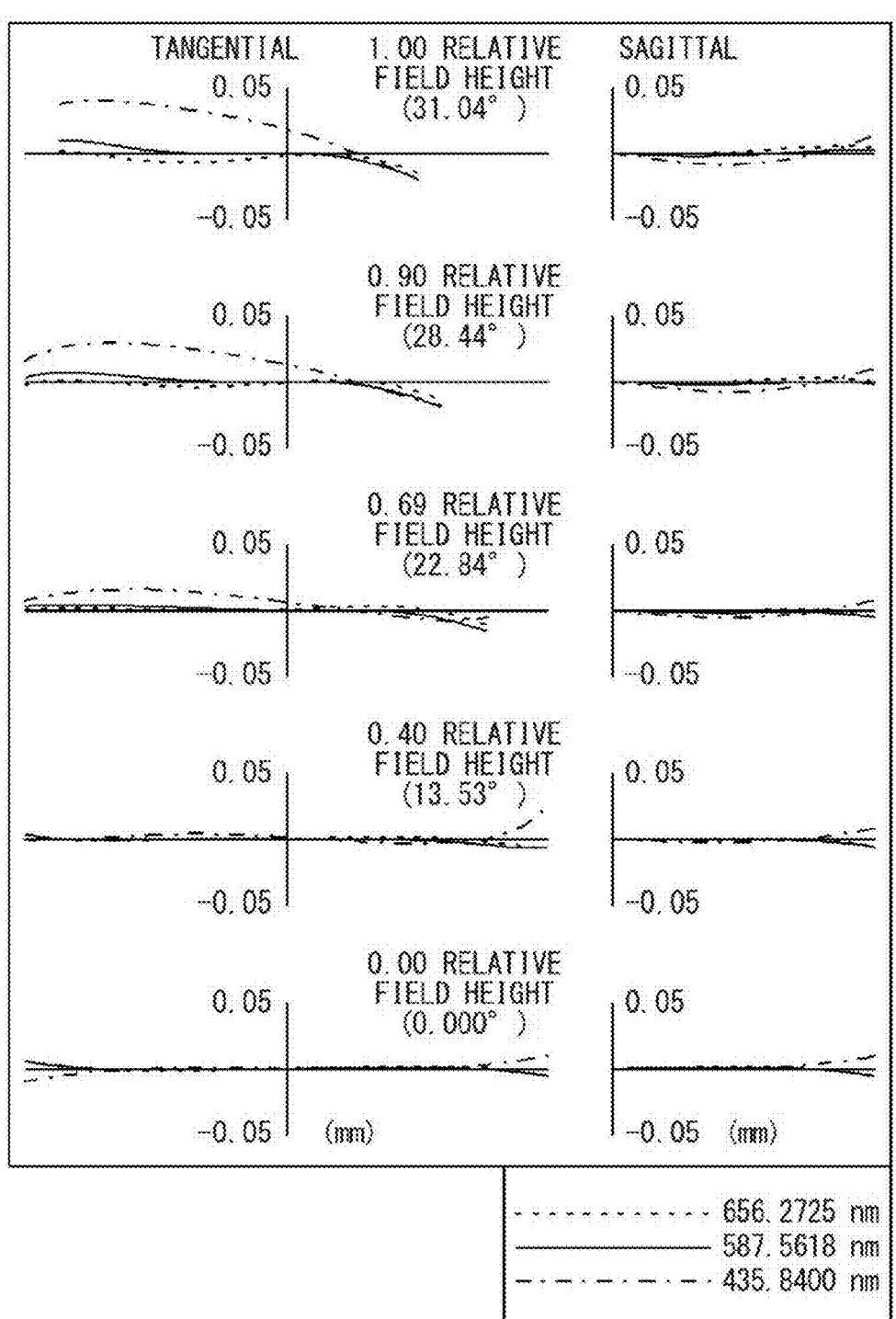

FIG. 139 is an aberration diagram illustrating lateral aberration upon infinity focusing at the intermediate position of the zoom lens according to Example 11.

Figure 140:
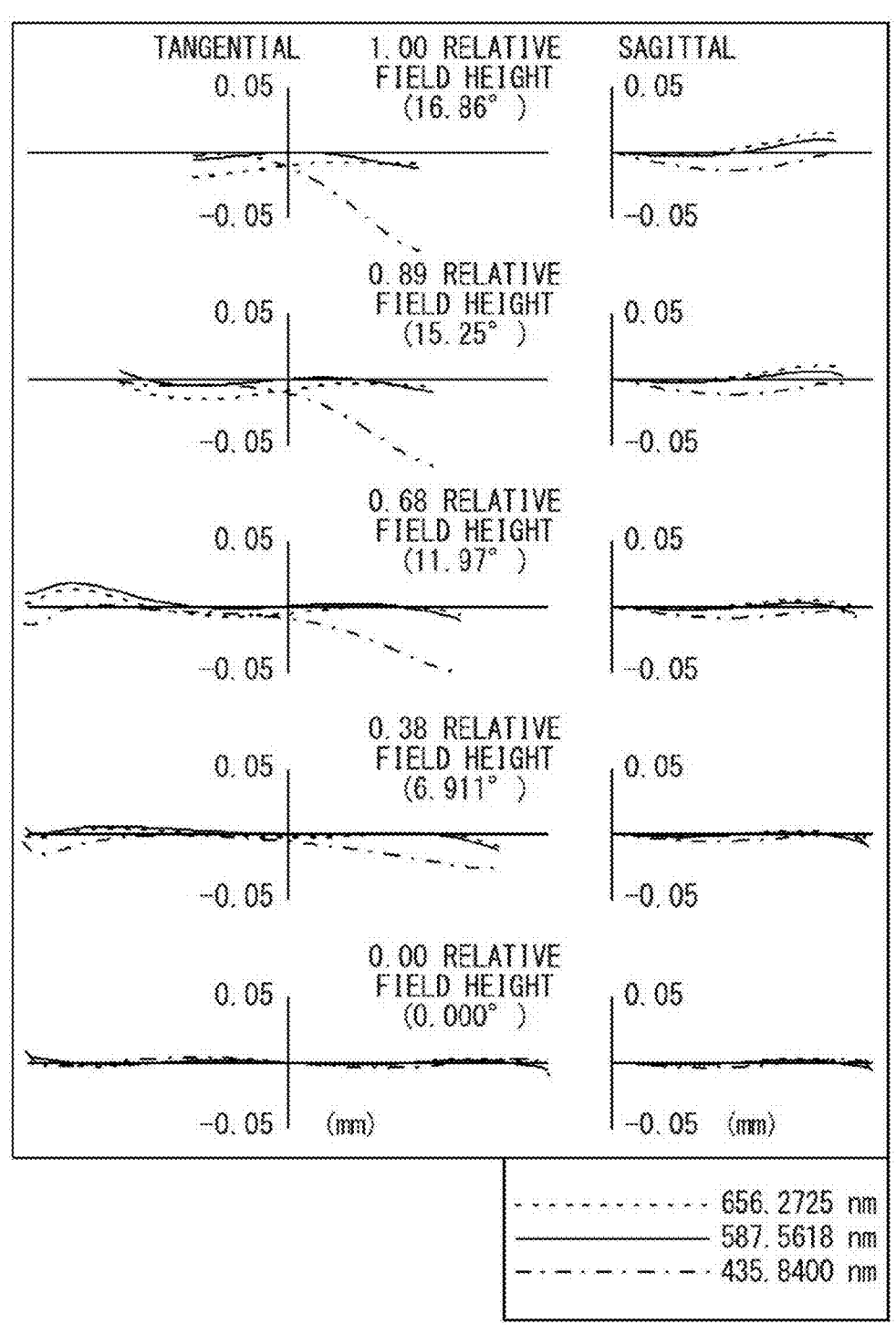

FIG. 140 is an aberration diagram illustrating lateral aberration upon infinity focusing at the telephoto end of the zoom lens according to Example 11.

Figure 141:
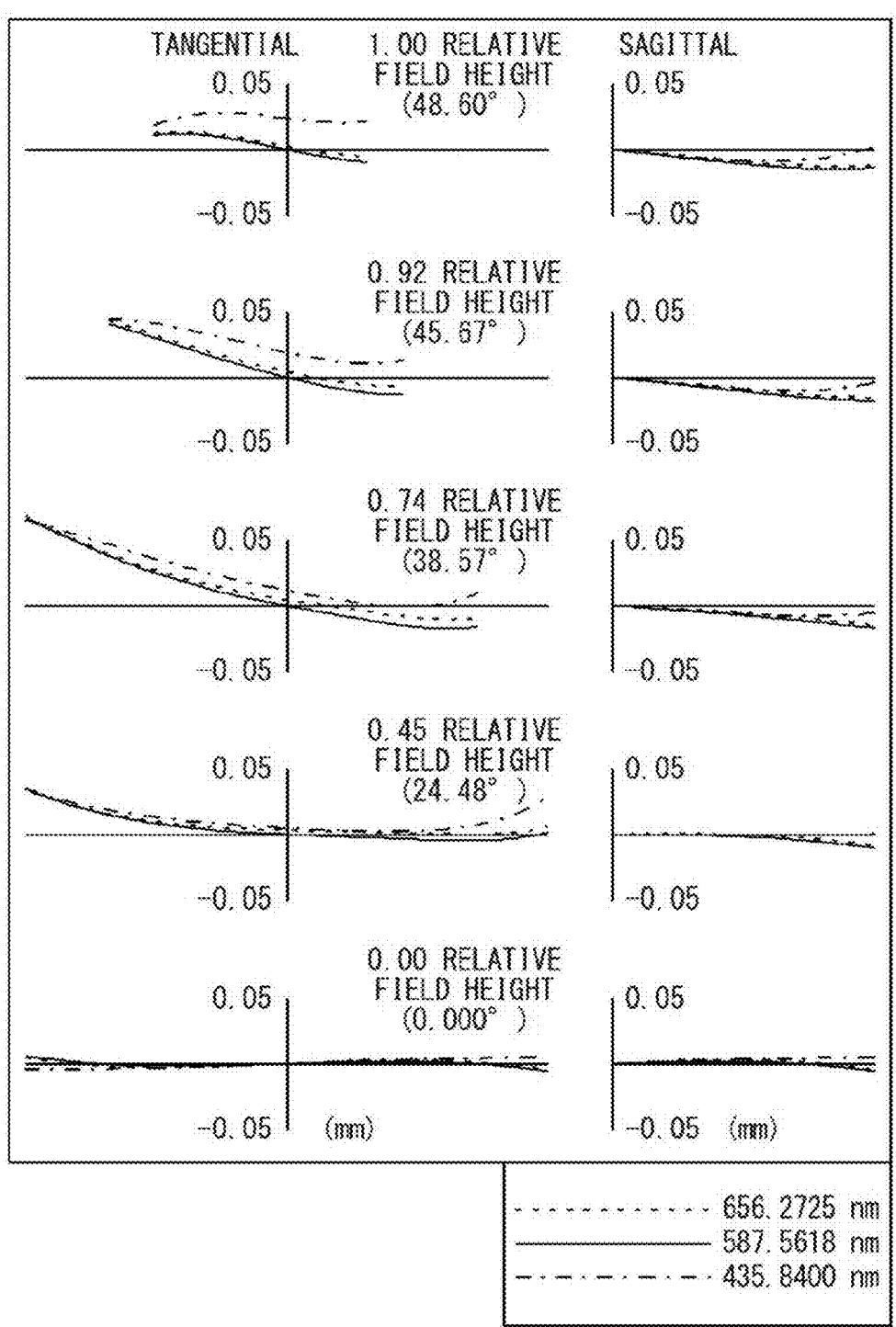

FIG. 141 is an aberration diagram illustrating lateral aberration upon short-distance focusing at the wide-angle end of the zoom lens according to Example 11.

Figure 142:
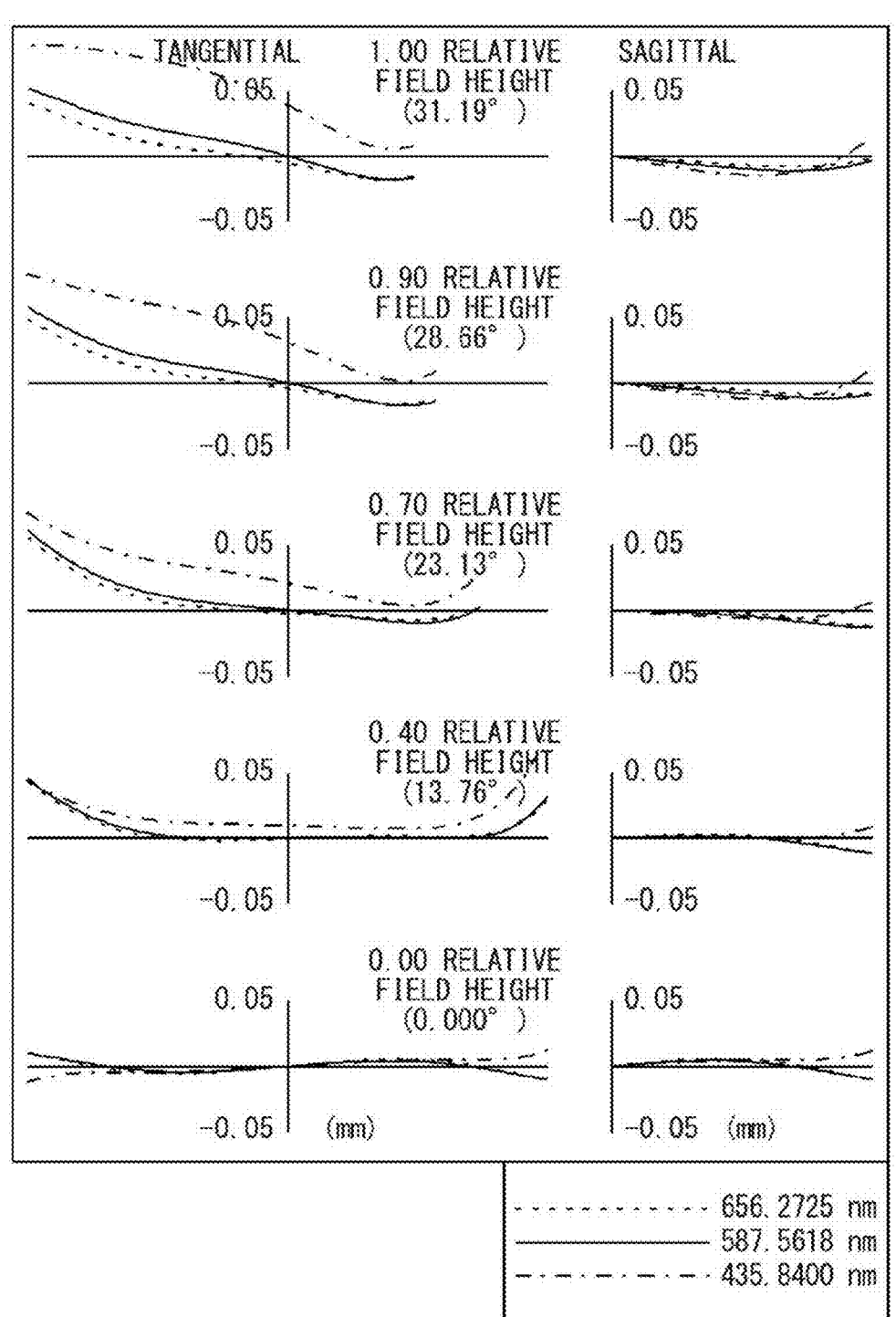

FIG. 142 is an aberration diagram illustrating lateral aberration upon short-distance focusing at the intermediate position of the zoom lens according to Example 11.

Figure 143:
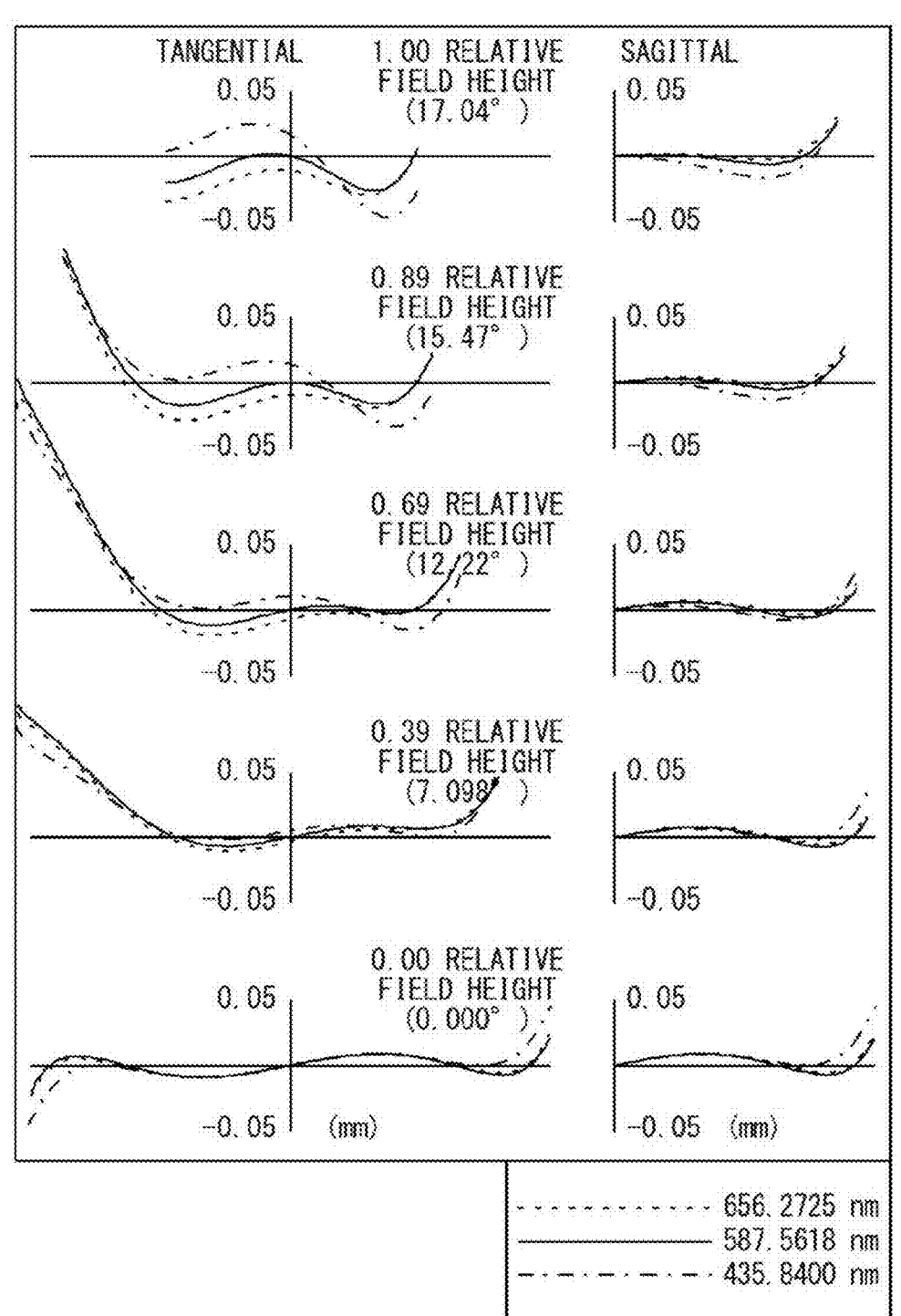

FIG. 143 is an aberration diagram illustrating lateral aberration upon short-distance focusing at the telephoto end of the zoom lens according to Example 11.

Figure 144:
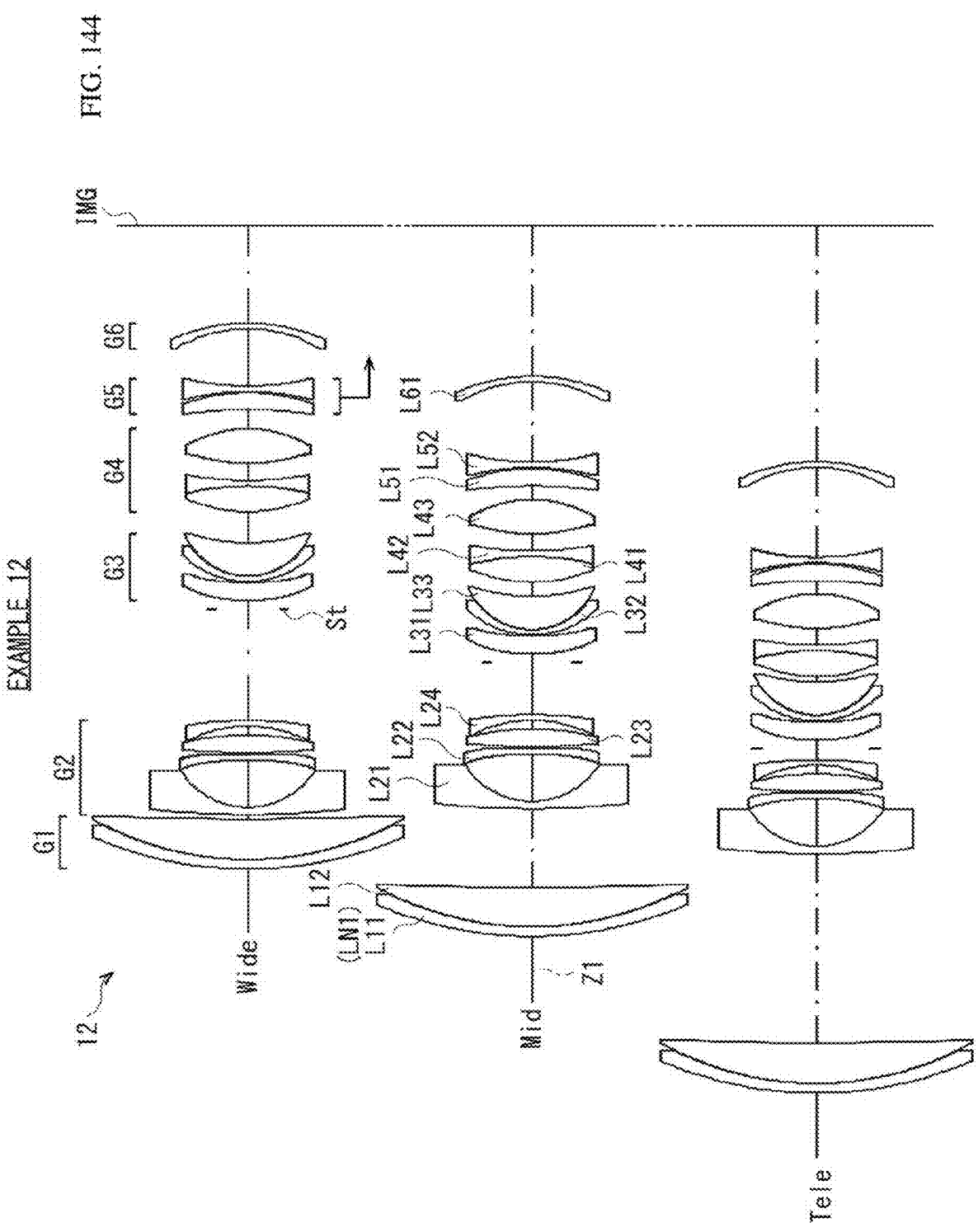

FIG. 144 is a lens cross-sectional view of a twelfth configuration example (Example 12) of a zoom lens according to an embodiment.

Figure 145:
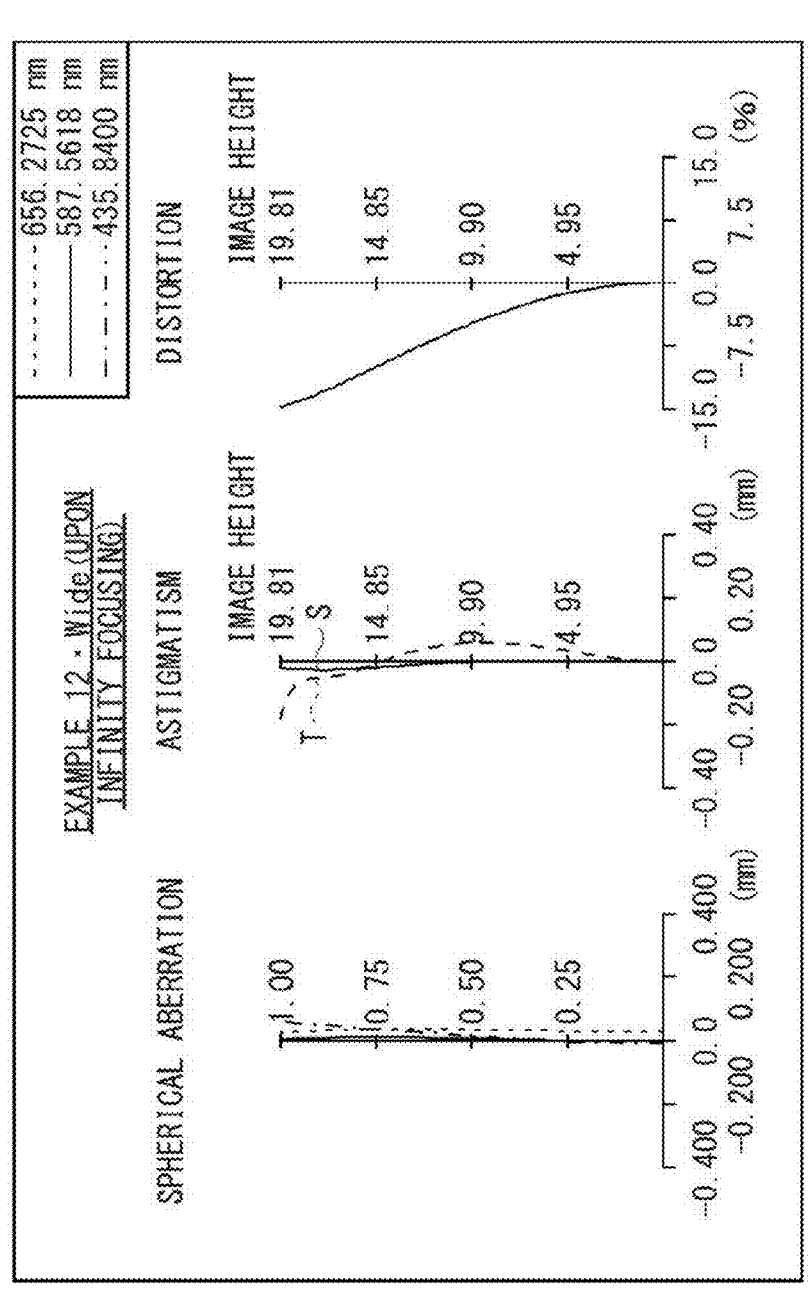

FIG. 145 is an aberration diagram illustrating longitudinal aberration upon infinity focusing at a wide-angle end of the zoom lens according to Example 12.

Figure 146:
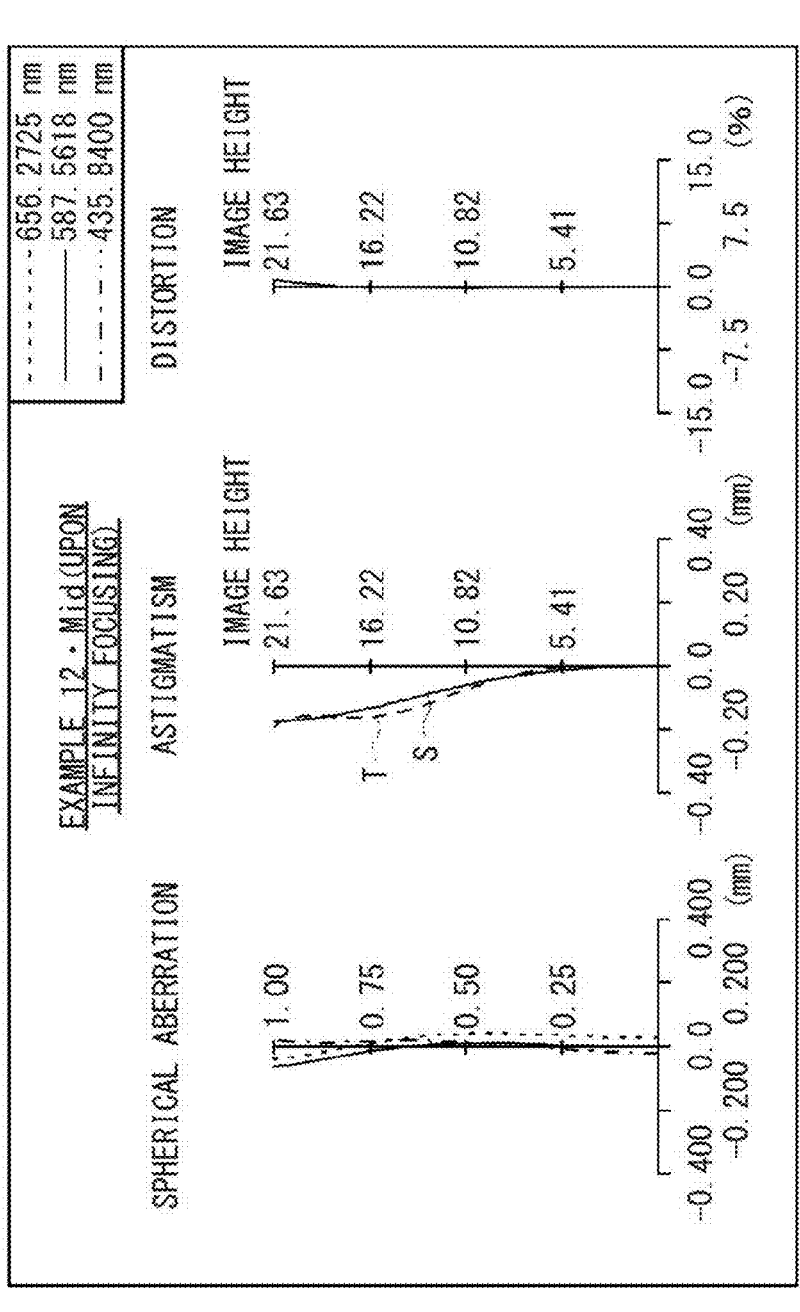

FIG. 146 is an aberration diagram illustrating longitudinal aberration upon infinity focusing at an intermediate position of the zoom lens according to Example 12.

Figure 147:
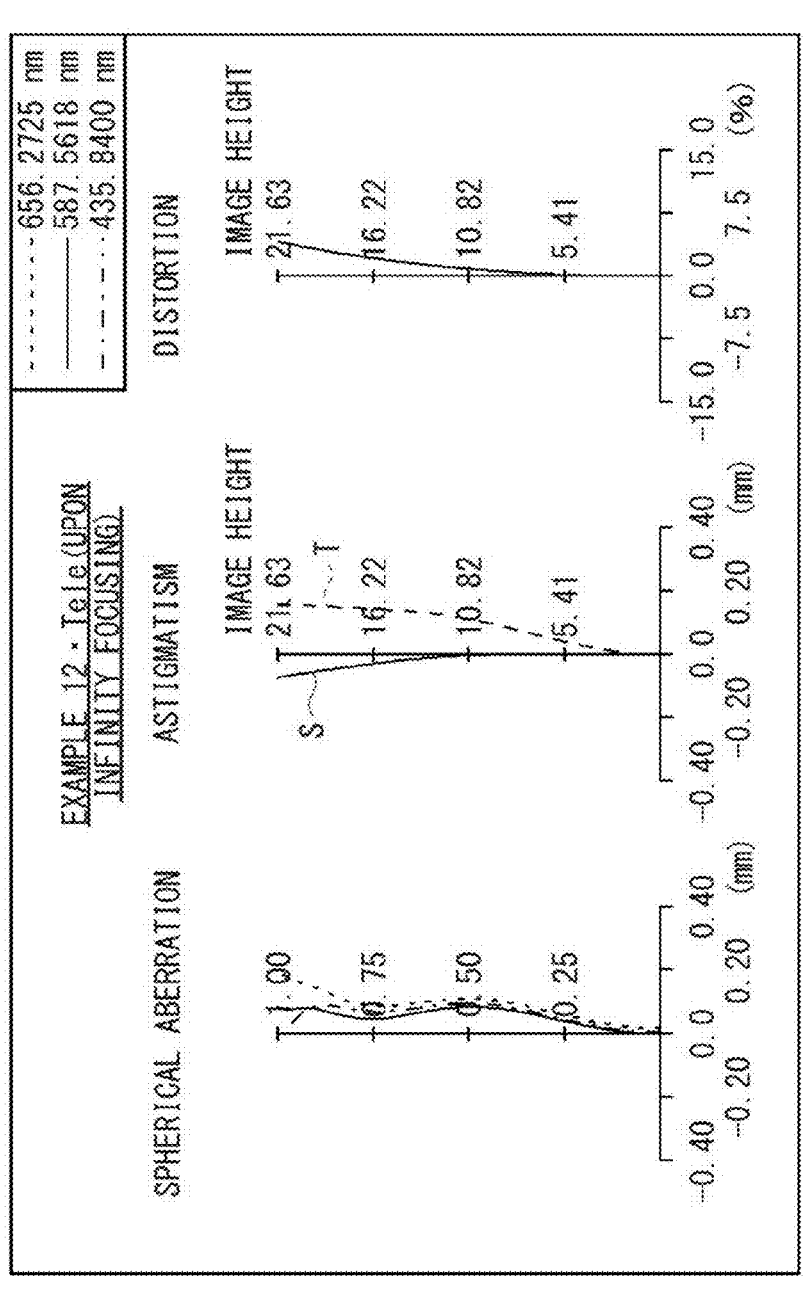

FIG. 147 is an aberration diagram illustrating longitudinal aberration upon infinity focusing at a telephoto end of the zoom lens according to Example 12.

Figure 148:
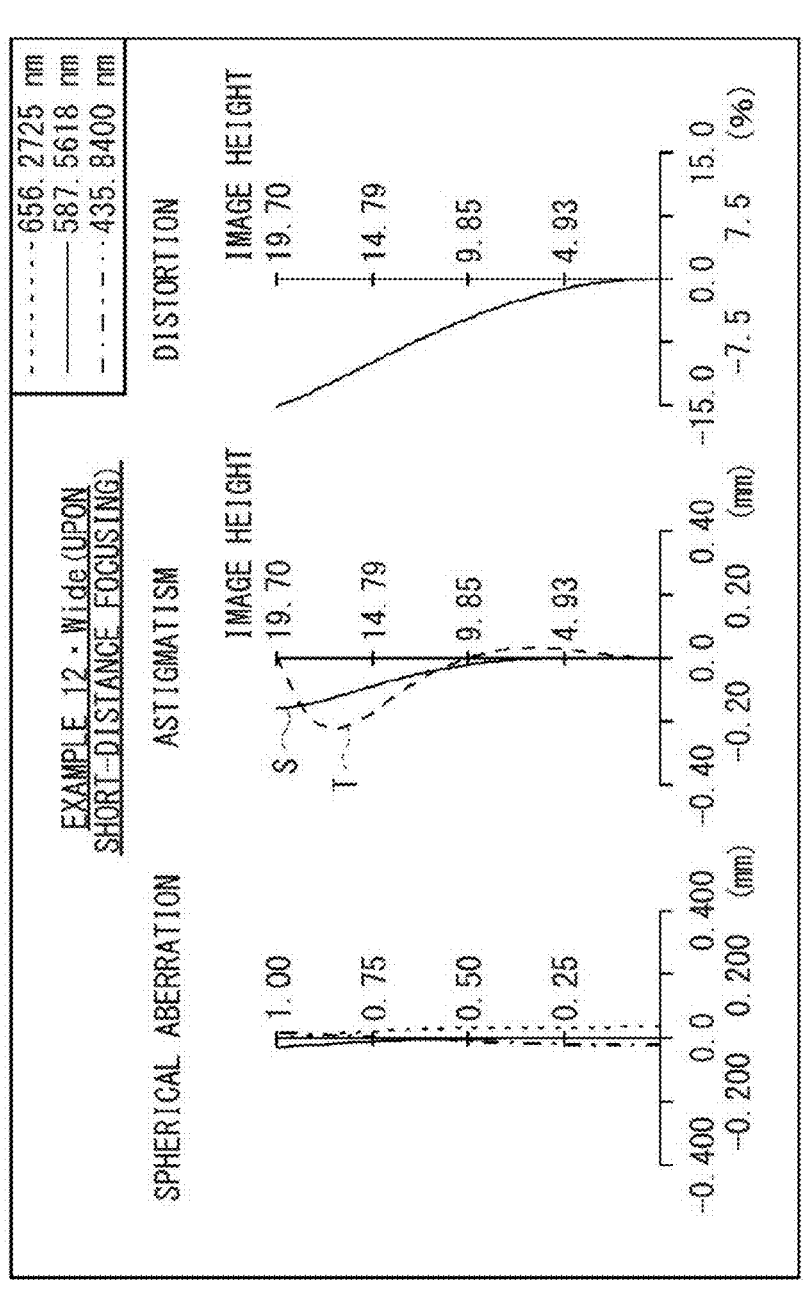

FIG. 148 is an aberration diagram illustrating longitudinal aberration upon short-distance focusing at the wide-angle end of the zoom lens according to Example 12.

Figure 149:
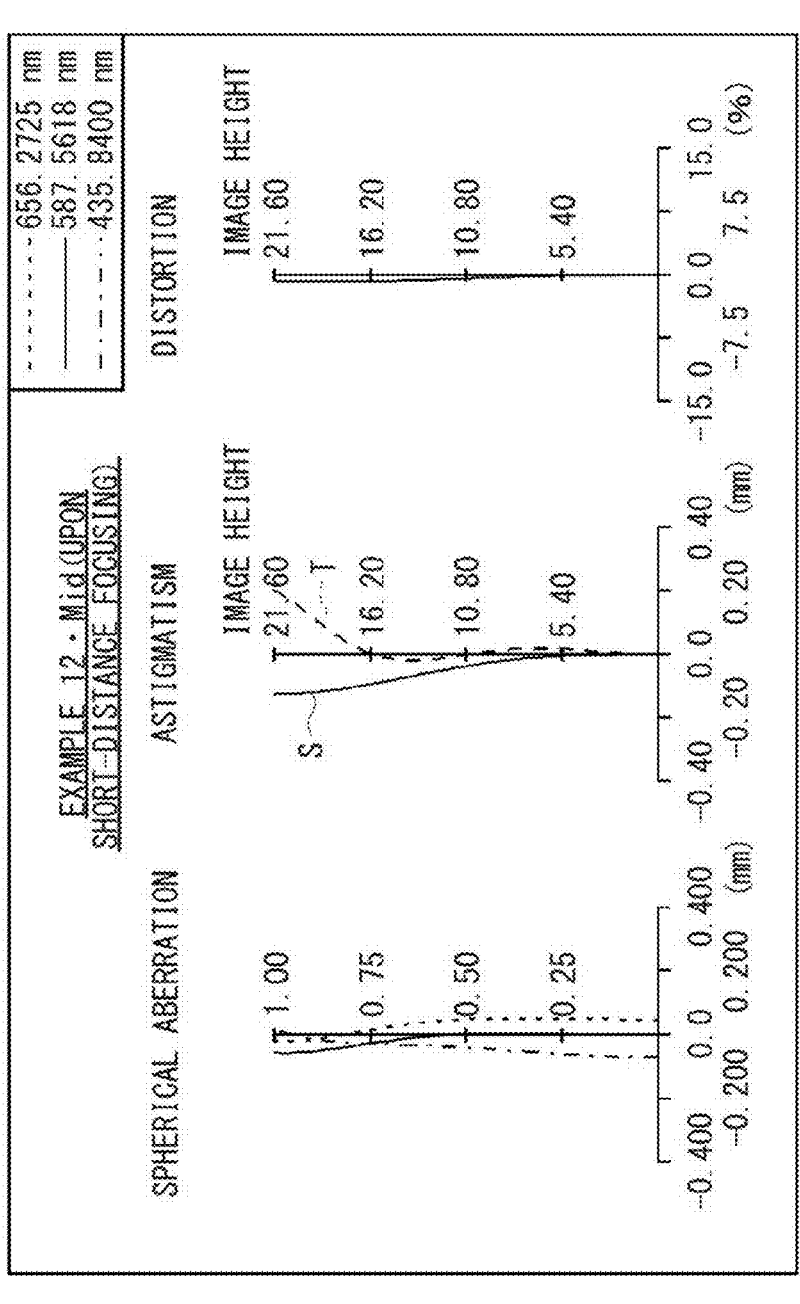

FIG. 149 is an aberration diagram illustrating longitudinal aberration upon short-distance focusing at the intermediate position of the zoom lens according to Example 12.

Figure 150:
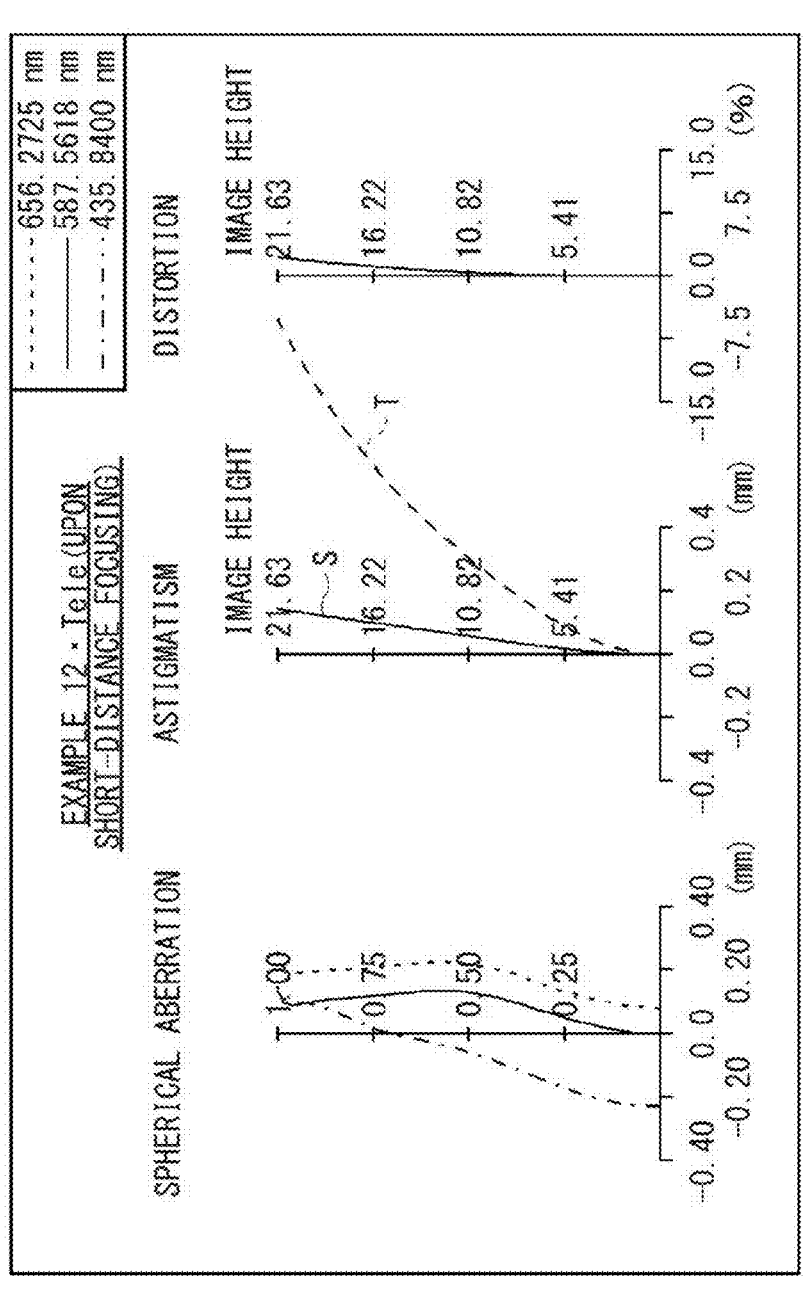

FIG. 150 is an aberration diagram illustrating longitudinal aberration upon short-distance focusing at the telephoto end of the zoom lens according to Example 12.

Figure 151:
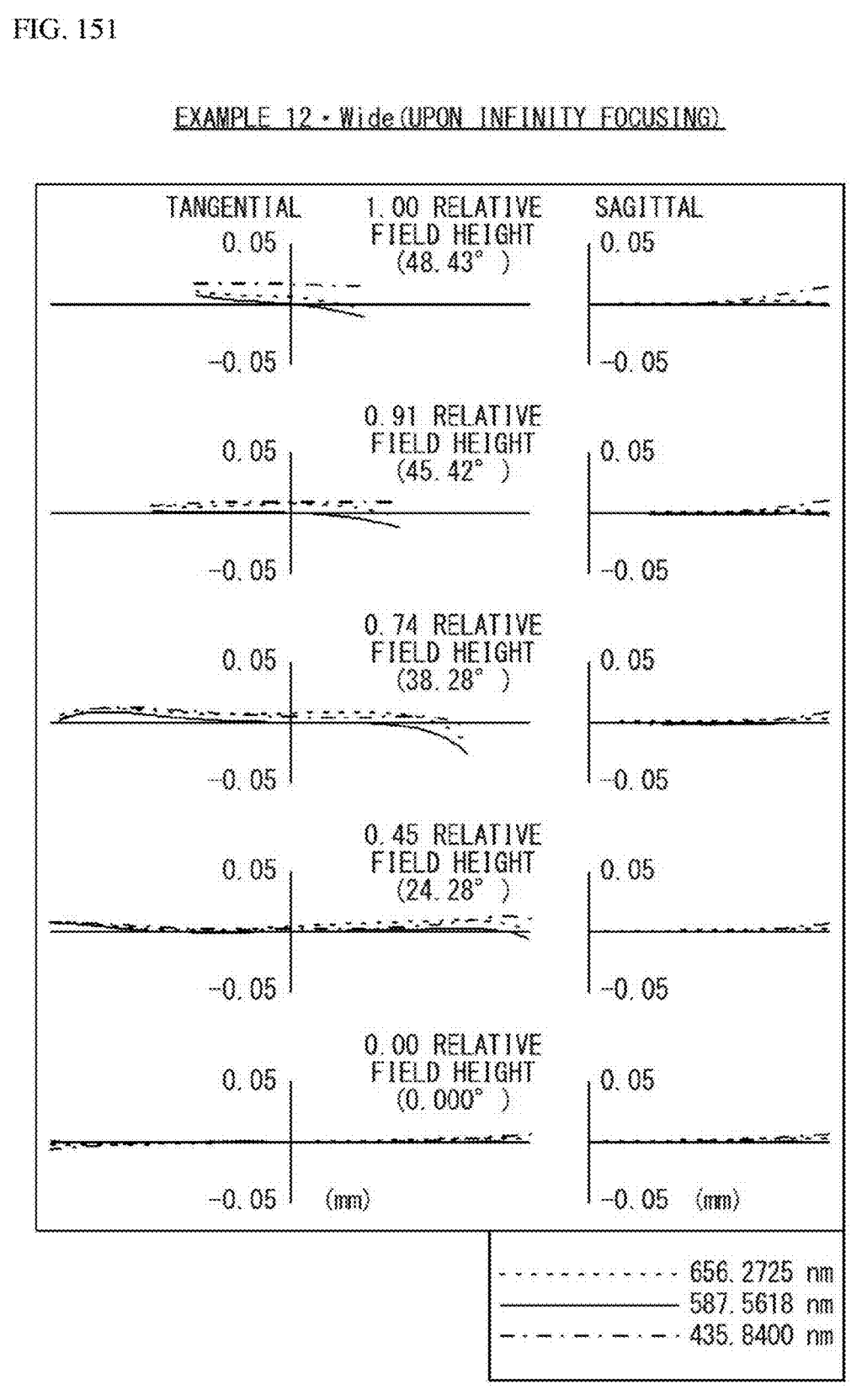

FIG. 151 is an aberration diagram illustrating lateral aberration upon infinity focusing at the wide-angle end of the zoom lens according to Example 12.

Figure 152:
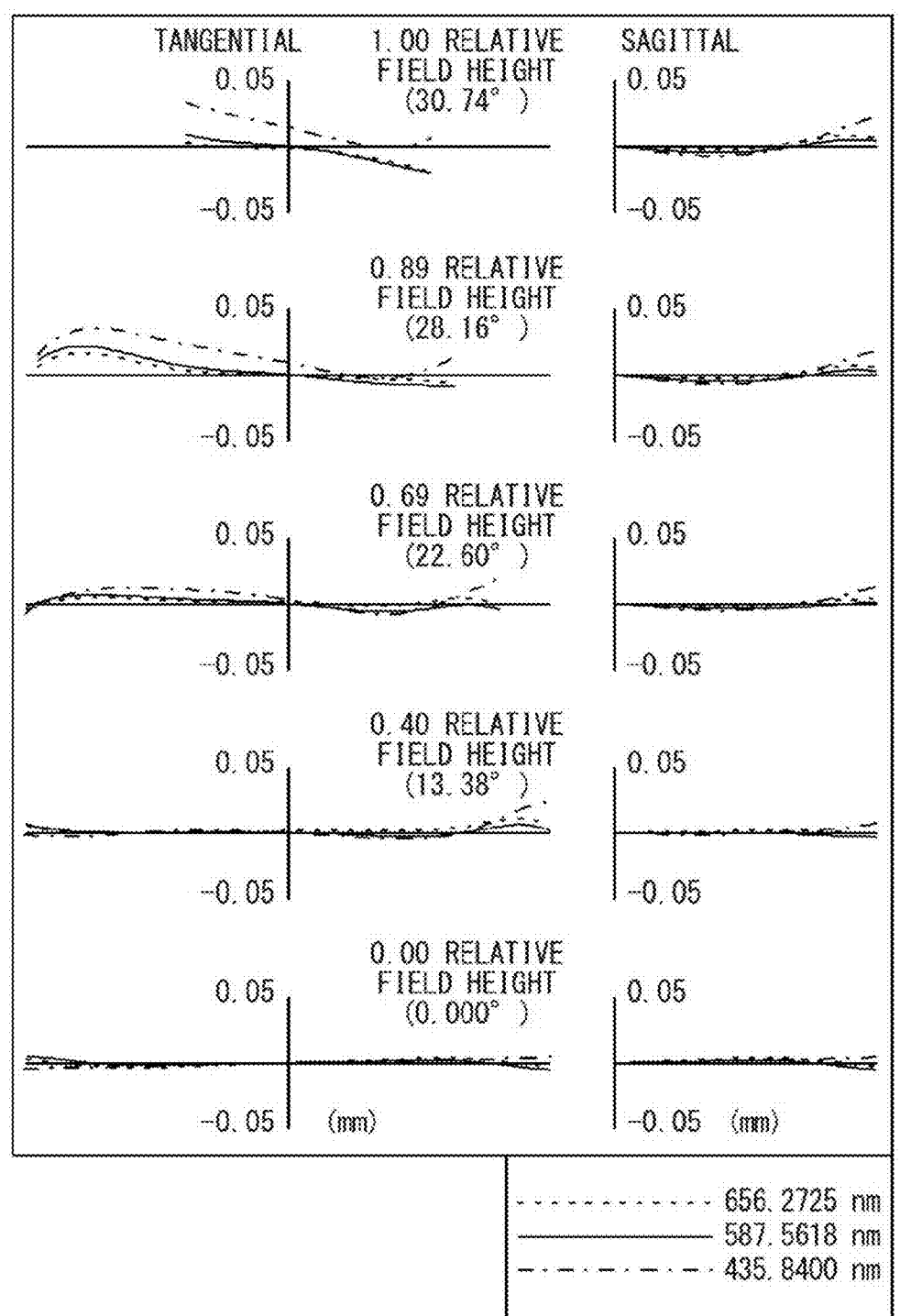

FIG. 152 is an aberration diagram illustrating lateral aberration upon infinity focusing at the intermediate position of the zoom lens according to Example 12.

Figure 153:
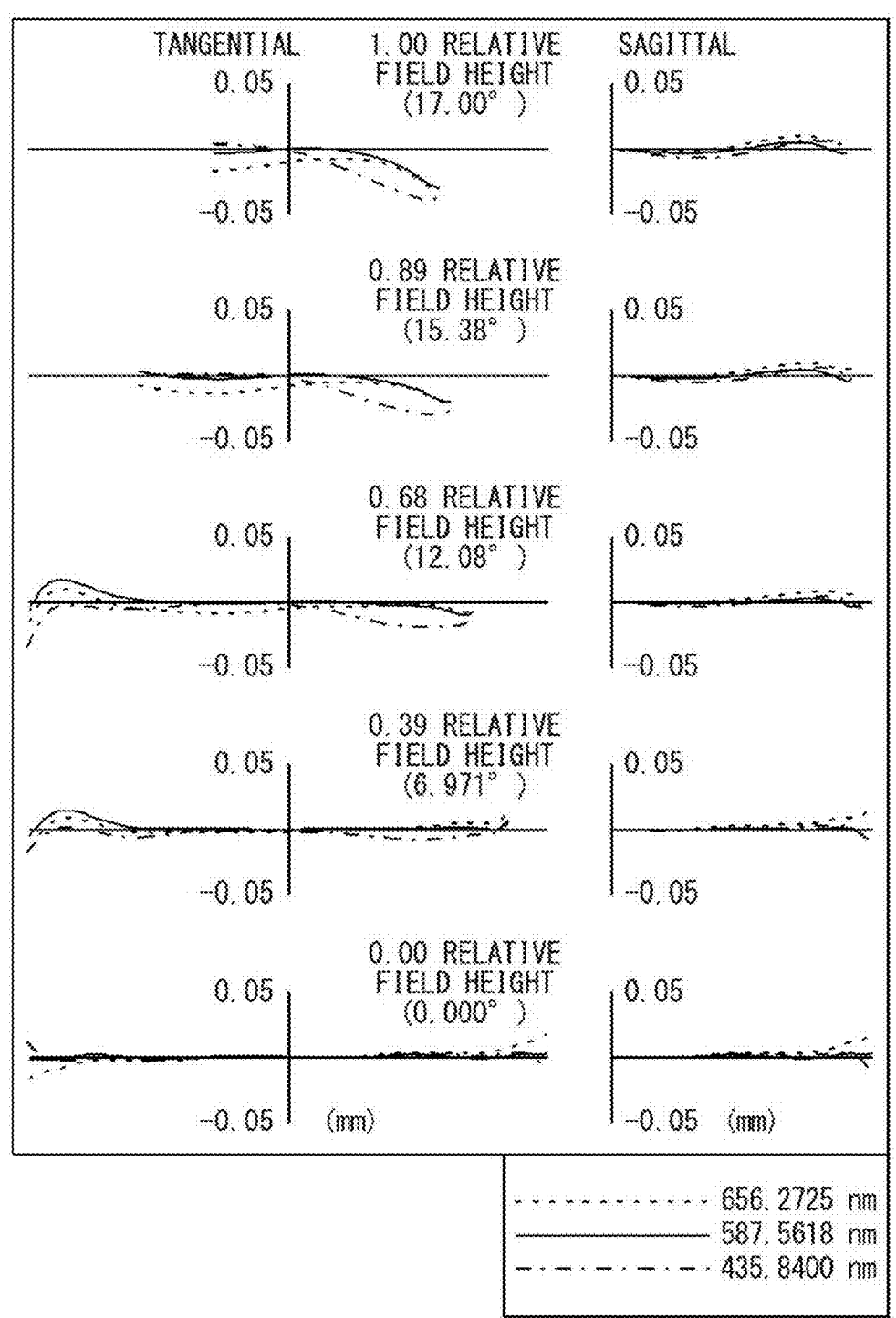

FIG. 153 is an aberration diagram illustrating lateral aberration upon infinity focusing at the telephoto end of the zoom lens according to Example 12.

Figure 154:
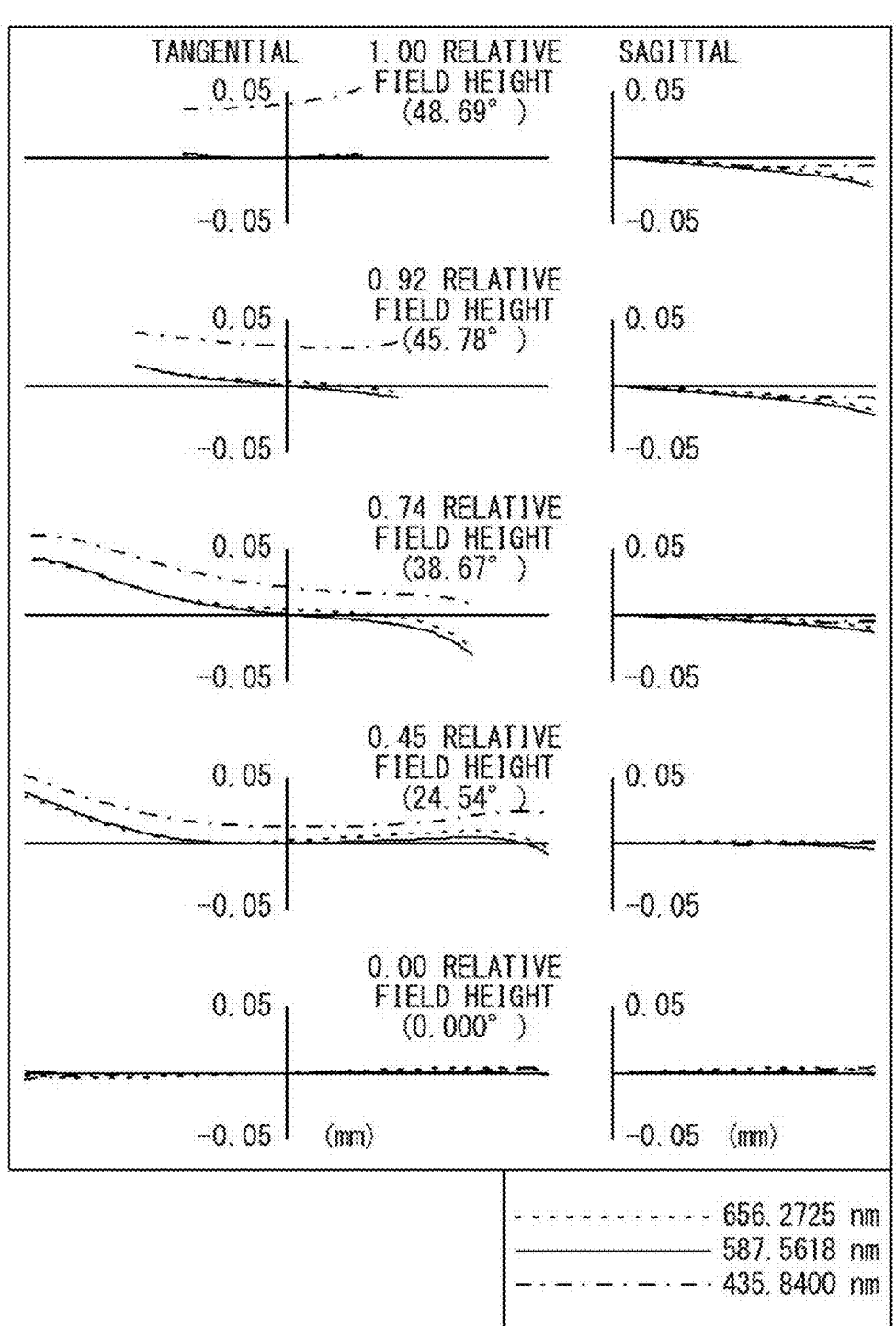

FIG. 154 is an aberration diagram illustrating lateral aberration upon short-distance focusing at the wide-angle end of the zoom lens according to Example 12.

Figure 155:
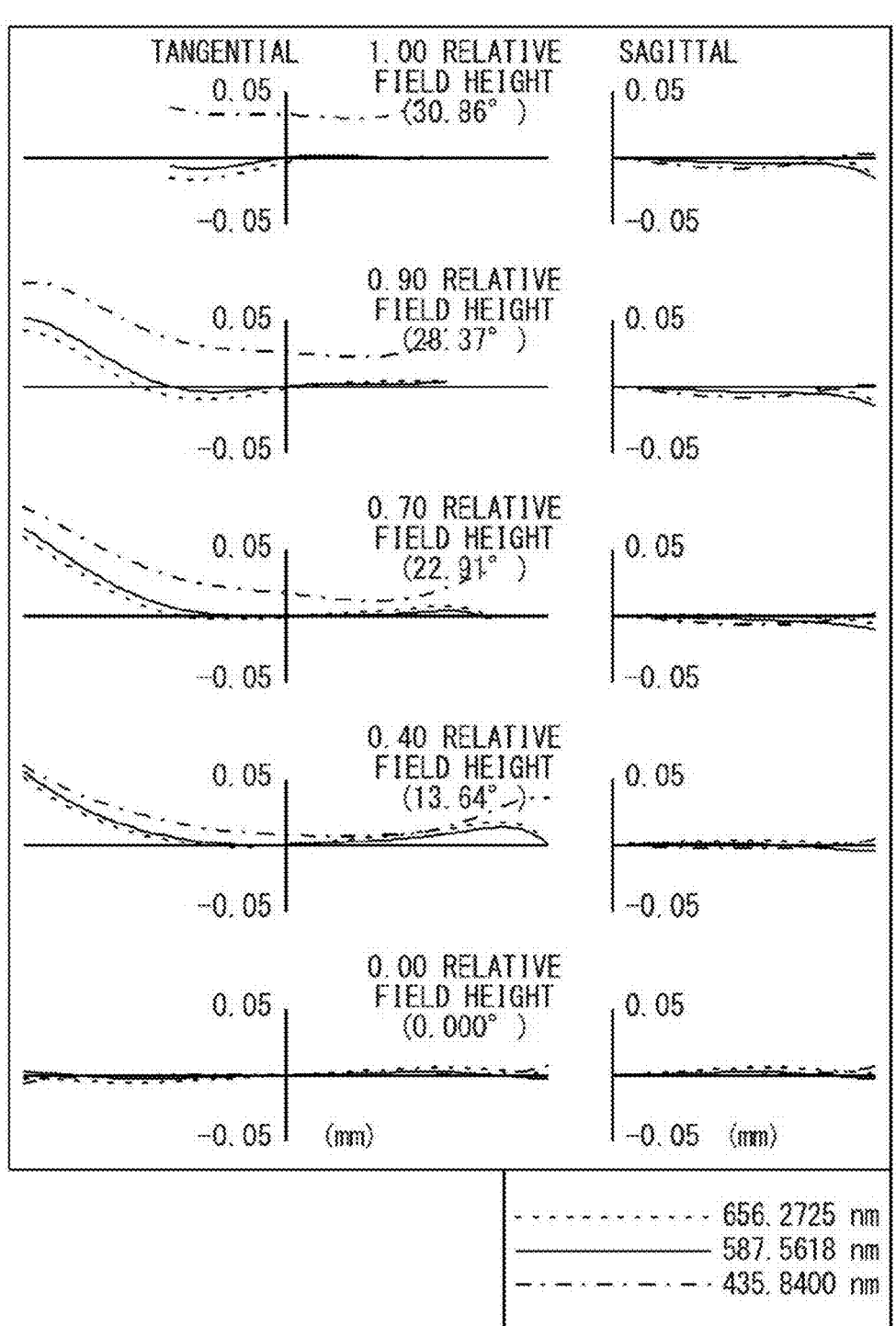

FIG. 155 is an aberration diagram illustrating lateral aberration upon short-distance focusing at the intermediate position of the zoom lens according to Example 12.

Figure 156:
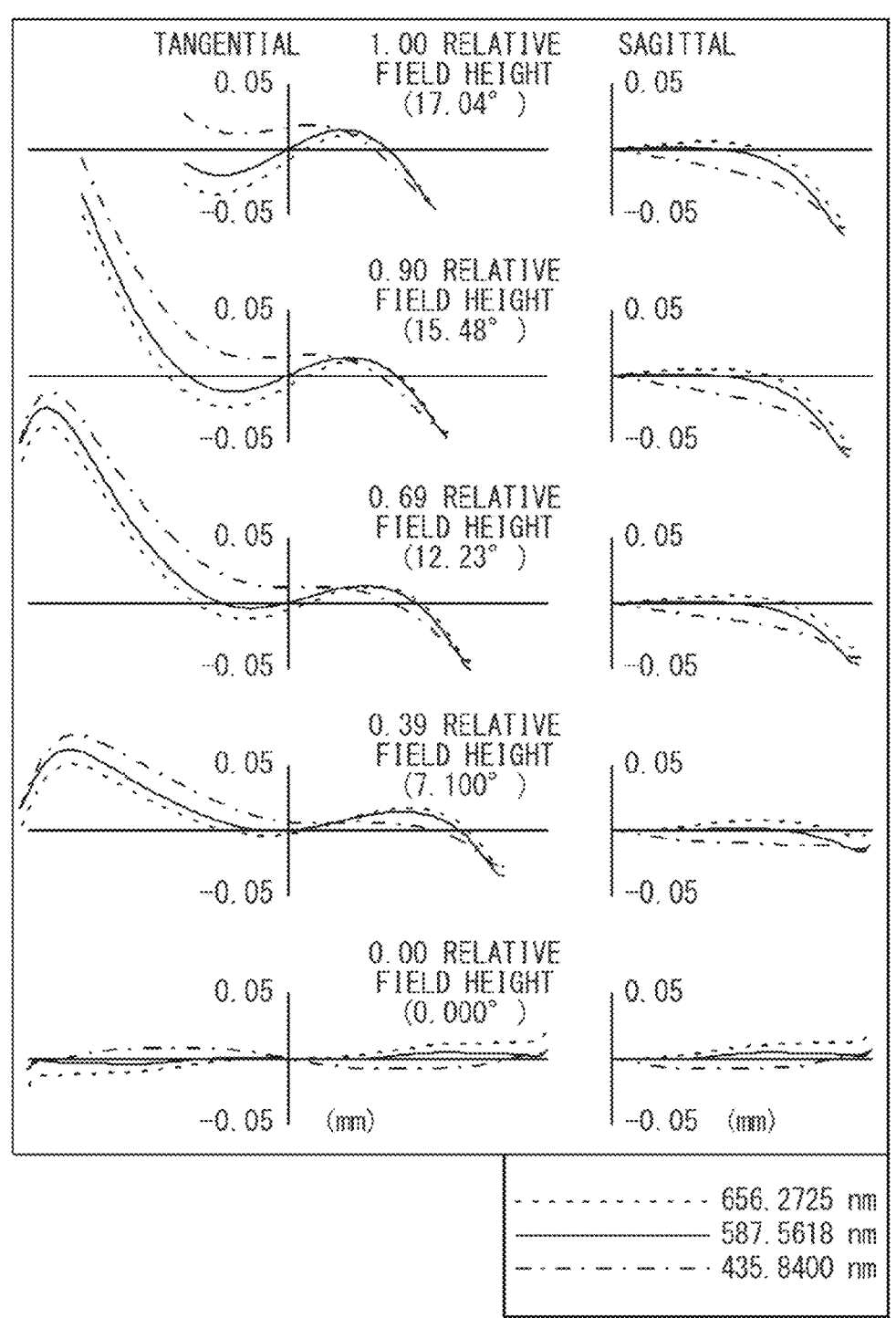

FIG. 156 is an aberration diagram illustrating lateral aberration upon short-distance focusing at the telephoto end of the zoom lens according to Example 12.

Figure 157:
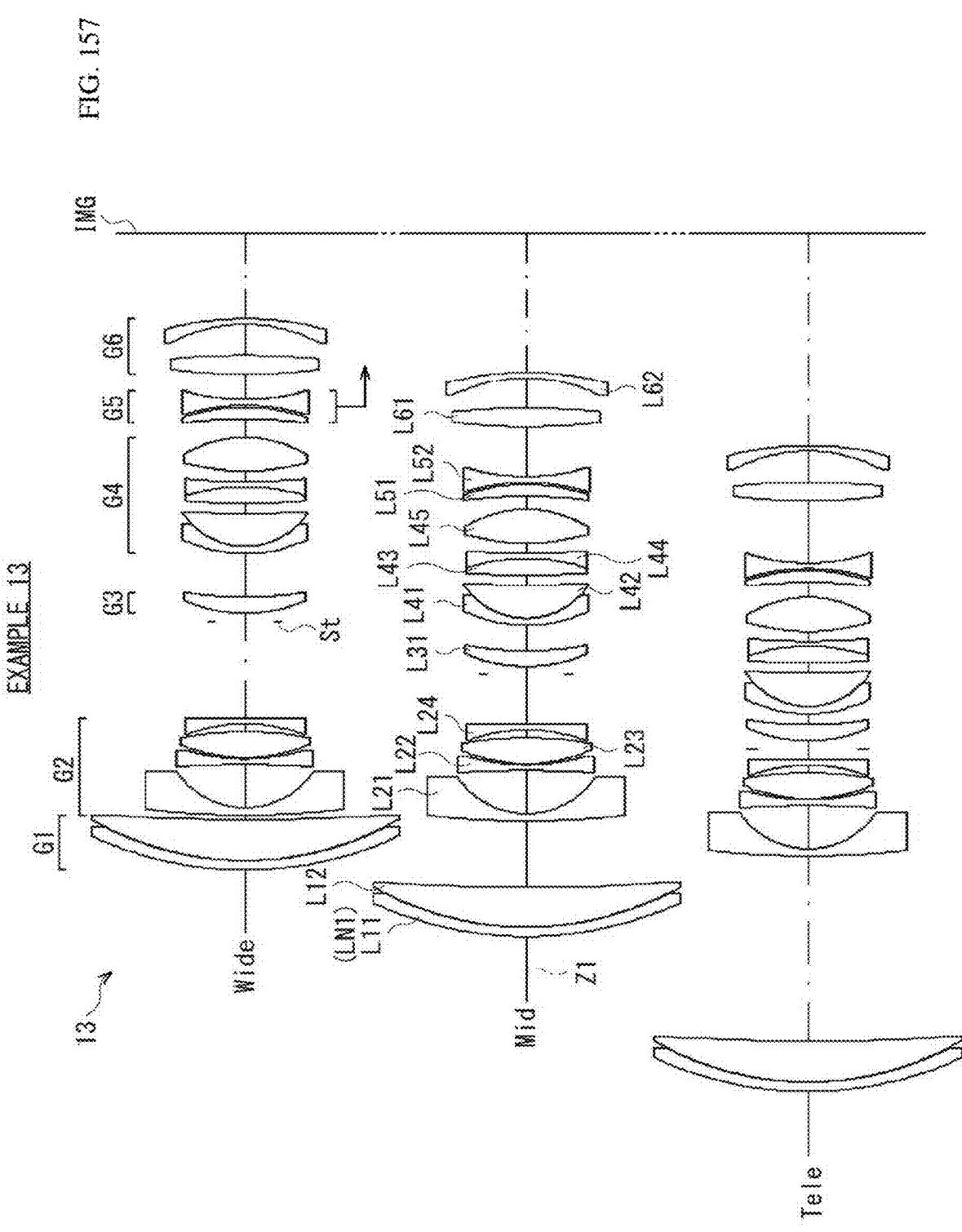

FIG. 157 is a lens cross-sectional view of a thirteenth configuration example (Example 13) of a zoom lens according to an embodiment.

Figure 158:
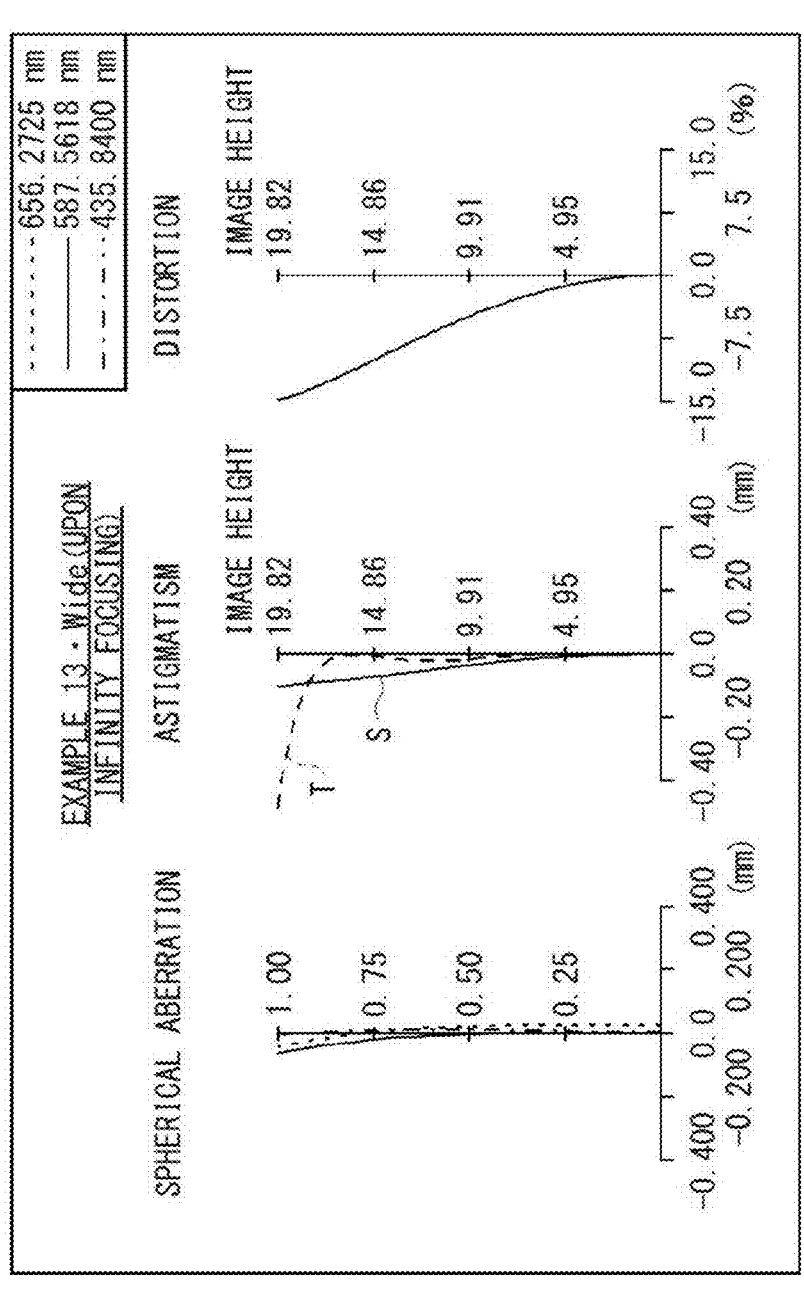

FIG. 158 is an aberration diagram illustrating longitudinal aberration upon infinity focusing at a wide-angle end of the zoom lens according to Example 13.

Figure 159:
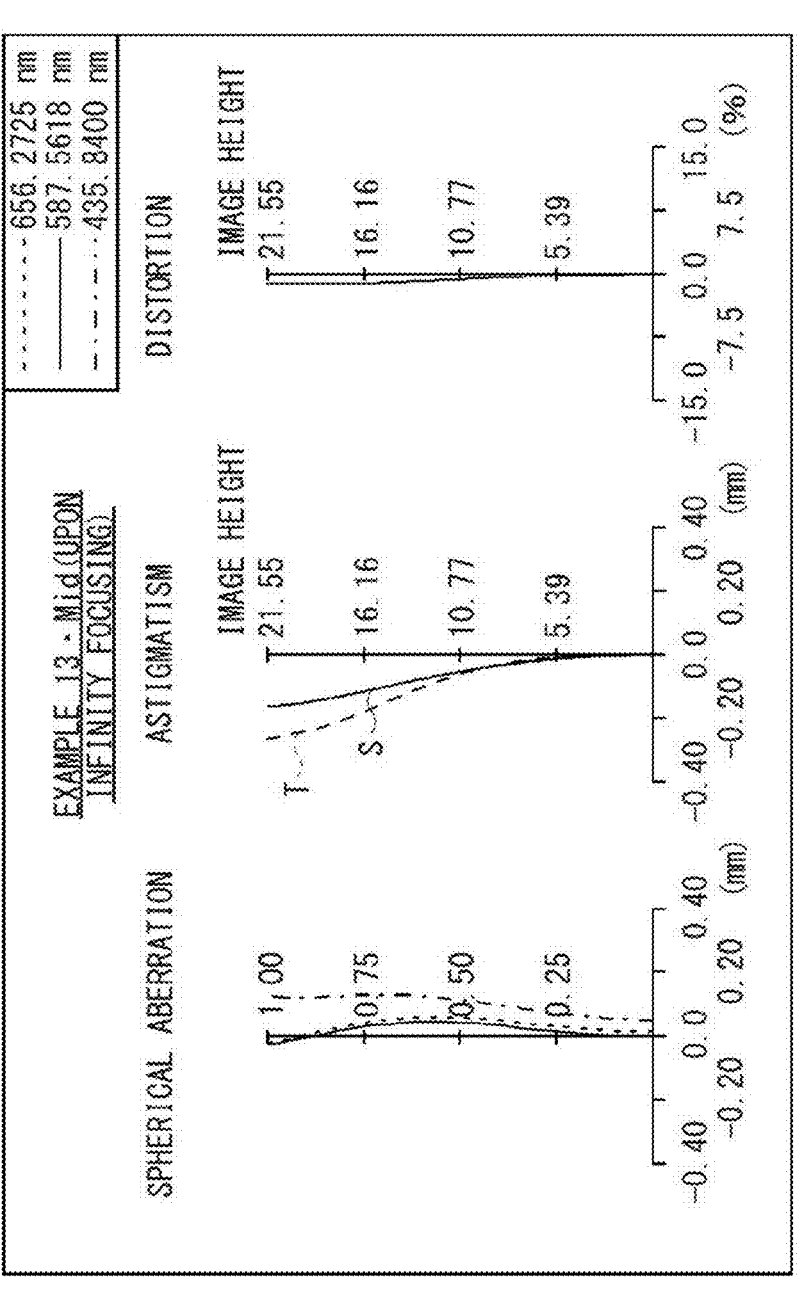

FIG. 159 is an aberration diagram illustrating longitudinal aberration upon infinity focusing at an intermediate position of the zoom lens according to Example 13.

Figure 160:
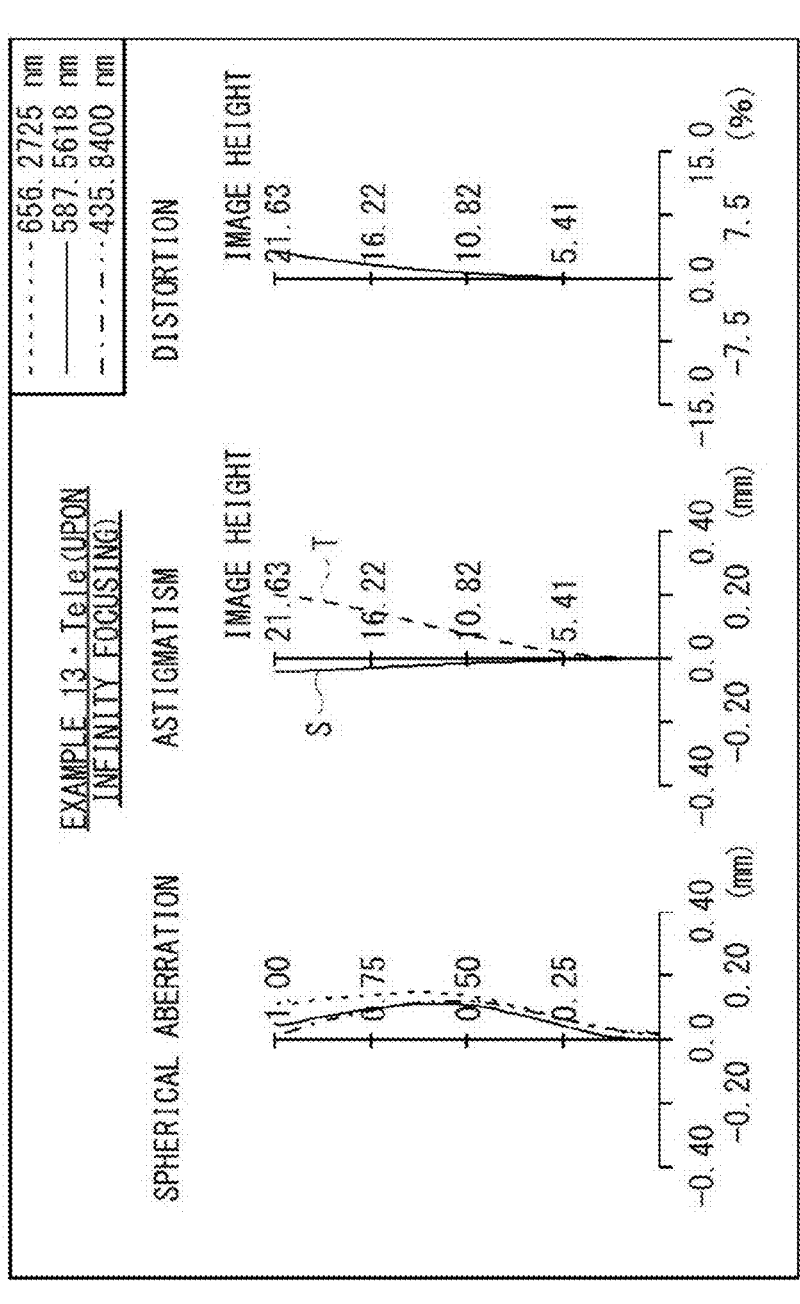

FIG. 160 is an aberration diagram illustrating longitudinal aberration upon infinity focusing at a telephoto end of the zoom lens according to Example 13.

Figure 161:
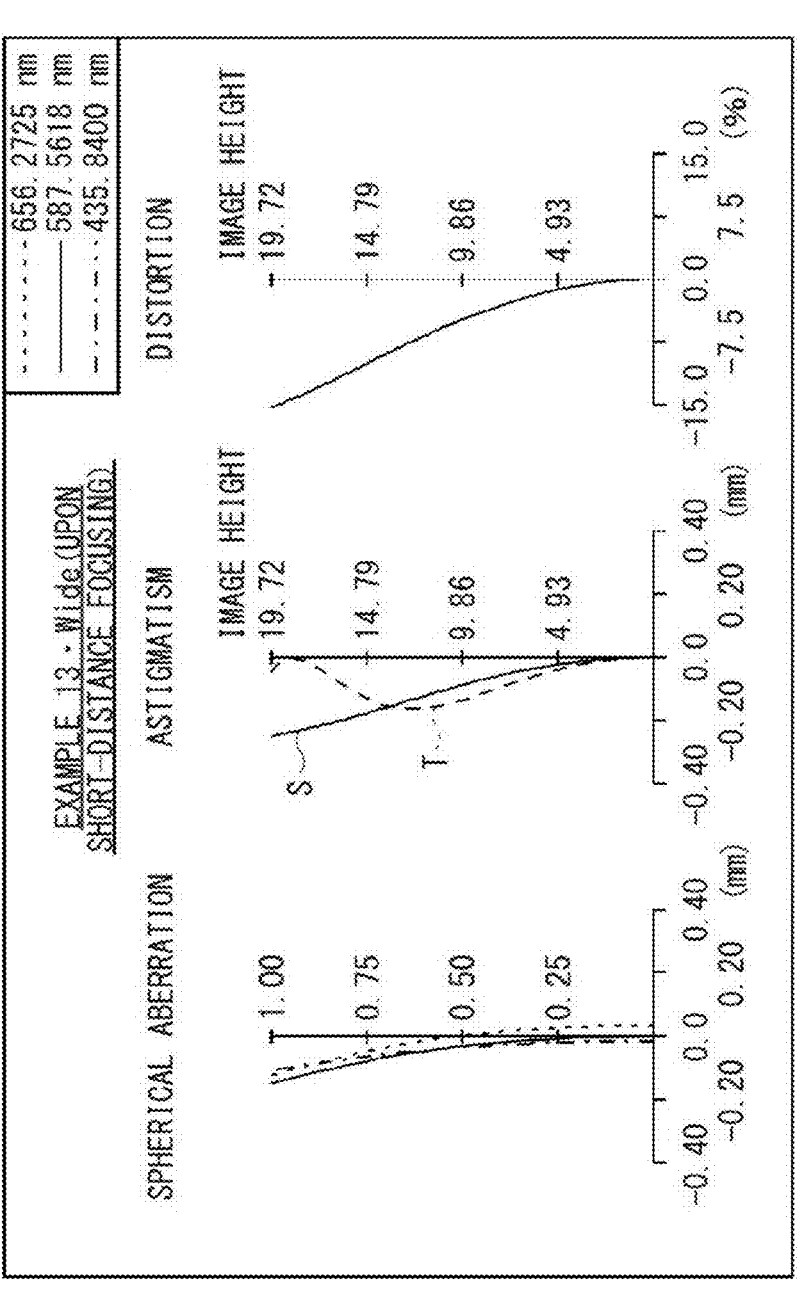

FIG. 161 is an aberration diagram illustrating longitudinal aberration upon short-distance focusing at the wide-angle end of the zoom lens according to Example 13.

Figure 162:
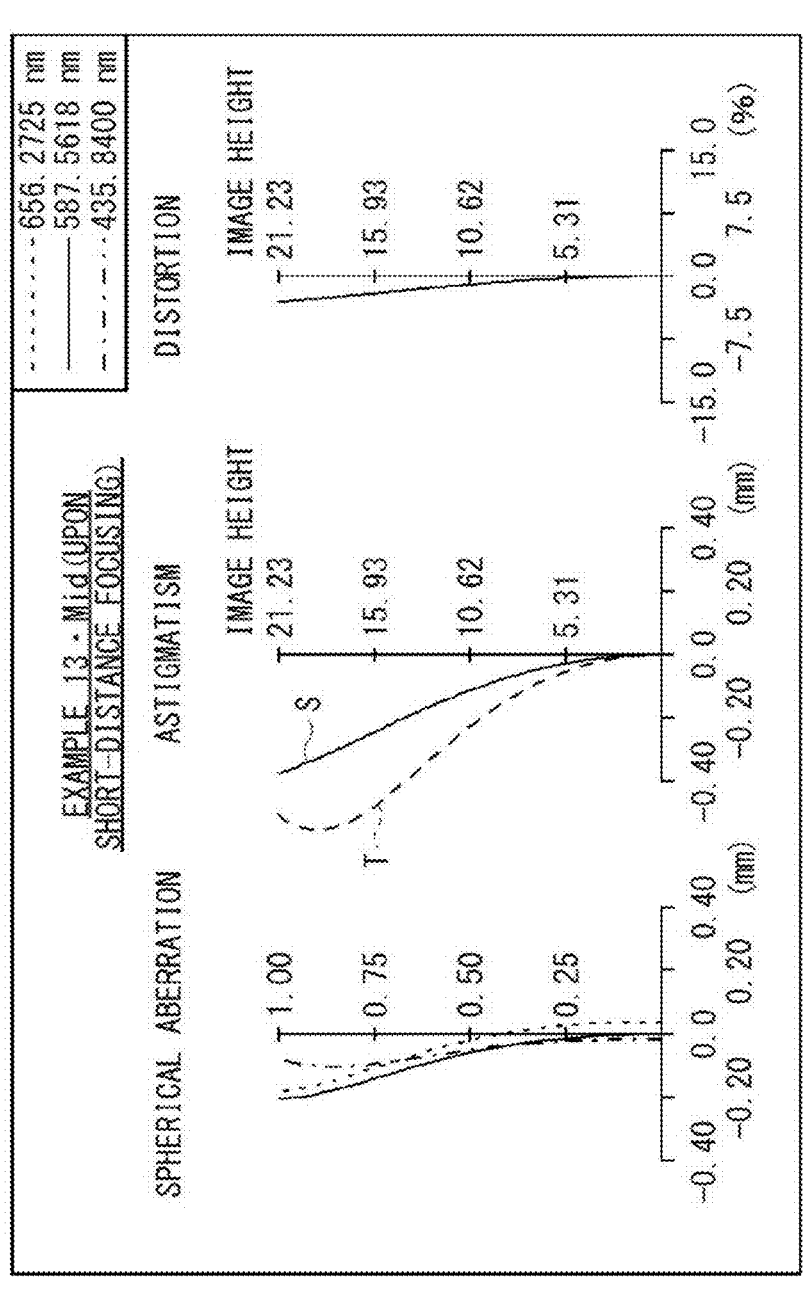

FIG. 162 is an aberration diagram illustrating longitudinal aberration upon short-distance focusing at the intermediate position of the zoom lens according to Example 13.

Figure 163:
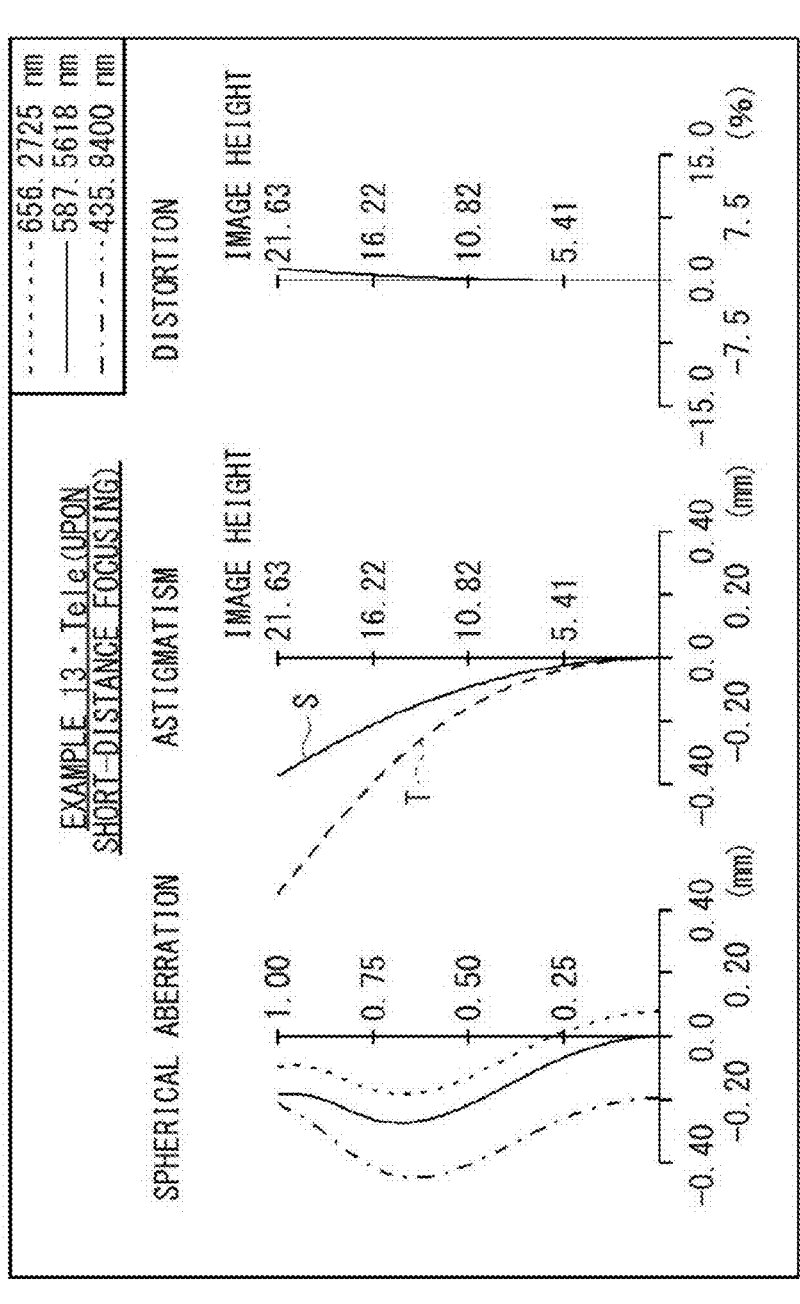

FIG. 163 is an aberration diagram illustrating longitudinal aberration upon short-distance focusing at the telephoto end of the zoom lens according to Example 13.

Figure 164:
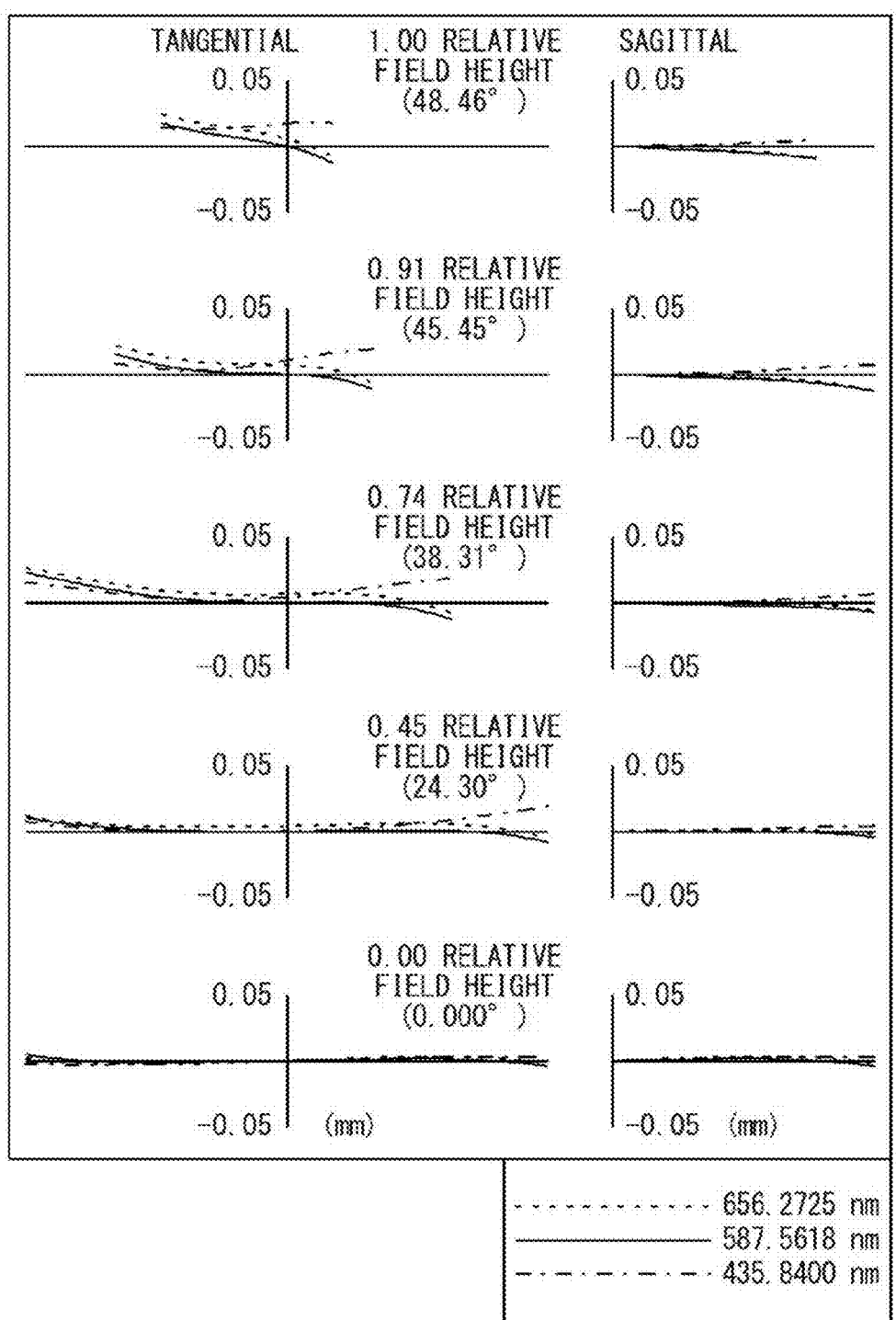

FIG. 164 is an aberration diagram illustrating lateral aberration upon infinity focusing at the wide-angle end of the zoom lens according to Example 13.

Figure 165:
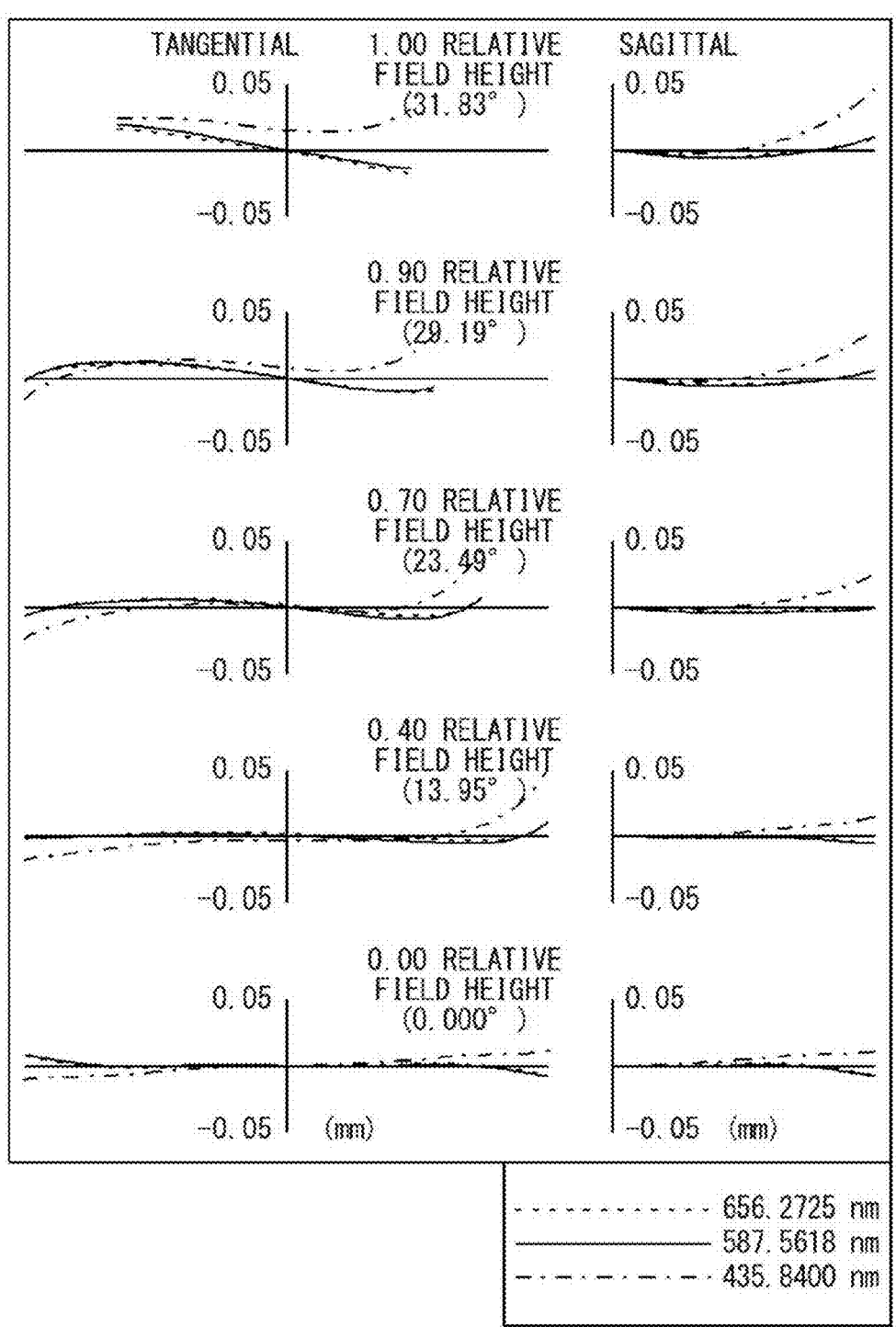

FIG. 165 is an aberration diagram illustrating lateral aberration upon infinity focusing at the intermediate position of the zoom lens according to Example 13.

Figure 166:
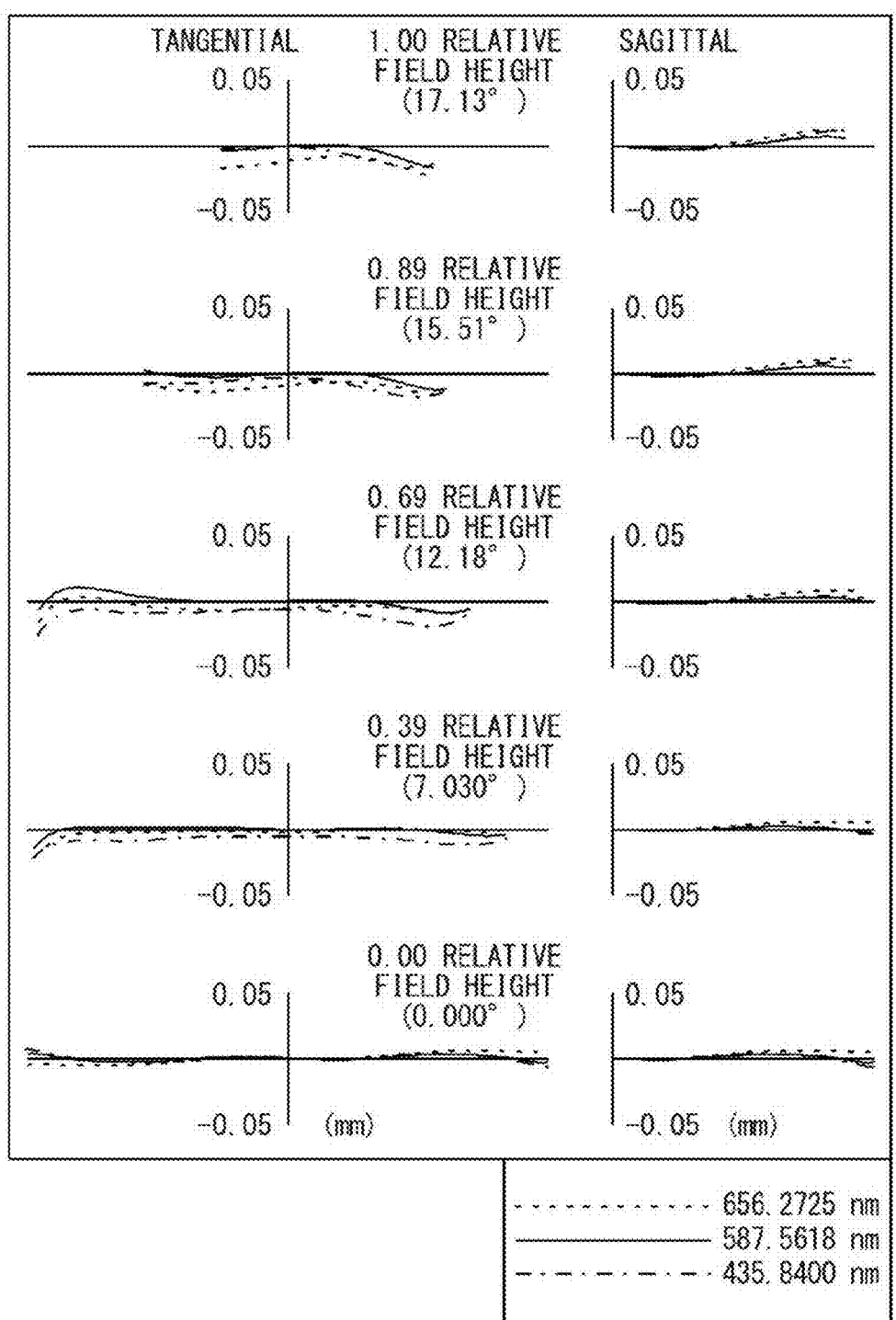

FIG. 166 is an aberration diagram illustrating lateral aberration upon infinity focusing at the telephoto end of the zoom lens according to Example 13.

Figure 167:
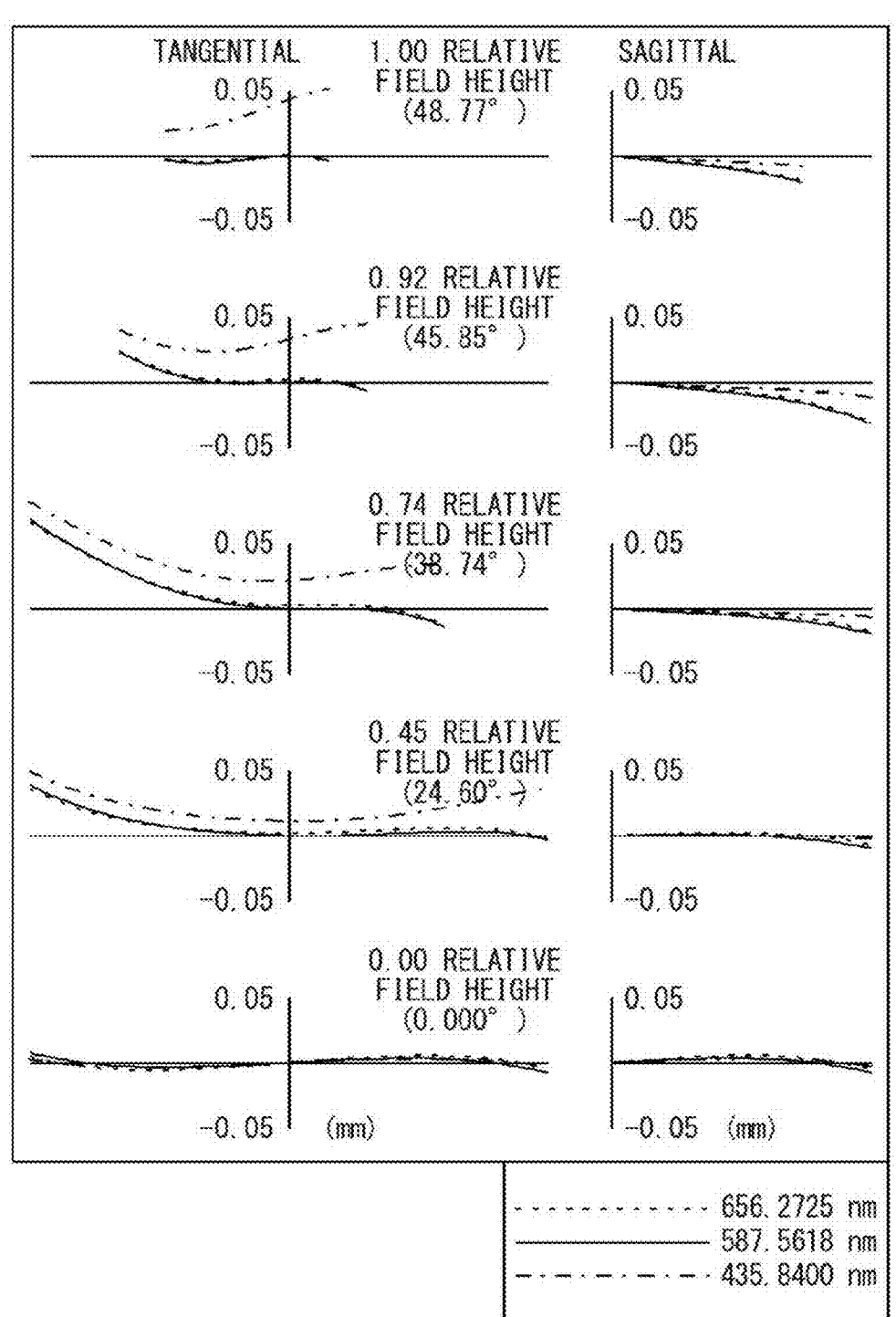

FIG. 167 is an aberration diagram illustrating lateral aberration upon short-distance focusing at the wide-angle end of the zoom lens according to Example 13.

Figure 168:
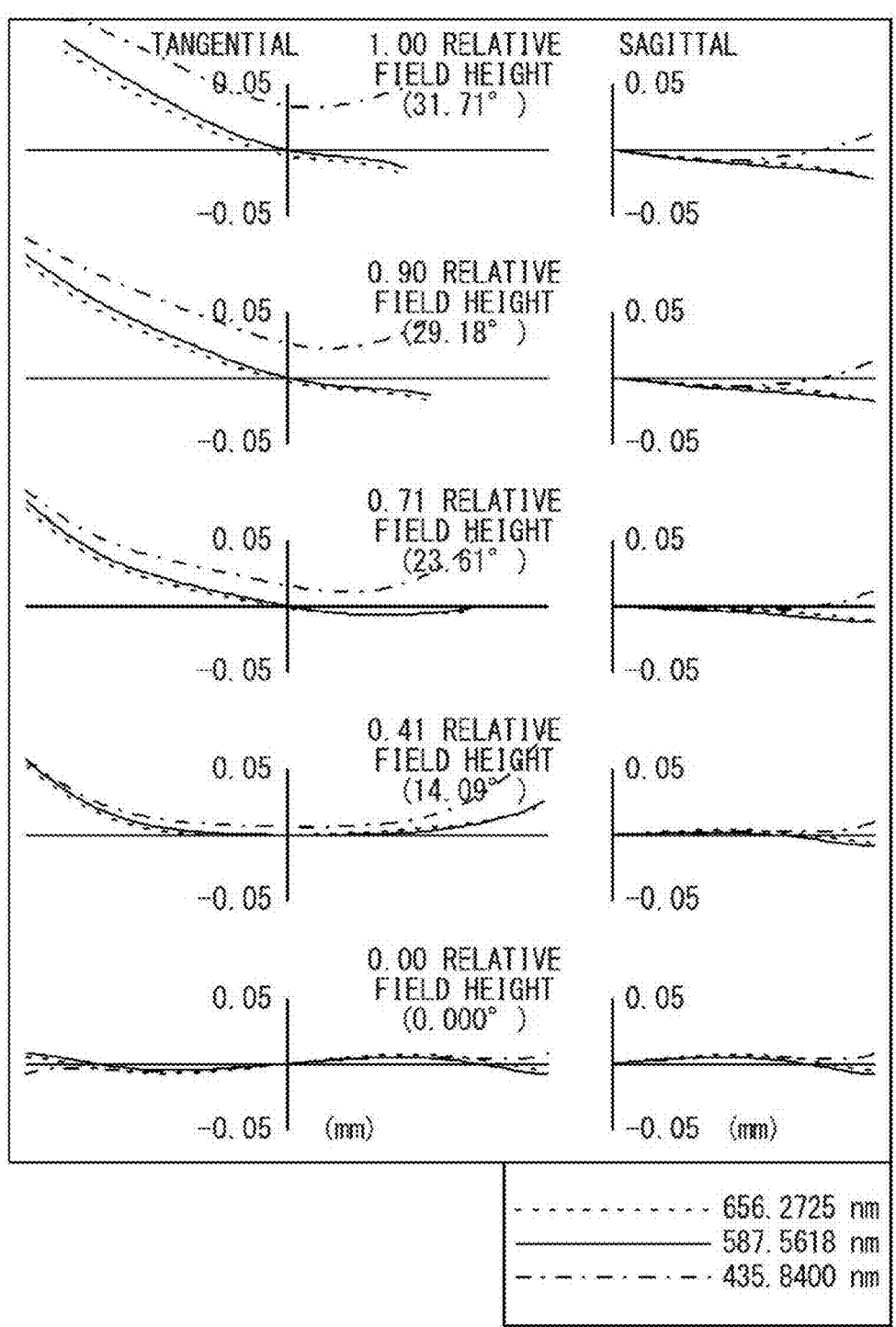

FIG. 168 is an aberration diagram illustrating lateral aberration upon short-distance focusing at the intermediate position of the zoom lens according to Example 13.

Figure 169:
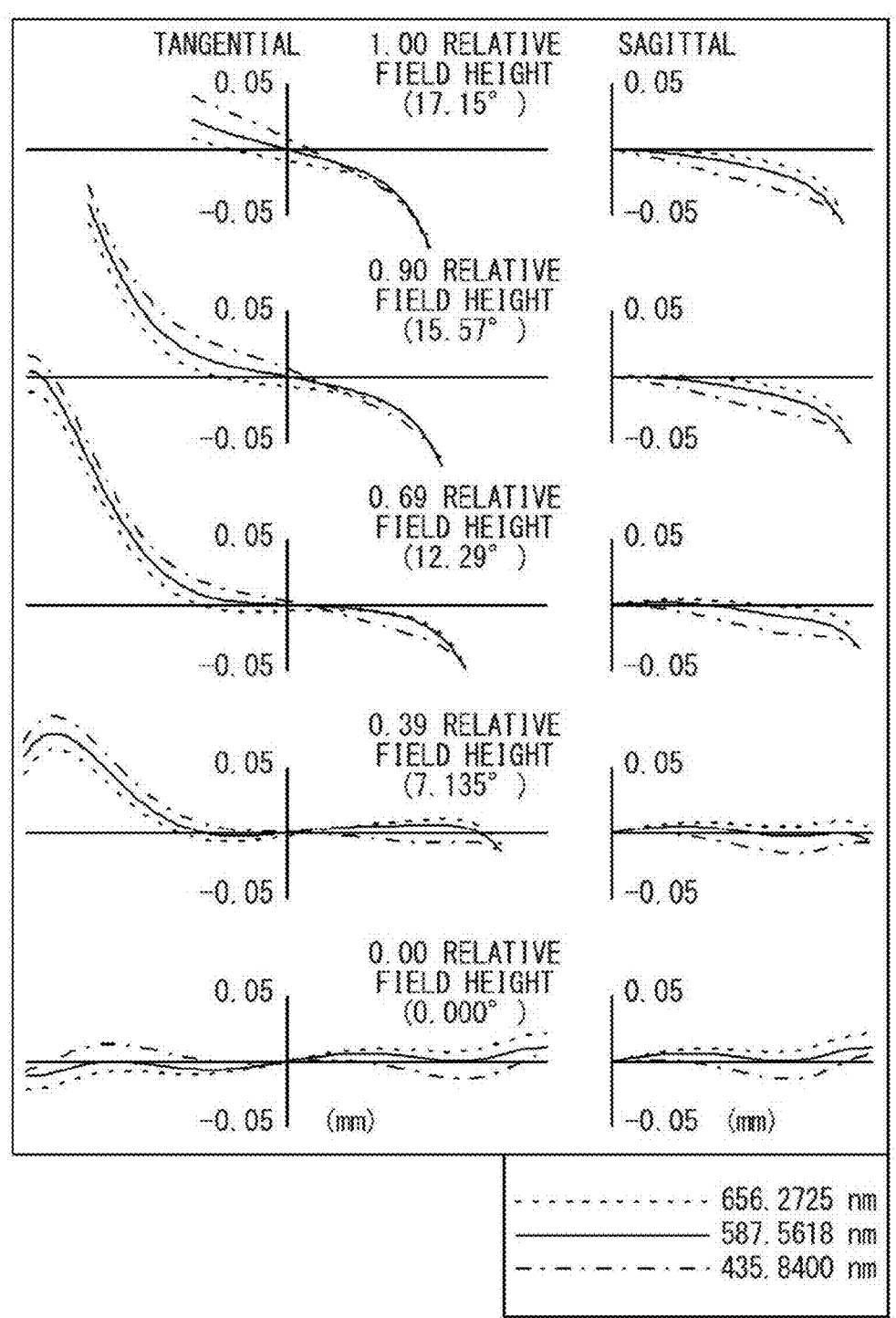

FIG. 169 is an aberration diagram illustrating lateral aberration upon short-distance focusing at the telephoto end of the zoom lens according to Example 13.

Figure 170:
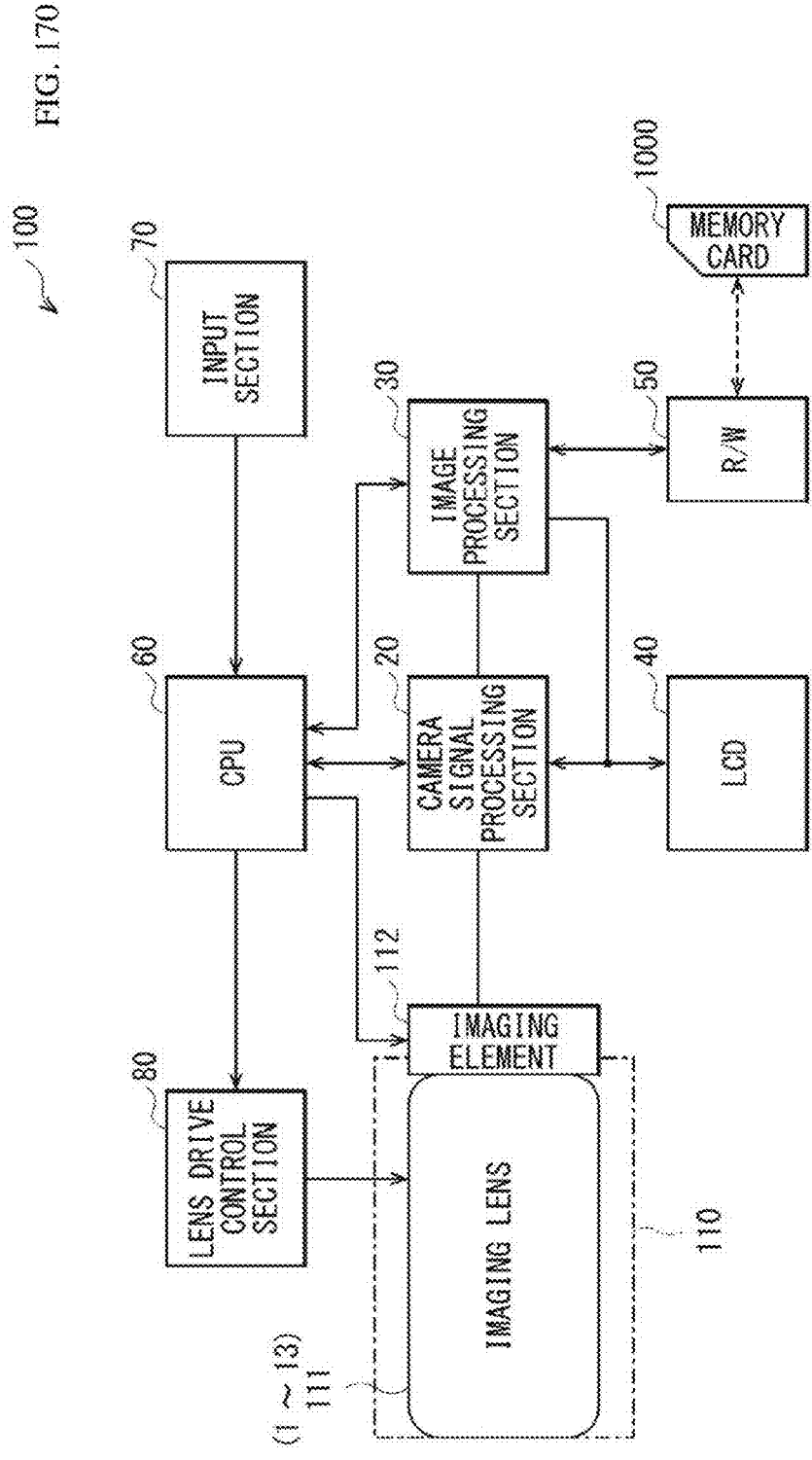

FIG. 170 is a block diagram illustrating a configuration example of an imaging apparatus.

Figure 171:
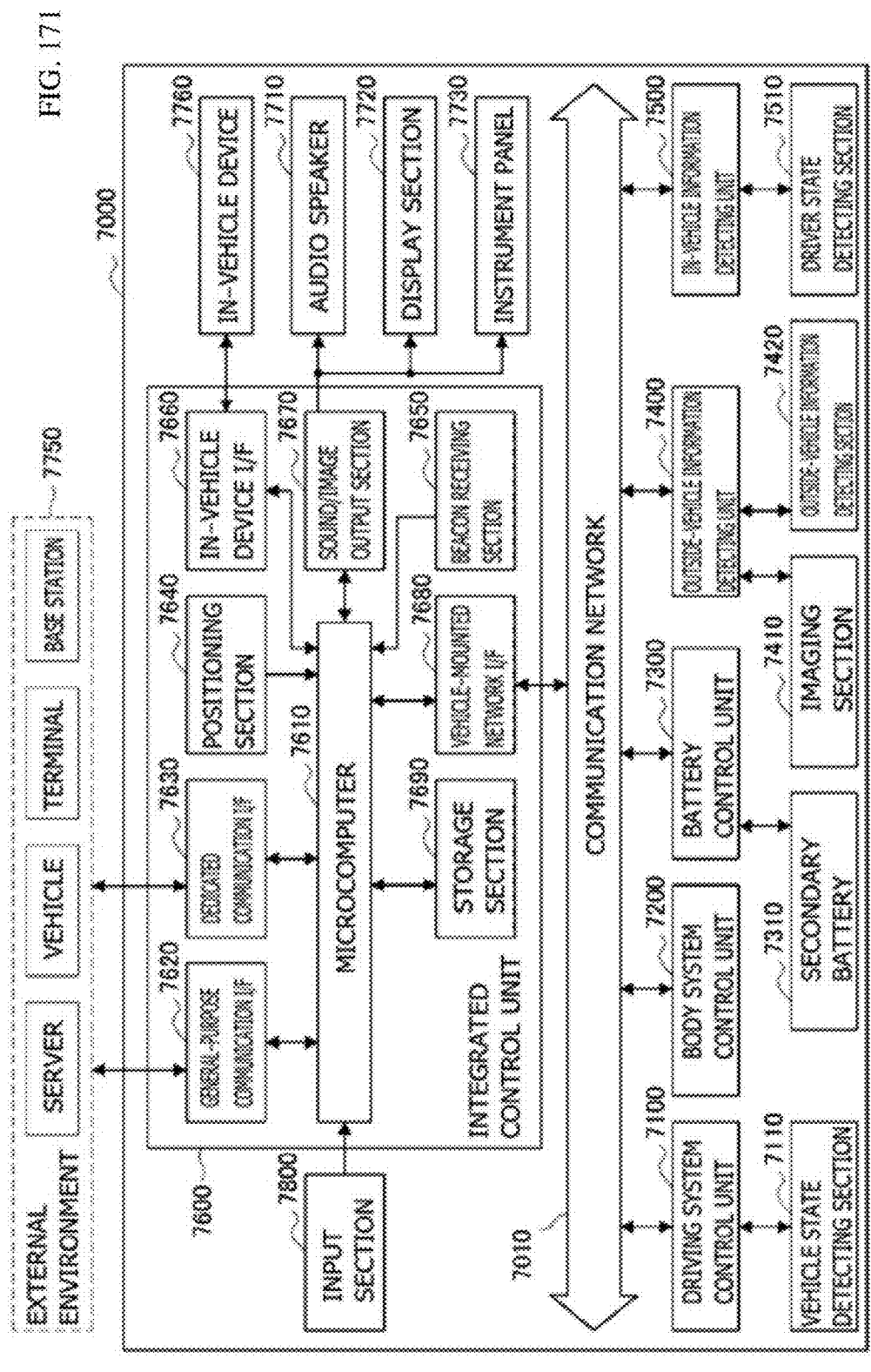

FIG. 171 is a block diagram depicting an example of schematic configuration of a vehicle control system.

Figure 172:
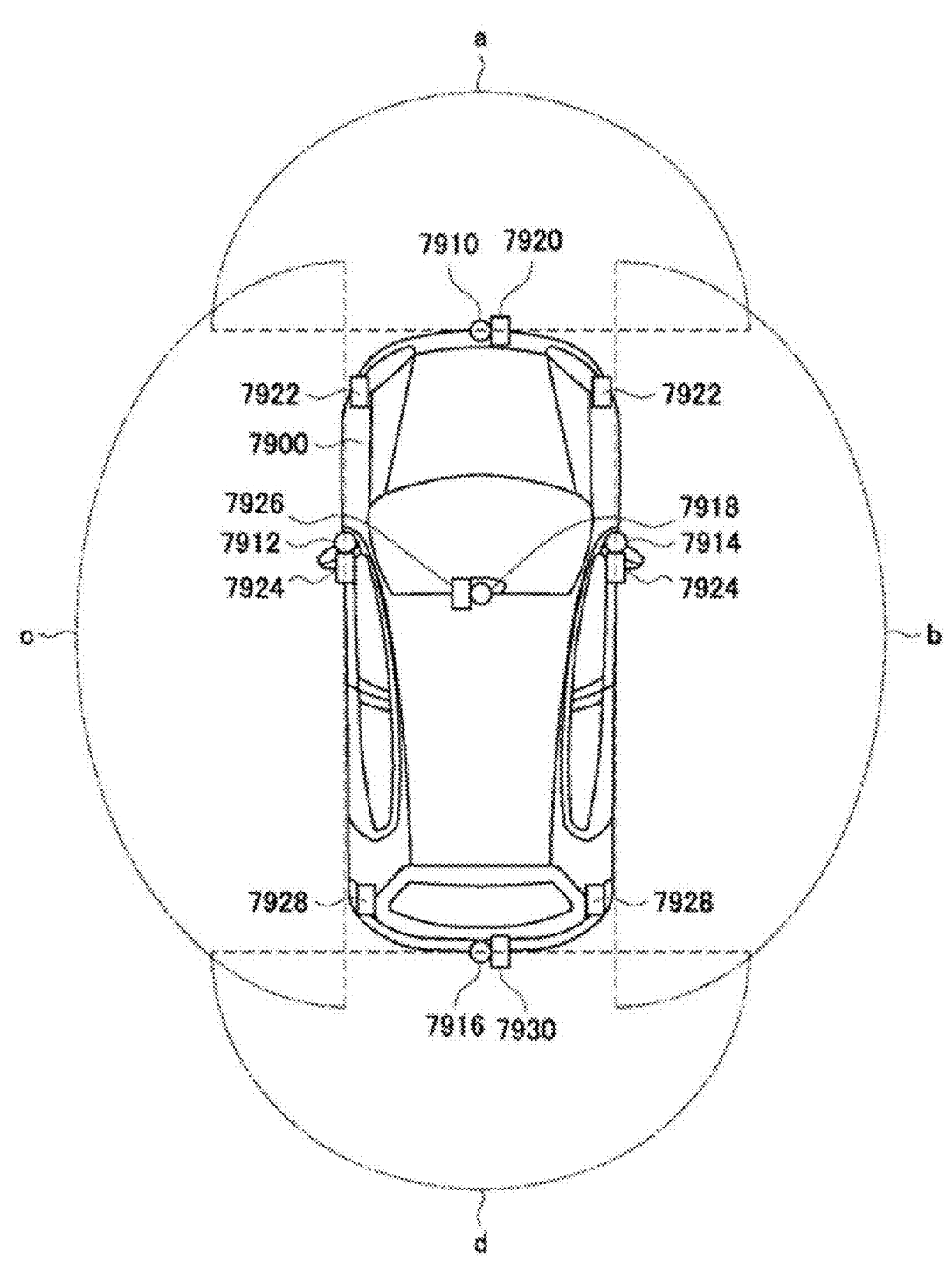

FIG. 172 is a diagram of assistance in explaining an example of installation positions of an outside-vehicle information detecting section and an imaging section.

Figure 173:
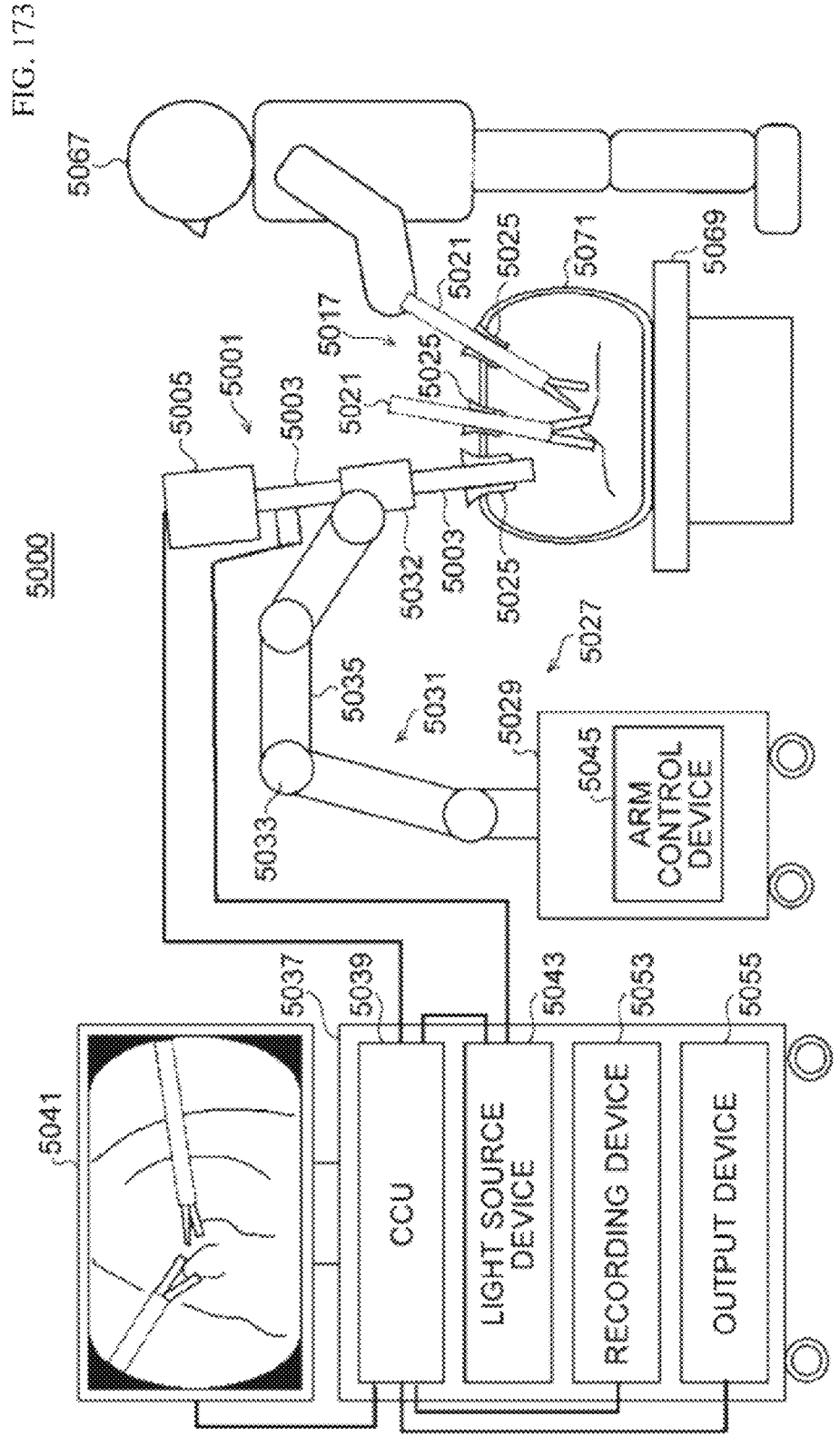

FIG. 173 is a diagram illustrating an example of a schematic configuration of an endoscope system.

Figure 174:
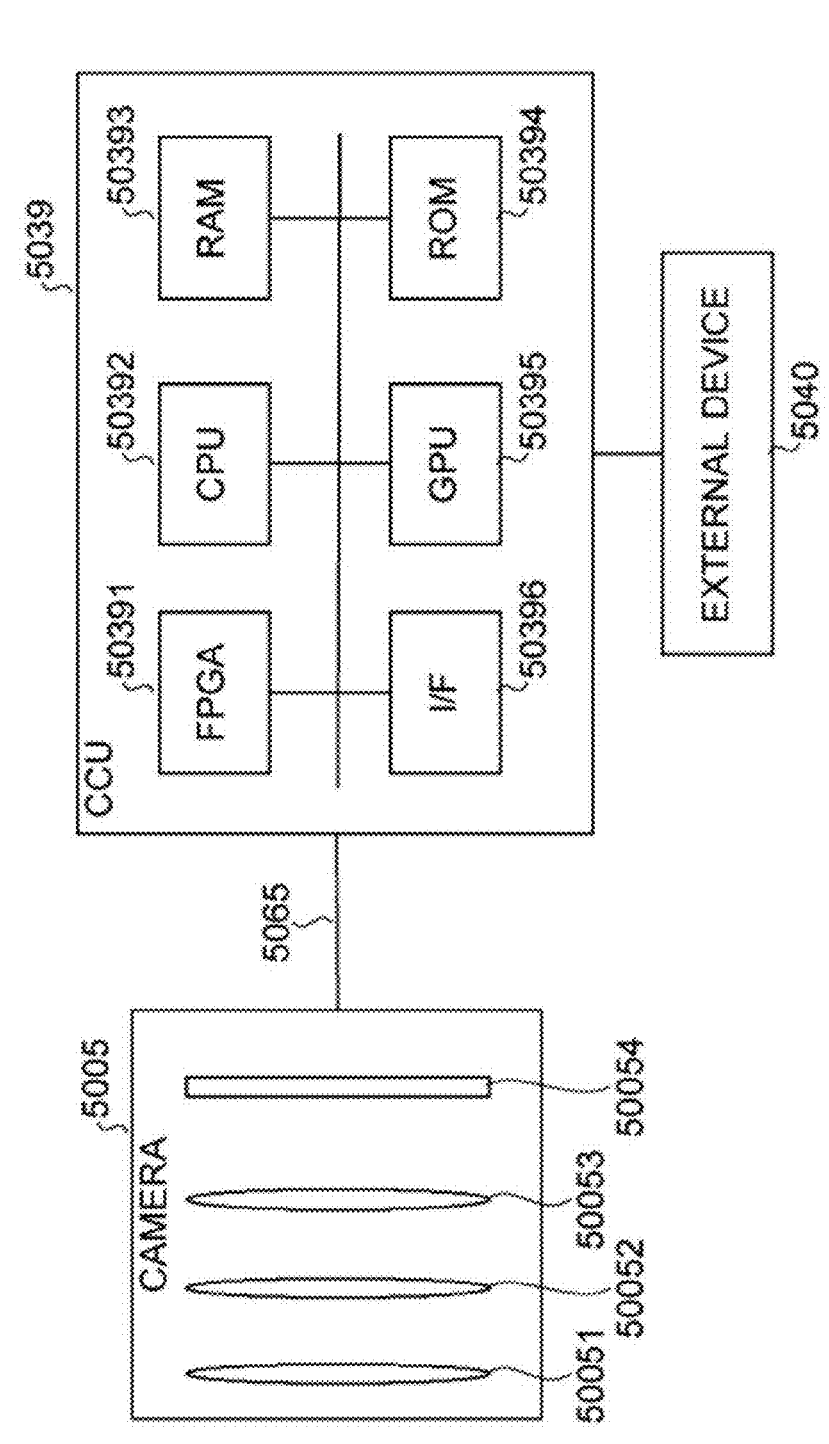

FIG. 174 is a block diagram illustrating an example of a functional configuration of a camera and a camera control unit (CCU) illustrated in FIG. 173.

Figure 175:
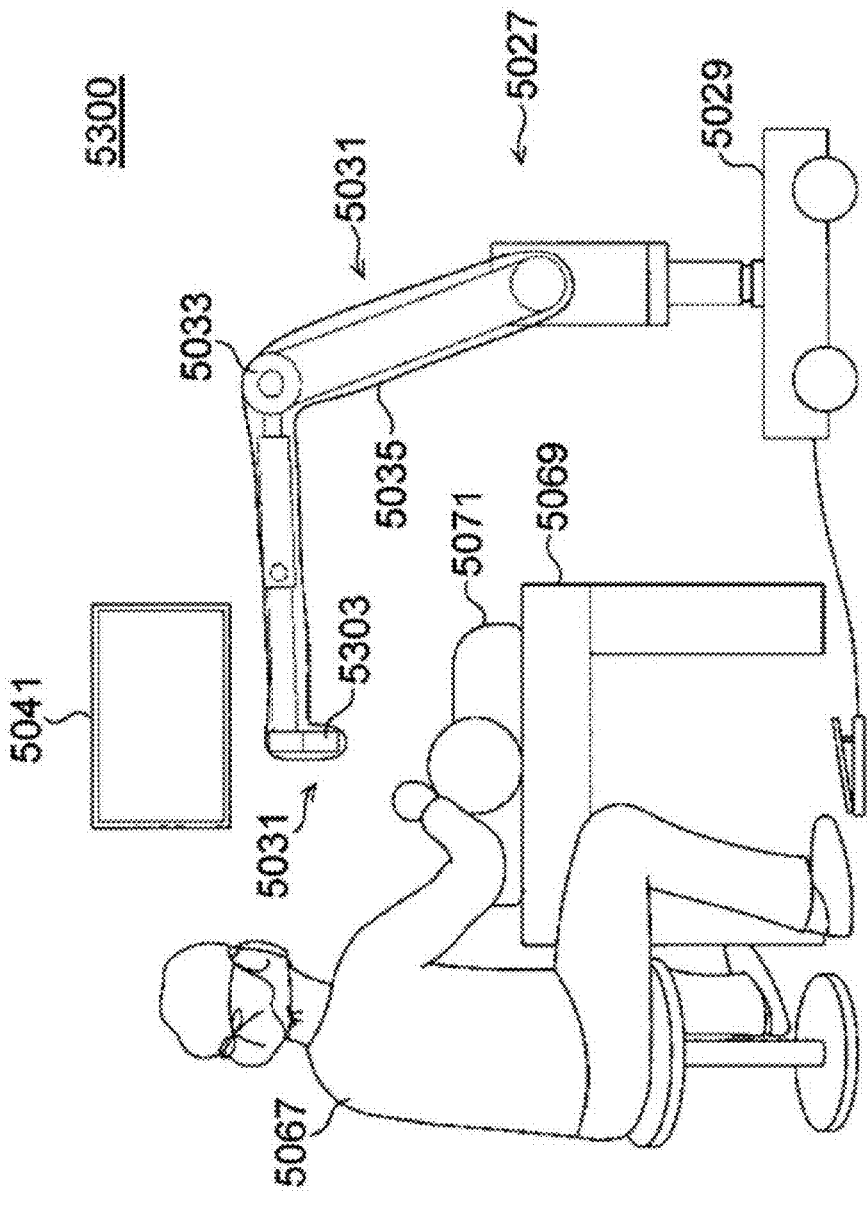

FIG. 175 is a diagram illustrating an example of a schematic configuration of a microscopic surgery system.

MODES FOR CARRYING OUT THE INVENTION

Hereinafter, description is given in detail of embodiments of the present disclosure with reference to the drawings. It is to be noted that the description is given in the following order.

1. Basic Configuration of Lens
2. Workings and Effects
3. Example of Application to Imaging Apparatus
4. Numerical Examples of Lenses
5. Practical Application Examples
6. Other Embodiments

1. Basic Configuration of Lens

An embodiment of the present disclosure relates to a zoom lens suitable for a digital still camera, a digital mirrorless camera, or the like, and to an optical apparatus including such a zoom lens. In particular, an embodiment of the present disclosure relates to a miniaturized and light-weight imaging lens having high performance throughout the entire zoom range to which a group configuration and a zooming trajectory enabling a favorable aberration correction are applied, as well as to an imaging apparatus including such an imaging lens.

Figure 1:
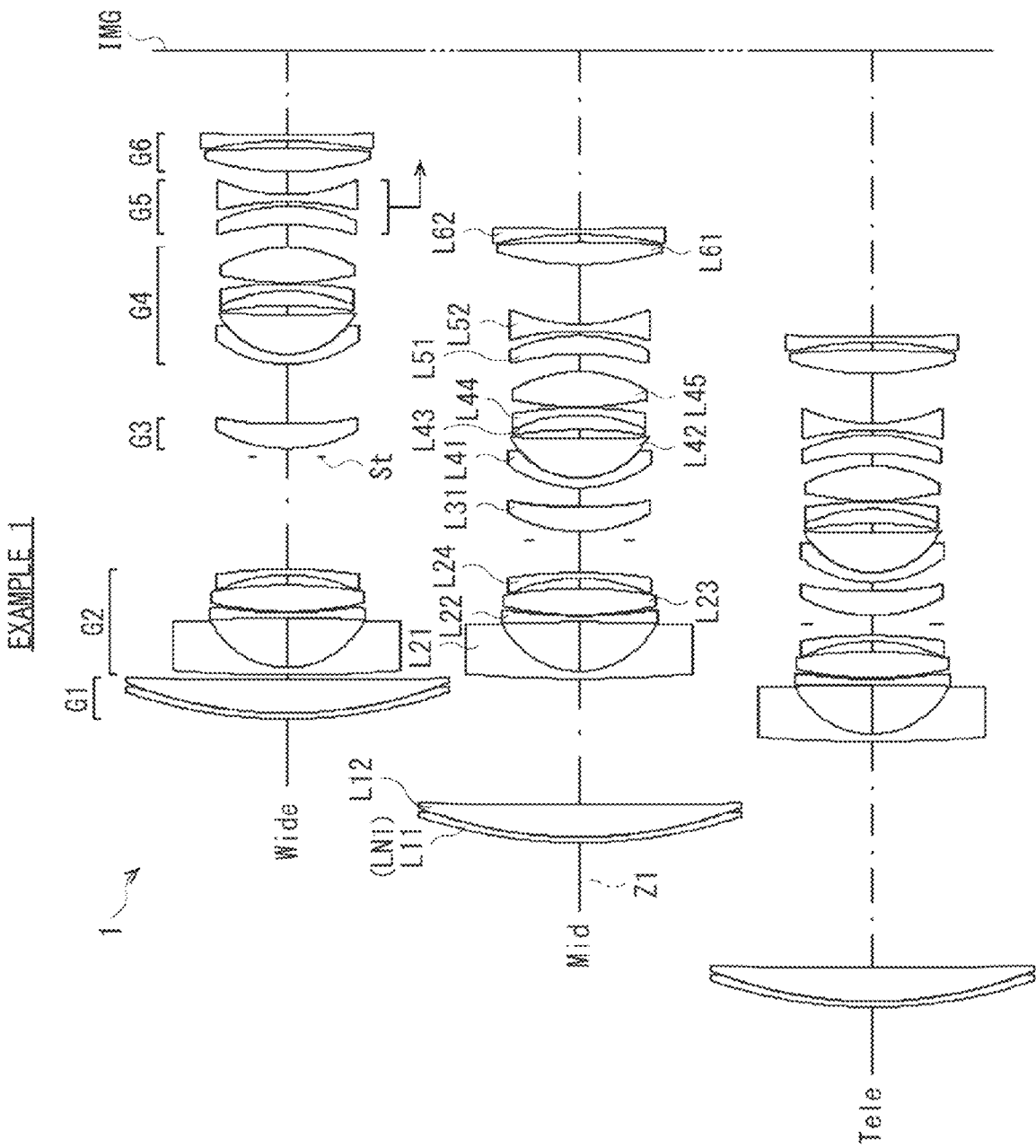
FIG. 1 is a lens cross-sectional view of a first configuration example (Example 1) of a zoom lens according to an embodiment of the present disclosure.
Figure 27:
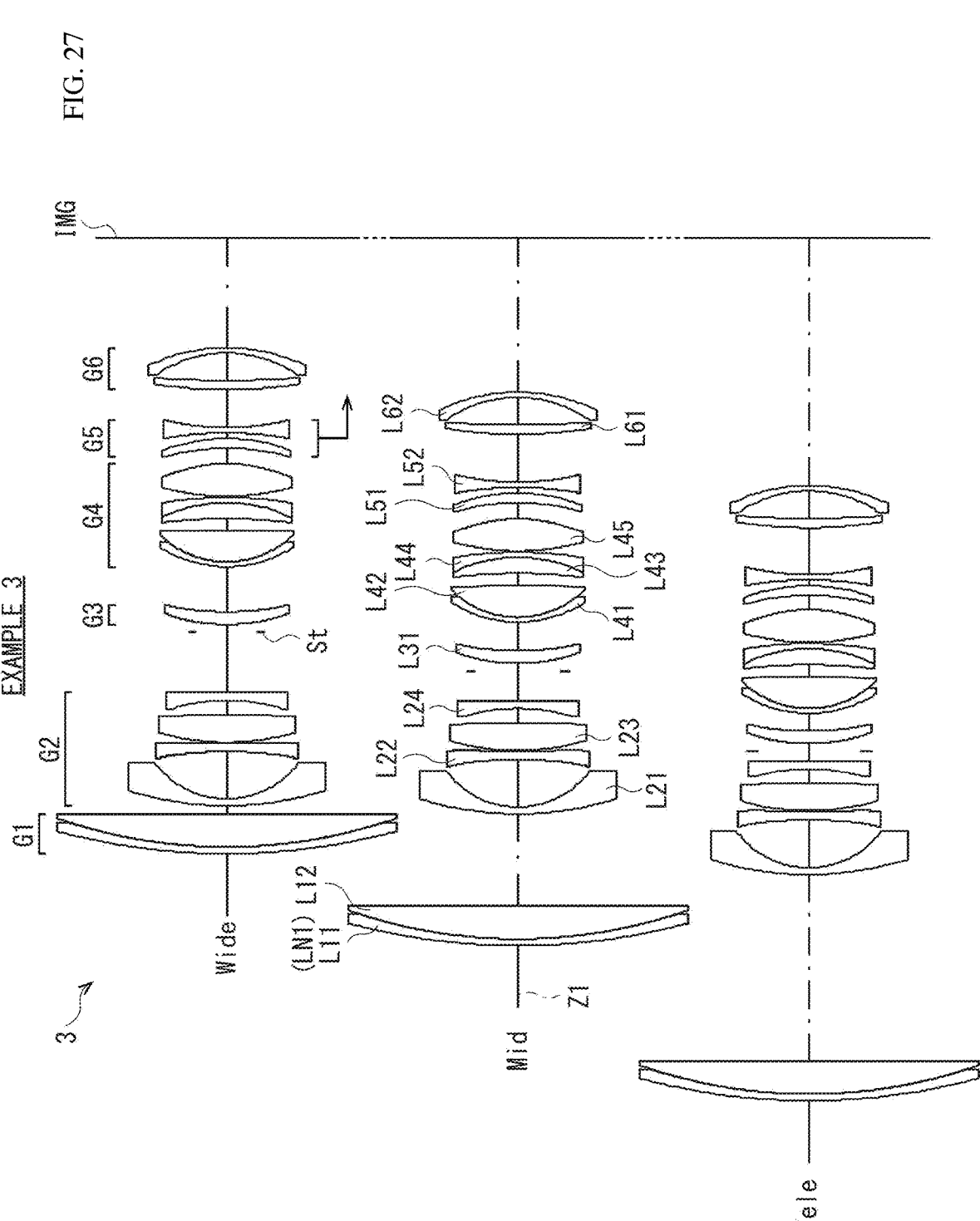
FIG. 27 is a lens cross-sectional view of a third configuration example (Example 3) of a zoom lens according to an embodiment.
Figure 40:
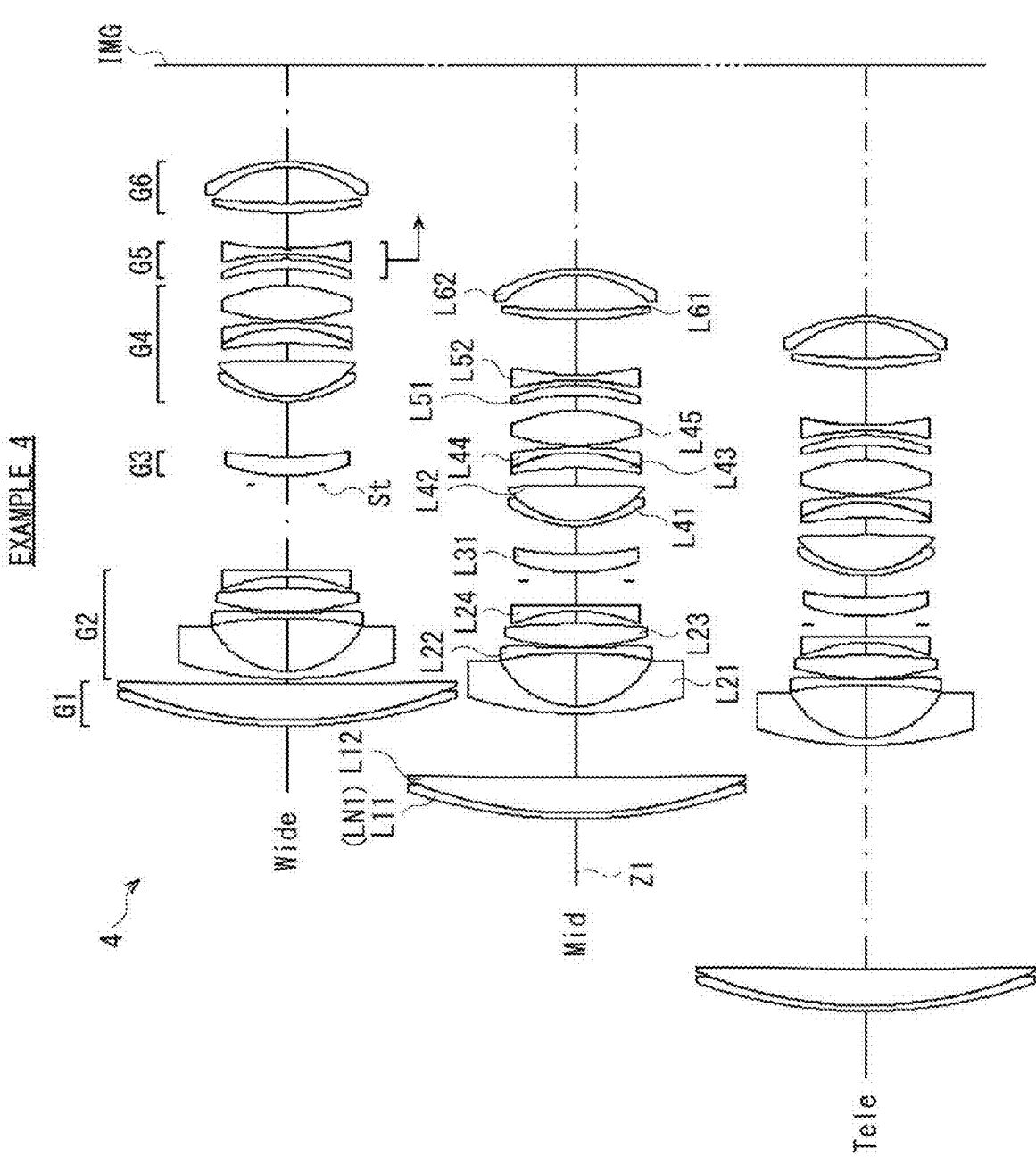
FIG. 40 is a lens cross-sectional view of a fourth configuration example (Example 4) of a zoom lens according to an embodiment.
Figure 53:
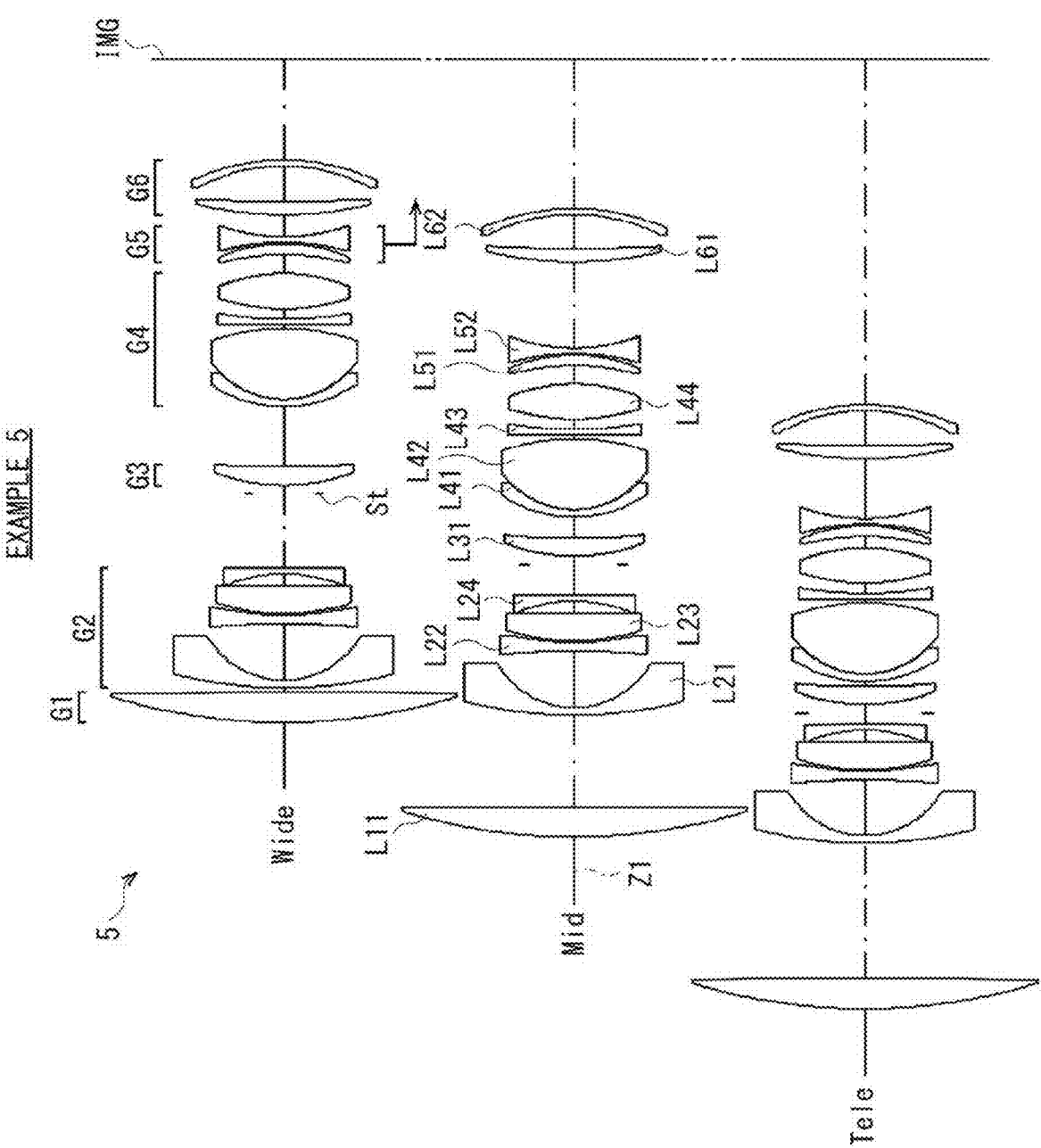
FIG. 53 is a lens cross-sectional view of a fifth configuration example (Example 5) of a zoom lens according to an embodiment.
Figure 66:
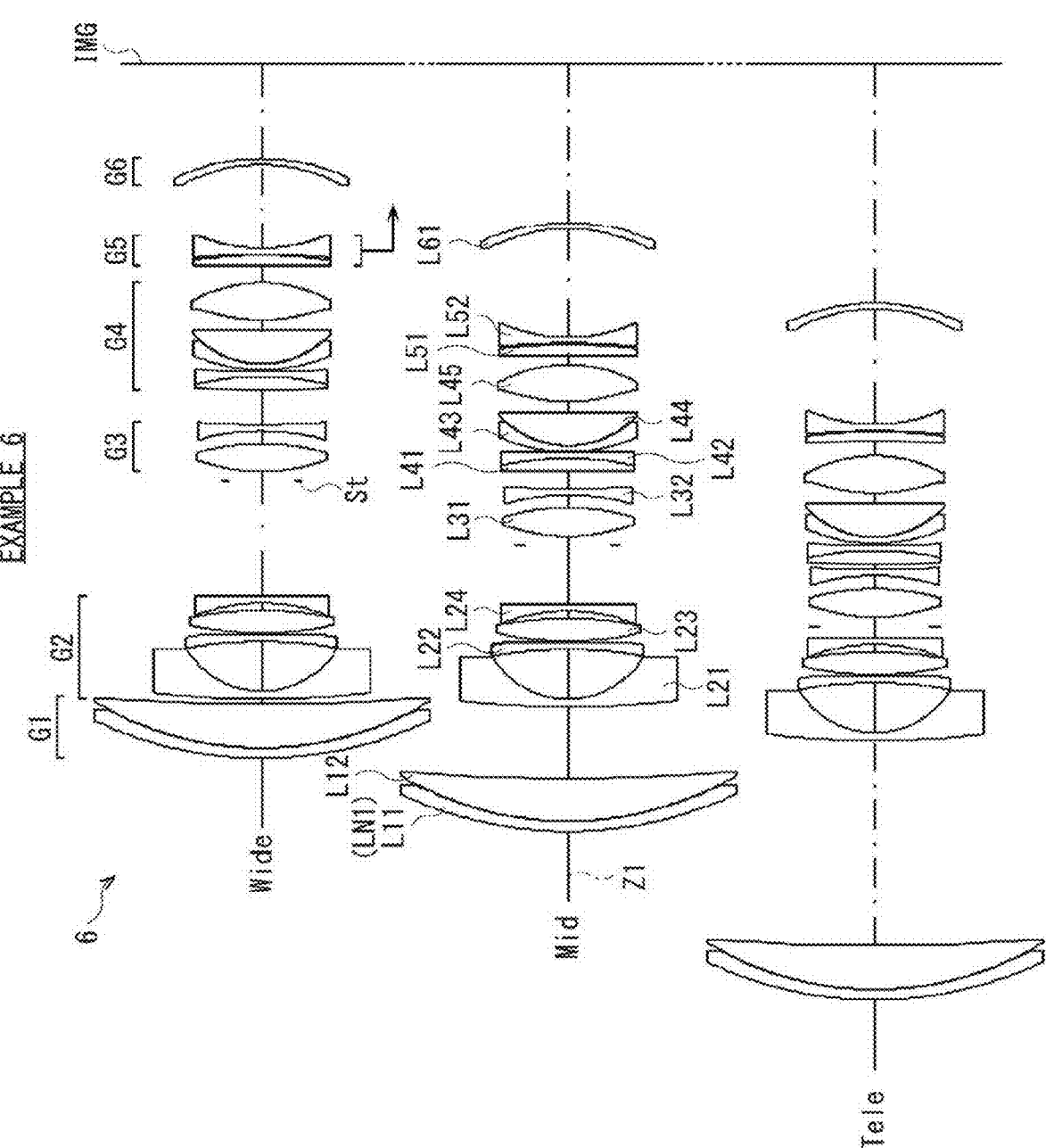
FIG. 66 is a lens cross-sectional view of a sixth configuration example (Example 6) of a zoom lens according to an embodiment.
Figure 79:
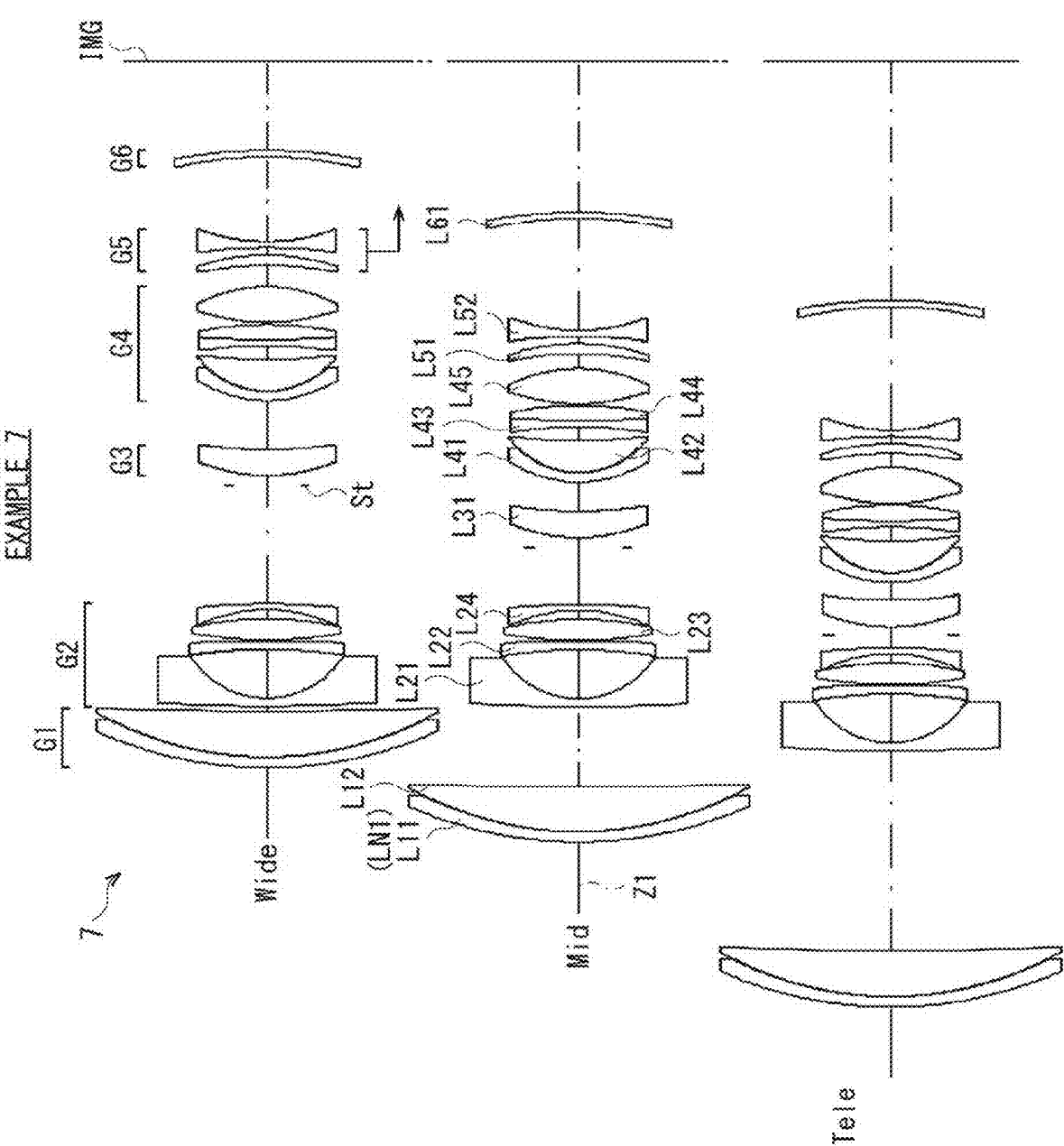
FIG. 79 is a lens cross-sectional view of a seventh configuration example (Example 7) of a zoom lens according to an embodiment.
Figure 92:
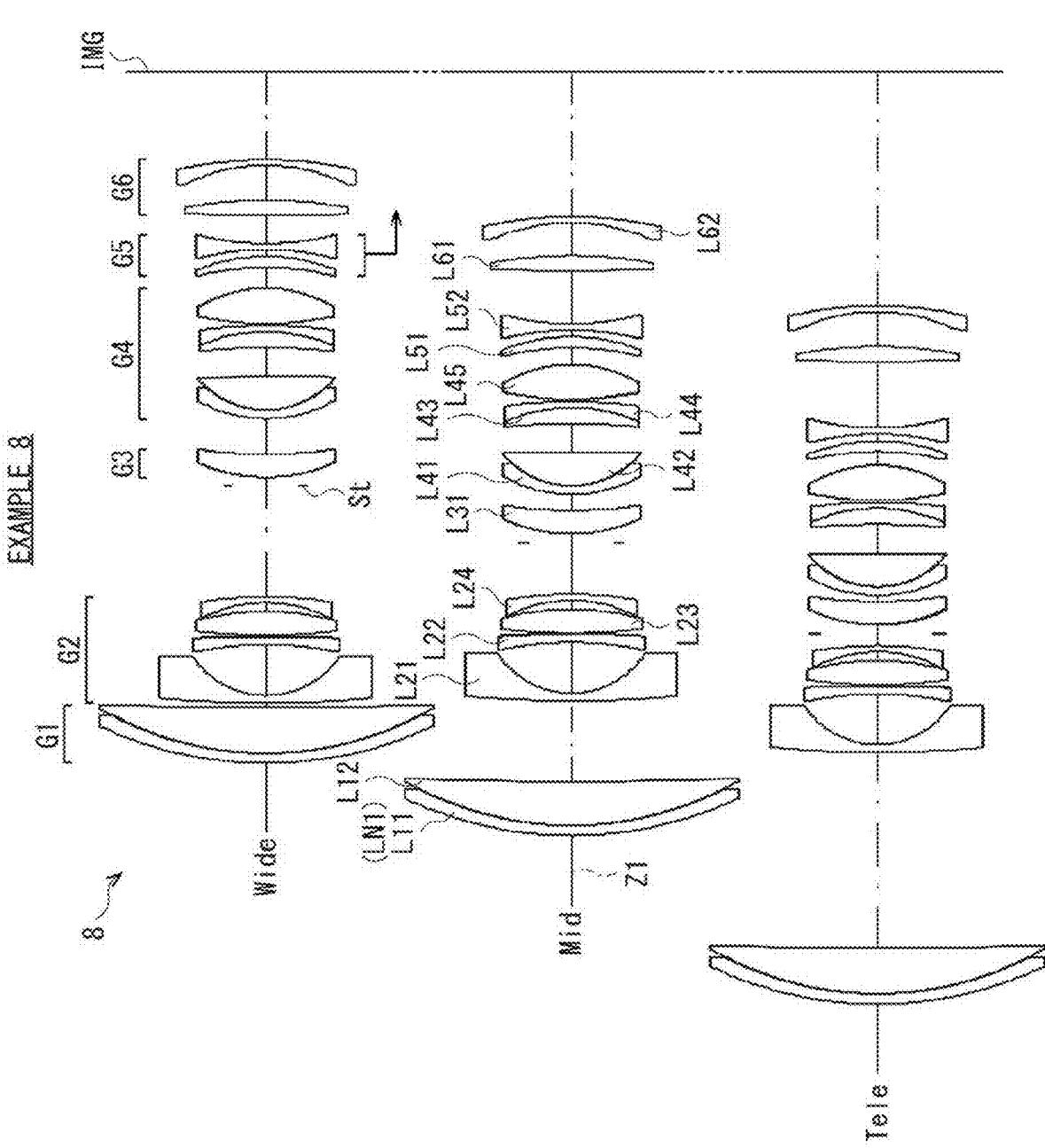
FIG. 92 is a lens cross-sectional view of an eighth configuration example (Example 8) of a zoom lens according to an embodiment.
Figure 105:
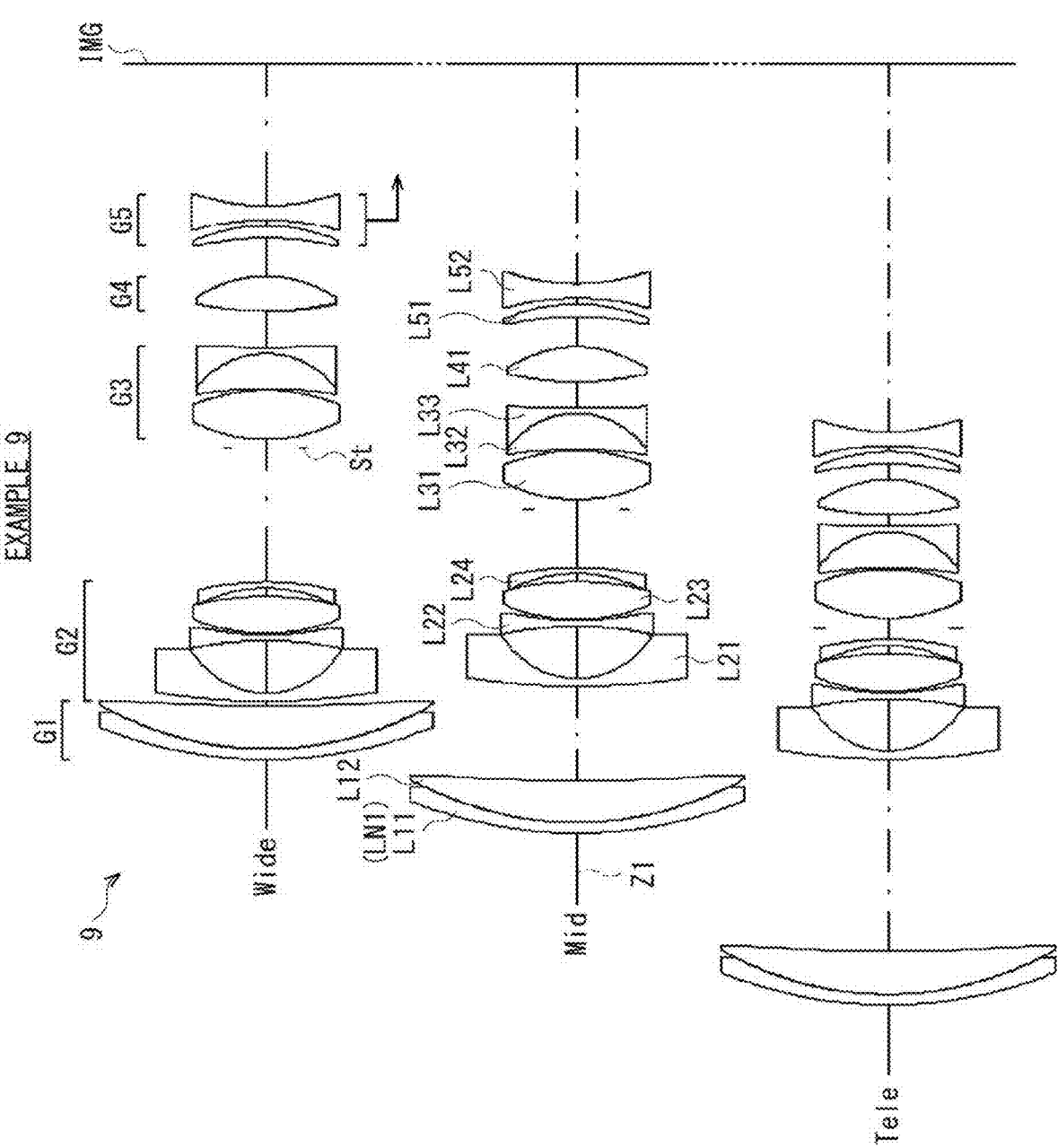
FIG. 105 is a lens cross-sectional view of a ninth configuration example (Example 9) of a zoom lens according to an embodiment.
Figure 118:
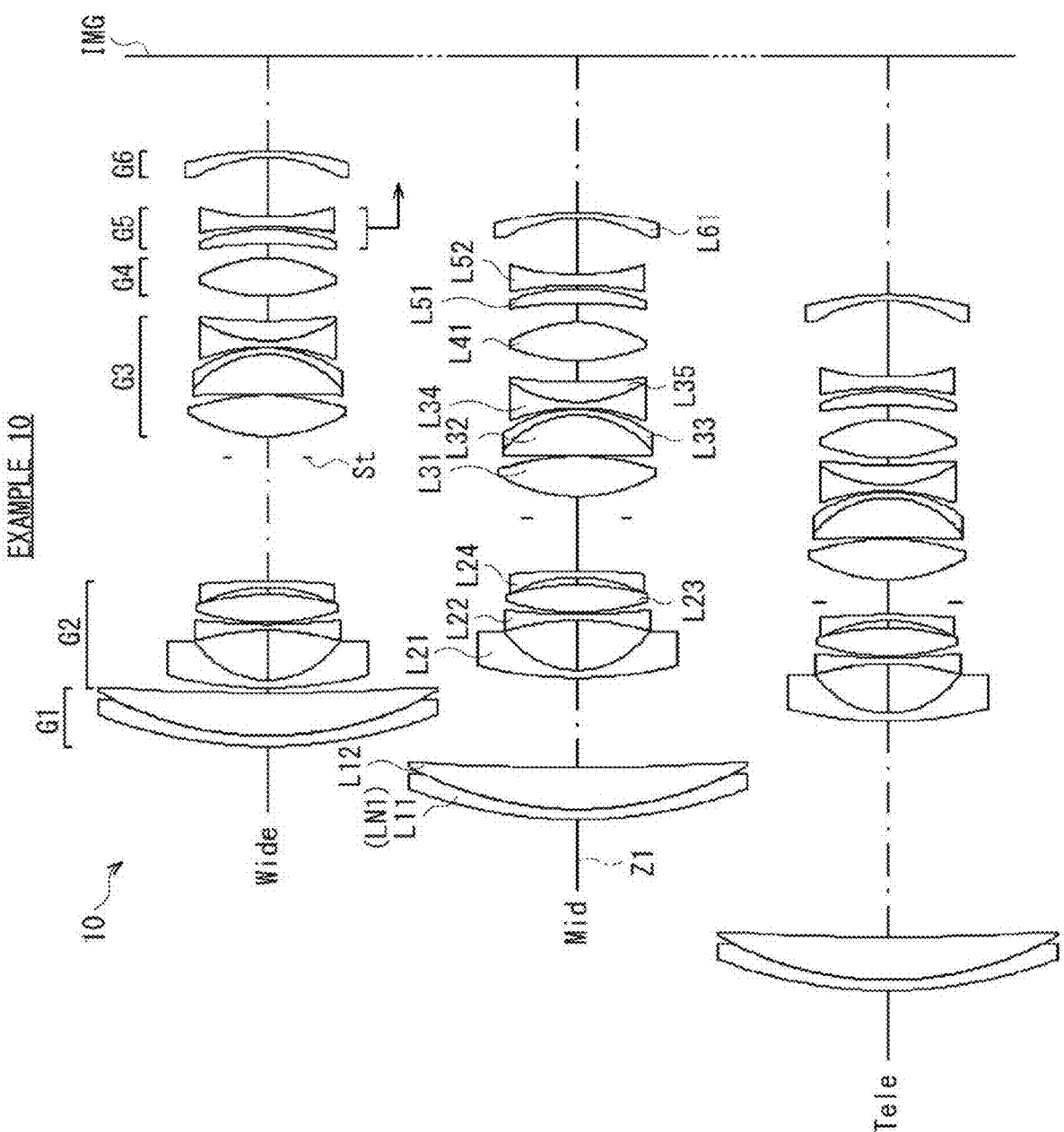
FIG. 118 is a lens cross-sectional view of a tenth configuration example (Example 10) of a zoom lens according to an embodiment.
Figure 131:
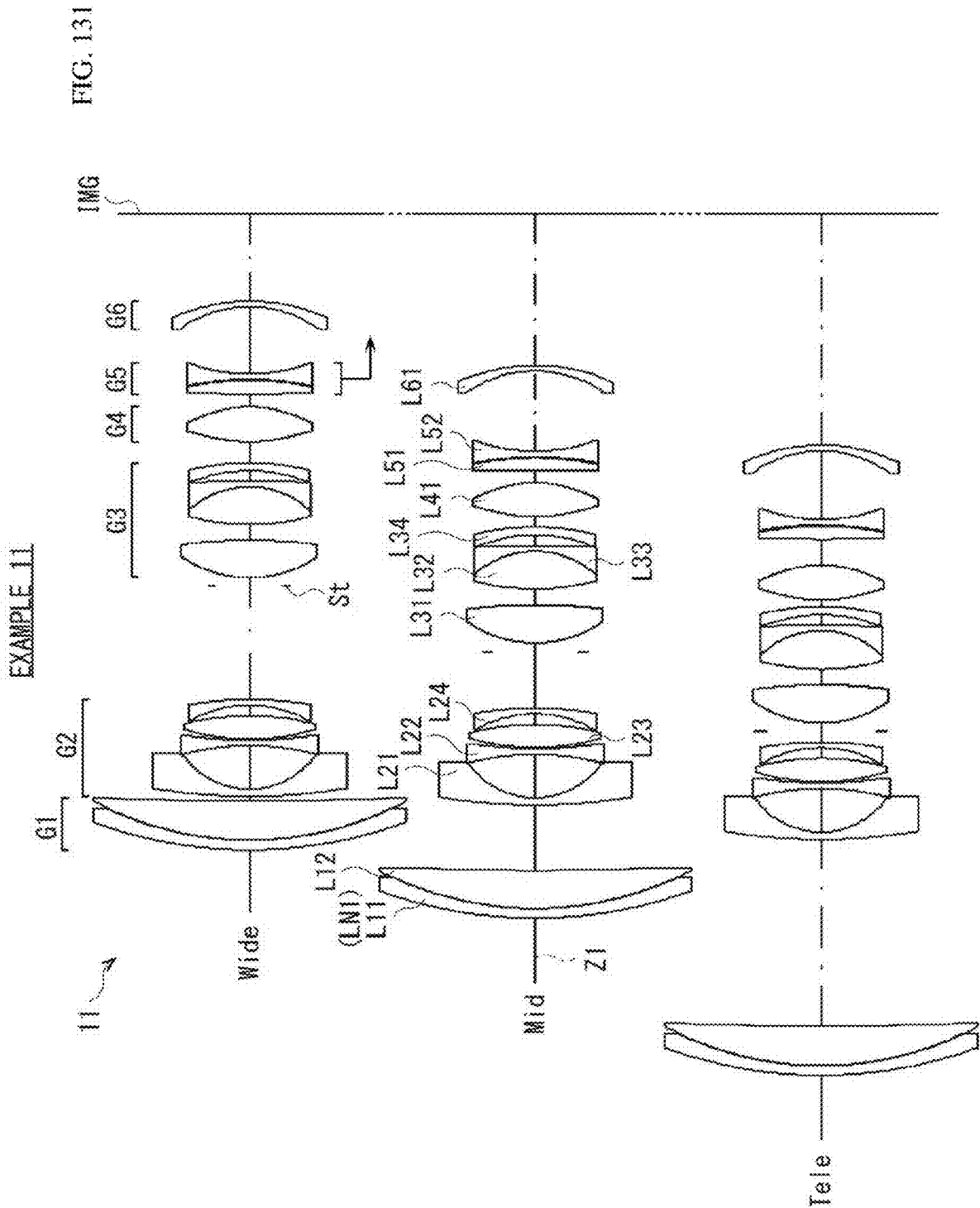

FIG. 1 illustrates a first configuration example of a zoom lens according to an embodiment of the present disclosure, and corresponds to a configuration of Example 1 described later. FIG. 14 illustrates a second configuration example of the zoom lens according to an embodiment, and corresponds to a configuration of Example 2 described later. FIG. 27 illustrates a third configuration example of the zoom lens according to an embodiment, and corresponds to a configuration of Example 3 described later. FIG. 40 illustrates a fourth configuration example of the zoom lens according to an embodiment, and corresponds to a configuration of Example 4 described later. FIG. 53 illustrates a fifth configuration example of the zoom lens according to an embodiment, and corresponds to a configuration of Example 5 described later. FIG. 66 illustrates a sixth configuration example of the zoom lens according to an embodiment, and corresponds to a configuration of Example 6 described later. FIG. 79 illustrates a seventh configuration example of the zoom lens according to an embodiment, and corresponds to a configuration of Example 7 described later. FIG. 92 illustrates an eighth configuration example of the zoom lens according to an embodiment, and corresponds to a configuration of Example 8 described later. FIG. 105 illustrates a ninth configuration example of the zoom lens according to an embodiment, and corresponds to a configuration of Example 9 described later. FIG. 118 illustrates a tenth configuration example of the zoom lens according to an embodiment, and corresponds to a configuration of Example 10 described later. FIG. 131 illustrates an eleventh configuration example of the zoom lens according to an embodiment, and corresponds to a configuration of Example 11 described later. FIG. 144 illustrates a twelfth configuration example of the zoom lens according to an embodiment, and corresponds to a configuration of Example 12 described later. FIG. 157 illustrates a thirteenth configuration example of the zoom lens according to an embodiment, and corresponds to a configuration of Example 13 described later.

In FIG. 1 and other drawings, Z1 denotes an optical axis. An optical member such as a cover glass for protecting an imaging element may be disposed between an image plane IMG and any of zoom lenses 1 to 13 according to the first to thirteenth configuration examples. Further, in addition to the cover glass, various optical filters such as a low-pass filter or an infrared cut filter may be disposed as the optical member.

Hereinafter, description is given of a configuration of the zoom lens according to an embodiment of the present disclosure, as appropriate, in association with the zoom lenses 1 to 13 according to the respective configuration examples illustrated in FIG. 1 and other drawings. However, the technique according to the present disclosure is not limited to the illustrated configuration examples.

The zoom lens according to an embodiment includes a plurality of lens groups. The plurality of lens groups includes, in order from an object side toward an image plane side, a first lens group G1 having positive refractive power, a second lens group G2 having negative refractive power, a third lens group G3 having positive refractive power, a fourth lens group G4 having positive refractive power, and a fifth lens group G5 having negative refractive power. The first lens group G1 is configured by two or less lenses.

Here, in the zoom lens according to an embodiment, the "lens group" refers to a lens group having refractive power and having an interval that varies with respect to an adjacent lens group upon zooming. A lens group configured only by a flat plate having no refractive power is not defined as the lens group.

In the Examples described later, the zoom lenses 1 to 8 and 10 to 13 according to Examples 1 to 8 and 10 to 13 include the first lens group G1 to the sixth lens group as the plurality of lens groups. The zoom lens 9 according to Example 9 includes the first lens group G1 to the fifth lens group G5 as the plurality of lens groups.

The zoom lens according to an embodiment is configured to allow at least the first lens group G1, the third lens group G3, and the fourth lens group G4 to move to the object side upon zooming from a wide-angle end to a telephoto end. It is to be noted that, in FIG. 1 and other drawings, a lens arrangement upon infinity focusing at a wide-angle end (Wide) is illustrated at the upper part, and a lens arrangement upon infinity focusing at an intermediate position (Mid) is illustrated in the middle part. In addition, a lens arrangement upon infinity focusing at the telephoto end (Tele) is illustrated in the lower part.

In addition to those described above, the zoom lens according to an embodiment may further satisfy a predetermined conditional expression or the like described later.

2. Workings and Effects

Next, description is given of workings and effects of the zoom lens according to an embodiment of the present disclosure. In addition thereto, description is given of a more preferable configuration in the zoom lens according to an embodiment of the present disclosure as well as of the workings and effects thereof.

It is to be noted that the effects described in herein are merely exemplary and are not limited thereto, and may further include other effects.

According to the zoom lens according to an embodiment, configurations of the respective lens groups are optimized to enable achievement of compactness, high performance, and a high variable magnification ratio. This makes it possible to provide a compact and high-performance zoom lens having a high variable magnification ratio as well as an imaging apparatus including such a zoom lens.

The zoom lens according to an embodiment includes, in order from the object side toward the image plane side, the first lens group G1 having positive refractive power, the second lens group G2 having negative refractive power, the third lens group G3 having positive refractive power, the fourth lens group G4 having positive refractive power, and the fifth lens group G5 having negative refractive power. The zoom lens according to an embodiment is configured to allow at least the first lens group G1, the third lens group G3, and the fourth lens group G4 to move to the object side upon the zooming from the wide-angle end to the telephoto end. Upon the zooming, movement trajectories (movement amounts) of the first lens group G1, the third lens group G3, and the fourth lens group G4 may differ from one another. This increases flexibility of the movement trajectory of a zoom variator, thus making it possible to secure high optical performance throughout the entire zoom range while earning the variable magnification ratio. In addition, setting the first lens group G1 to be a lens group having positive refractive power and configuring the first lens group G1 by two or less lenses suppress an increase in size of the first lens group G1, thus making it possible to reduce the size and weight of the optical system.

The zoom lens according to an embodiment may satisfy the following conditional expression (1):

$$f1/f2 < -6.00 \tag{1}$$

where
f1 denotes a focal distance of the first lens group G1, and
f2 denotes a focal distance of the second lens group G2.
The conditional expression (1) is defined to achieve a wider angle of the optical system and higher performance thereof, and is a conditional expression to appropriately set the focal distance of the second lens group G2 with respect to the focal distance of the first lens group G1. Exceeding an upper limit value of the conditional expression (1) increases the positive refractive power of the first lens group G1, thus making it difficult to correct various aberrations generated in the first lens group G1. In addition, the negative refractive power of the second lens group G2 is decreased, thus making it difficult to achieve the wider angle.

It is to be noted that the upper limit value of the conditional expression (1) may be set to −6.50 or even to −6.80. This makes it possible to further suppress the various aberrations generated in the first lens group G1. In addition, securing the negative refractive power of the second lens group G2 facilitates the wider angle of the optical system more advantageously. In addition, decreasing the value of the conditional expression (1) intensifies the negative refractive power of the second lens group G2, thus making it difficult to correct various aberrations. Therefore, the lower limit value of the conditional expression (1) may be set to −15.00 or even to −13.0, from the viewpoint of higher performance of the optical system.

In addition, the zoom lens according to an embodiment may satisfy the following conditional expression (2):

$$1.75 < f3/f4 < 4.20 \qquad (2)$$

where f3 denotes a focal distance of the third lens group G3; and f4 denotes a focal distance of the fourth lens group G4.

The conditional expression (2) is defined to achieve a higher variable magnification ratio of the optical system and higher performance thereof, and is a conditional expression to appropriately set the focal distance of the fourth lens group G4 with respect to the focal distance of the third lens group G3. Exceeding an upper limit value of the conditional expression (2) increases the positive refractive power of the fourth lens group G4, thus making it difficult to correct spherical aberration and coma aberration generated in the fourth lens group G4. Meanwhile, falling below a lower limit value of the conditional expression (2) reduces the positive refractive power of the fourth lens group G4, thus reducing a change in a focal distance of the entire optical system due to a change in an interval between the third lens group G3 and the fourth lens group G4. This makes it difficult to achieve the higher variable magnification ratio.

It is to be noted that the upper limit value of the conditional expression (2) may be set to 4.00 or even to 3.8. This makes it possible to further suppress the spherical aberration and the coma aberration generated in the fourth lens group G4. In addition, the lower limit value of the conditional expression (2) may be set to 1.80 or even to 1.85, from the viewpoint of higher variable magnification ratio of the optical system.

In addition, the zoom lens according to an embodiment may satisfy the following conditional expression (3):

$$5.0 < f1/fw < 15.0 \qquad (3)$$

where f1 denotes the focal distance of the first lens group G1, and fw denotes a focal distance of a total system at the wide-angle end.

The conditional expression (3) is defined to achieve miniaturization of the optical system and a wider angle of the optical system, and is a conditional expression to appropriately set a focal distance of the total system at the wide-angle end with respect to the focal distance of the first lens group G1. Exceeding an upper limit value of the conditional expression (3) reduces the positive refractive power of the first lens group G1, thus increasing the movement amount of the first lens group G1 at the time of varying the magnification. This makes it difficult to miniaturize the optical system. Meanwhile, falling below a lower limit value of the conditional expression (3) increases the focal distance of the total system at the wide-angle end, thus resulting in an insufficient wider angle of the optical system.

It is to be noted that the upper limit value of the conditional expression (3) may be set to 13.0 or even to 10.0, from the viewpoint of miniaturization of the optical system. In addition, the Lower limit value of the conditional expression (3) may be set to 6.0 or even to 6.3. This makes it possible to achieve a still wider angle of the optical system.

In addition, the zoom lens according to an embodiment may satisfy the following conditional expression (4):

$$0.10 < f4/ft < 0.60 \qquad (4)$$

where f4 denotes a focal distance of the fourth lens group G4, and ft denotes a focal distance of a total system at the telephoto end.

The conditional expression (4) is defined to allow the optical system to have a more telephoto property and to suppress aberration of the optical system, and is a conditional expression to appropriately set the focal distance of the total system at the telephoto end with respect to the focal distance of the fourth lens group G4. Exceeding an upper limit value of the conditional expression (4) reduces the focal distance of the total system at the telephoto end too much, thus resulting in an insufficient telephoto property of the optical system. Meanwhile, falling below a lower limit value of the conditional expression (4) increases the positive refractive power of the fourth lens group G4 too much, thus makes it difficult to correct the spherical aberration and the coma aberration generated in the fourth lens group G4.

It is to be noted that the upper limit value of the conditional expression (4) may be set to 0.50 or even to 0.45, from the viewpoint of the telephoto property of the optical system. This enables the optical system to have a more telephoto property. In addition, the lower limit value of the conditional expression (4) may be set to 0.20 or even to 0.25. This makes it possible to further suppress the spherical aberration and the coma aberration generated in the fourth lens group G4.

In addition, the zoom lens according to an embodiment may be configured to allow the fifth lens group G5 to move as a focusing lens group in an optical axis direction and thereby perform focusing, when an object distance varies from infinity to a short distance. In FIG. 1 and other drawings, an arrow indicates a moving direction of the focusing lens group upon focusing from infinity to a short distance.

In recent years, a reduction in a variation of an angle of view at the time of focusing has been strongly demanded in the field of moving images, or the like. To meet that demand, the focusing lens group may be disposed at a position close to the image plane IMG. In addition, in the zoom lens according to an embodiment, it is preferable to secure moving distances of the third lens group G3 and the fourth lens group G4 as long as possible, as the zoom variator, upon zooming from the wide-angle end to the telephoto end. In a case where the third lens group G3 or the fourth lens group G4 is set as the focus lens group, it is necessary to additionally secure the movement amount thereof by the focusing in the optical axis direction, thus leading to an increase in the size of the optical system. Accordingly, it is sufficient for the fifth lens group G5 to be set as a focusing group in the zoom lens according to an embodiment, from the viewpoint of reducing the variation of the angle of view upon the focusing and the miniaturization of the optical system.

In addition, the zoom lens according to an embodiment may include an aperture stop St between the second lens group G2 and the third lens group G3.

In the zoom lens according to an embodiment, in a case where the aperture stop St is disposed in the second lens group G2 or on a side closer to an object than the second lens group G2, the number of lenses disposed on the side closer to the object than the aperture stop St is reduced, thus making it difficult to correct distortion and appropriately correct upper and lower beams of an off-axis light beam. This makes it difficult to suppress various aberrations, which is not preferable from the viewpoint of higher performance of the optical system. Meanwhile, in a case where the aperture stop St is disposed in the third lens group G3 or on a side closer to an image plane than the third lens group G3, a diameter of the off-axis light beam passing through the first lens group G1 and the second lens group G2 is increased, thus making it difficult to reduce a diameter of the first lens group G1. In addition, an on-axis light beam is incident on the third lens group G3 and the fourth lens group G4 in a state of being diffused by the second lens group G2, thus causing the stop mechanism to have a larger size, which is not preferable for miniaturization of the entire optical system. It is therefore desirable to provide the aperture stop St between the second lens group G2 and the third lens group G3, from the viewpoint of suppressing various aberrations and miniaturization of the optical system.

In addition, the zoom lens according to an embodiment may be configured to allow the third lens group G3 and a final lens group GR in the plurality of lens groups to move in the same trajectory upon zooming from the wide-angle end to the telephoto end. It is to be noted that, in Examples described later, the zoom lenses 1 to 8 and 10 to 13 in Examples 1 to 8 and 10 to 13 correspond to this configuration; the third lens group G3 and a sixth lens group G6 as the final lens group GR move in the same trajectory.

In the zoom lens according to an embodiment, in a case where the final lens group GR does not move in the optical axis direction upon zooming from the wide-angle end to the telephoto end, a height of the off-axis light beam to be incident on the final lens group GR at the telephoto end is increased, which is disadvantageous in reduction in the size and the weight. Meanwhile, in a case where the final lens group GR independently moves in the optical axis direction upon zooming from the wide-angle end to the telephoto end, the number of movable lens groups upon zooming is increased, thus causing a mechanical configuration for zooming to be complicated, which is not preferable from the viewpoint of miniaturization and construction of the mechanical configuration. It is therefore desirable for the third lens group G3 and the final lens group GR to move in the same trajectory upon zooming from the wide-angle end to the telephoto end, from the viewpoint of the miniaturization and the construction of the mechanical configuration.

In addition, in the zoom lens according to an embodiment, the fourth lens group G4 may have an aspherical surface and include a positive lens PL1 that satisfies the following conditional expressions (5) and (6). It is to be noted that, in Examples described later, a lens L45 corresponds to the positive lens PL1, in the zoom lenses 1 to 4, 6 to 8, and 13 according to Examples 1 to 4, 6 to 8, and 13. In addition, in the zoom lenses 9 to 11 according to Examples 9 to 11, a lens L41 corresponds to the positive lens PL1. In addition, in the zoom lens 12 according to Example 12, a lens L43 corresponds to the positive lens PL1.

16

$$60.0 < vdPL1 < 100.0 \tag{5}$$
$$0.005 < \Delta PgFPL1 < 0.150 \tag{6}$$

where
vdPL1 denotes Abbe number of the positive lens PL1,
ΔPgFPL1 denotes anomalous dispersibility of the positive lens PL1,
ΔPgFPL1=PgFPL1−0.64833+0.00180−vdPL1 holds true, and
PgFPL1 denotes a partial dispersion ratio between an F-line and a g-line of the positive lens PL1.

In the zoom lens according to an embodiment, a light beam is diffused by negative refractive power in the second lens group G2, thus causing a height of the on-axis light beam to be incident on the fourth lens group G4 is increased. In addition, the fourth lens group G4 serves the role of a variator upon zooming from the wide-angle end to the telephoto end, and desirably has stronger positive refractive power for higher variable magnification. In this case, it becomes difficult to correct aberration in the fourth lens group G4. It is therefore desirable for the fourth lens group G4 to have an aspherical surface for the correction of aberration.

The conditional expression (5) is defined to secure workability of a lens and to suppress chromatic aberration, and is a conditional expression to appropriately set Abbe number of the positive lens PL1. Exceeding an upper limit value of the conditional expression (5) increases a difficulty level of forming a material of the lens, thus making it difficult to ensure the manufacturability. Falling below a lower limit value of the conditional expression (5) makes it difficult to correct axial chromatic aberration and off-axis chromatic aberration generated in the positive lens PL1.

It is to be noted that the upper limit value of the conditional expression (5) may be set to 95.0 or even to 85.0, from the viewpoint of the manufacturability of the lens. In addition, the lower limit value of the conditional expression (5) may be set to 65.0 or even to 70.0. This makes it possible to further suppress the axial chromatic aberration and the off-axis chromatic aberration generated by the positive lens PL1.

The conditional expression (6) is defined to suppress chromatic aberration, and is a conditional expression to appropriately set the anomalous dispersibility of the positive lens PL1. Exceeding an upper limit value of the conditional expression (6) results in overcorrection of off-axis chromatic aberration and axial chromatic aberration of the g-line at the telephoto end. Falling below a lower limit value of the conditional expression (6) results in insufficient correction of the off-axis chromatic aberration and the axial chromatic aberration of the g-line at the telephoto end.

It is to be noted that the upper limit value of the conditional expression (6) may be set to 0.100, and the lower limit value thereof may be set to 0.010, from the viewpoint of correction of chromatic aberration of the optical system. Further, the upper limit value of the conditional expression (6) may be set to 0.075, and the lower limit value thereof may be set to 0.015.

In addition, in the zoom lens according to an embodiment, the first lens group G1 may include, on a side closest to the object, a negative lens LN1 that satisfies the following conditional expression. It is to be noted that, in the zoom lenses 1 to 4 and 6 to 13 according to Examples 1 to 4 and 6 to 13 described later, a lens L11 corresponds to the negative lens LN1.

$$10.0 < vdLN1 < 22.5 \qquad (7)$$

where vdL1 denotes Abbe number of the negative lens LN1.

The conditional expression (7) is defined to suppress chromatic aberration of the optical system, and is a conditional expression to appropriately set Abbe number of the negative lens LN1. Exceeding an upper limit value of the conditional expression (7) results in insufficient correction of off-axis chromatic aberration and axial chromatic aberration at the telephoto end by the negative lens LN1. Meanwhile, falling below a lower limit value of the conditional expression (7) results in overcorrection of the off-axis chromatic aberration and the axial chromatic aberration at the telephoto end by the negative lens LN1.

It is to be noted that the upper limit value of the conditional expression (7) may be set to 21.0, and the lower limit value thereof may be set to 15.0, from the viewpoint of correction of chromatic aberration of the optical system.

In addition, the zoom lens according to an embodiment may satisfy the following conditional expression (8):

$$0.3 < BFw/fw < 2.5 \qquad (8)$$

where

BFw denotes a back focus at the wide-angle end (a distance from a surface on a side of an image plane of a lens on a side closest to the image plane to the image plane IMG, at the wide-angle end), and fw denotes a focal distance of the total system at the wide-angle end.

The conditional expression (8) defines a ratio between the back focus BFw at the wide-angle end and the focal distance fw of the total system at the wide-angle end in a preferable range. Exceeding an upper limit value of the conditional expression (8) increases the back focus BFw at the wide-angle end, thus making it difficult to reduce the overall length. Meanwhile, falling below a lower limit value thereof makes it difficult to secure the back focus BFw at the wide-angle end, thus deteriorating the manufacturability.

It is to be noted that the upper limit value of the conditional expression (8) may be set to 1.55. This makes it possible to reduce the back focus BFw at the wide-angle end, and thus to further reduce the overall length. In addition, the lower limit value of the conditional expression (8) may be set to 0.4. This makes it possible to secure the back focus BFw at the wide-angle end, thus making it possible to further enhance the manufacturability.

3. Example of Application to Imaging Apparatus

Next, description is given of an example of application of the zoom lens according to an embodiment of the present disclosure to a specific imaging apparatus.

FIG. 170 illustrates a configuration example of an imaging apparatus 100 to which the zoom lens according to an embodiment is applied. The imaging apparatus 100 is, for example, a digital still camera, and includes a camera block 110, a camera signal processing section 20, an image processing section 30, an LCD (Liquid Crystal Display) 40, an R/W (reader/writer) 50, a CPU (Central Processing Unit) 60, an input section 70, and a lens drive control section 80.

The camera block 110 serves a role in an imaging function, and includes an imaging lens 111, and an imaging element 112 such as CCD (Charge Coupled Devices) or CMOS (Complementary Metal Oxide Semiconductor). The imaging element 112 converts an optical image formed by the imaging lens 111 into an electric signal, to thereby output an imaging signal (image signal) that corresponds to the optical image. Any of the zoom lenses 1 to 13 according to the respective configuration examples illustrated in FIG. 1 and other drawings is applicable as the imaging lens 111.

The camera signal processing section 20 performs, on the image signal outputted from the imaging element 112, various types of signal processing including, for example, analog-digital conversion, noise removal, image quality correction, or conversion to luminance and color difference signals.

The image processing section 30 performs processing of recording and reproduction of an image signal. The image processing section 30 performs processing including, for example, compression encoding and expansion decoding processing of an image signal based on a predetermined image data format, and processing of converting data specification such as resolution.

The LCD 40 has a function of displaying various types of data including, for example, a state of operation performed on the input section 70 by a user and a captured image. The R/W 50 performs writing of image data encoded by the image processing section 30 into a memory card 1000, and reading of the image data recorded in the memory card 1000. The memory card 1000 is a semiconductor memory attachable to and detachable from a slot coupled to the R/W 50, for example.

The CPU 60 functions as a control processing section that controls each of circuit blocks provided in the imaging apparatus 100. The CPU 60 controls each of the circuit blocks on the basis of, for example, an instruction input signal from the input section 70. The input section 70 includes, for example, various switches on which required operations are performed by the user. For example, the input section 70 includes a shutter release button used to perform a shutter operation, a selection switch used to select an operation mode, or the like. The input section 70 outputs, to the CPU 60, the instruction input signal that corresponds to the operation performed by the user. The lens drive control section 80 controls driving of lenses disposed in the camera block 110. The lens drive control section 80 controls, for example, unillustrated motors that drive respective lenses of the imaging lens 111 on the basis of a control signal from the CPU 60.

In the following, description is given of operations in the imaging apparatus 100.

In a standby state upon image capturing, an image signal corresponding to an image captured in the camera block 110 is outputted to the LCD 40 through the camera signal processing section 20, and is thus displayed as a camera-through image, under the control of the CPU 60. In addition, for example, when the instruction input signal, for zooming or focusing, from the input section 70 is inputted, the CPU 60 outputs the control signal to the lens drive control section 80. This moves a predetermined lens of the imaging lens 111 under the control of the lens drive control section 80.

When an unillustrated shutter of the camera block 110 is operated in response to the instruction input signal from the input section 70, the captured image signal is outputted from the camera signal processing section 20 to the image processing section 30 to be subjected to the compression encoding processing, and is thus converted into digital data in a predetermined data format. The converted data is outputted to the R/W 50 to be written into the memory card 1000.

It is to be noted that the focusing is performed in a case where the shutter release button of the input section 70 is pressed halfway, or in a case where the shutter release button is pressed fully for recording (image capturing), for example. The focusing is performed by causing the lens drive control section 80 to move a predetermined lens of the imaging lens 111 on the basis of the control signal from the CPU 60.

In a case where the image data recorded in the memory card 1000 is to be reproduced, predetermined image data is read from the memory card 1000 by the R/W 50 in accordance with the operation performed on the input section 70. The predetermined image data read from the memory card 1000 is subjected to the expansion decoding processing by the image processing section 30. Thereafter, a reproduction image signal is outputted to the LCD 40, and a reproduced image is thus displayed.

It is to be noted that, although the foregoing embodiment exemplifies the application of the imaging apparatus to the digital still camera, or the like, a range of application of the imaging apparatus is not limited to the digital still camera. The imaging apparatus is applicable to other various imaging apparatuses. For example, the imaging apparatus is applicable to a digital single-lens reflex camera, a digital non-reflex camera, a digital video camera, a surveillance camera, and the like. In addition, the imaging apparatus is applicable widely to, for example, a camera section of a digital input/output apparatus such as a mobile phone mounted with a camera or an information terminal mounted with a camera. In addition, the imaging apparatus is applicable to an interchangeable-lens camera as well.

EXAMPLES

4. Numerical Examples of Lenses

Next, description is given of specific Numerical Examples of the zoom lens according to an embodiment of the present disclosure. Here, the description is given of Numerical Examples in which specific numerical values are applied to the zoom lenses 1 to 13 of the respective configuration examples illustrated in FIG. 1 and other drawings.

It is to be noted that meanings, and the like of respective symbols indicated in the following tables and descriptions areas follows. "Si" denotes the number of i-th surface signed to be increased sequentially from the side closest to the object. "ri" denotes a value (mm) of a paraxial radius of curvature of the i-th surface. "di" denotes a value (mm) of an interval on the optical axis between the i-th surface and (i+1)-th surface. "ndi" denotes a value of a refractive index in a d-line (wavelength of 587.6 nm) of a material of an optical element having the i-th surface. "vdi" denotes a value of Abbe number in the d-line of the material of the optical element having the i-th surface. "φi" denotes a value (mm) of an effective diameter of the i-th surface. A portion where the value of "ri" is "∞"" indicates a flat surface, an aperture stop surface, or the like. "ASP" in the column of surface number (Si) indicates that the surface is configured by an aspherical shape. "STO" in the column of the surface number indicates that the aperture stop St is disposed at the corresponding position. "OBJ" in the column of the surface number indicates that the surface is an object surface (subject surface). "IMG" in the column of the surface number indicates that the surface is an image plane. "f" denotes a focal distance of the total system (unit: mm). "Fno" denotes an open F-value (F-number). "ω" denotes a half angle of view (unit: °). "Y" denotes an image height (unit: mm). "L" denotes a total optical length (a distance on the optical axis from a surface on the side closest to the object to the image plane IMG) (unit: mm).

In addition, some of the lenses to be used in each of Examples have a lens surface configured by an aspherical surface. The aspheric shape is defined by the following expression. It is to be noted that, in each of the tables exhibiting aspherical coefficients described later, "E-i" denotes exponential notation with a base of 10, i.e., "10$^{-i}$"; for example, "0.12345E-05" denotes "0.12345-10$^{-5}$". (Expression of Aspherical Surface)

$$x = c^2 y^2 / \left(1 + \left(1 - (1+k)c^2 y^2\right)^{1/2}\right) +$$
$$A4 \cdot y^4 + A6 \cdot y^6 + A8 \cdot y^8 * A10 \cdot y^{10} + A12 \cdot y^{12}$$

Here, it is assumed that "x" is a distance (a sag amount) from a vertex of a lens surface in the optical axis direction, "y" is a height in a direction perpendicular to the optical axis, "c" is a paraxial curvature at the vertex of the lens surface (inverse of the radius of curvature), and "k" is a conic (conic) constant. A4, A6, A8, A10, and A12 are 4-th order, 6-th order, 8-th order, 10-th order, and 12-th order aspherical coefficients, respectively.

Example 1

Table 1 exhibits basic lens data of the zoom lens 1 according to Example 1 illustrated in FIG. 1. Table 2 exhibits values of a focal distance f of a total system, an F-value, a total angle of view 2*o*, an image height Y, and a total optical length L in the zoom lens 1 according to Example 1. Table 3 exhibits data on a surface interval that is variable upon zooming and focusing in the zoom lens 1 according to Example 1. It is to be noted that Table 2 exhibits values for each of the wide-angle end (Wide), the intermediate position (Mid), and the telephoto end (Tele) in a case where an object distance (d0) is infinity. Table 3 exhibits values for each of the wide-angle end (Wide), the intermediate position (Mid), and the telephoto end (Tele) in the case where the object distance (d0) is infinity and in a case where the object distance (d0) is a short distance. Table 4 exhibits values of coefficients indicating shapes of aspherical surfaces in the zoom lens 1 according to Example 1. Table 5 exhibits a starting surface and a focal distance (unit: mm) of each of lens groups of the zoom lens 1 according to Example 1.

The zoom lens 1 according to Example 1 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having positive refractive power are disposed in order from the object side toward the image plane side.

The zoom lens 1 according to Example 1 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and a lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes lenses L21 to L24 in order from the object side toward the image plane side. The lens L21 is a negative meniscus lens with a convex surface opposed to the object side. The lens L22 is a negative lens of a biconcave shape including an aspherical surface on both sides. The lens L23 is a positive lens of a biconvex shape. The lens L24 is a negative meniscus lens with a concave surface opposed to the object side.

The third lens group G3 includes a lens L31. The lens L31 is a positive meniscus lens including an aspherical surface on both sides, with a convex surface opposed to the object side.

The fourth lens group G4 includes lenses L41 to L45 in order from the object side toward the image plane side. The lens L41 is a negative meniscus lens with a convex surface opposed to the object side. The lens L42 is a positive meniscus lens with a convex surface opposed to the object side. The lens L41 and the lens L42 constitute a cemented lens in which the lens L41 and the lens L42 are attached to each other. The lens L43 is a positive meniscus lens with a concave surface opposed to the object side. The lens L44 is a negative meniscus lens with a concave surface opposed to the object side. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes a lens L51 and a lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes a lens L61 and a lens L62 in order from the object side toward the image plane side. The lens L61 is a positive lens of a biconvex shape. The lens L62 is a negative lens of a biconcave shape.

The above-described configuration allows for achievement of a zoom lens having a high variable magnification ratio while covering a wide-angle region despite a miniaturized optical system.

TABLE 1

| | Example 1 | | | | |
|---|---|---|---|---|---|
| Si | ri | di | ndi | vdi | φi |
| 0 (OBJ) | | (d0) | | | |
| 1 | 87.412 | 1.00 | 1.94595 | 18.0 | 53.00 |
| 2 | 77.183 | 5.78 | 1.59282 | 68.6 | 52.21 |
| 3 | 1308.973 | (d3) | | | 51.44 |
| 4 | 235.268 | 1.30 | 1.77250 | 49.6 | 36.85 |
| 5 | 15.031 | 8.55 | | | 25.66 |
| 6 (ASP) | −175.835 | 1.00 | 1.76802 | 49.2 | 25.03 |

TABLE 1-continued

| | Example 1 | | | | |
|---|---|---|---|---|---|
| Si | ri | di | ndi | vdi | φi |
| 7 (ASP) | 68.042 | 0.20 | | | 24.60 |
| 8 | 57.965 | 4.57 | 1.85478 | 24.8 | 24.30 |
| 9 | −77.178 | 1.76 | | | 23.24 |
| 10 | −29.467 | 1.00 | 1.59282 | 68.6 | 22.78 |
| 11 | −83.476 | (d11) | | | 22.00 |
| 12 (STO) | ∞ | 1.50 | | | 20.37 |
| 13 (ASP) | 26.711 | 4.24 | 1.69350 | 53.2 | 22.64 |
| 14 (ASP) | 103.769 | (d14) | | | 22.28 |
| 15 | 20.706 | 1.70 | 1.95375 | 32.3 | 22.67 |
| 16 | 13.518 | 6.82 | 1.49700 | 81.6 | 20.86 |
| 17 | 213.033 | 1.63 | | | 20.68 |
| 18 | −75.563 | 2.58 | 1.60342 | 38.0 | 20.63 |
| 19 | −27.345 | 1.20 | 1.85451 | 25.2 | 20.70 |
| 20 | −68.997 | 0.20 | | | 21.09 |
| 21 (ASP) | 42.731 | 6.17 | 1.49700 | 81.5 | 21.16 |
| 22 (ASP) | −20.379 | (d22) | | | 21.00 |
| 23 | −41.651 | 3.19 | 1.94595 | 18.0 | 21.42 |
| 24 | −29.447 | 0.72 | | | 22.13 |
| 25 (ASP) | −57.948 | 1.29 | 1.76802 | 49.2 | 21.81 |
| 26 (ASP) | 29.296 | (d26) | | | 22.39 |
| 27 | 49.456 | 4.01 | 1.59349 | 67.0 | 26.11 |
| 28 | −236.915 | 1.36 | | | 26.35 |
| 29 | −68.193 | 1.00 | 1.80420 | 46.5 | 26.53 |
| 30 | 374.412 | (d30) | | | 27.64 |
| 31 (IMG) | ∞ | 0.00 | | | 43.32 |

TABLE 2

| | Example 1 (Zoom Ratio: 3.64) | | |
|---|---|---|---|
| | Wide | Mid | Tele |
| f (mm) | 18.54 | 42.33 | 67.57 |
| Fno | 4.12 | 4.16 | 4.14 |
| 2ω (°) | 95.21 | 54.13 | 35.47 |
| Y (mm) | 20.31 | 21.63 | 21.61 |
| L (mm) | 116.05 | 137.75 | 166.05 |

TABLE 3

| | Example 1 • Variable Data | | | | | |
|---|---|---|---|---|---|---|
| | Wide | Mid | Tele | Wide | Mid | Tele |
| d0 | ∞ | ∞ | ∞ | 299 mm | 299 mm | 299 mm |
| d3 | 0.80 | 21.90 | 39.28 | 0.80 | 21.90 | 39.28 |
| d11 | 19.50 | 5.66 | 2.00 | 19.50 | 5.66 | 2.00 |
| d14 | 10.41 | 3.29 | 1.50 | 10.41 | 3.29 | 1.50 |
| d22 | 4.08 | 3.04 | 2.14 | 4.96 | 4.96 | 5.24 |
| d26 | 4.00 | 10.36 | 8.67 | 3.12 | 8.43 | 5.57 |
| d30 | 14.51 | 30.75 | 49.71 | 14.51 | 30.75 | 49.71 |

TABLE 4

| | | | Example 1·Aspherical Data | | | |
|---|---|---|---|---|---|---|
| Si | k | A4 | A6 | A8 | A10 | A12 |
| 6 | 0.00000E+00 | 3.36270E−05 | −2.35503E−07 | 1.17667E−09 | −2.38006E−12 | −7.77811E−15 |
| 7 | 0.00000E+00 | 1.64056E−05 | −2.67123E−07 | 1.09330E−09 | −1.70482E−12 | −1.17335E−14 |
| 13 | 0.00000E+00 | 8.37635E−07 | 3.71574E−08 | −1.20706E−11 | 7.23470E−13 | 0.00000E+00 |
| 14 | 0.00000E+00 | 9.67830E−06 | 5.45736E−08 | −1.82974E−11 | 1.23742E−12 | 0.00000E+00 |
| 21 | 0.00000E+00 | −2.30353E−05 | 2.64053E−08 | −9.83297E−11 | −9.22748E−13 | 6.87586E−15 |
| 22 | 0.00000E+00 | 3.37740E−05 | −5.89139E−08 | −1.26934E−10 | 1.70839E−13 | 3.78792E−16 |
| 25 | 0.00000E+00 | 7.19524E−07 | −1.10451E−07 | 1.41942E−10 | 0.00000E+00 | 0.00000E+00 |
| 26 | 0.00000E+00 | 1.80873E−06 | −5.54625E−08 | 1.60307E−10 | 0.00000E+00 | 0.00000E+00 |

TABLE 5

| | Example 1 | |
|---|---|---|
| Lens Group | Starting Surface | Focal Distance |
| G1 | 1 | 171.47 |
| G2 | 4 | −19.07 |
| G3 | 13 | 50.72 |
| G4 | 15 | 27.02 |
| G5 | 23 | −33.23 |
| G6 | 27 | 842.85 |

Figure 2:
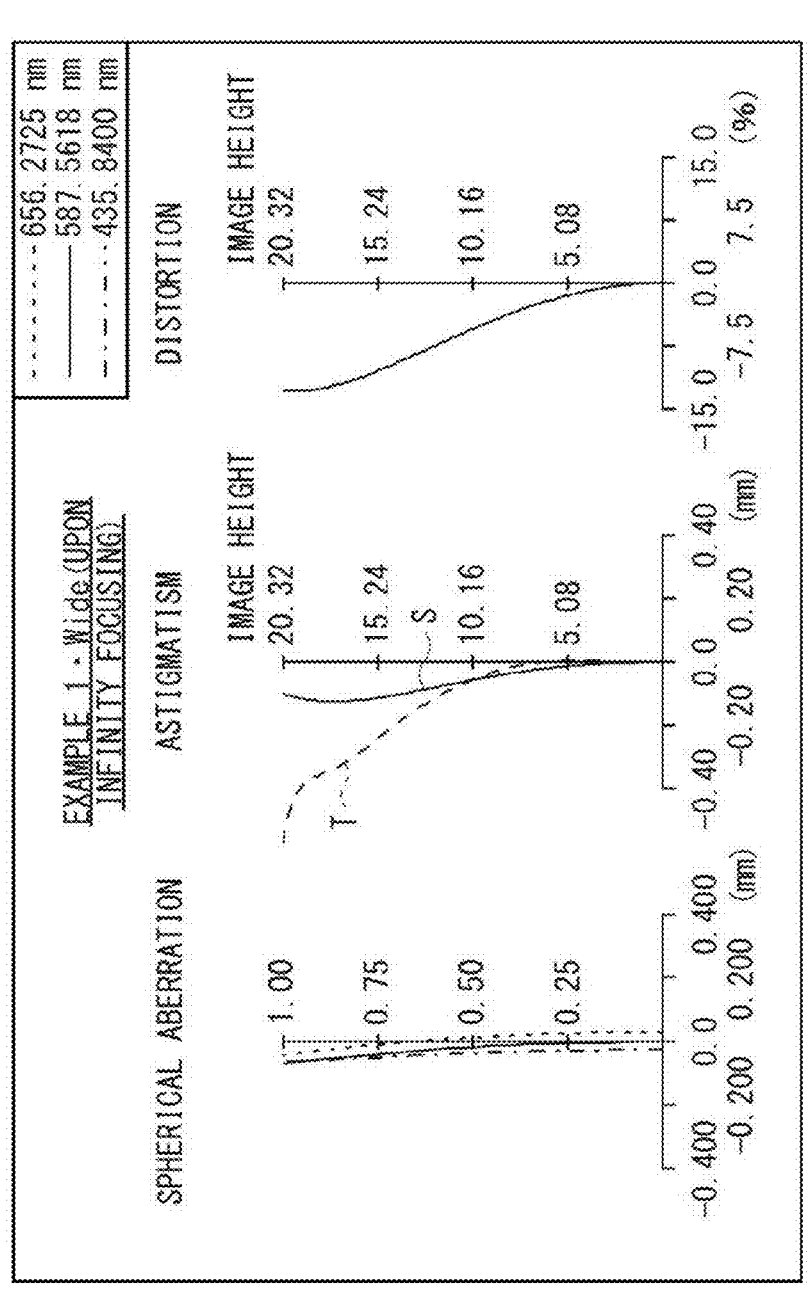
FIG. 2 is an aberration diagram illustrating longitudinal aberration upon infinity focusing at a wide-angle end of the zoom lens according to Example 1.
Figure 3:
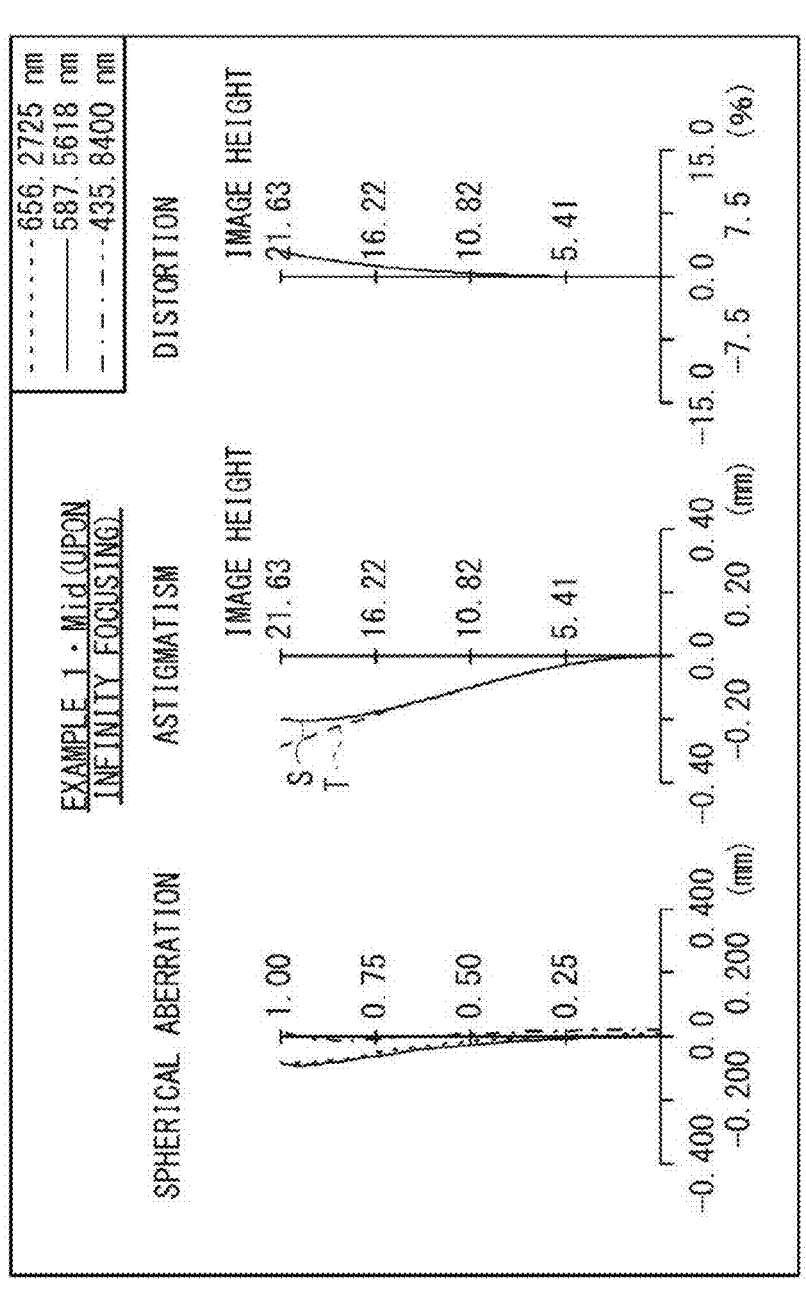
FIG. 3 is an aberration diagram illustrating longitudinal aberration upon infinity focusing at an intermediate position of the zoom lens according to Example 1.
Figure 4:
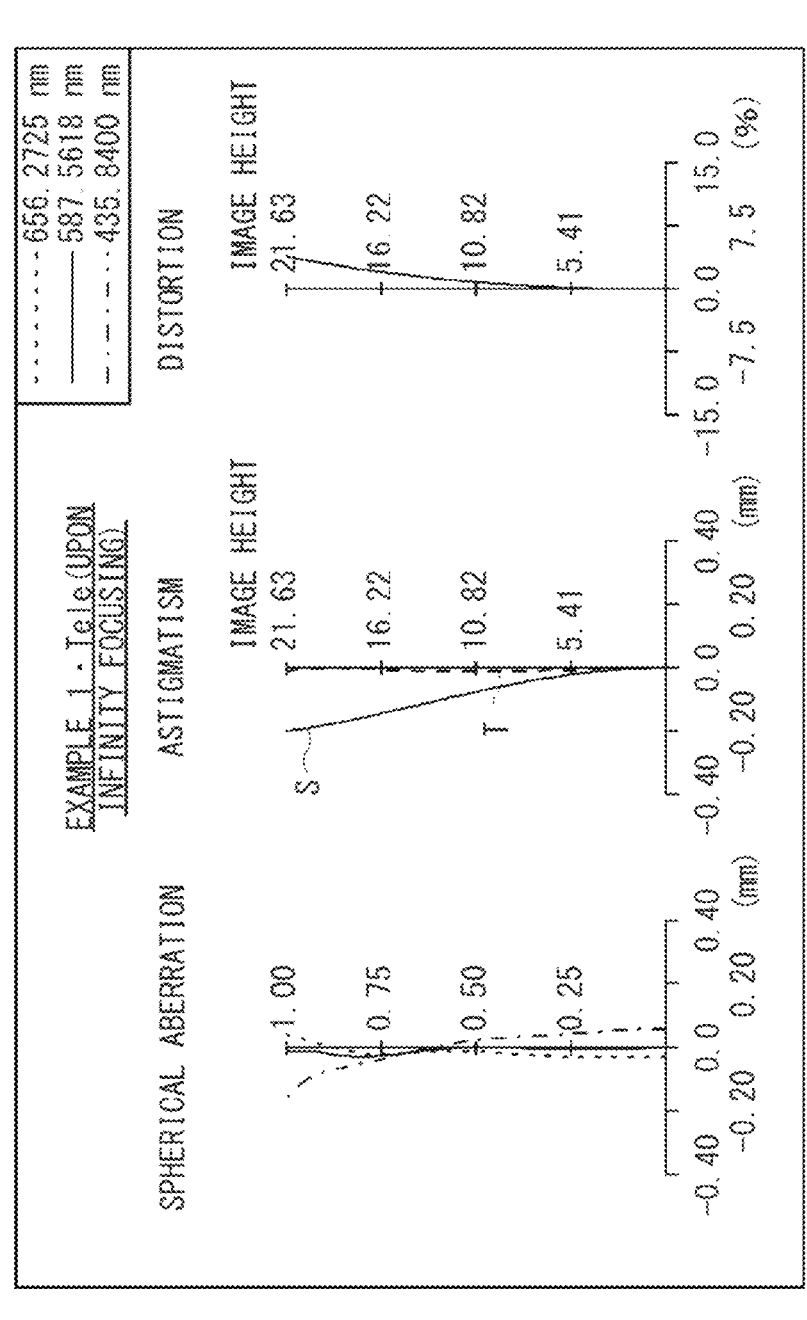
FIG. 4 is an aberration diagram illustrating longitudinal aberration upon infinity focusing at a telephoto end of the zoom lens according to Example 1.
Figure 5:
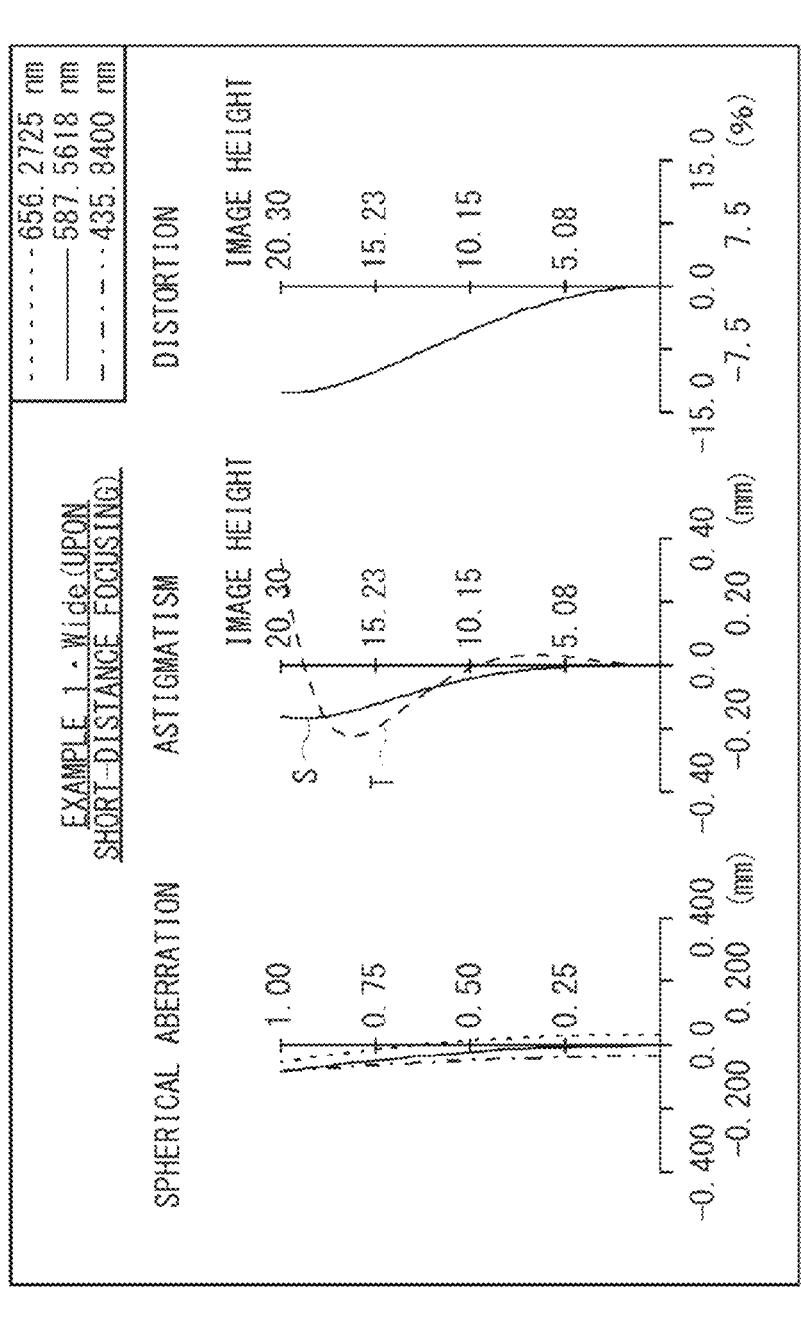
FIG. 5 is an aberration diagram illustrating longitudinal aberration upon short-distance focusing at the wide-angle end of the zoom lens according to Example 1.
Figure 6:
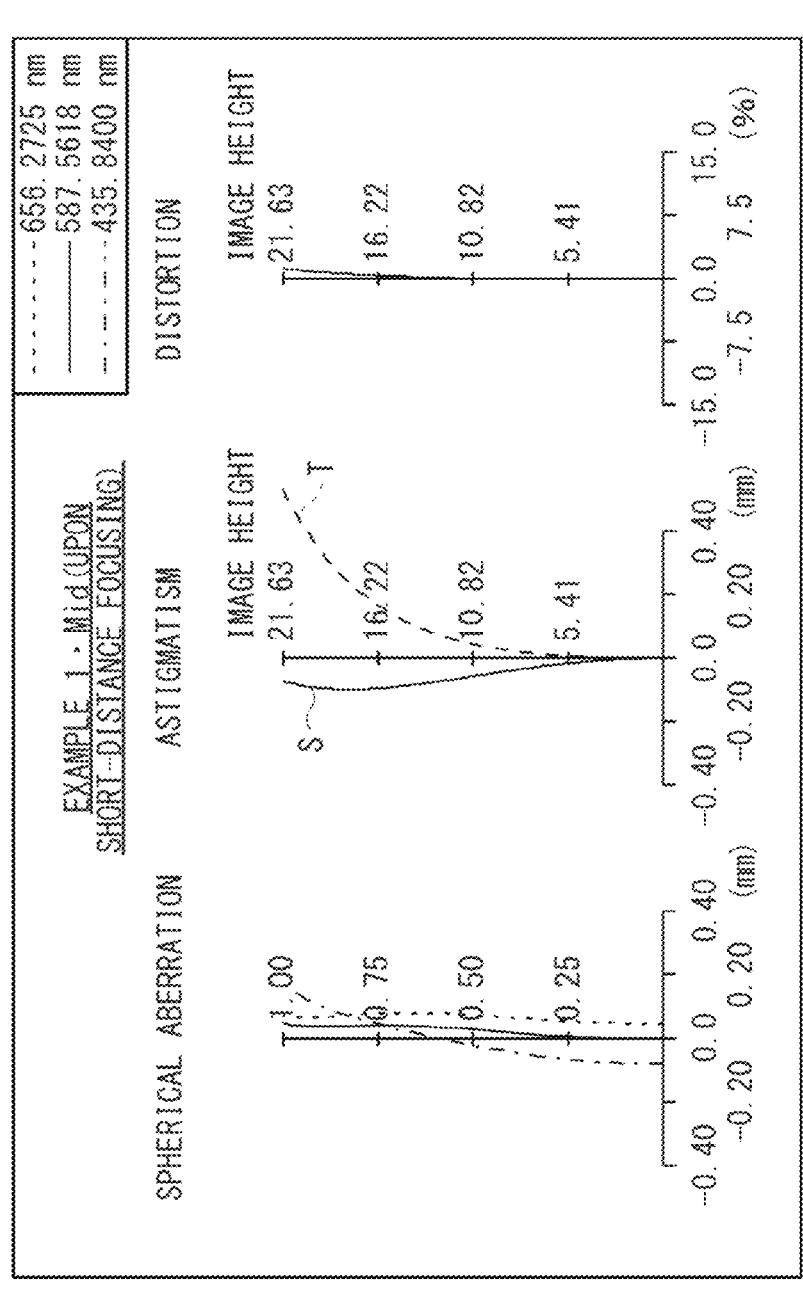
FIG. 6 is an aberration diagram illustrating longitudinal aberration upon short-distance focusing at the intermediate position of the zoom lens according to Example 1.
Figure 7:
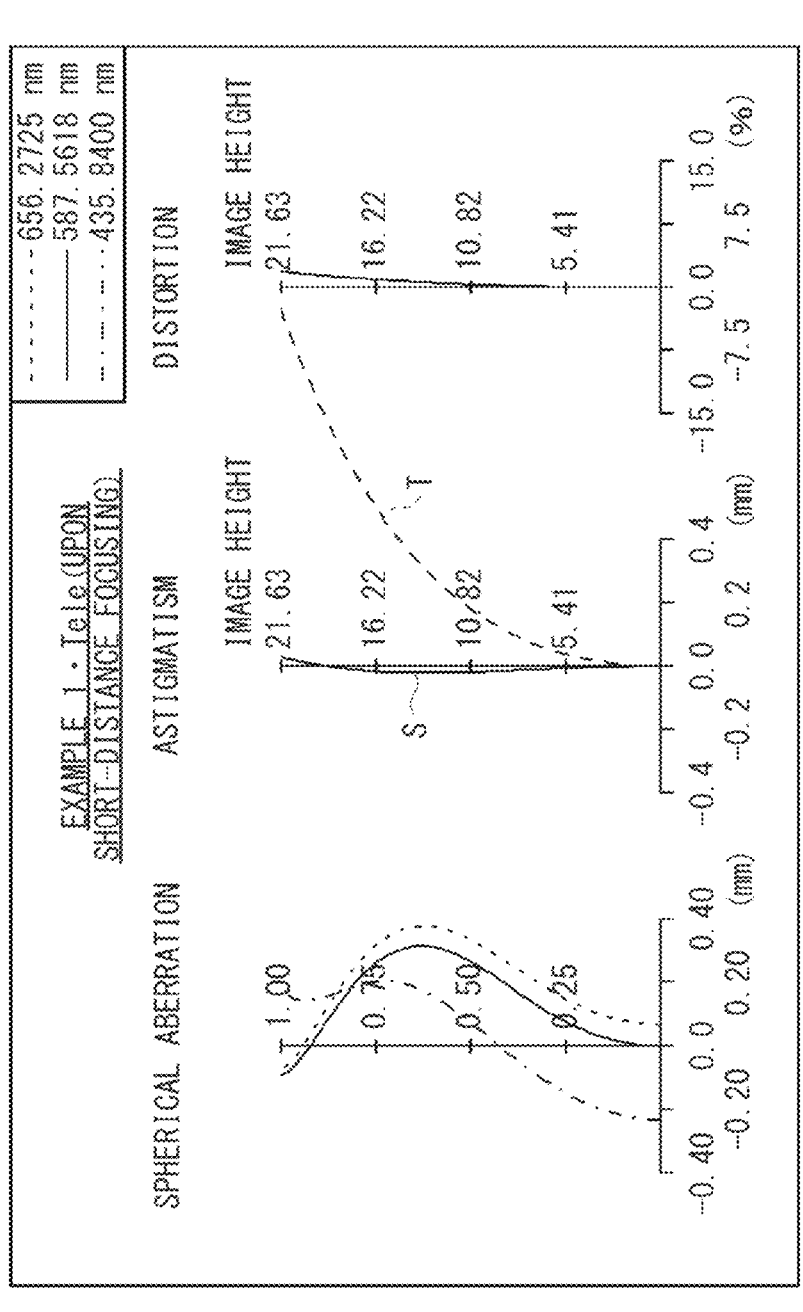
FIG. 7 is an aberration diagram illustrating longitudinal aberration upon short-distance focusing at the telephoto end of the zoom lens according to Example 1.
Figure 8:
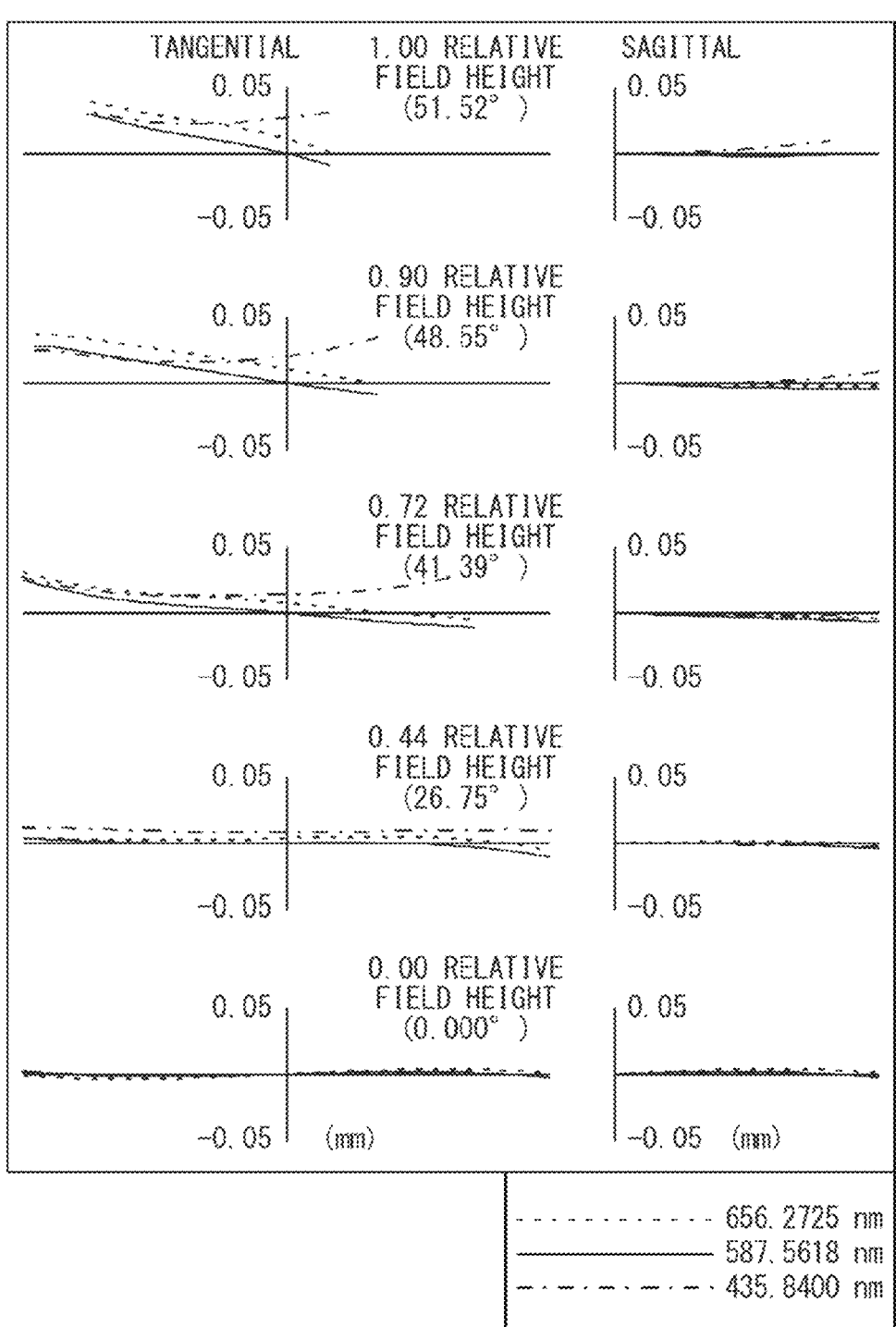
FIG. 8 is an aberration diagram illustrating lateral aberration upon infinity focusing at the wide-angle end of the zoom lens according to Example 1.
Figure 9:
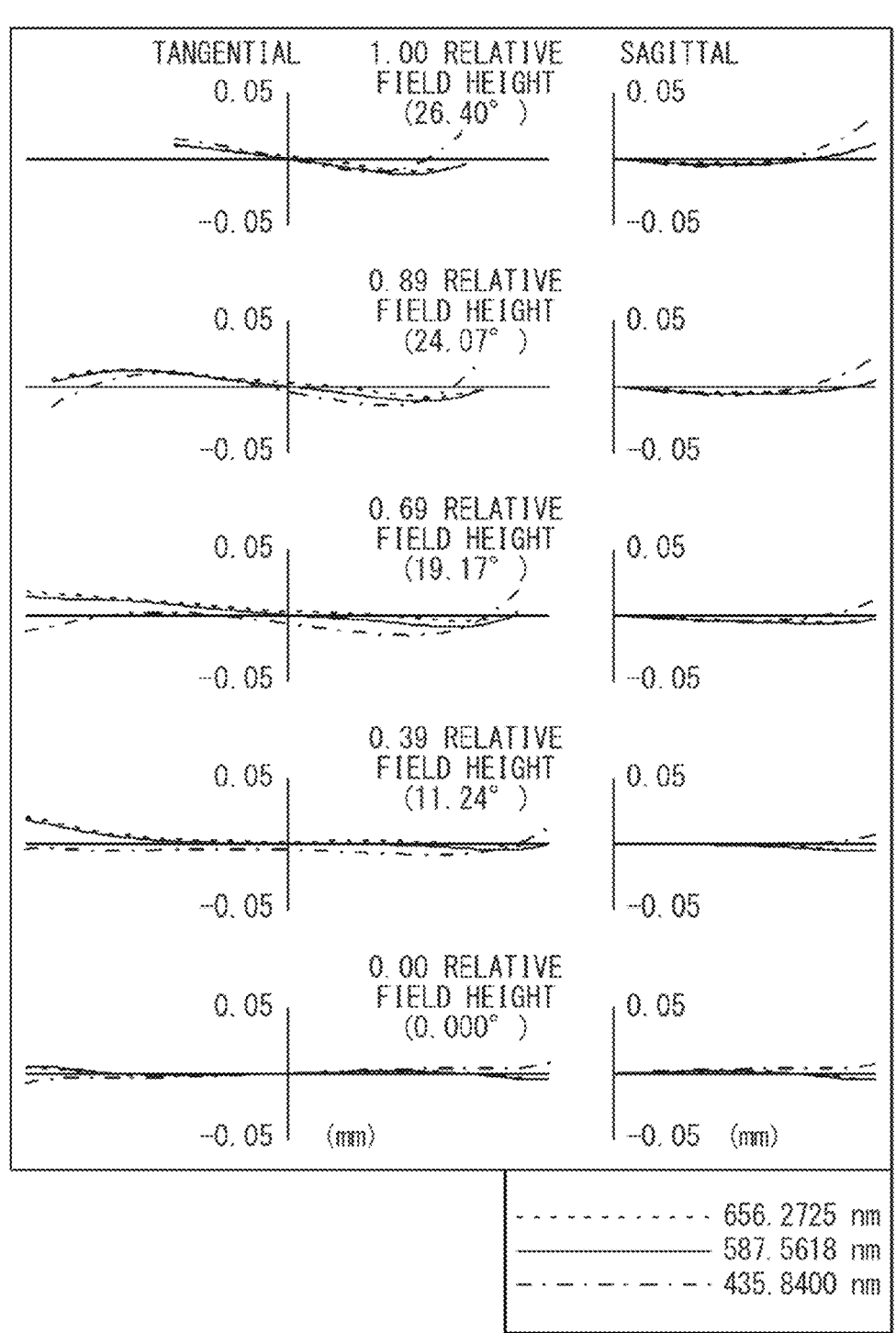
FIG. 9 is an aberration diagram illustrating lateral aberration upon infinity focusing at the intermediate position of the zoom lens according to Example 1.
Figure 10:
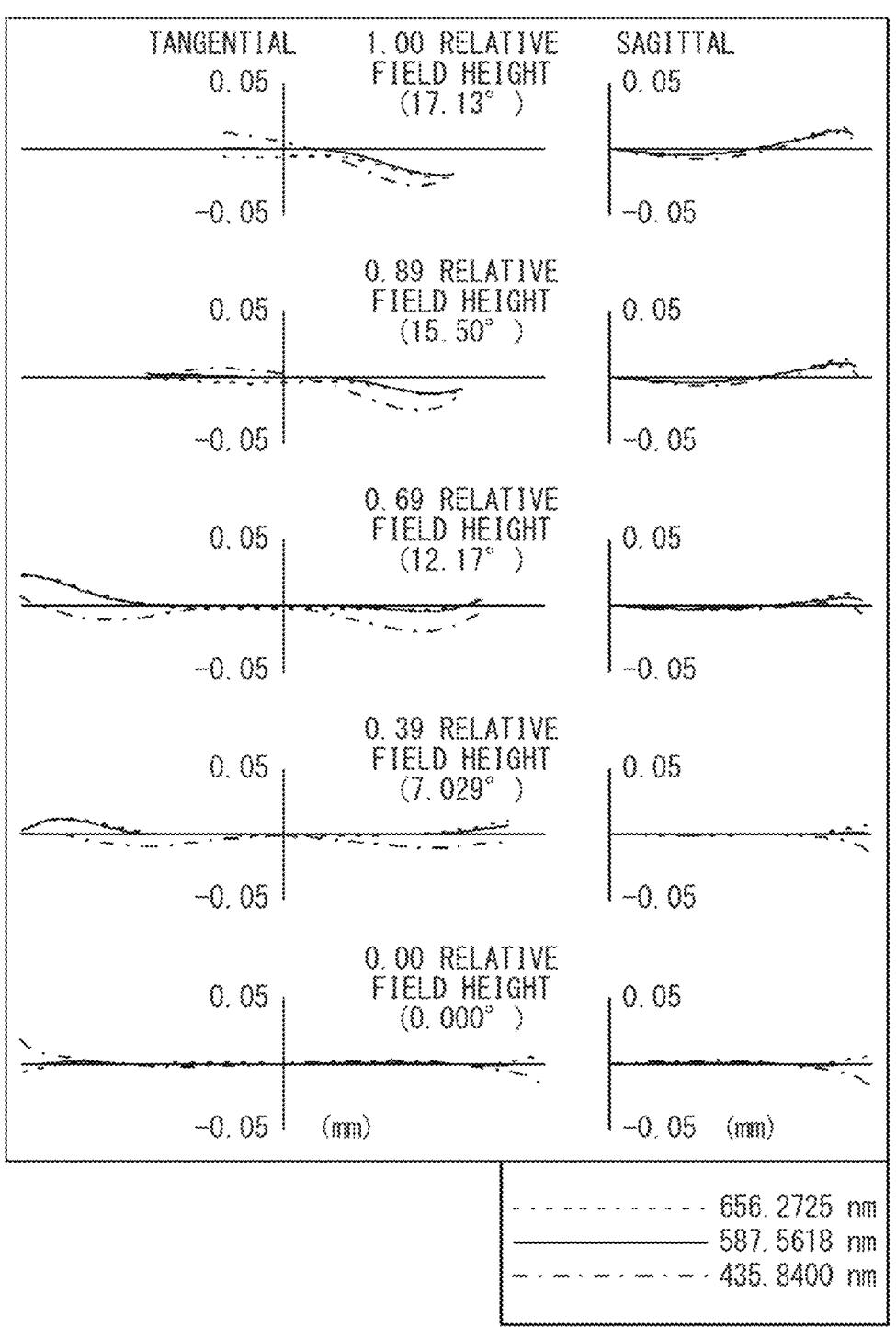
FIG. 10 is an aberration diagram illustrating lateral aberration upon infinity focusing at the telephoto end of the zoom lens according to Example 1.
Figure 11:
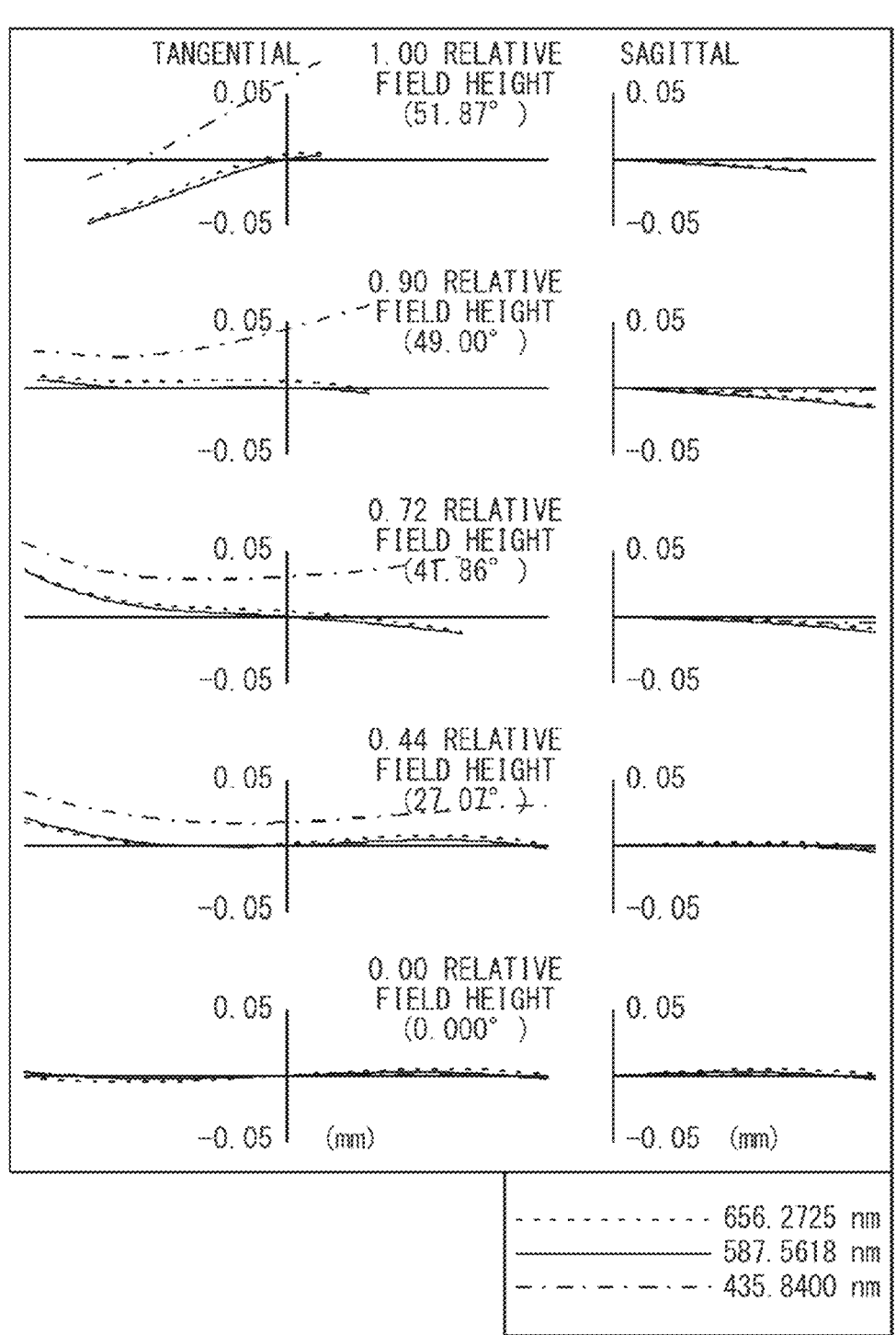
FIG. 11 is an aberration diagram illustrating lateral aberration upon short-distance focusing at the wide-angle end of the zoom lens according to Example 1.
Figure 12:
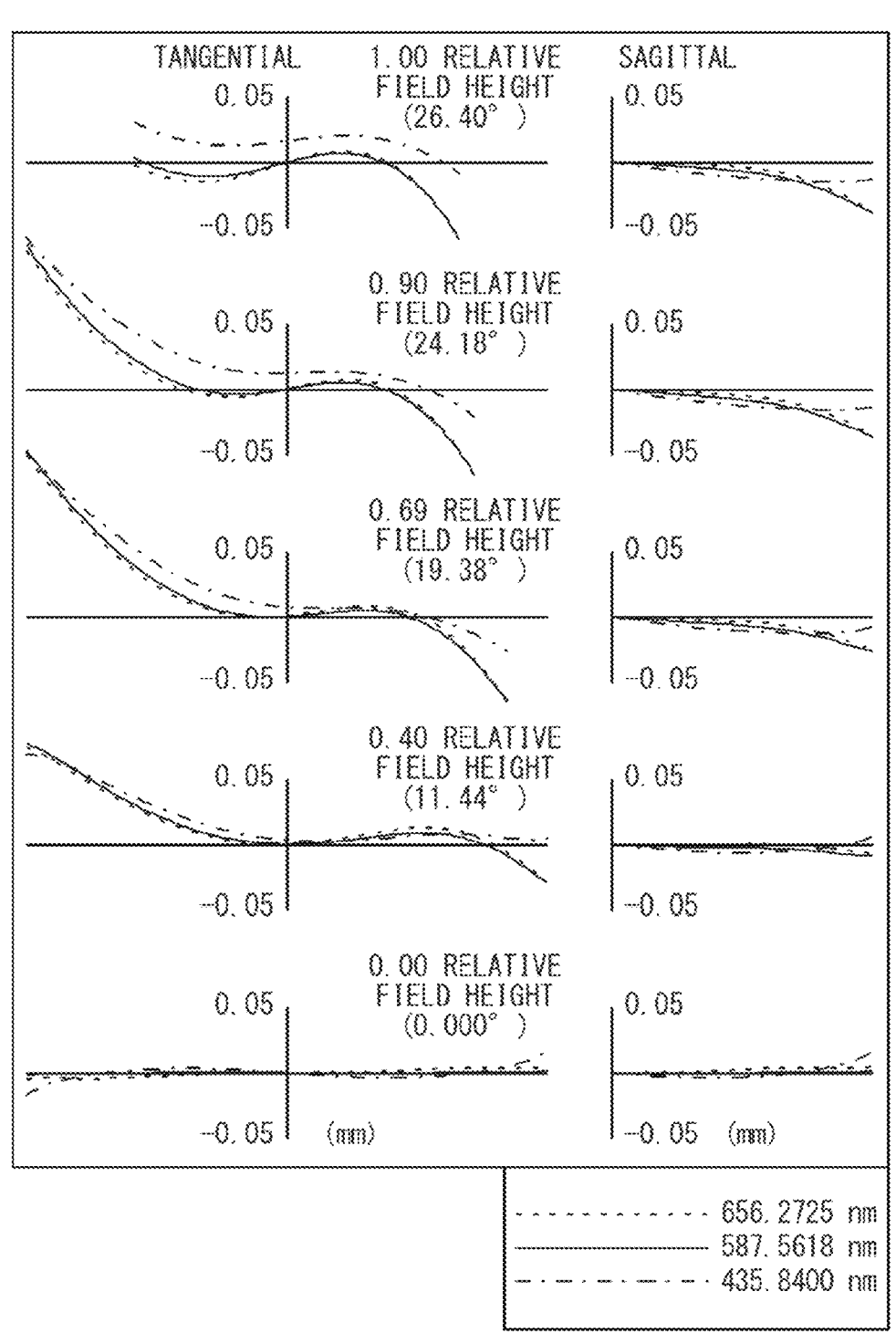
FIG. 12 is an aberration diagram illustrating lateral aberration upon short-distance focusing at the intermediate position of the zoom lens according to Example 1.
Figure 13:
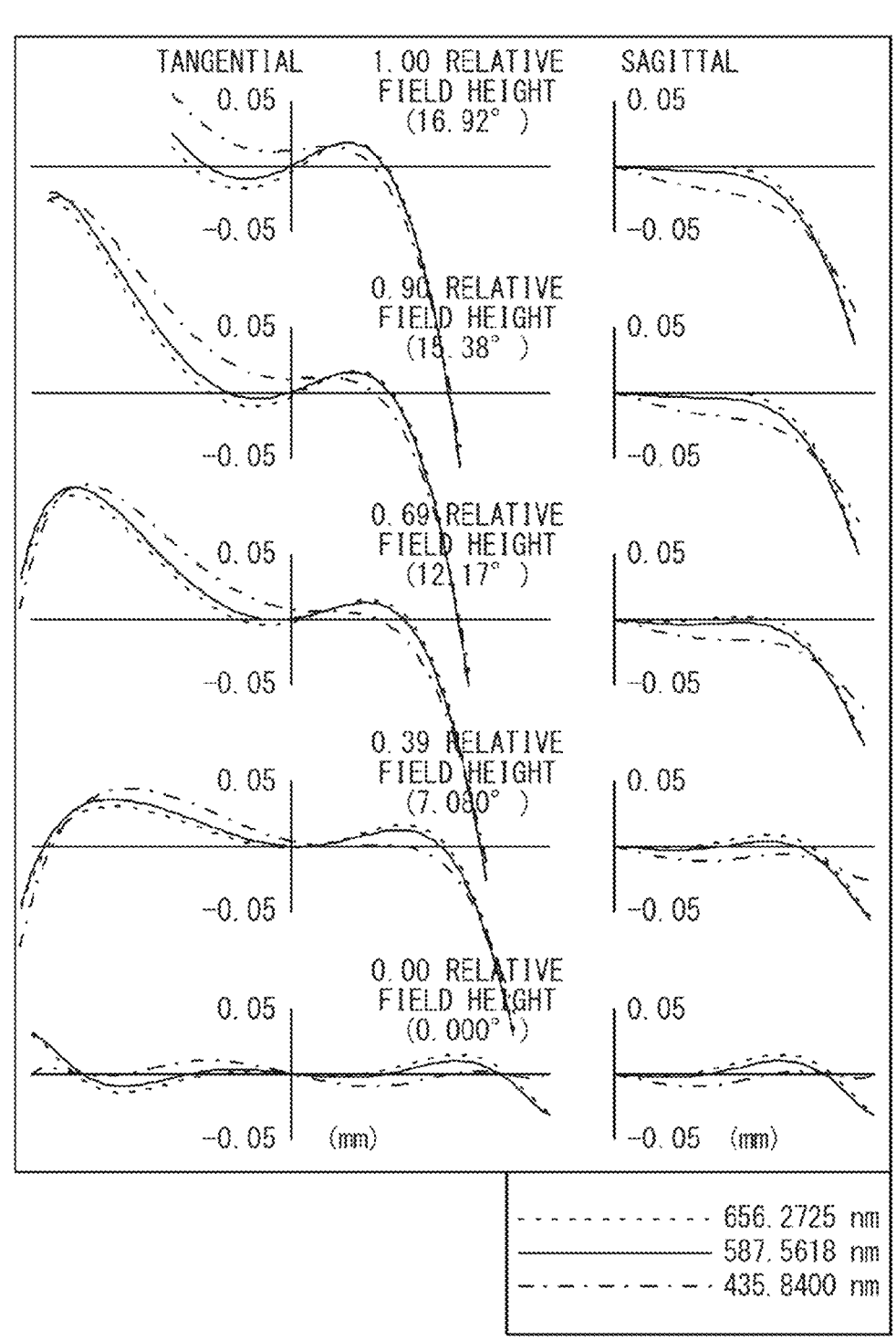
FIG. 13 is an aberration diagram illustrating lateral aberration upon short-distance focusing at the telephoto end of the zoom lens according to Example 1.

FIG. 2 illustrates longitudinal aberration upon infinity focusing at a wide-angle end of the zoom lens 1 according to Example 1. FIG. 3 illustrates longitudinal aberration upon infinity focusing at an intermediate position of the zoom lens 1 according to Example 1. FIG. 4 illustrates longitudinal aberration upon infinity focusing at a telephoto end of the zoom lens 1 according to Example 1. FIG. 5 illustrates longitudinal aberration upon short-distance focusing at the wide-angle end of the zoom lens 1 according to Example 1. FIG. 6 illustrates longitudinal aberration upon short-distance focusing at the intermediate position of the zoom lens 1 according to Example 1. FIG. 7 illustrates longitudinal aberration upon short-distance focusing at the telephoto end of the zoom lens 1 according to Example 1. FIG. 8 illustrates lateral aberration upon infinity focusing at the wide-angle end of the zoom lens 1 according to Example 1. FIG. 9 illustrates lateral aberration upon infinity focusing at the intermediate position of the zoom lens 1 according to Example 1. FIG. 10 illustrates lateral aberration upon infinity focusing at the telephoto end of the zoom lens 1 according to Example 1. FIG. 11 illustrates lateral aberration upon short-distance focusing at the wide-angle end of the zoom lens 1 according to Example 1. FIG. 12 illustrates lateral aberration upon short-distance focusing at the intermediate position of the zoom lens 1 according to Example 1. FIG. 13 illustrates lateral aberration upon short-distance focusing at the telephoto end of the zoom lens 1 according to Example 1.

FIGS. 2 to 7 illustrate, as longitudinal aberration, spherical aberration, astigmatism (field curvature), and distortion. In the spherical aberration diagrams in FIGS. 2 to 7 and lateral aberration diagrams in FIGS. 8 to 13, a solid line indicates a value on a d-line (587.56 nm), a dashed-dotted line indicates a value on a g-line (435.84 nm), and a broken line indicates a value on a C-line (656.27 nm). In the astigmatism diagrams in FIGS. 2 to 7, S denotes a value on a sagittal image plane, and T denotes a value on a tangential image plane. The astigmatism diagrams and the distortion diagrams in FIGS. 2 to 7 illustrate values on the d-line.

These apply similarly to aberration diagrams in subsequent other Examples.

As appreciated from each of the aberration diagrams, the zoom lens 1 according to Example 1 undergoes favorable correction of various aberrations, and thus has superior image-forming performance.

Example 2

Table 6 exhibits basic lens data of the zoom lens 2 according to Example 2 illustrated in FIG. 14. Table 7 exhibits values of the focal distance f of the total system, the F-value, the total angle of view 2c, the image height Y, and the total optical length L in the zoom lens 2 according to Example 2. Table 8 exhibits data on a surface interval that is variable upon zooming and focusing in the zoom lens 2 according to Example 2. It is to be noted that Table 7 exhibits values for each of the wide-angle end (Wide), the intermediate position (Mid), and the telephoto end (Tele) in a case where the object distance (d0) is infinity. Table 8 exhibits values for each of the wide-angle end (Wide), the intermediate position (Mid), and the telephoto end (Tele) in the case where the object distance (d0) is infinity and in a case where the object distance (d0) is a short distance. Table 9 exhibits values of coefficients indicating shapes of aspherical surfaces in the zoom lens 2 according to Example 2. Table 10 exhibits a starting surface and a focal distance (unit: mm) of each of lens groups of the zoom lens 2 according to Example 2.

The zoom lens 2 according to Example 2 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 2 according to Example 2 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a concave surface opposed to the object side. The lens L23 is a positive lens of a biconvex shape. The lens L24 is a negative meniscus lens with a concave surface opposed to the object side.

The third lens group G3 includes the lens L31. The lens L31 is a positive meniscus lens including an aspherical surface on both sides, with a convex surface opposed to the object side.

The fourth lens group G4 includes the lenses L41 to L45 in order from the object side toward the image plane side. The lens L41 is a negative meniscus lens with a convex surface opposed to the object side. The lens L42 is a positive meniscus lens with a convex surface opposed to the object side. The lens L41 and the lens L42 constitute a cemented lens in which the lens L41 and the lens L42 are attached to each other. The lens L43 is a positive meniscus lens with a concave surface opposed to the object side. The lens L44 is a negative meniscus lens with a concave surface opposed to the object side. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61 and the lens L62 in order from the object side toward the image plane side. The lens L61 is a positive meniscus lens with a convex surface opposed to the object side. The lens L62 is a negative meniscus lens with a concave surface opposed to the object side.

The above-described configuration allows for achievement of a zoom lens having a high variable magnification ratio while covering a wide-angle region despite a miniaturized optical system.

TABLE 6

| | | Example 2 | | | |
|---|---|---|---|---|---|
| Si | ri | di | ndi | vdi | φi |
| 0 (OBJ) | | (d0) | | | |
| 1 | 72.753 | 1.00 | 1.94595 | 18.0 | 54.00 |
| 2 | 62.759 | 6.65 | 1.59282 | 68.6 | 52.97 |
| 3 | 1483.422 | (d3) | | | 52.40 |

TABLE 6-continued

| | | Example 2 | | | |
|---|---|---|---|---|---|
| Si | ri | di | ndi | vdi | φi |
| 4 | 160.799 | 1.30 | 1.77250 | 49.6 | 35.60 |
| 5 | 15.595 | 8.57 | | | 25.40 |
| 6 (ASP) | −67.319 | 1.00 | 1.76802 | 49.2 | 24.64 |
| 7 (ASP) | −1456.978 | 0.20 | | | 24.35 |
| 8 | 60.664 | 4.64 | 1.85478 | 24.8 | 23.20 |
| 9 | −75.036 | 1.68 | | | 21.71 |
| 10 | −27.225 | 1.08 | 1.59282 | 68.6 | 21.16 |
| 11 | −225.584 | (d11) | | | 20.00 |
| 12 (STO) | ∞ | 1.50 | | | 19.51 |
| 13 (ASP) | 27.735 | 4.93 | 1.69350 | 53.2 | 21.46 |
| 14 (ASP) | 127.510 | (d14) | | | 21.11 |
| 15 | 22.391 | 1.45 | 1.95375 | 32.3 | 21.43 |
| 16 | 14.340 | 6.14 | 1.49700 | 81.6 | 20.10 |
| 17 | 437.447 | 1.60 | | | 19.97 |
| 18 | −62.617 | 2.66 | 1.60342 | 38.0 | 19.92 |
| 19 | −25.231 | 1.43 | 1.85451 | 25.2 | 20.02 |
| 20 | −61.683 | 0.20 | | | 20.50 |
| 21 (ASP) | 39.920 | 6.05 | 1.49700 | 81.5 | 20.61 |
| 22 (ASP) | −21.398 | (d22) | | | 20.40 |
| 23 | −46.856 | 1.94 | 1.94595 | 18.0 | 20.64 |
| 24 | −32.539 | 1.25 | | | 20.97 |
| 25 (ASP) | −63.238 | 1.01 | 1.76802 | 49.2 | 20.60 |
| 26 (ASP) | 32.617 | (d26) | | | 20.89 |
| 27 | 92.591 | 4.30 | 1.59349 | 67.0 | 23.82 |
| 28 | 298.382 | 3.25 | | | 25.10 |
| 29 | −42.343 | 1.26 | 1.80420 | 46.5 | 25.70 |
| 30 | −72.656 | (d30) | | | 26.94 |
| 31 (IMG) | ∞ | 0.00 | | | 43.53 |

TABLE 7

| | Example 2 (Zoom Ratio: 3.98) | | |
|---|---|---|---|
| | Wide | Mid | Tele |
| f (mm) | 20.60 | 52.77 | 82.03 |
| Fno | 4.11 | 4.09 | 4.64 |
| 2ω (°) | 88.76 | 44.58 | 29.52 |
| Y (mm) | 20.16 | 21.63 | 21.62 |
| L (mm) | 118.00 | 140.51 | 168.05 |

TABLE 8

| | Example 2 • Variable Data | | | | | |
|---|---|---|---|---|---|---|
| | Wide | Mid | Tele | Wide | Mid | Tele |
| d0 | ∞ | ∞ | ∞ | 299 mm | 299 mm | 299 mm |
| d3 | 0.80 | 19.39 | 37.39 | 0.80 | 9.50 | 37.39 |
| d11 | 21.08 | 5.04 | 2.14 | 21.08 | 9.12 | 2.14 |
| d14 | 7.82 | 2.32 | 1.29 | 7.82 | 3.81 | 1.29 |
| d22 | 3.35 | 2.90 | 2.14 | 4.37 | 4.42 | 6.40 |
| d26 | 5.06 | 9.05 | 11.35 | 4.04 | 7.54 | 7.09 |
| d30 | 14.78 | 36.69 | 48.63 | 14.78 | 27.63 | 48.63 |

TABLE 9

| | | | Example 2•Aspherical Data | | | |
|---|---|---|---|---|---|---|
| Si | k | A4 | A6 | A8 | A10 | A12 |
| 6 | 0.00000E+00 | 2.94700E−05 | −2.54974E−07 | 9.97597E−10 | −1.52613E−12 | −1.00409E−14 |
| 7 | 0.00000E+00 | 1.60463E−05 | −2.92352E−07 | 1.28472E−09 | −3.70786E−12 | −1.13059E−14 |
| 13 | 0.00000E+00 | 2.72063E−07 | 3.02548E−08 | −7.67144E−12 | 1.34192E−12 | 0.00000E+00 |
| 14 | 0.00000E+00 | 8.36246E−06 | 5.82577E−08 | −1.55421E−10 | 2.77914E−12 | 0.00000E+00 |
| 21 | 0.00000E+00 | −2.05555E−05 | 8.55074E−09 | −1.41679E−10 | −1.50708E−13 | 3.86515E−15 |

TABLE 9-continued

| | | Example 2•Aspherical Data | | | | |
|---|---|---|---|---|---|---|
| Si | k | A4 | A6 | A8 | A10 | A12 |
| 22 | 0.00000E+00 | 2.77066E−05 | −6.96926E−08 | −1.30670E−11 | −1.19341E−13 | 7.37877E−16 |
| 25 | 0.00000E+00 | 1.48305E−06 | −7.73050E−08 | 9.84206E−11 | 0.00000E+00 | 0.00000E+00 |
| 26 | 0.00000E+00 | 4.33661E−06 | −2.22586E−08 | 2.09339E−11 | 0.00000E+00 | 0.00000E+00 |

TABLE 10

| | Example 2 | |
|---|---|---|
| Lens Group | Starting Surface | Focal Distance |
| G1 | 1 | 142.28 |
| G2 | 4 | −19.27 |
| G3 | 13 | 50.10 |
| G4 | 15 | 27.58 |
| G5 | 23 | −37.66 |
| G6 | 27 | −321.60 |

Figure 15:
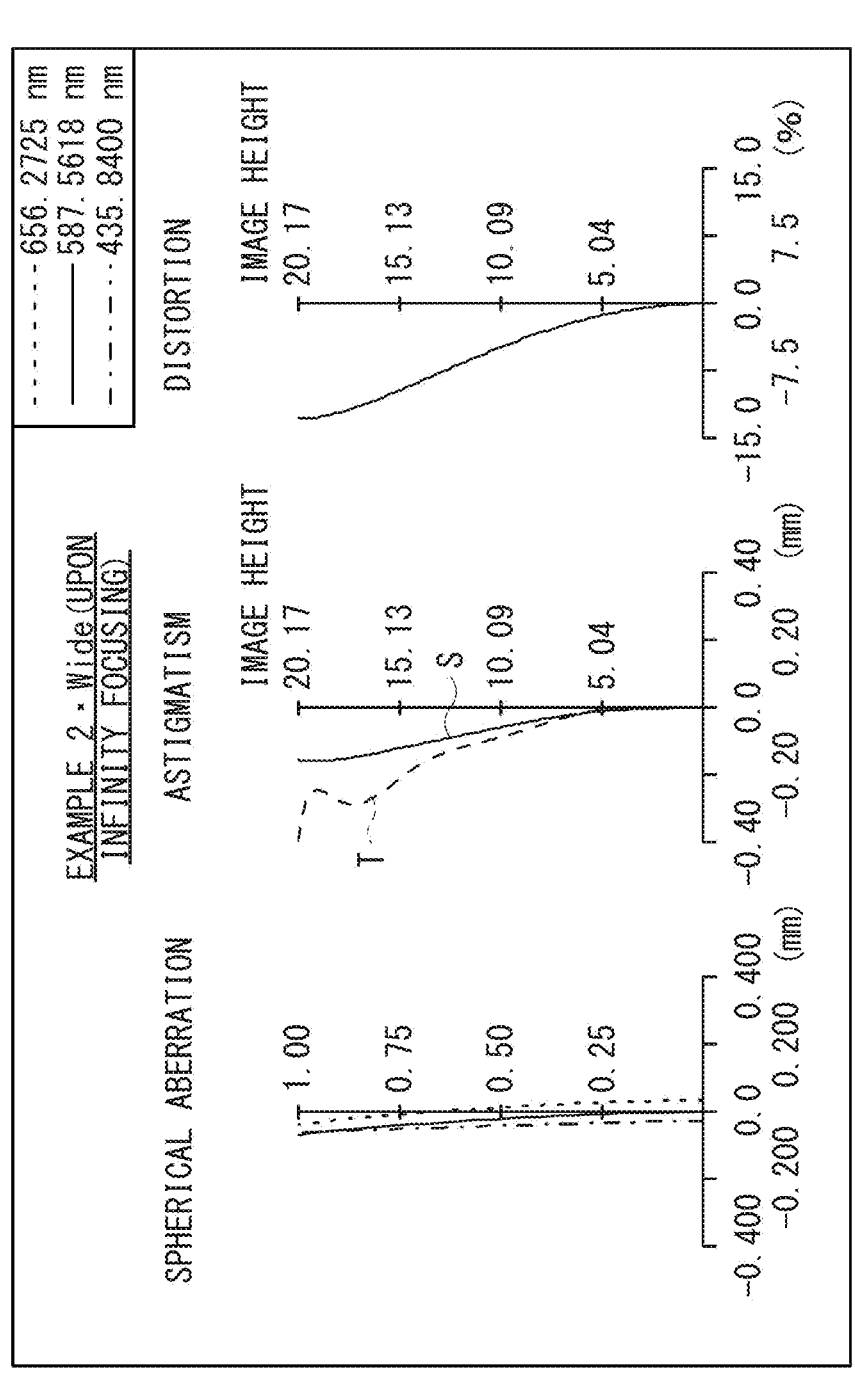
FIG. 15 is an aberration diagram illustrating longitudinal aberration upon infinity focusing at a wide-angle end of the zoom lens according to Example 2.
Figure 16:
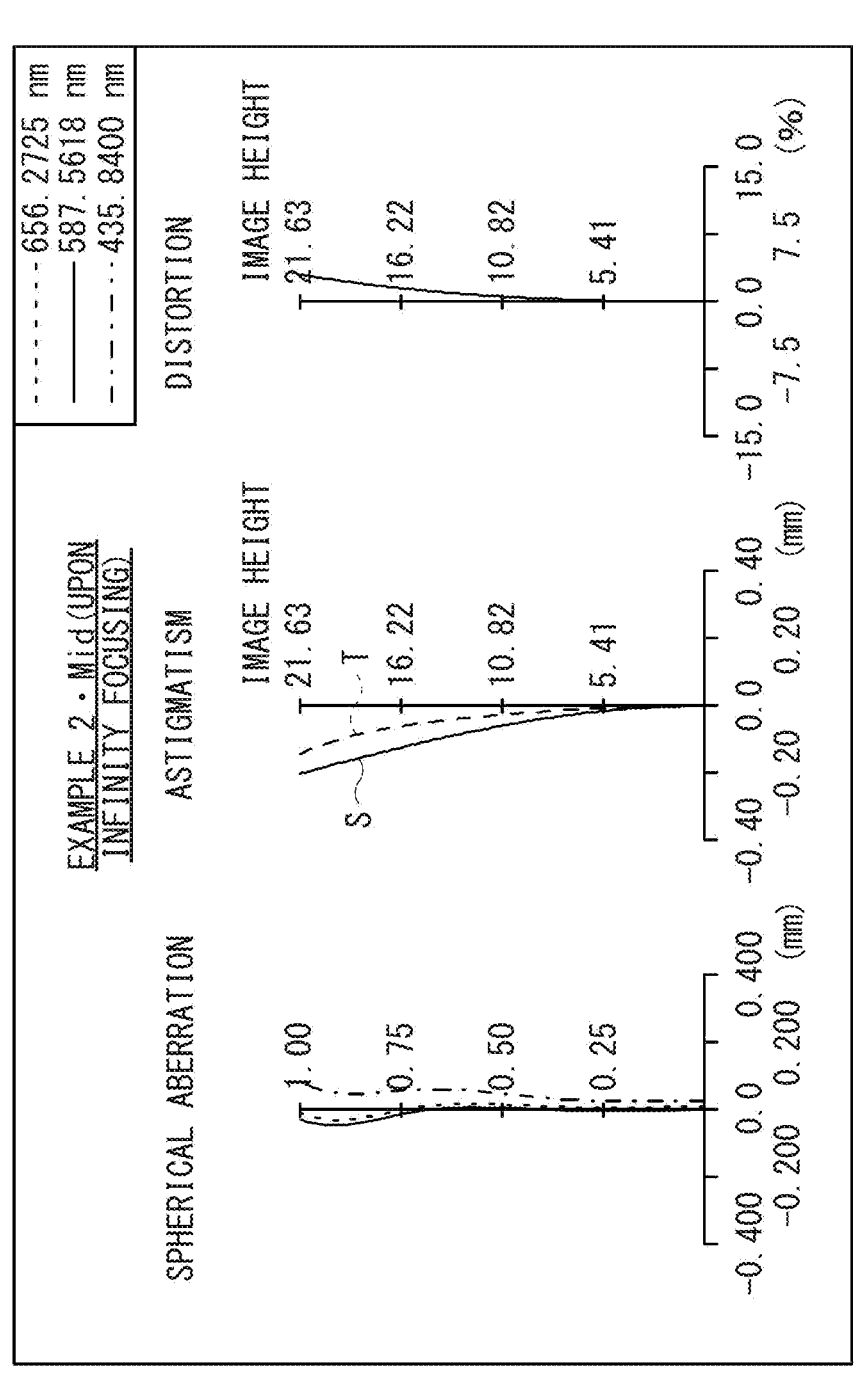
FIG. 16 is an aberration diagram illustrating longitudinal aberration upon infinity focusing at an intermediate position of the zoom lens according to Example 2.
Figure 17:
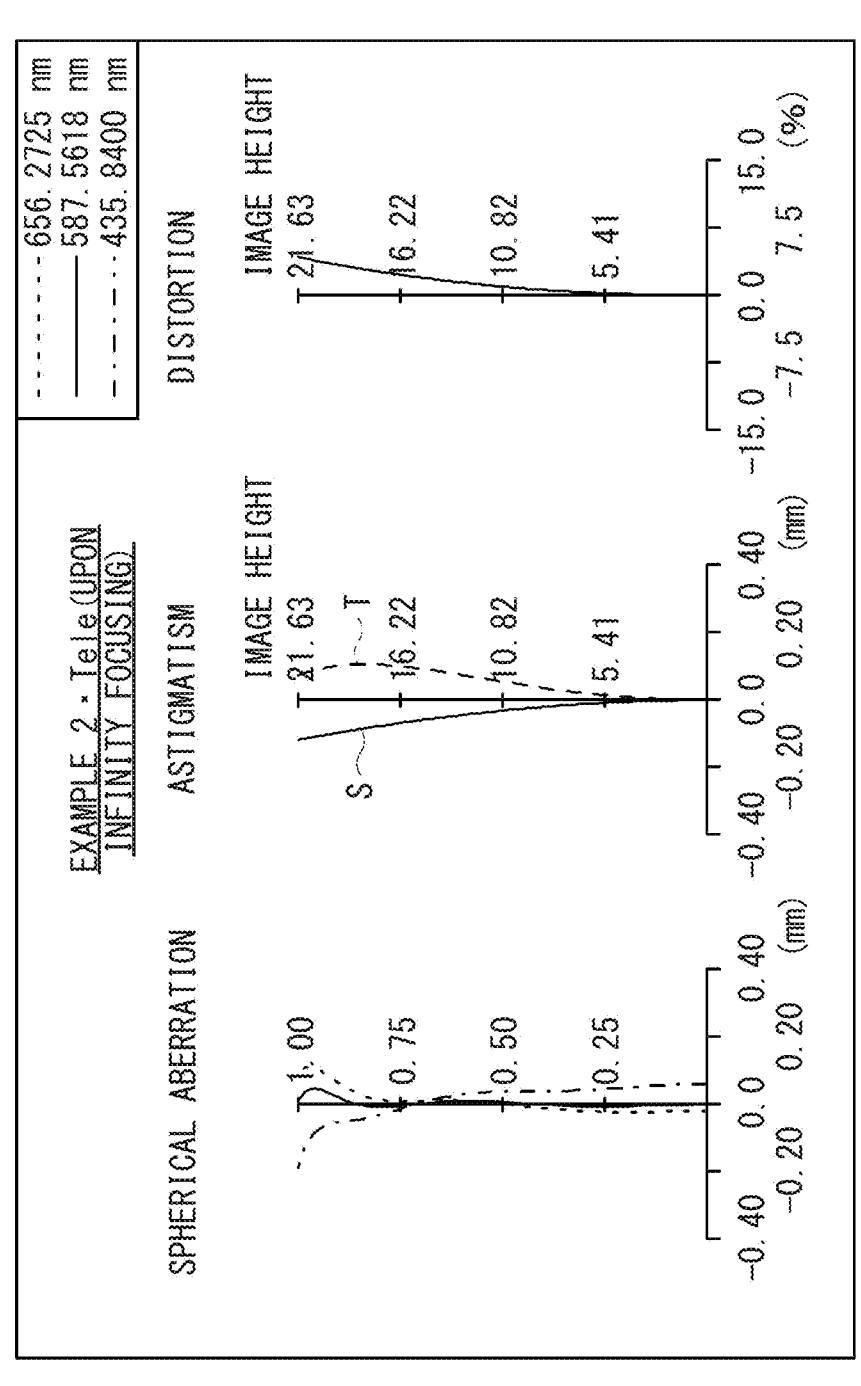
FIG. 17 is an aberration diagram illustrating longitudinal aberration upon infinity focusing at a telephoto end of the zoom lens according to Example 2.
Figure 18:
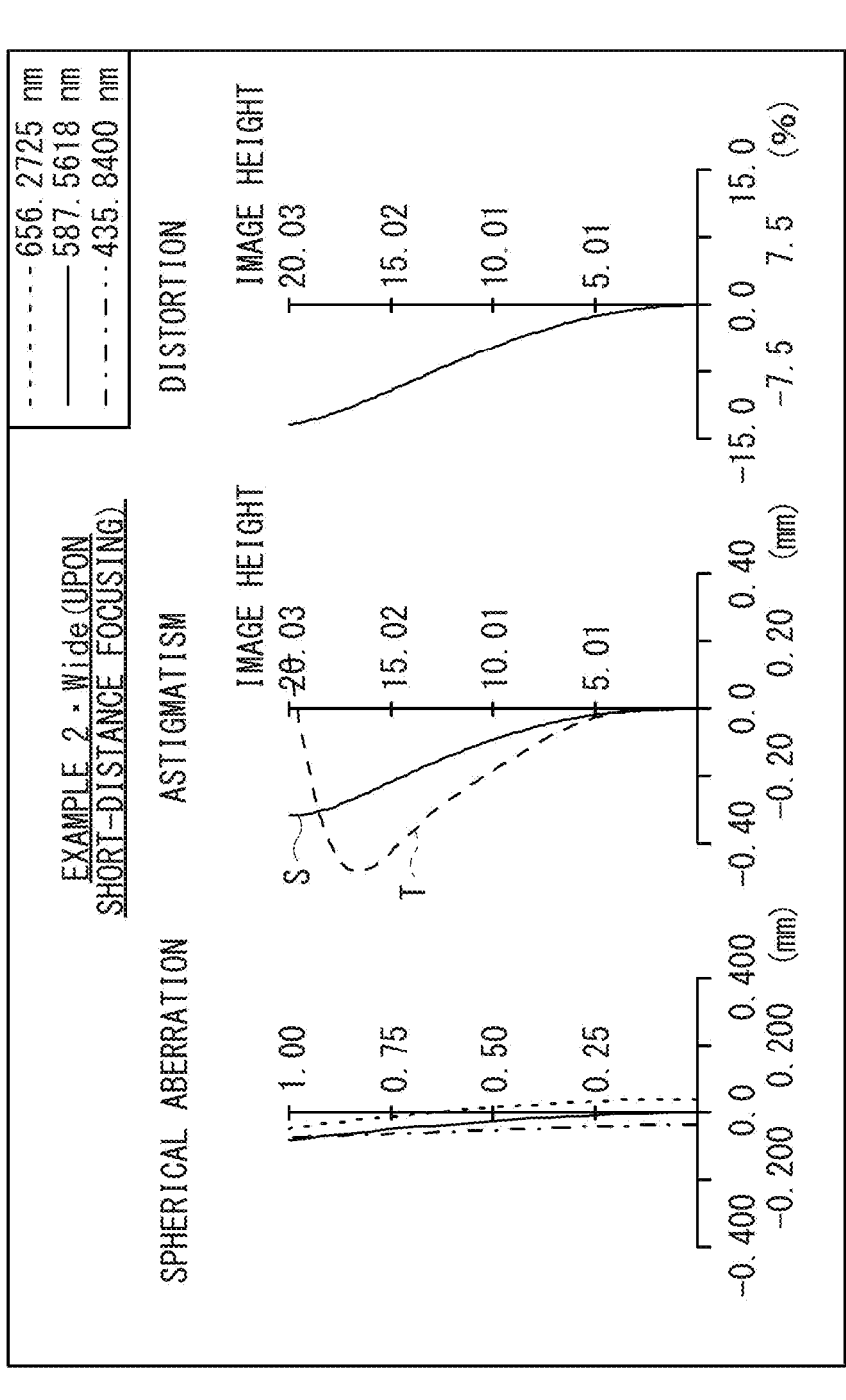
FIG. 18 is an aberration diagram illustrating longitudinal aberration upon short-distance focusing at the wide-angle end of the zoom lens according to Example 2.
Figure 19:
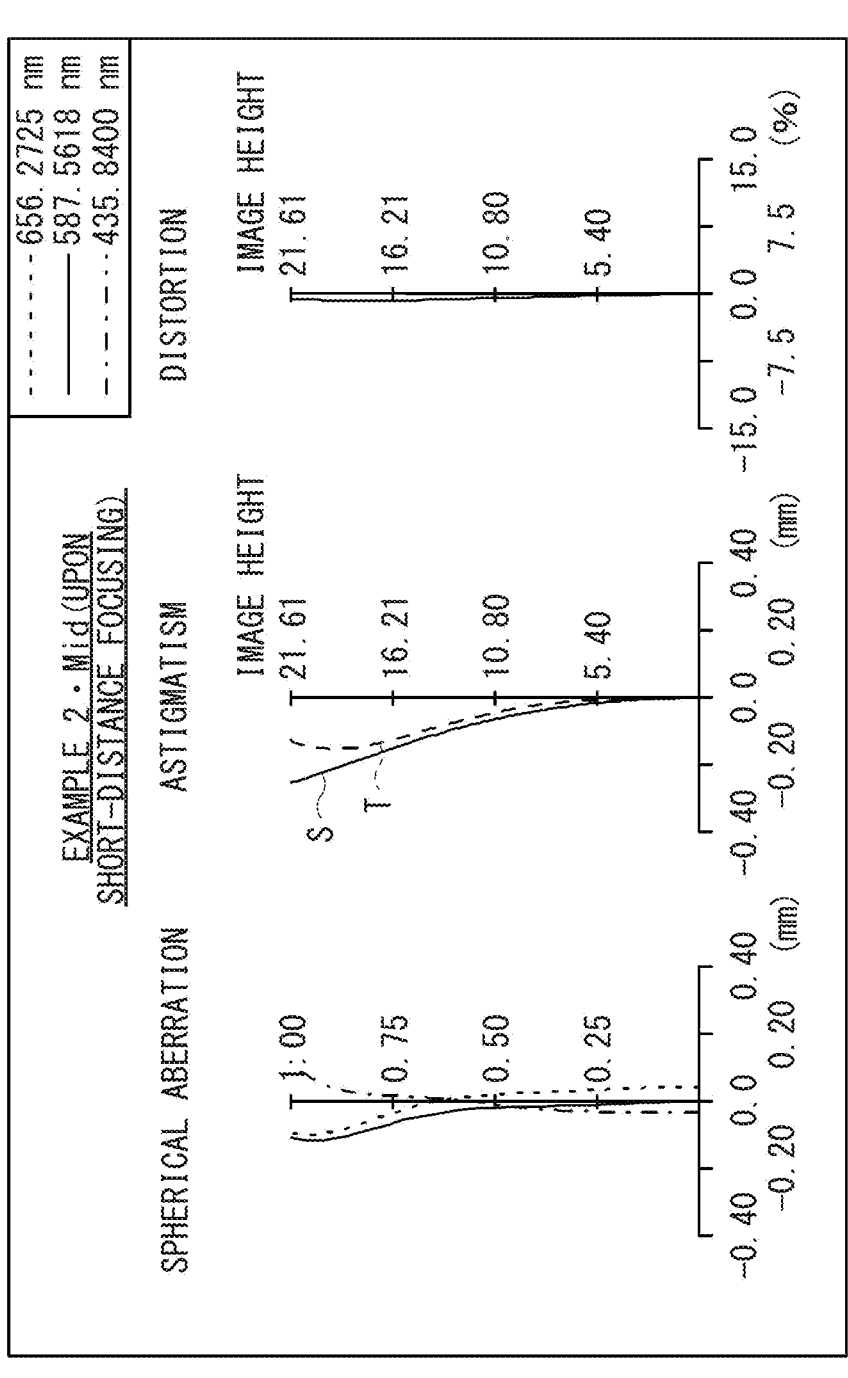
FIG. 19 is an aberration diagram illustrating longitudinal aberration upon short-distance focusing at the intermediate position of the zoom lens according to Example 2.
Figure 20:
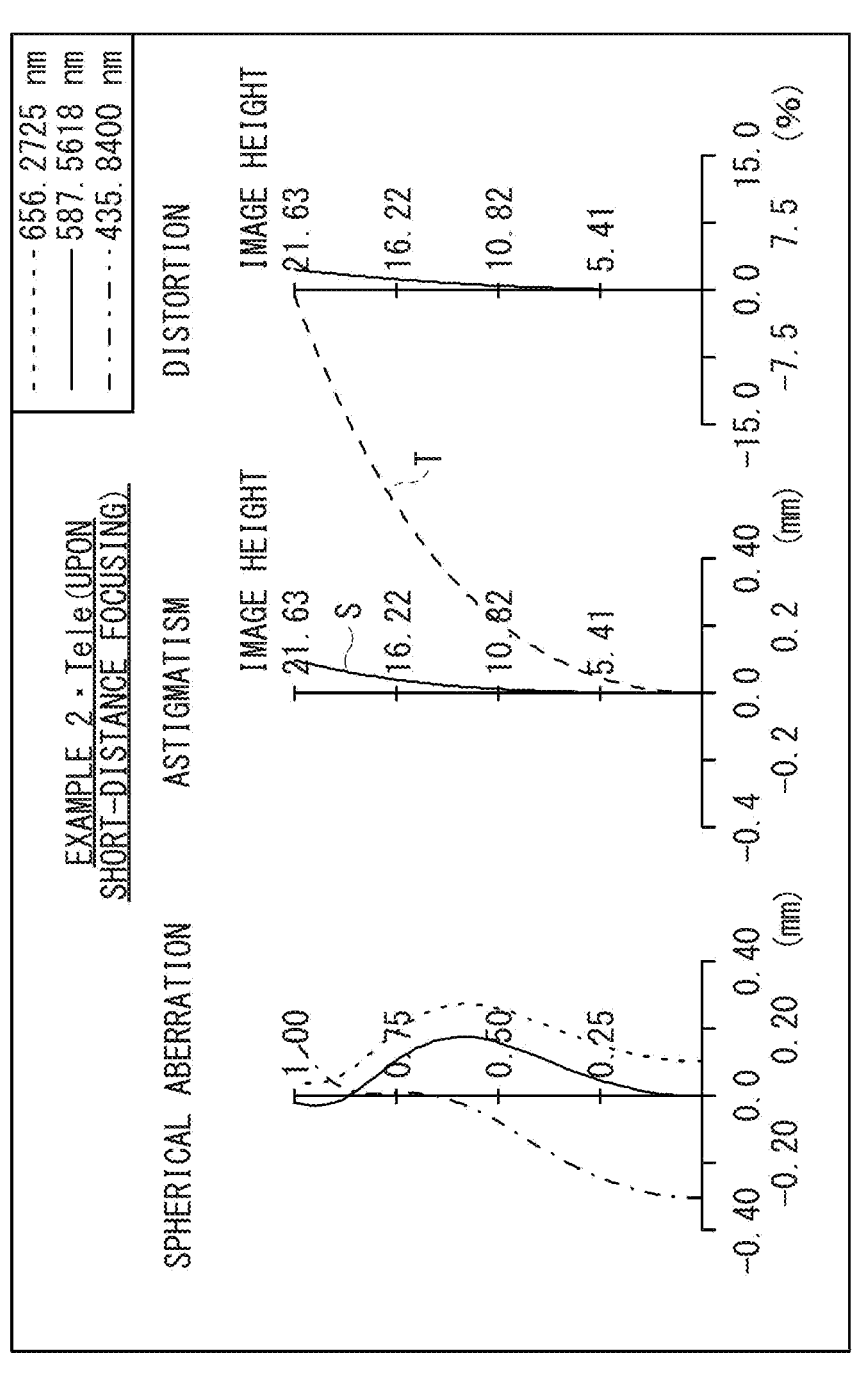
FIG. 20 is an aberration diagram illustrating longitudinal aberration upon short-distance focusing at the telephoto end of the zoom lens according to Example 2.
Figure 21:
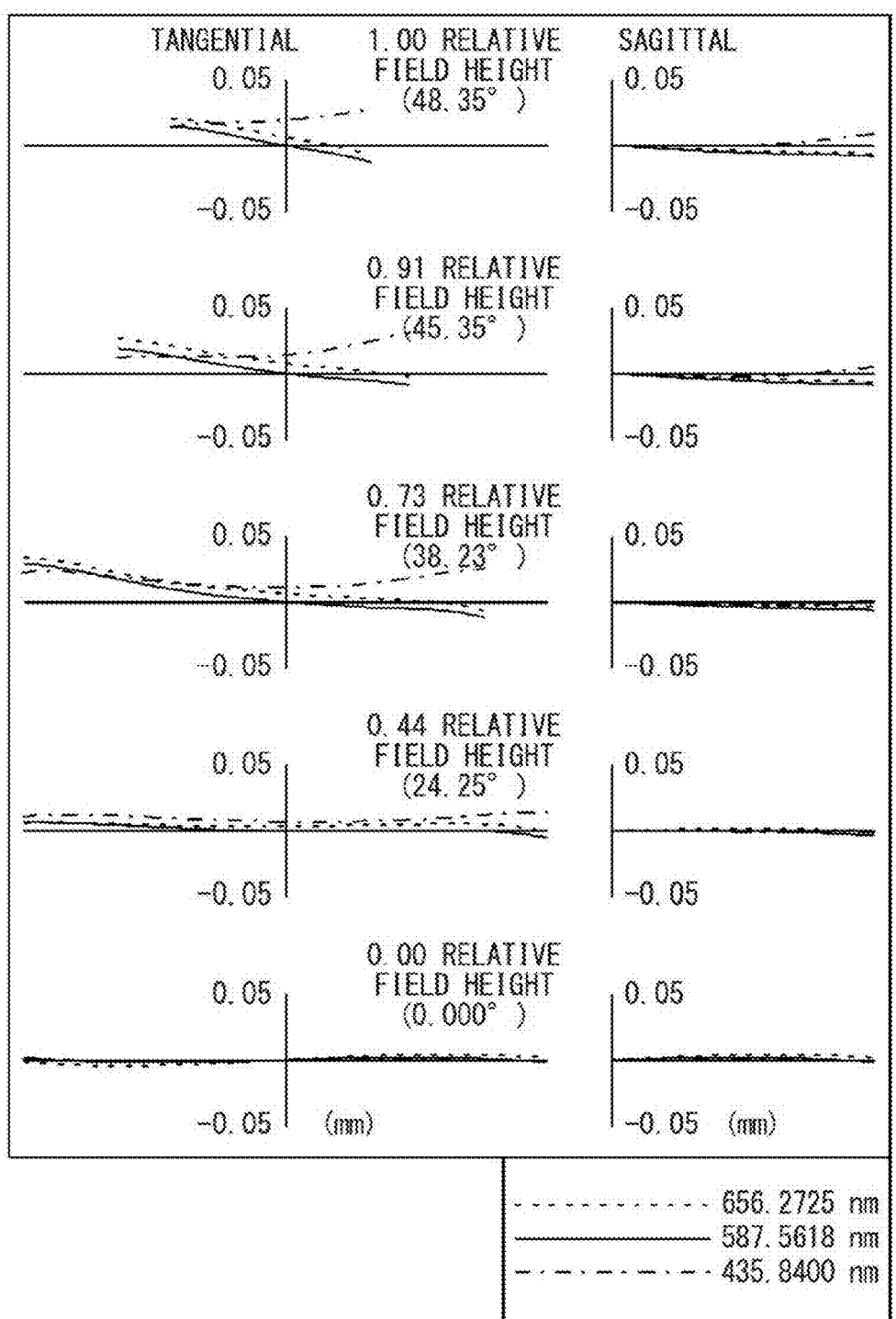
FIG. 21 is an aberration diagram illustrating lateral aberration upon infinity focusing at the wide-angle end of the zoom lens according to Example 2.
Figure 22:
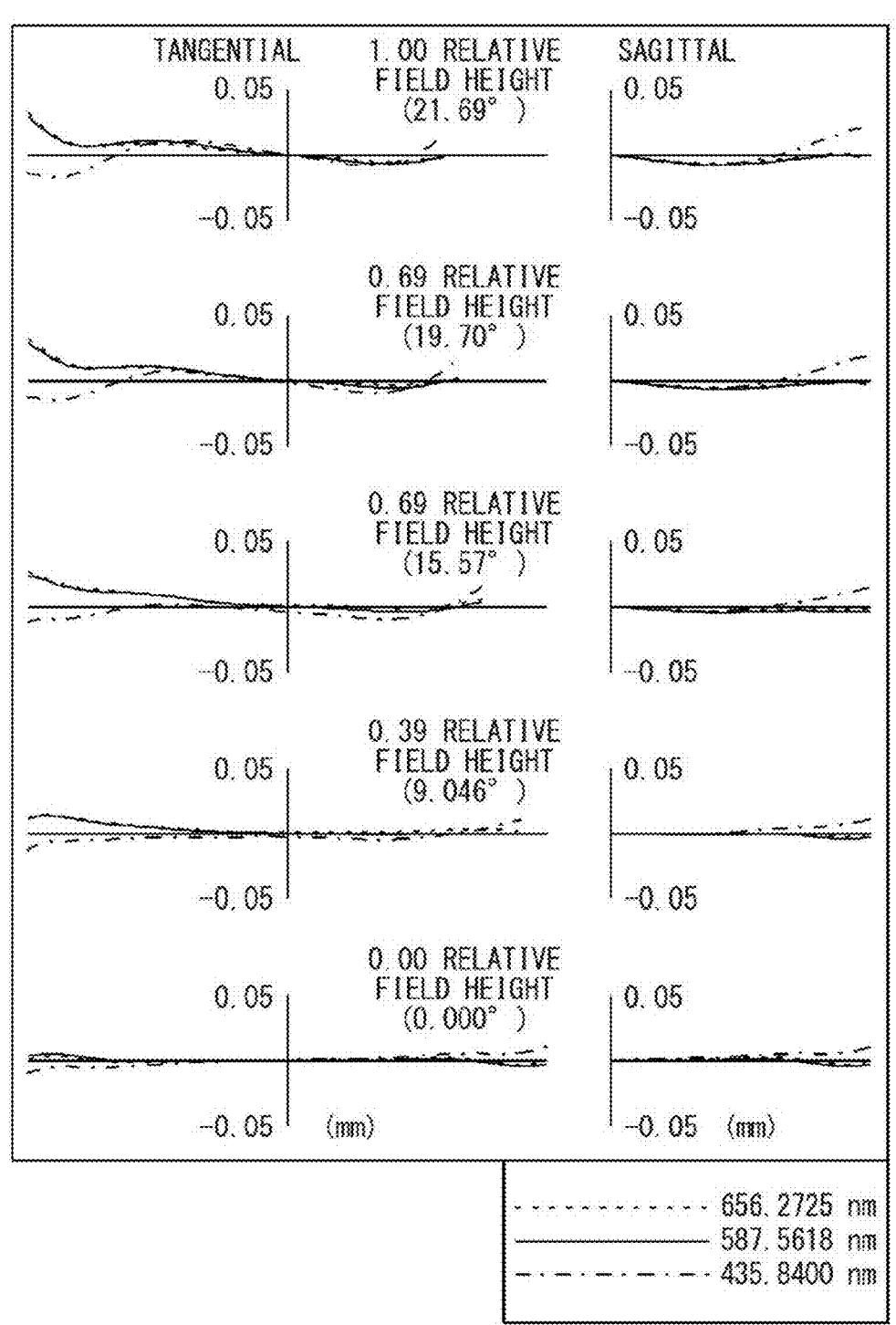
FIG. 22 is an aberration diagram illustrating lateral aberration upon infinity focusing at the intermediate position of the zoom lens according to Example 2.
Figure 23:
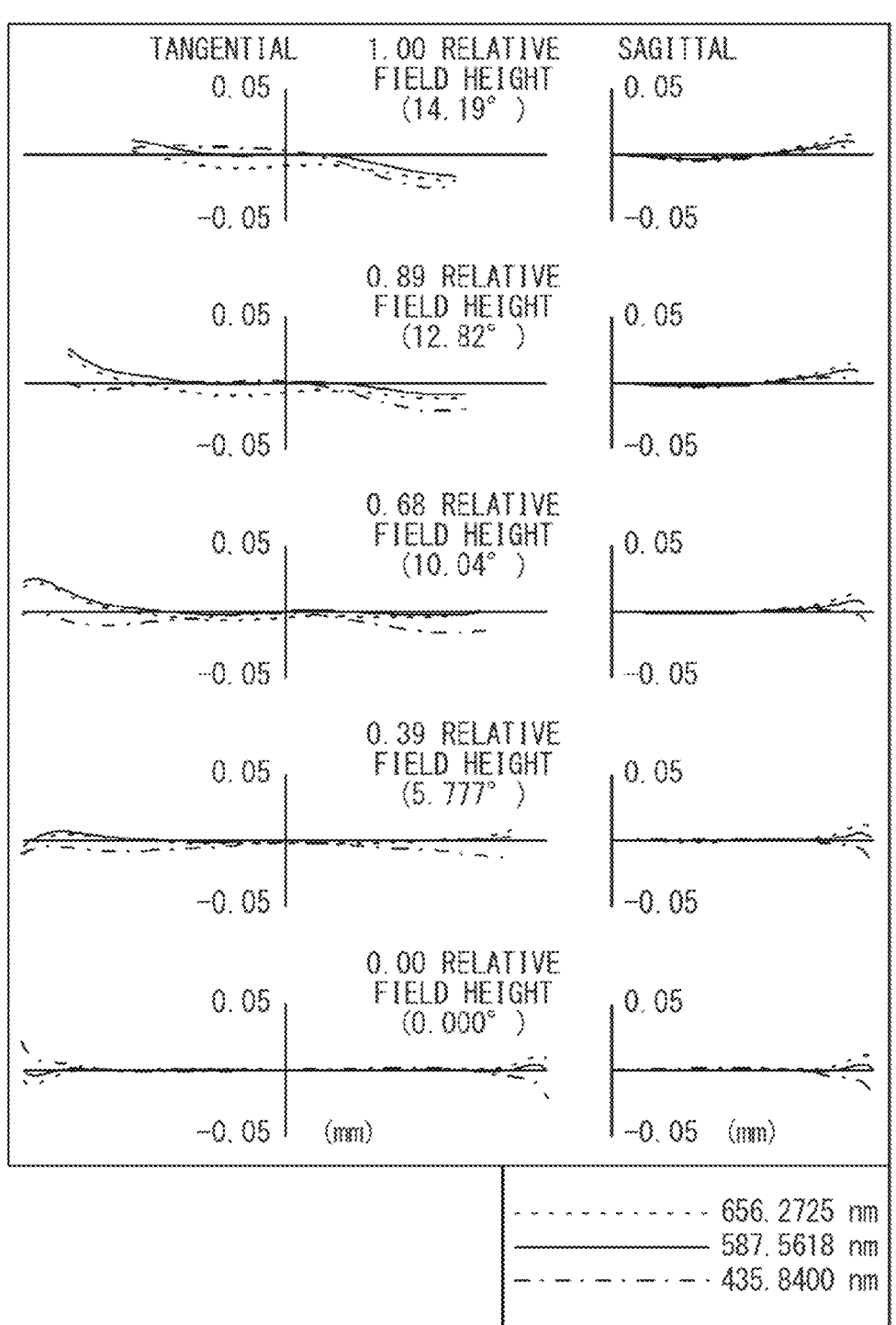
FIG. 23 is an aberration diagram illustrating lateral aberration upon infinity focusing at the telephoto end of the zoom lens according to Example 2.
Figure 24:
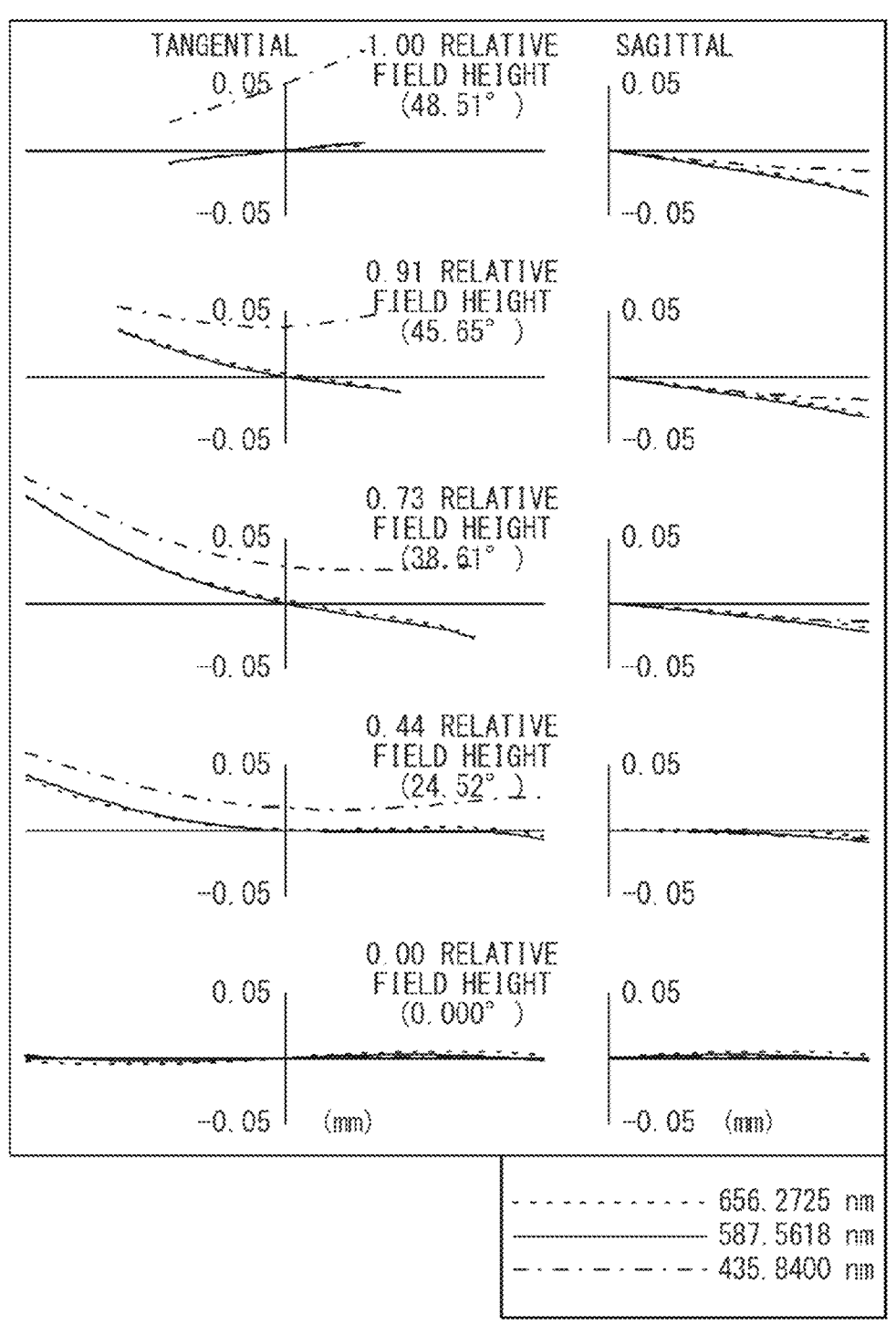
FIG. 24 is an aberration diagram illustrating lateral aberration upon short-distance focusing at the wide-angle end of the zoom lens according to Example 2.
Figure 25:
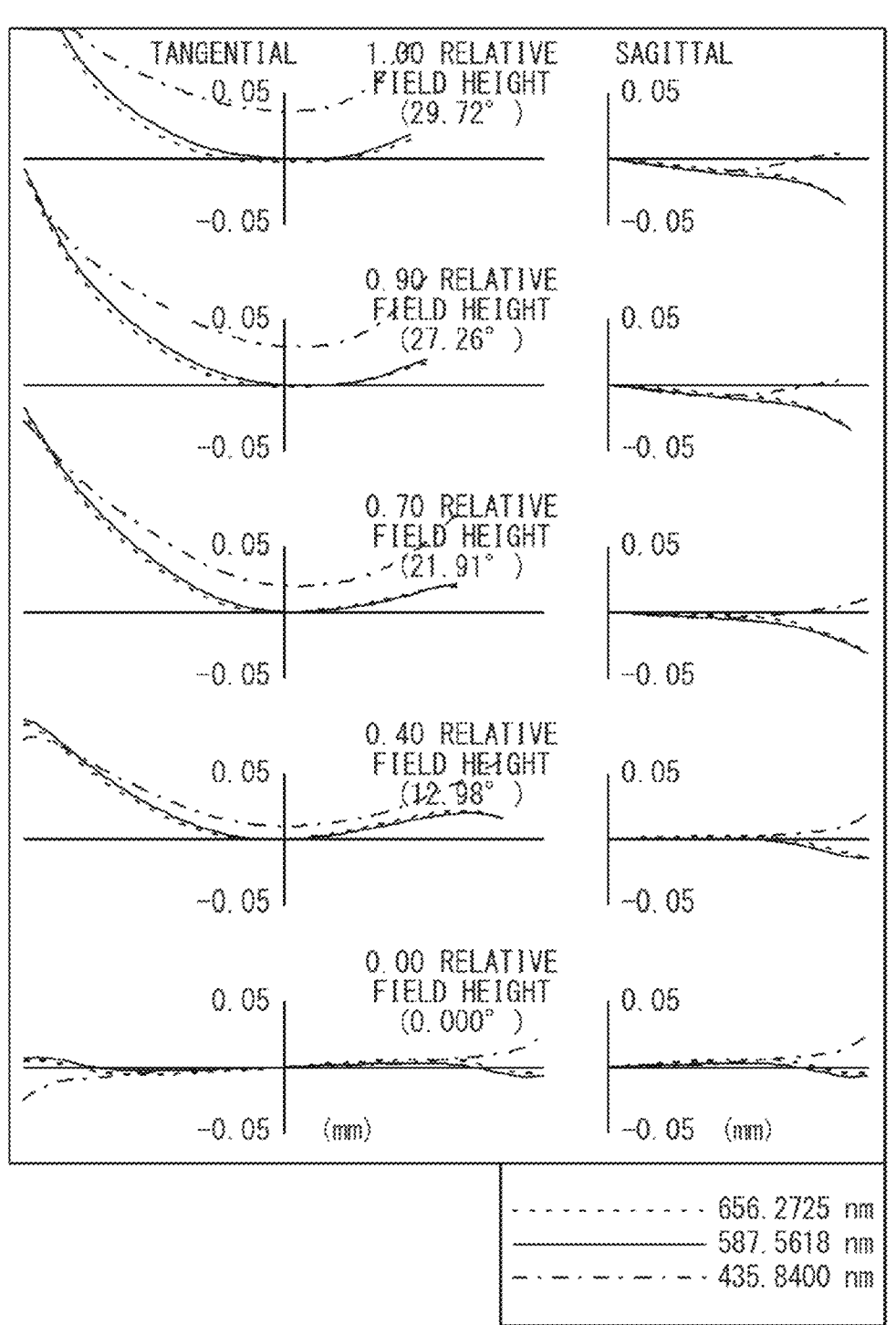
FIG. 25 is an aberration diagram illustrating lateral aberration upon short-distance focusing at the intermediate position of the zoom lens according to Example 2.
Figure 26:
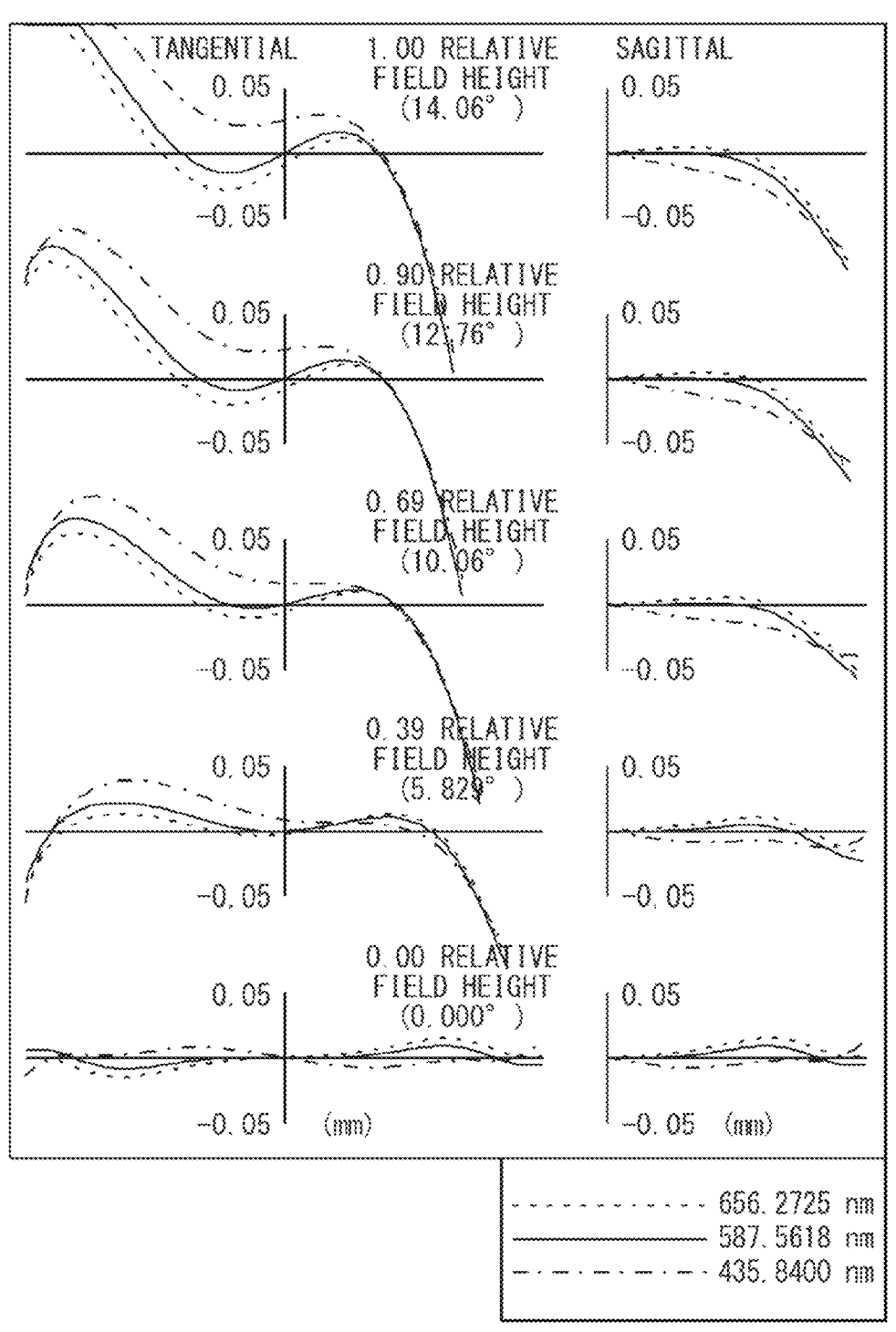
FIG. 26 is an aberration diagram illustrating lateral aberration upon short-distance focusing at the telephoto end of the zoom lens according to Example 2.

FIG. 15 illustrates longitudinal aberration upon infinity focusing at a wide-angle end of the zoom lens 2 according to Example 2. FIG. 16 illustrates longitudinal aberration upon infinity focusing at an intermediate position of the zoom lens 2 according to Example 2. FIG. 17 illustrates longitudinal aberration upon infinity focusing at a telephoto end of the zoom lens 2 according to Example 2. FIG. 18 illustrates longitudinal aberration upon short-distance focusing at the wide-angle end of the zoom lens 2 according to Example 2. FIG. 19 illustrates longitudinal aberration upon short-distance focusing at the intermediate position of the zoom lens 2 according to Example 2. FIG. 20 illustrates longitudinal aberration upon short-distance focusing at the telephoto end of the zoom lens 2 according to Example 2. FIG. 21 illustrates lateral aberration upon infinity focusing at the wide-angle end of the zoom lens 2 according to Example 2. FIG. 22 illustrates lateral aberration upon infinity focusing at the intermediate position of the zoom lens 2 according to Example 2. FIG. 23 illustrates lateral aberration upon infinity focusing at the telephoto end of the zoom lens 2 according to Example 2. FIG. 24 illustrates lateral aberration upon short-distance focusing at the wide-angle end of the zoom lens 2 according to Example 2. FIG. 25 illustrates lateral aberration upon short-distance focusing at the intermediate position of the zoom lens 2 according to Example 2. FIG. 26 illustrates lateral aberration upon short-distance focusing at the telephoto end of the zoom lens 2 according to Example 2.

As appreciated from each of the aberration diagrams, the zoom lens 2 according to Example 2 undergoes favorable correction of various aberrations, and thus has superior image-forming performance.

Example 3

Table 11 exhibits basic lens data of the zoom lens 3 according to Example 3 illustrated in FIG. 27. Table 12 exhibits values of the focal distance f of the total system, the F-value, the total angle of view 2c, the image height Y, and the total optical length L in the zoom lens 3 according to Example 3. Table 13 exhibits data on a surface interval that is variable upon zooming and focusing in the zoom lens 3 according to Example 3. It is to be noted that Table 12 exhibits values for each of the wide-angle end (Wide), the intermediate position (Mid), and the telephoto end (Tele) in a case where the object distance (d0) is infinity. Table 13 exhibits values for each of the wide-angle end (Wide), the intermediate position (Mid), and the telephoto end (Tele) in the case where the object distance (d0) is infinity and in a case where the object distance (d0) is a short distance. Table 14 exhibits values of coefficients indicating shapes of aspherical surfaces in the zoom lens 3 according to Example 3. Table 15 exhibits a starting surface and a focal distance (unit: mm) of each of lens groups of the zoom lens 3 according to Example 3.

The zoom lens 3 according to Example 3 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 3 according to Example 3 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive lens of a biconvex shape. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a concave surface opposed to the object side. The lens L23 is a positive lens of a biconvex shape. The lens L24 is a negative lens of a biconcave shape. with a concave surface opposed to the object side.

The third lens group G3 includes the lens L31. The lens L31 is a positive meniscus lens including an aspherical surface on both sides, with a convex surface opposed to the object side.

The fourth lens group G4 includes the lenses L41 to L45 in order from the object side toward the image plane side. The lens L41 is a negative meniscus lens with a convex surface opposed to the object side. The lens L42 is a positive lens of a biconvex shape. The lens L41 and the lens L42 constitute a cemented lens in which the lens L41 and the lens L42 are attached to each other. The lens L43 is a positive meniscus lens with a concave surface opposed to the object side. The lens L44 is a negative meniscus lens with a concave surface opposed to the object side. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61 and the lens L62 in order from the object side toward the image plane side. The lens L61 is a positive meniscus lens with a convex surface opposed to the object side. The lens L62 is a negative meniscus lens with a concave surface opposed to the object side.

The above-described configuration allows for achievement of a zoom lens having a high variable magnification ratio while covering a wide-angle region despite a miniaturized optical system.

TABLE 11

| | Example 3 | | | | |
|---|---|---|---|---|---|
| Si | ri | di | ndi | νdi | φi |
| 0 (OBJ) | | (d0) | | | |
| 1 | 106.644 | 1.26 | 1.92286 | 20.9 | 56.00 |
| 2 | 84.093 | 6.26 | 1.59282 | 68.6 | 54.79 |
| 3 | −38481.902 | (d3) | | | 53.87 |
| 4 | 53.441 | 1.30 | 1.77250 | 49.6 | 31.88 |
| 5 | 14.888 | 8.96 | | | 24.23 |
| 6 (ASP) | −78.144 | 1.54 | 1.76802 | 49.2 | 22.91 |
| 7 (ASP) | 115.746 | 0.20 | | | 22.42 |
| 8 | 38.920 | 5.24 | 1.85478 | 24.8 | 21.75 |
| 9 | −173.218 | 2.68 | | | 20.08 |
| 10 | −30.433 | 1.39 | 1.59282 | 68.6 | 18.27 |
| 11 | 571.595 | (d11) | | | 19.40 |
| 12 (STO) | ∞ | 1.50 | | | 18.02 |
| 13 (ASP) | 30.686 | 2.41 | 1.69350 | 53.2 | 19.71 |
| 14 (ASP) | 58.890 | (d14) | | | 19.65 |
| 15 | 20.501 | 0.90 | 1.95375 | 32.3 | 21.42 |
| 16 | 15.719 | 5.87 | 1.49700 | 81.6 | 20.68 |
| 17 | −645.614 | 2.38 | | | 20.59 |
| 18 | −82.826 | 2.97 | 1.60342 | 38.0 | 20.41 |
| 19 | −24.735 | 1.00 | 1.85451 | 25.2 | 20.46 |
| 20 | −64.612 | 0.20 | | | 20.82 |
| 21 (ASP) | 34.133 | 6.20 | 1.49700 | 81.5 | 20.83 |

TABLE 11-continued

| | Example 3 | | | | |
|---|---|---|---|---|---|
| Si | ri | di | ndi | νdi | φi |
| 24 | −29.310 | 1.10 | | | 20.50 |
| 25 (ASP) | −53.211 | 1.00 | 1.76802 | 49.2 | 20.02 |
| 26 (ASP) | 45.672 | (d26) | | | 20.14 |
| 27 | 73.114 | 1.78 | 1.59349 | 67.0 | 23.30 |
| 28 | 175.162 | 5.14 | | | 23.49 |
| 29 | −20.549 | 1.00 | 1.80420 | 46.5 | 23.80 |
| 30 | −29.530 | (d30) | | | 25.31 |
| 31 (IMG) | ∞ | 0.00 | | | 43.62 |

TABLE 12

| | Example 3 (Zoom Ratio: 2.54) | | |
|---|---|---|---|
| | Wide | Mid | Tele |
| f (mm) | 24.72 | 38.44 | 62.74 |
| Fno | 4.42 | 4.01 | 4.46 |
| 2ω (°) | 78.76 | 58.71 | 38.04 |
| Y (mm) | 20.29 | 21.62 | 21.63 |
| L (mm) | 116.05 | 133.37 | 162.63 |

TABLE 13

| | Example 3 • Variable Data | | | | | |
|---|---|---|---|---|---|---|
| | Wide | Mid | Tele | Wide | Mid | Tele |
| d0 | ∞ | ∞ | ∞ | 299 mm | 299 mm | 299 mm |
| d3 | 1.49 | 17.28 | 35.13 | 1.49 | 17.28 | 35.13 |
| d11 | 11.38 | 5.61 | 1.92 | 11.38 | 5.61 | 1.92 |
| d14 | 8.45 | 5.37 | 3.28 | 8.45 | 5.37 | 3.28 |
| d22 | 2.88 | 3.00 | 2.68 | 3.47 | 4.42 | 5.15 |
| d26 | 7.08 | 9.00 | 8.90 | 7.48 | 8.44 | 7.89 |
| d30 | 20.67 | 29.03 | 46.62 | 20.67 | 29.03 | 46.62 |

TABLE 14

| | Example 3•Aspherical Data | | | | | |
|---|---|---|---|---|---|---|
| Si | k | A4 | A6 | A8 | A10 | A12 |
| 6 | 0.00000E+00 | −2.02235E−06 | −1.26698E−07 | 3.27566E−10 | −6.57437E−13 | 3.59543E−15 |
| 7 | 0.00000E+00 | −1.03112E−05 | −1.74132E−07 | 9.54366E−10 | −6.45069E−12 | 2.82181E−14 |
| 13 | 0.00000E+00 | 4.18805E−06 | 5.78188E−08 | −4.30261E−10 | 3.52438E−12 | 0.00000E+00 |
| 14 | 0.00000E+00 | 1.45249E−05 | 1.01004E−07 | −7.06082E−10 | 4.89981E−12 | 0.00000E+00 |
| 21 | 0.00000E+00 | −2.15711E−05 | 3.37960E−08 | 1.30507E−10 | −2.86132E−12 | 1.50502E−14 |
| 22 | 0.00000E+00 | 3.13199E−05 | 3.43701E−08 | −1.37924E−10 | −1.52635E−12 | 1.19240E−14 |
| 25 | 0.00000E+00 | 1.42170E−05 | −4.48626E−08 | −4.31178E−10 | 0.00000E+00 | 0.00000E+00 |
| 26 | 0.00000E+00 | 1.32660E−05 | −3.94819E−08 | −2.41699E−10 | 0.00000E+00 | 0.00000E+00 |

TABLE 11-continued

| | Example 3 | | | | |
|---|---|---|---|---|---|
| Si | ri | di | ndi | νdi | φi |
| 22 (ASP) | −22.071 | (d22) | | | 20.40 |
| 23 | −37.014 | 1.80 | 1.94595 | 18.0 | 20.18 |

TABLE 15

| | Example 3 | |
|---|---|---|
| Lens Group | Starting Surface | Focal Distance |
| G1 | 1 | 209.81 |
| G2 | 4 | −19.00 |

TABLE 15-continued

| Example 3 | | |
| --- | --- | --- |
| Lens Group | Starting Surface | Focal Distance |
| G3 | 13 | 89.26 |
| G4 | 15 | 23.01 |
| G5 | 23 | −41.12 |
| G6 | 27 | −160.16 |

Figure 28:
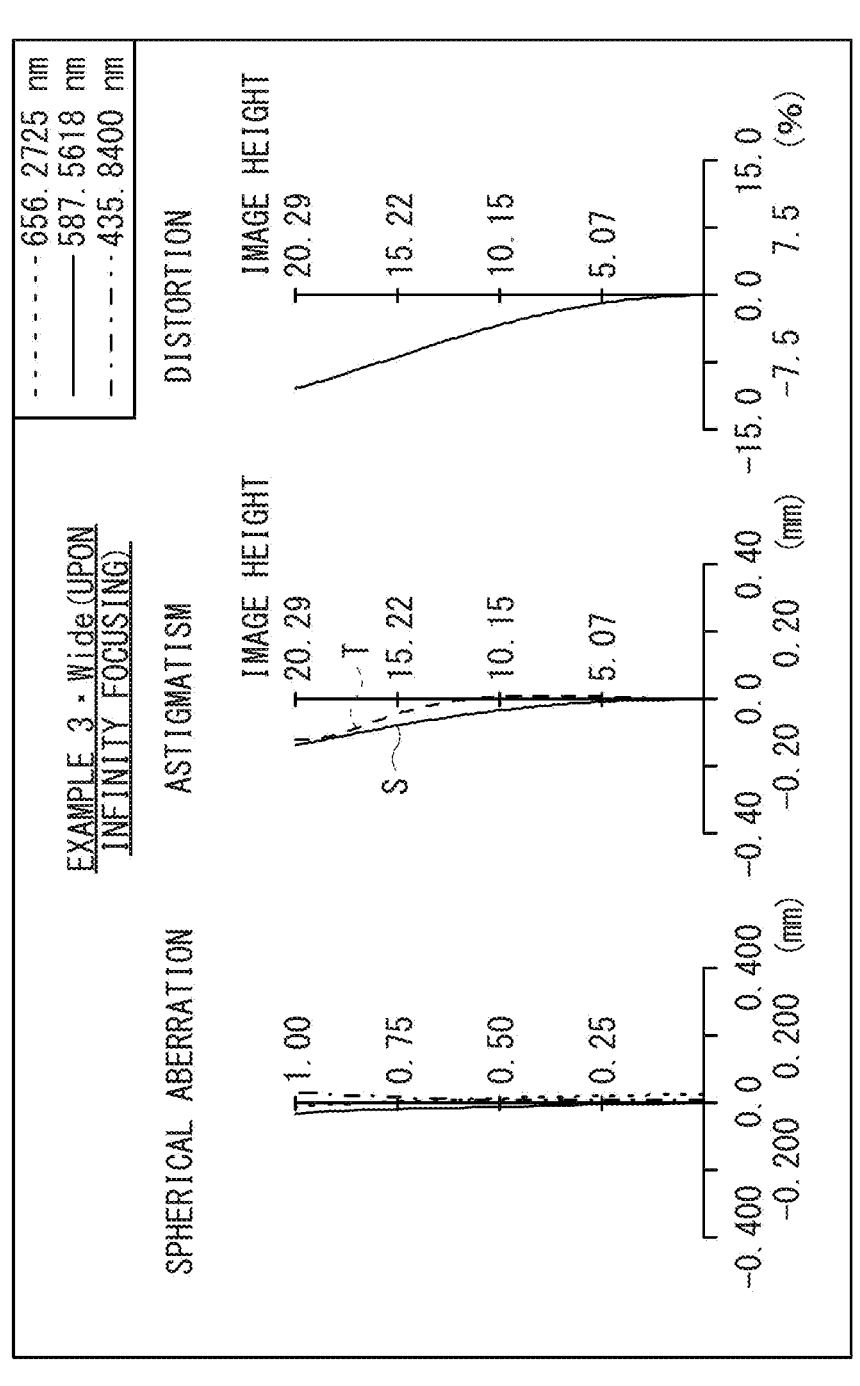
FIG. 28 is an aberration diagram illustrating longitudinal aberration upon infinity focusing at a wide-angle end of the zoom lens according to Example 3.
Figure 29:
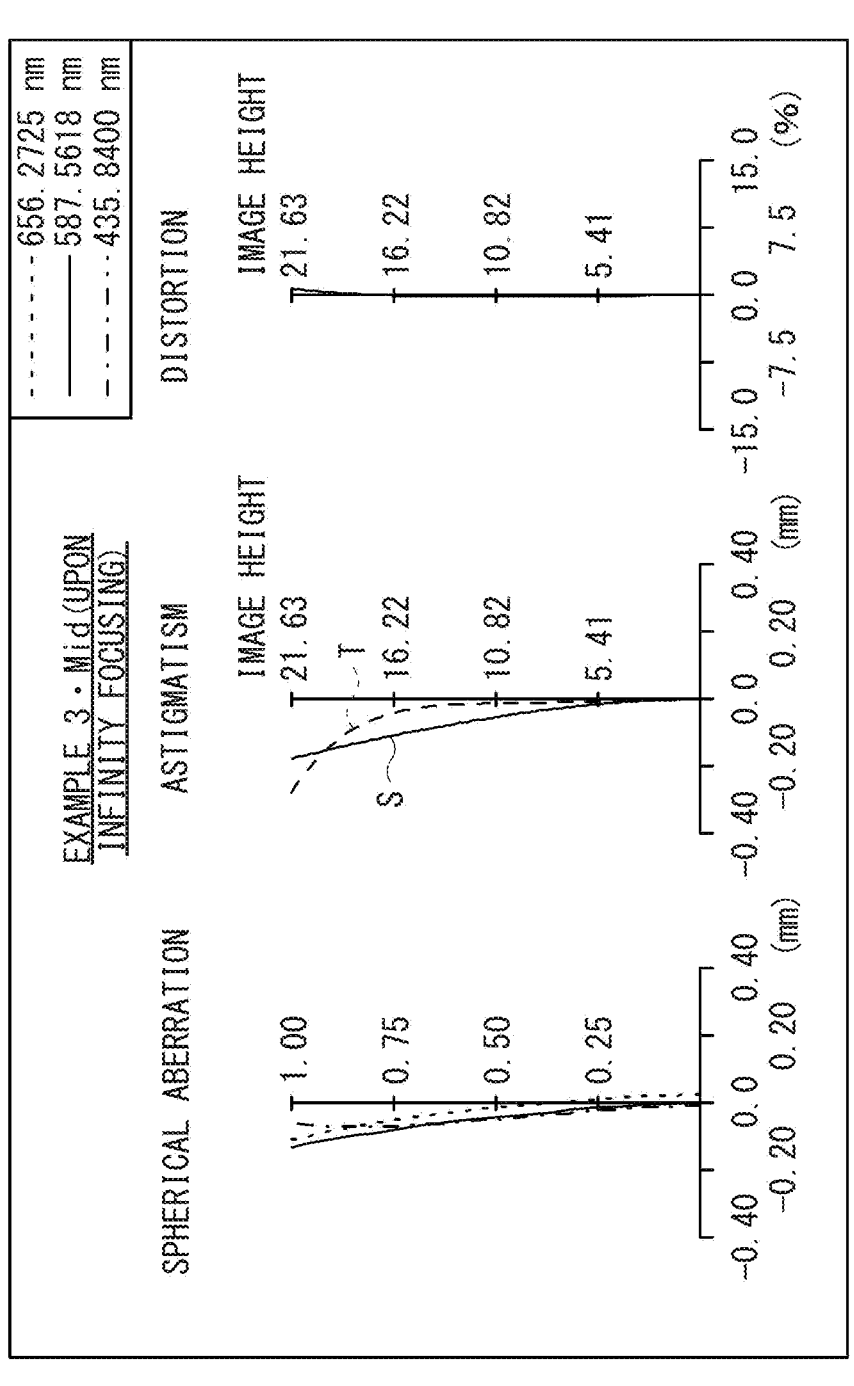
FIG. 29 is an aberration diagram illustrating longitudinal aberration upon infinity focusing at an intermediate position of the zoom lens according to Example 3.
Figure 30:
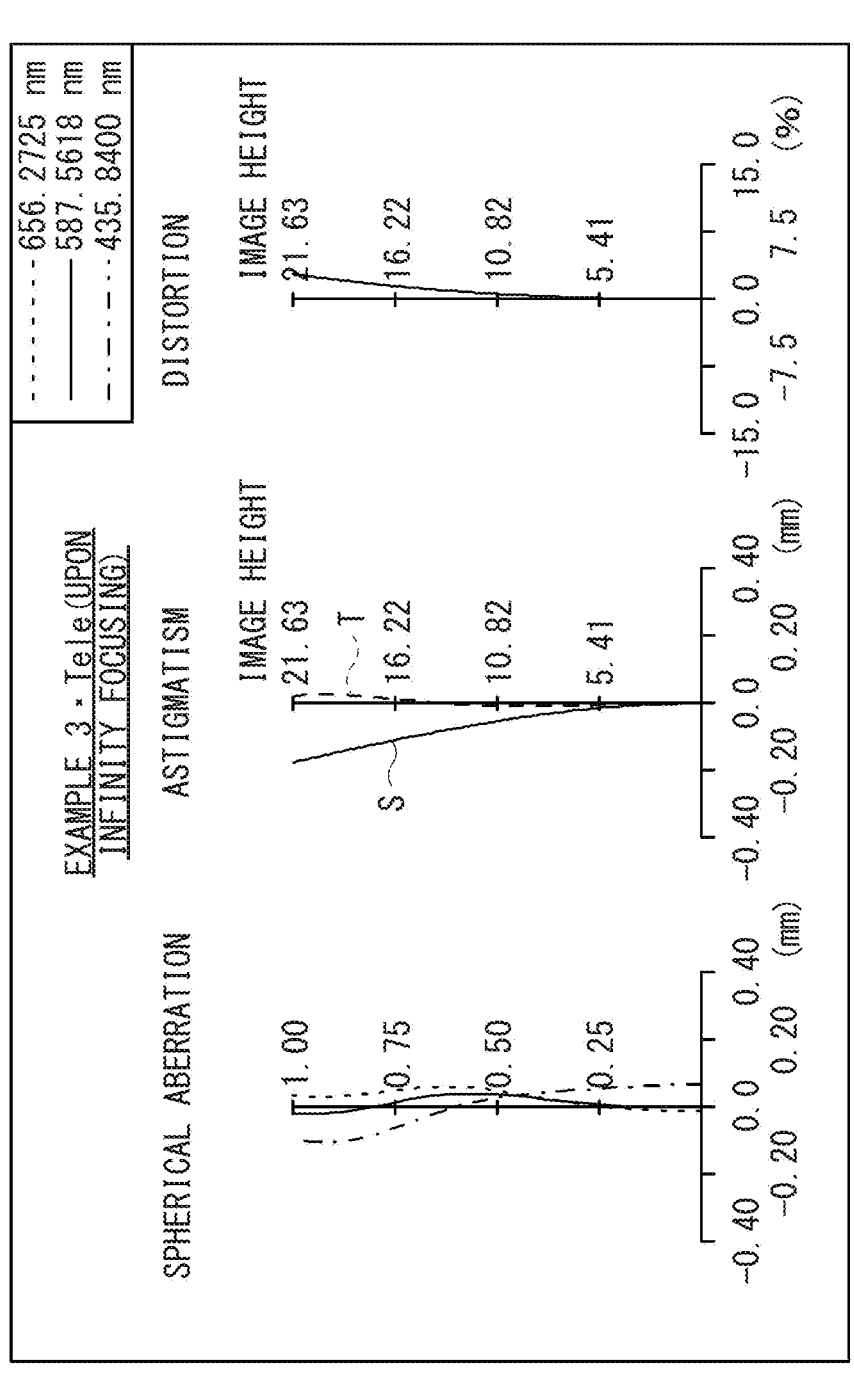
FIG. 30 is an aberration diagram illustrating longitudinal aberration upon infinity focusing at a telephoto end of the zoom lens according to Example 3.
Figure 31:
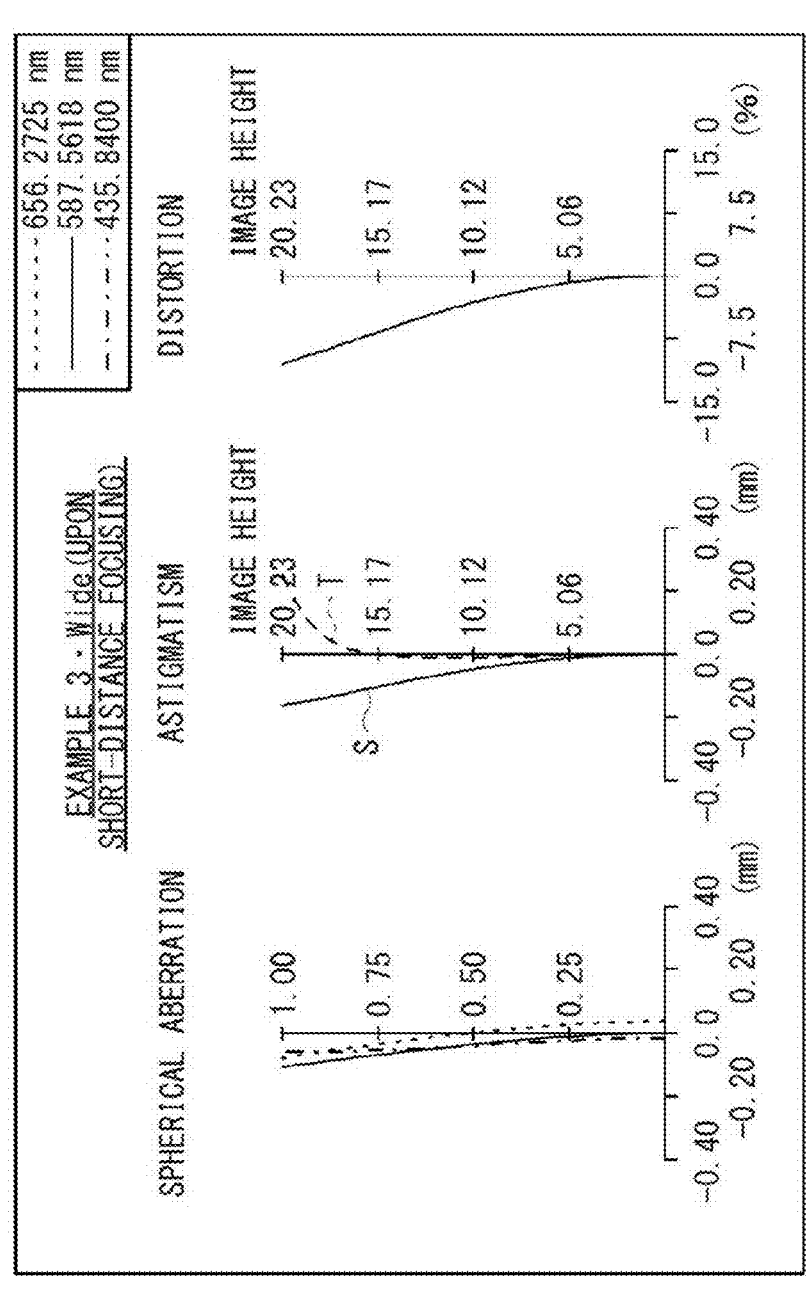
FIG. 31 is an aberration diagram illustrating longitudinal aberration upon short-distance focusing at the wide-angle end of the zoom lens according to Example 3.
Figure 32:
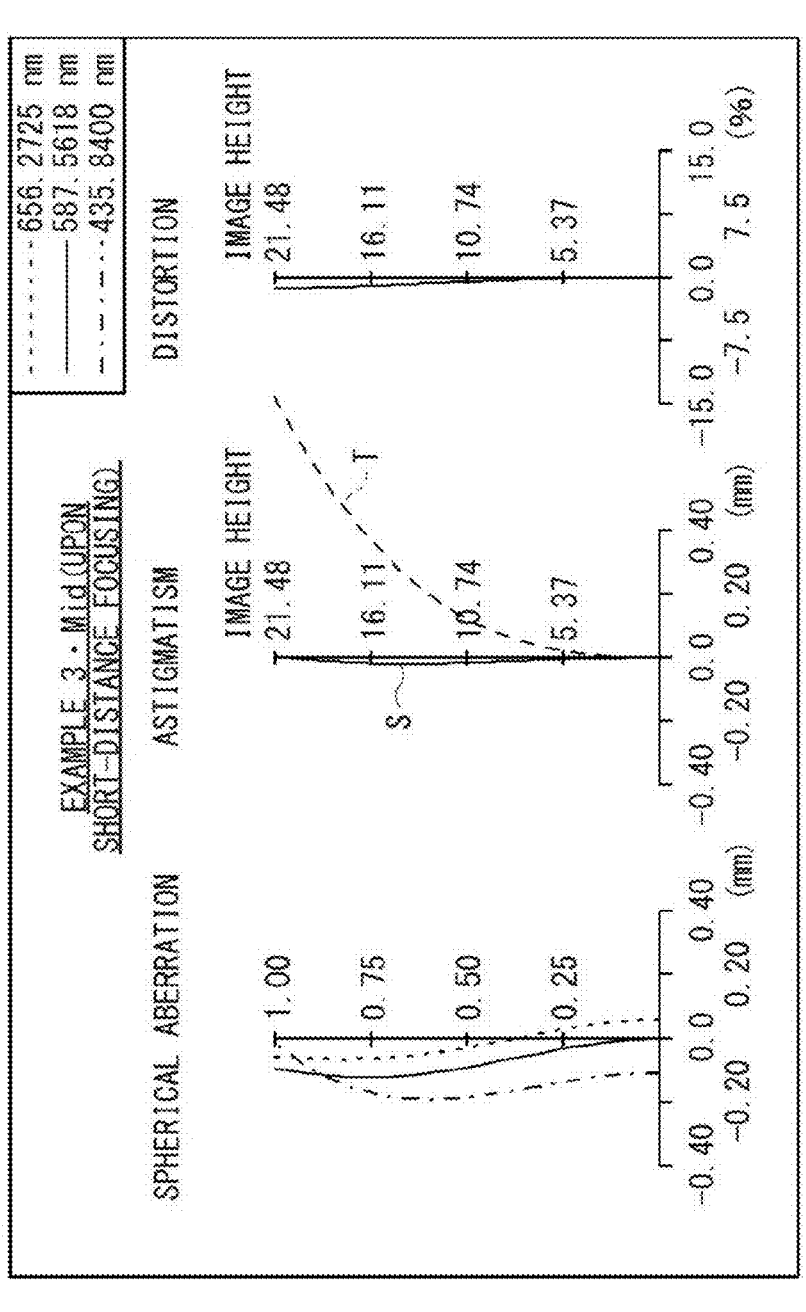
FIG. 32 is an aberration diagram illustrating longitudinal aberration upon short-distance focusing at the intermediate position of the zoom lens according to Example 3.
Figure 33:
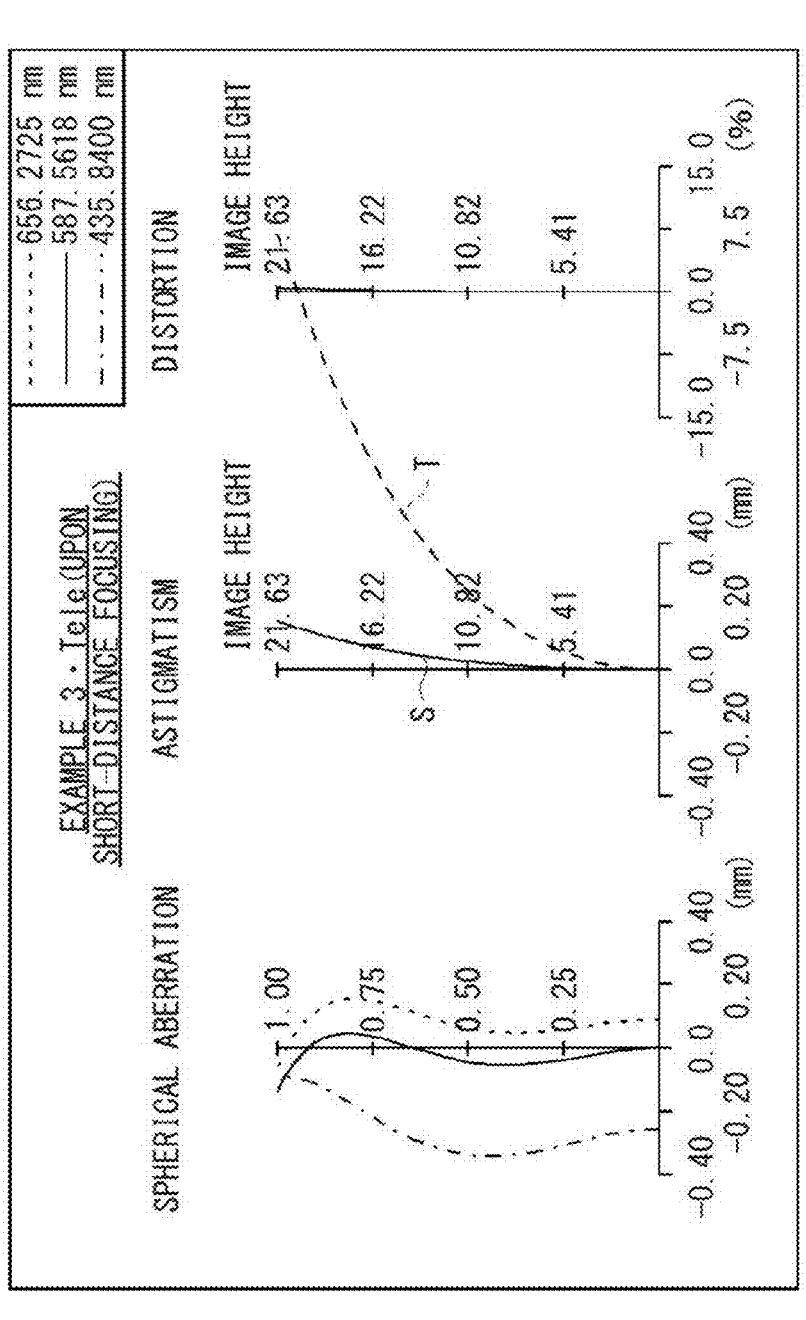
FIG. 33 is an aberration diagram illustrating longitudinal aberration upon short-distance focusing at the telephoto end of the zoom lens according to Example 3.
Figure 34:
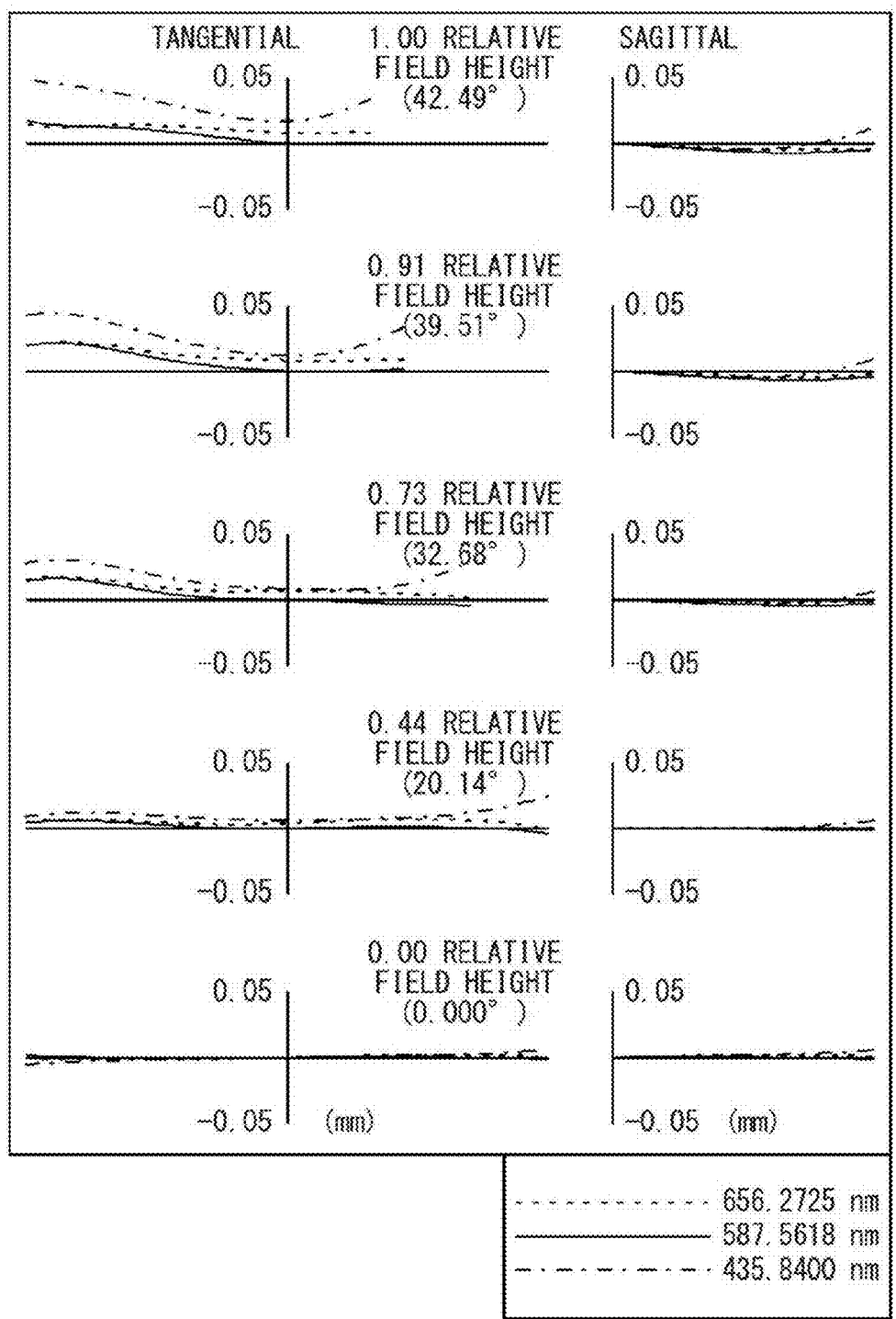
FIG. 34 is an aberration diagram illustrating lateral aberration upon infinity focusing at the wide-angle end of the zoom lens according to Example 3.
Figure 35:
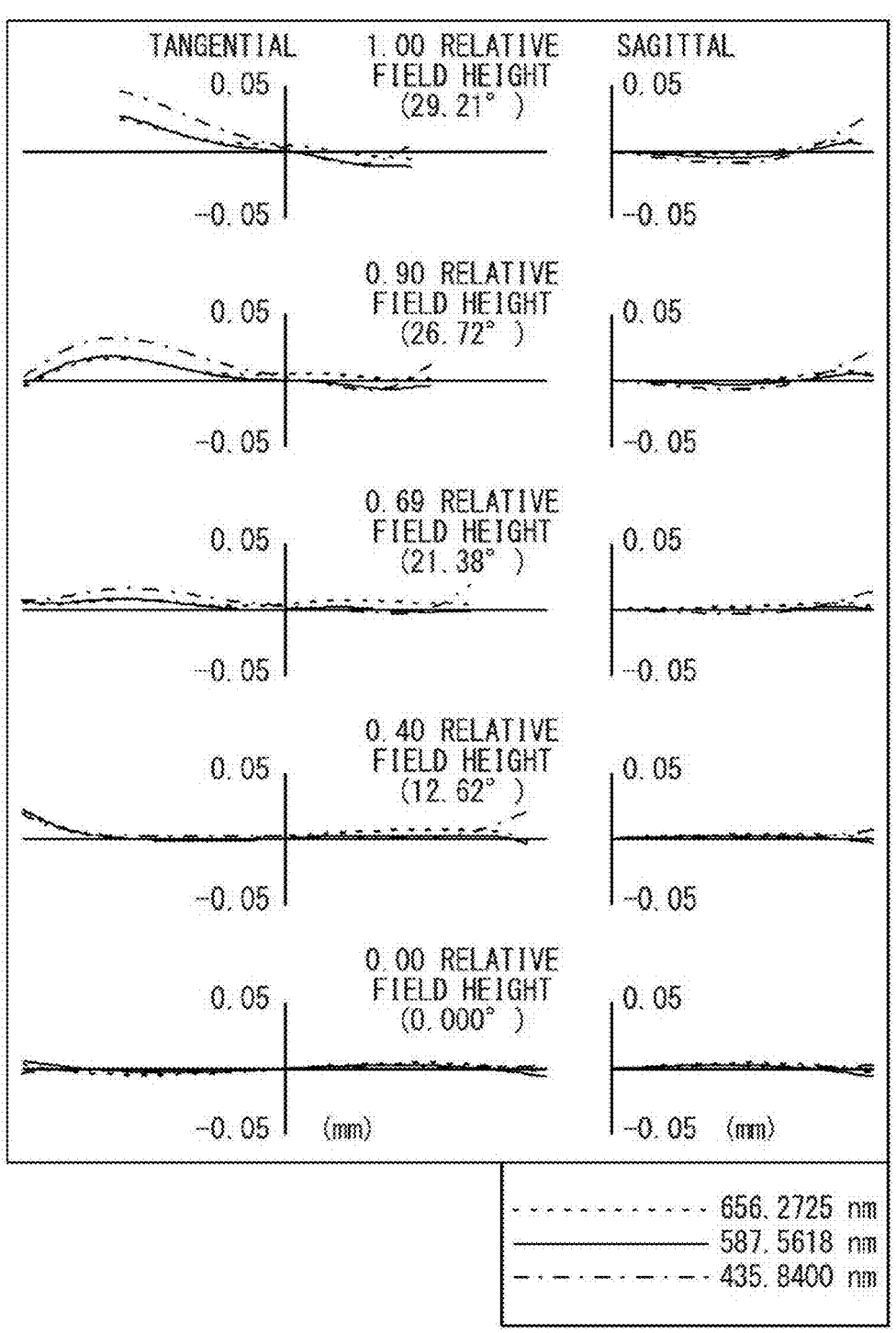
FIG. 35 is an aberration diagram illustrating lateral aberration upon infinity focusing at the intermediate position of the zoom lens according to Example 3.
Figure 36:
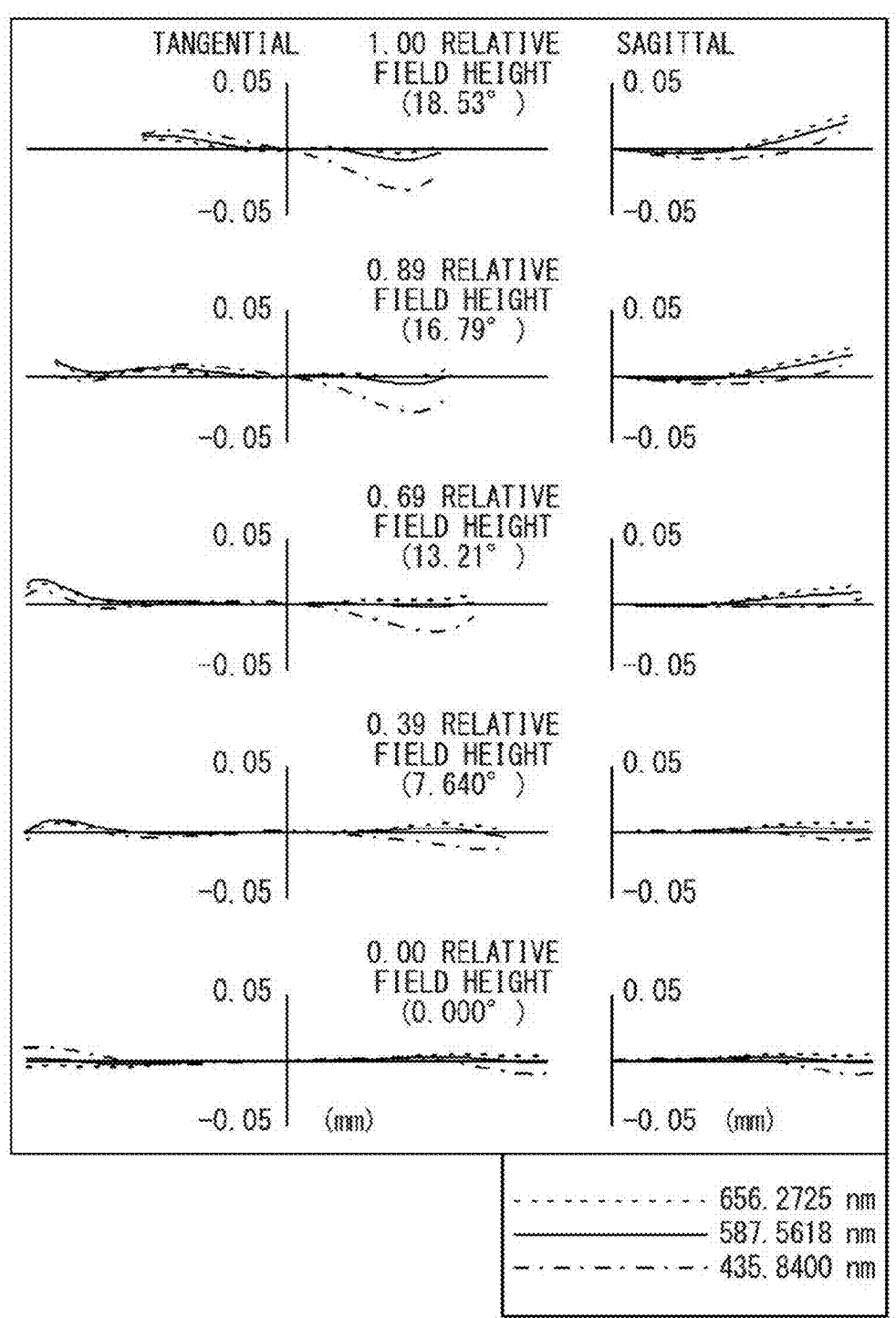
FIG. 36 is an aberration diagram illustrating lateral aberration upon infinity focusing at the telephoto end of the zoom lens according to Example 3.
Figure 37:
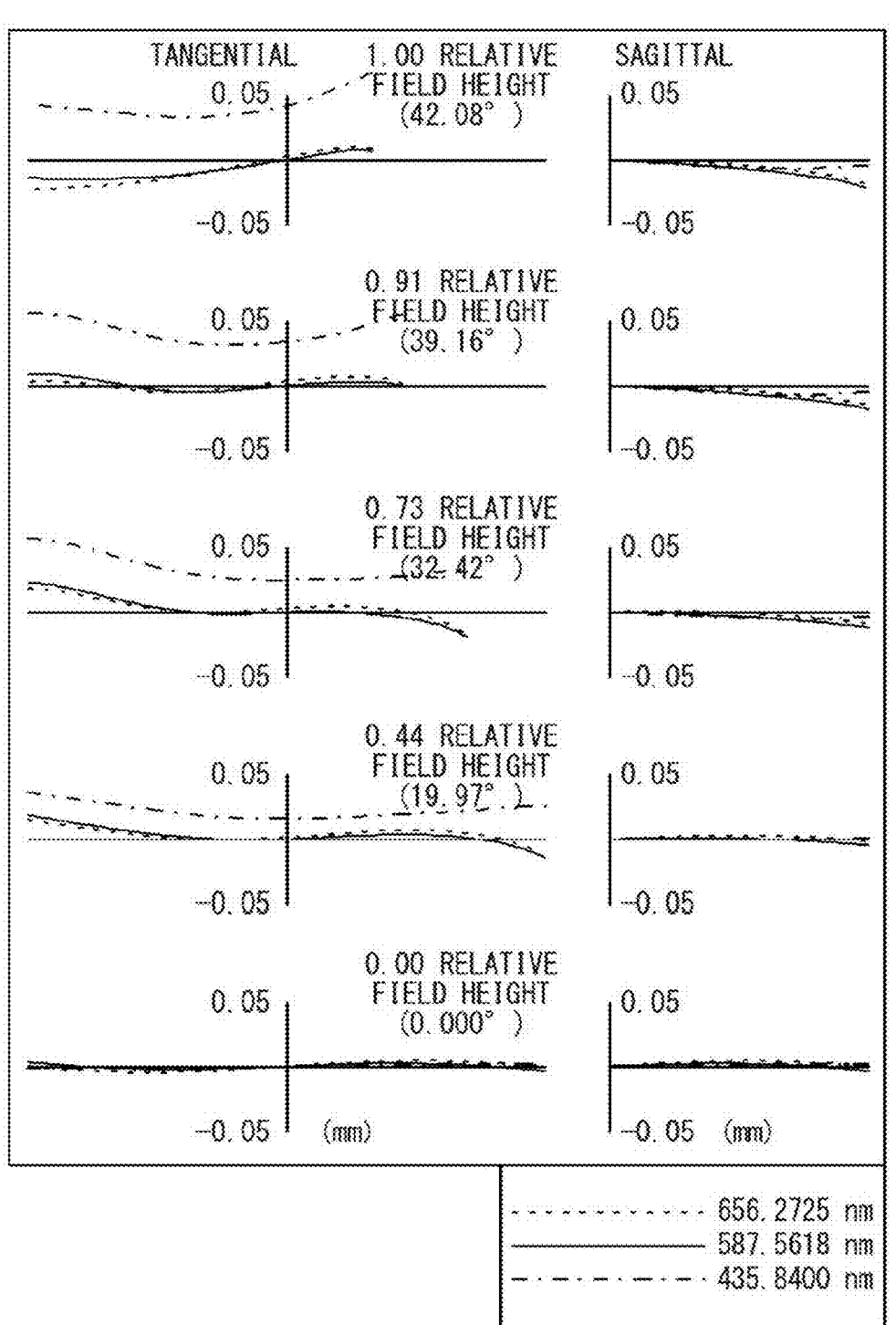
FIG. 37 is an aberration diagram illustrating lateral aberration upon short-distance focusing at the wide-angle end of the zoom lens according to Example 3.
Figure 38:
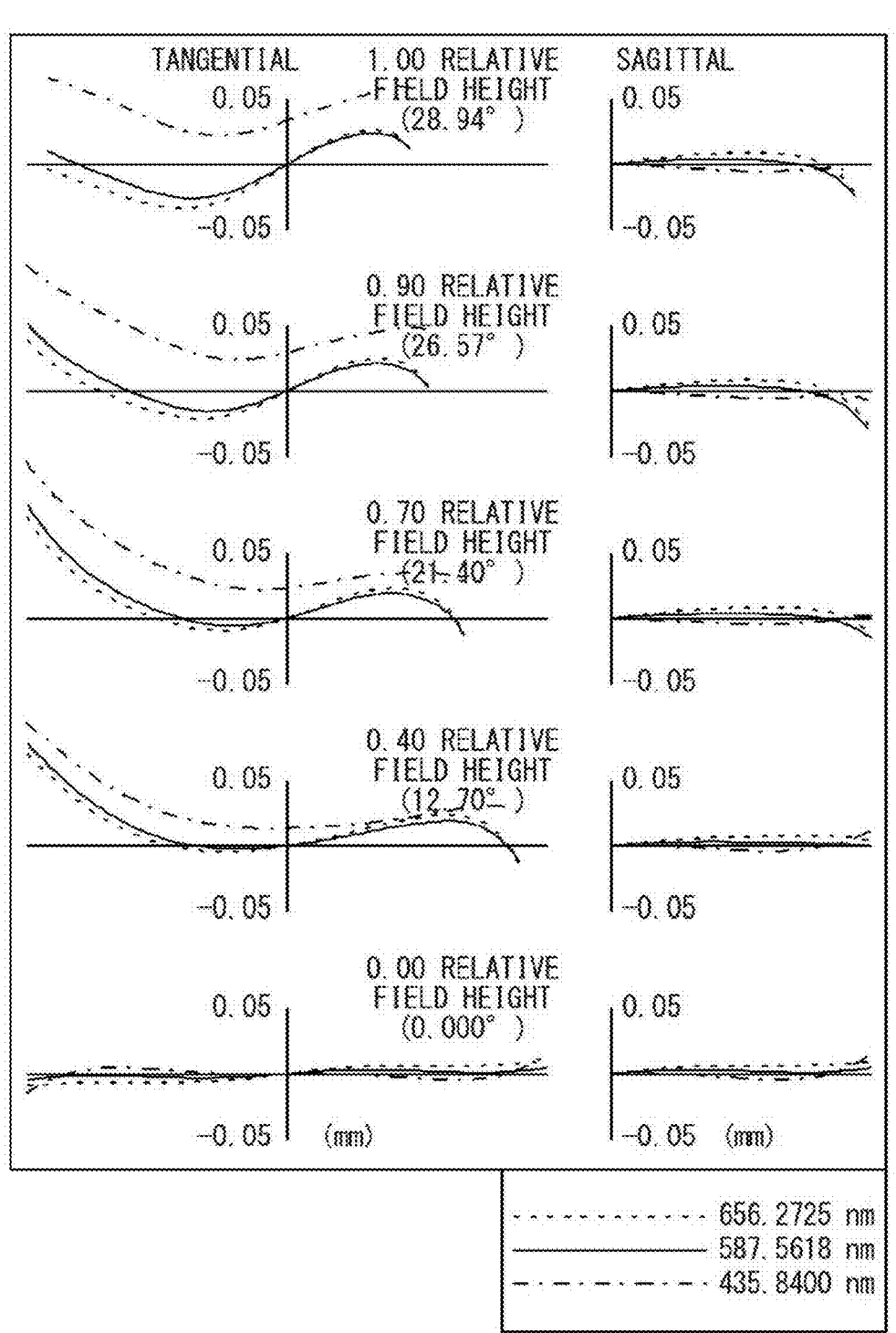
FIG. 38 is an aberration diagram illustrating lateral aberration upon short-distance focusing at the intermediate position of the zoom lens according to Example 3.
Figure 39:
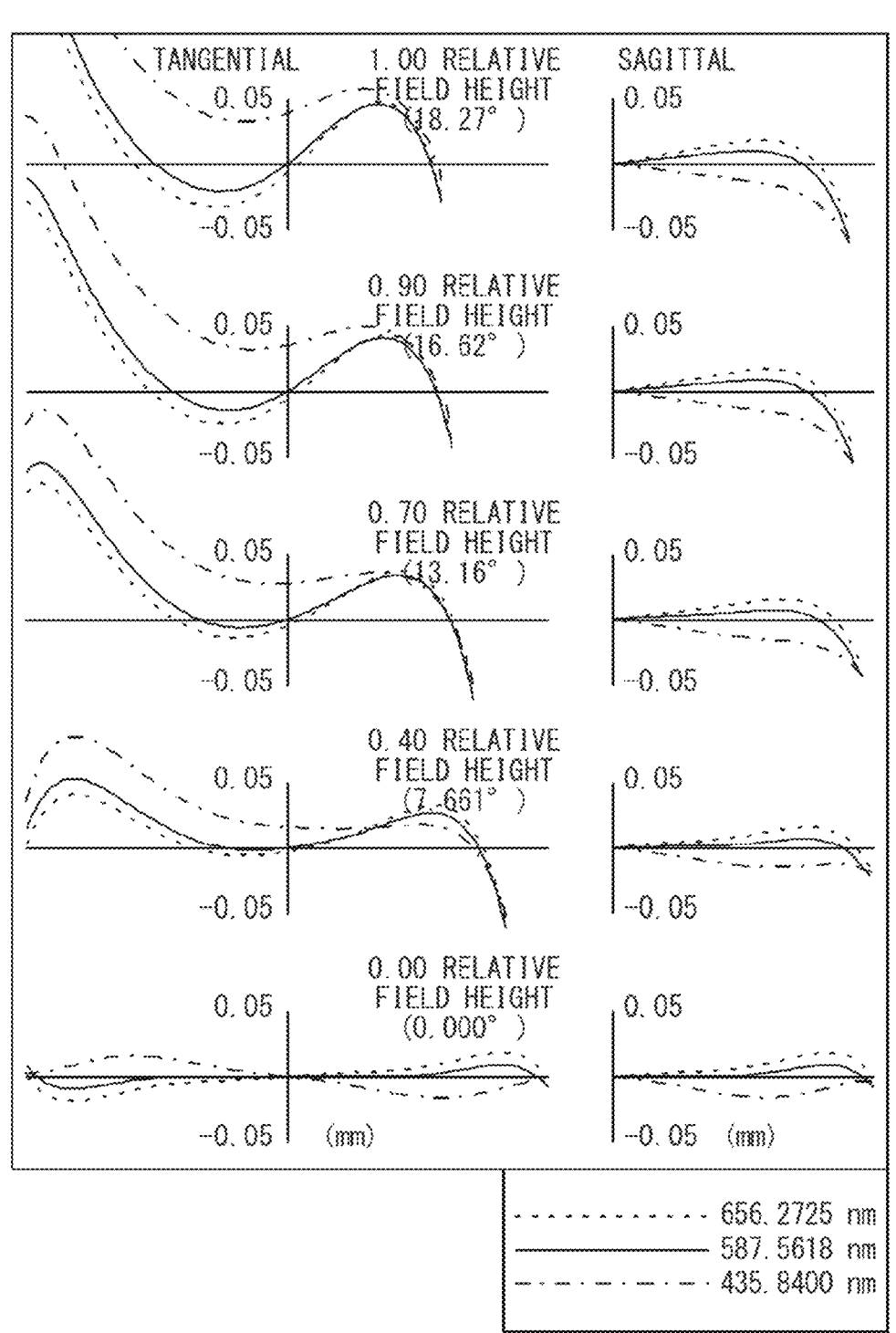
FIG. 39 is an aberration diagram illustrating lateral aberration upon short-distance focusing at the telephoto end of the zoom lens according to Example 3.

FIG. 28 illustrates longitudinal aberration upon infinity focusing at a wide-angle end of the zoom lens 3 according to Example 3. FIG. 29 illustrates longitudinal aberration upon infinity focusing at an intermediate position of the zoom lens 3 according to Example 3. FIG. 30 illustrates longitudinal aberration upon infinity focusing at a telephoto end of the zoom lens 3 according to Example 3. FIG. 31 illustrates longitudinal aberration upon short-distance focusing at the wide-angle end of the zoom lens 3 according to Example 3. FIG. 32 illustrates longitudinal aberration upon short-distance focusing at the intermediate position of the zoom lens 3 according to Example 3. FIG. 33 illustrates longitudinal aberration upon short-distance focusing at the telephoto end of the zoom lens 3 according to Example 3. FIG. 34 illustrates lateral aberration upon infinity focusing at the wide-angle end of the zoom lens 3 according to Example 3. FIG. 35 illustrates lateral aberration upon infinity focusing at the intermediate position of the zoom lens 3 according to Example 3. FIG. 36 illustrates lateral aberration upon infinity focusing at the telephoto end of the zoom lens 3 according to Example 3. FIG. 37 illustrates lateral aberration upon short-distance focusing at the wide-angle end of the zoom lens 3 according to Example 3. FIG. 38 illustrates lateral aberration upon short-distance focusing at the intermediate position of the zoom lens 3 according to Example 3. FIG. 39 illustrates lateral aberration upon short-distance focusing at the telephoto end of the zoom lens 3 according to Example 3.

As appreciated from each of the aberration diagrams, the zoom lens 3 according to Example 3 undergoes favorable correction of various aberrations, and thus has superior image-forming performance.

Example 4

Table 16 exhibits basic lens data of the zoom lens 4 according to Example 4 illustrated in FIG. 40. Table 17 exhibits values of the focal distance f of the total system, the F-value, the total angle of view 2*c*, the image height Y, and the total optical length L in the zoom lens 4 according to Example 4. Table 18 exhibits data on a surface interval that is variable upon zooming and focusing in the zoom lens 4 according to Example 4. It is to be noted that Table 17 exhibits values for each of the wide-angle end (Wide), the intermediate position (Mid), and the telephoto end (Tele) in a case where the object distance (d0) is infinity. Table 18 exhibits values for each of the wide-angle end (Wide), the intermediate position (Mid), and the telephoto end (Tele) in the case where the object distance (d0) is infinity and in a case where the object distance (d0) is a short distance. Table 19 exhibits values of coefficients indicating shapes of aspherical surfaces in the zoom lens 4 according to Example 4. Table 20 exhibits a starting surface and a focal distance (unit: mm) of each of lens groups of the zoom lens 4 according to Example 4.

The zoom lens 4 according to Example 4 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 4 according to Example 4 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a concave surface opposed to the object side. The lens L23 is a positive lens of a biconvex shape. The lens L24 is a negative meniscus lens with a concave surface opposed to the object side.

The third lens group G3 includes the lens L31. The lens L31 is a positive meniscus lens including an aspherical surface on both sides, with a convex surface opposed to the object side.

The fourth lens group G4 includes the lenses L41 to L45 in order from the object side toward the image plane side. The lens L41 is a negative meniscus lens with a convex surface opposed to the object side. The lens L42 is a positive lens of a biconvex shape. The lens L41 and the lens L42 constitute a cemented lens in which the lens L41 and the lens L42 are attached to each other. The lens L43 is a positive meniscus lens with a concave surface opposed to the object side. The lens L44 is a negative meniscus lens with a concave surface opposed to the object side. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61 and the lens L62 in order from the object side toward the image plane side. The lens L61 is a positive meniscus lens with a convex surface opposed to the object side. The lens L62 is a negative meniscus lens with a concave surface opposed to the object side.

The above-described configuration allows for achievement of a zoom lens having a high variable magnification ratio while covering a wide-angle region despite a miniaturized optical system.

TABLE 16

| | | Example 4 | | | |
|---|---|---|---|---|---|
| Si | ri | di | ndi | vdi | φi |
| 0 (OBJ) | | (d0) | | | |
| 1 | 91.216 | 1.00 | 1.94595 | 18.0 | 56.00 |
| 2 | 76.924 | 6.47 | 1.59282 | 68.6 | 54.99 |
| 3 | 1882.947 | (d3) | | | 54.10 |
| 4 | 63.113 | 1.30 | 1.77250 | 49.6 | 35.27 |
| 5 | 14.995 | 9.21 | | | 25.42 |
| 6 (ASP) | −109.042 | 1.00 | 1.76802 | 49.2 | 24.28 |
| 7 (ASP) | 88.388 | 0.20 | | | 23.72 |
| 8 | 42.934 | 4.04 | 1.85478 | 24.8 | 22.85 |
| 9 | −119.099 | 2.21 | | | 21.71 |
| 10 | −28.015 | 1.16 | 1.59282 | 68.6 | 20.58 |
| 11 | −1439.537 | (d11) | | | 19.40 |

TABLE 16-continued

| | | Example 4 | | | |
|---|---|---|---|---|---|
| Si | ri | di | ndi | vdi | φi |
| 12 (STO) | ∞ | 1.50 | | | 18.24 |
| 13 (ASP) | 32.879 | 3.30 | 1.69350 | 53.2 | 19.91 |
| 14 (ASP) | 80.385 | (d14) | | | 19.89 |
| 15 | 20.962 | 0.92 | 1.95375 | 32.3 | 21.74 |
| 16 | 15.551 | 6.20 | 1.49700 | 81.6 | 20.92 |
| 17 | −249.578 | 3.00 | | | 20.84 |
| 18 | −69.280 | 2.72 | 1.60342 | 38.0 | 20.58 |
| 19 | −24.735 | 0.00 | | | 20.64 |
| 20 | −26.323 | 1.00 | 1.85451 | 25.2 | 20.55 |
| 21 | −73.499 | 0.39 | | | 20.86 |
| 22 (ASP) | 32.503 | 6.12 | 1.49700 | 81.5 | 20.85 |
| 23 (ASP) | −23.376 | (d23) | | | 20.40 |
| 24 | −40.028 | 1.80 | 1.94595 | 18.0 | 20.30 |
| 25 | −30.149 | 0.84 | | | 20.61 |
| 26 (ASP) | −43.815 | 1.00 | 1.76802 | 49.2 | 20.27 |
| 27 (ASP) | 52.784 | (d27) | | | 20.53 |
| 28 | 63.808 | 1.66 | 1.59349 | 67.0 | 23.70 |
| 29 | 122.711 | 6.25 | | | 23.87 |
| 30 | −19.510 | 1.00 | 1.80420 | 46.5 | 24.38 |
| 31 | −27.201 | (d31) | | | 26.06 |
| 32 (IMG) | ∞ | 0.00 | | | 43.41 |

TABLE 17

| | Example 4 (Zoom Ratio: 3.09) | | |
|---|---|---|---|
| | Wide | Mid | Tele |
| f (mm) | 21.88 | 45.59 | 67.57 |
| Fno | 4.07 | 4.12 | 4.37 |
| 2ω (°) | 84.98 | 50.67 | 35.49 |
| Y (mm) | 20.04 | 21.59 | 21.63 |
| L (mm) | 116.05 | 132.53 | 166.05 |

TABLE 18

| | Example 4 • Variable Data | | | | | |
|---|---|---|---|---|---|---|
| | Wide | Mid | Tele | Wide | Mid | Tele |
| d0 | ∞ | ∞ | ∞ | 299 mm | 299 mm | 299 mm |
| d3 | 0.80 | 11.17 | 39.13 | 0.80 | 8.27 | 39.13 |
| d11 | 14.97 | 4.10 | 2.01 | 14.97 | 6.11 | 2.01 |
| d14 | 9.82 | 4.86 | 3.82 | 9.82 | 6.18 | 3.82 |
| d23 | 2.78 | 2.62 | 2.47 | 3.71 | 4.36 | 5.62 |
| d27 | 6.54 | 9.68 | 10.19 | 5.61 | 7.94 | 7.04 |
| d31 | 16.86 | 35.82 | 44.14 | 16.86 | 27.91 | 44.14 |

TABLE 19

| | | Example 4•Aspherical Data | | | | |
|---|---|---|---|---|---|---|
| Si | k | A4 | A6 | A8 | A10 | A12 |
| 6 | 0.00000E+00 | 2.30674E−08 | −1.15961E−07 | 3.21262E−10 | −1.65906E−12 | 5.49493E−15 |
| 7 | 0.00000E+00 | −1.02455E−05 | −1.65284E−07 | 8.17057E−10 | −6.46084E−12 | 2.70015E−14 |
| 13 | 0.00000E+00 | 2.02843E−06 | 6.29417E−08 | −4.21795E−10 | 3.55461E−12 | 0.00000E+00 |
| 14 | 0.00000E+00 | 1.06023E−05 | 9.96511E−08 | −6.33616E−10 | 4.95156E−12 | 0.00000E+00 |
| 22 | 0.00000E+00 | −1.77803E−05 | 6.36282E−09 | 1.01819E−10 | −1.94737E−12 | 1.03127E−14 |
| 23 | 0.00000E+00 | 2.92382E−05 | −4.05626E−11 | −7.36148E−11 | −1.25635E−12 | 8.53838E−15 |
| 26 | 0.00000E+00 | 1.45104E−05 | −4.43593E−08 | −2.87872E−10 | 0.00000E+00 | 0.00000E+00 |
| 27 | 0.00000E+00 | 1.29327E−05 | −3.34330E−08 | −2.02809E−10 | 0.00000E+00 | 0.00000E+00 |

TABLE 20

| | Example 4 | |
|---|---|---|
| Lens Group | Starting Surface | Focal Distance |
| G1 | 1 | 181.87 |
| G2 | 4 | −18.71 |
| G3 | 13 | 78.01 |
| G4 | 15 | 23.82 |
| G5 | 24 | −41.32 |
| G6 | 28 | −163.24 |

Figure 41:
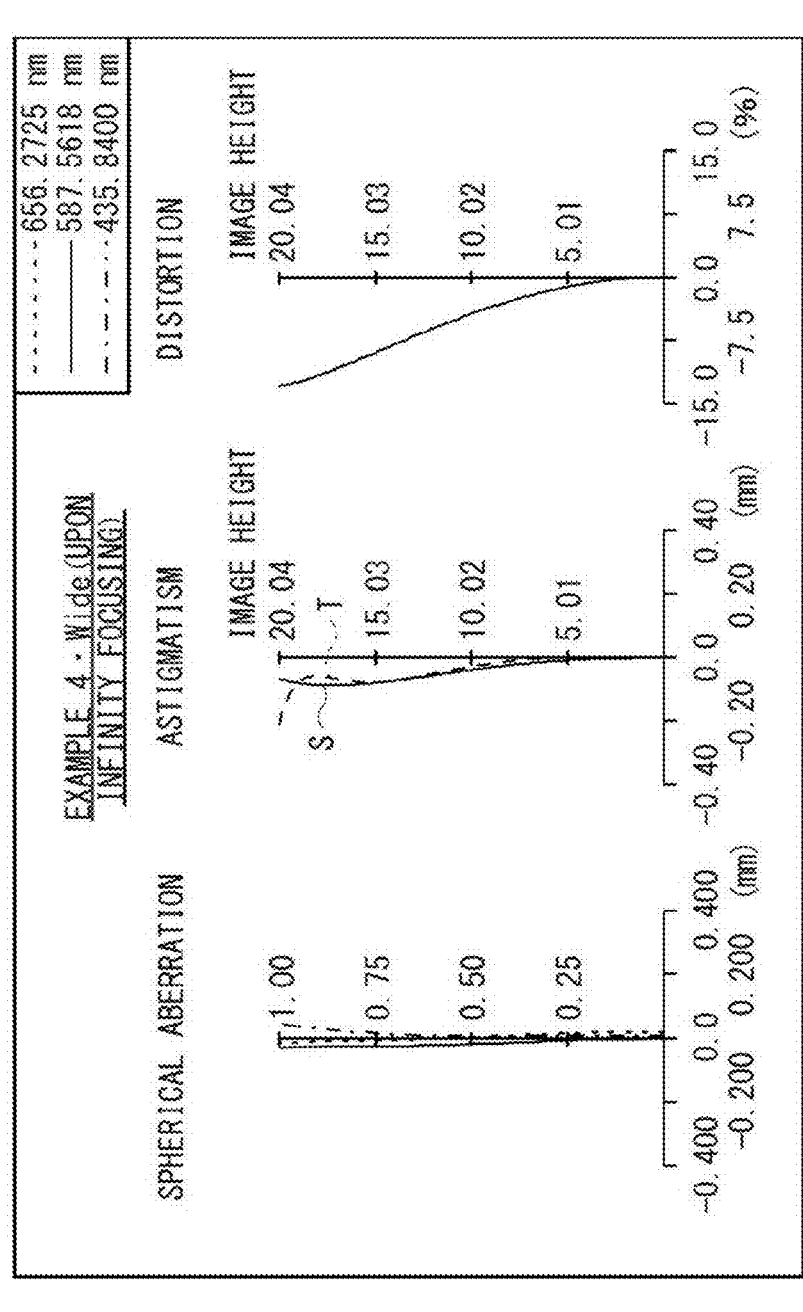
FIG. 41 is an aberration diagram illustrating longitudinal aberration upon infinity focusing at a wide-angle end of the zoom lens according to Example 4.
Figure 42:
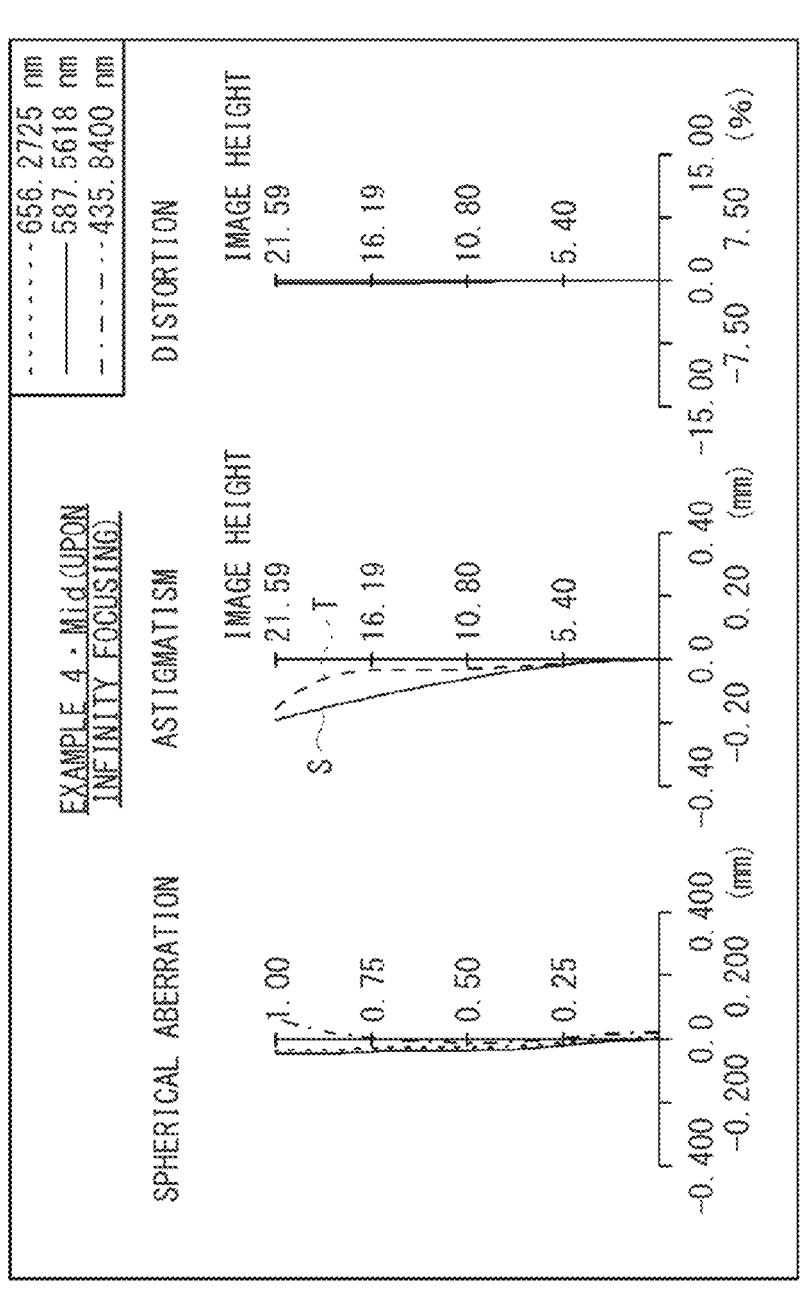
FIG. 42 is an aberration diagram illustrating longitudinal aberration upon infinity focusing at an intermediate position of the zoom lens according to Example 4.
Figure 43:
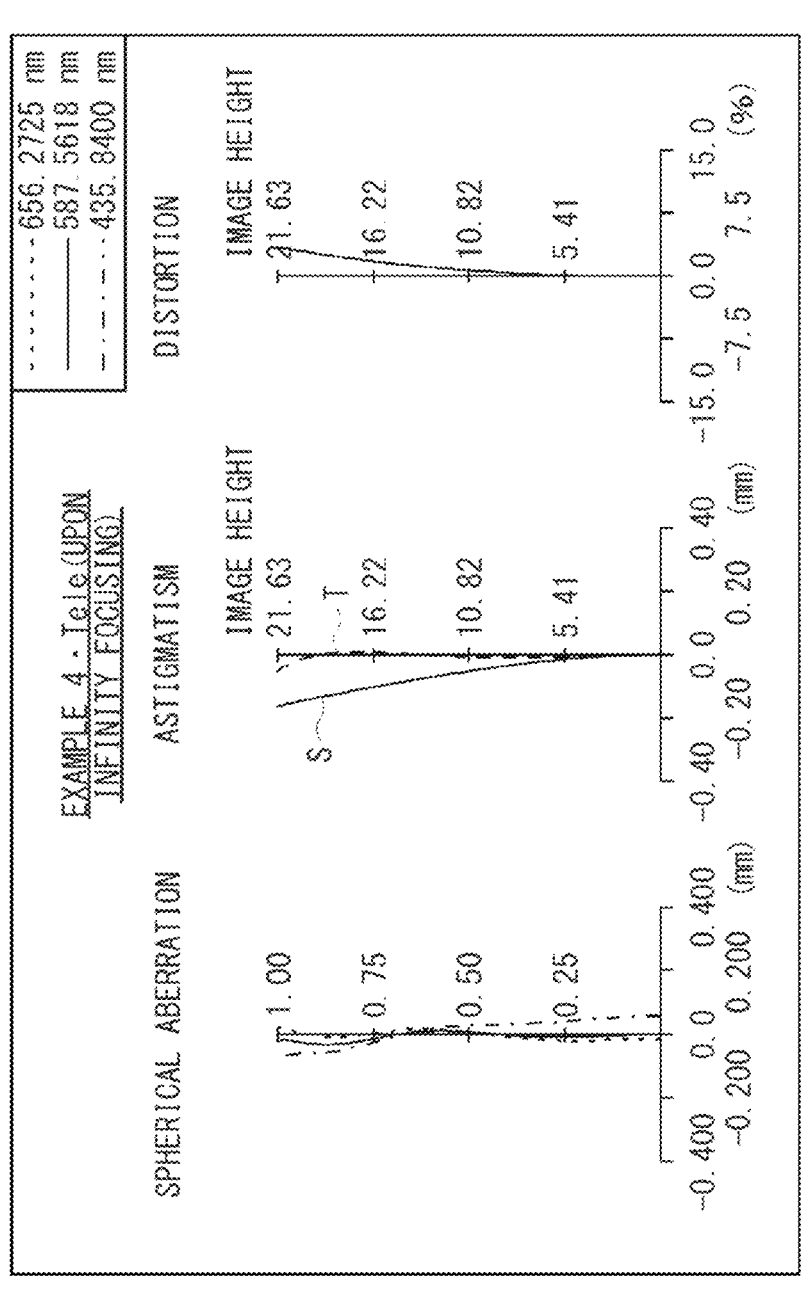
FIG. 43 is an aberration diagram illustrating longitudinal aberration upon infinity focusing at a telephoto end of the zoom lens according to Example 4.
Figure 44:
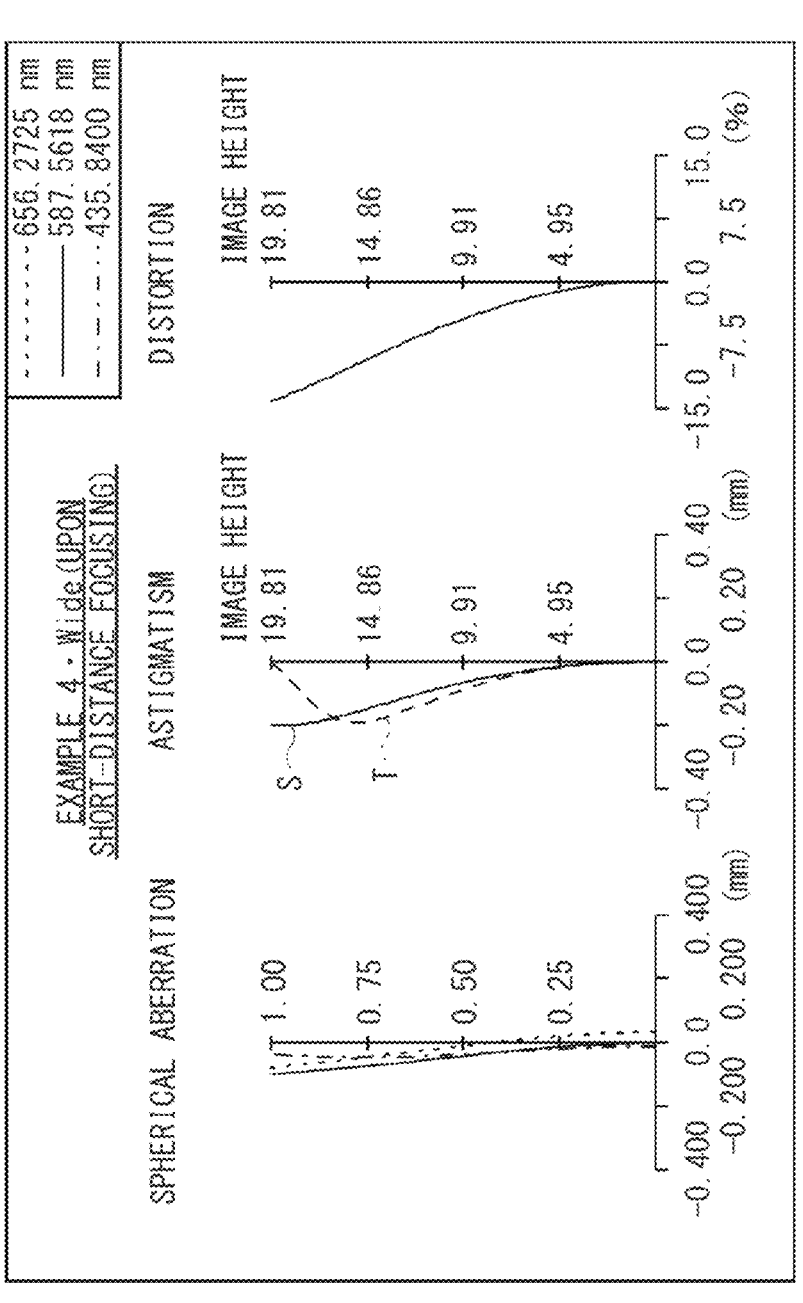
FIG. 44 is an aberration diagram illustrating longitudinal aberration upon short-distance focusing at the wide-angle end of the zoom lens according to Example 4.
Figure 45:
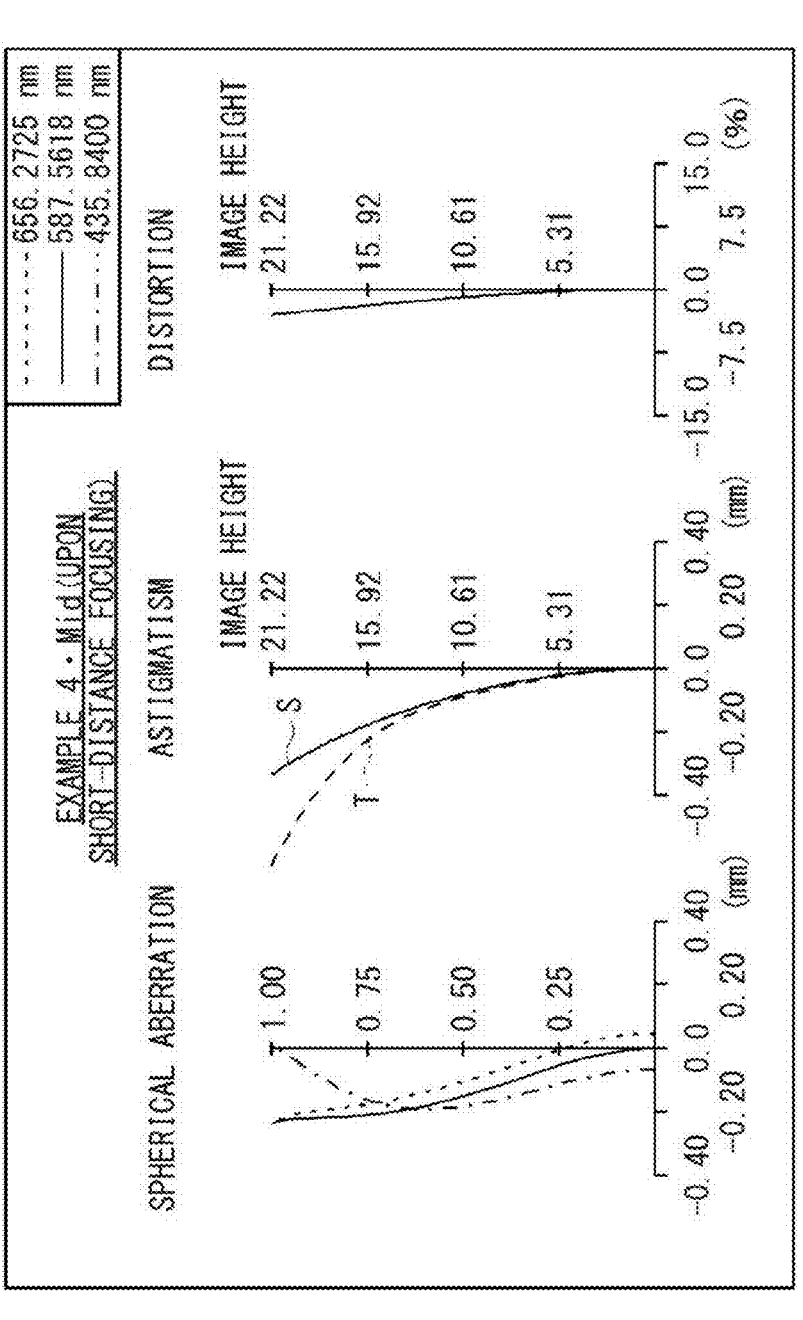
FIG. 45 is an aberration diagram illustrating longitudinal aberration upon short-distance focusing at the intermediate position of the zoom lens according to Example 4.
Figure 46:
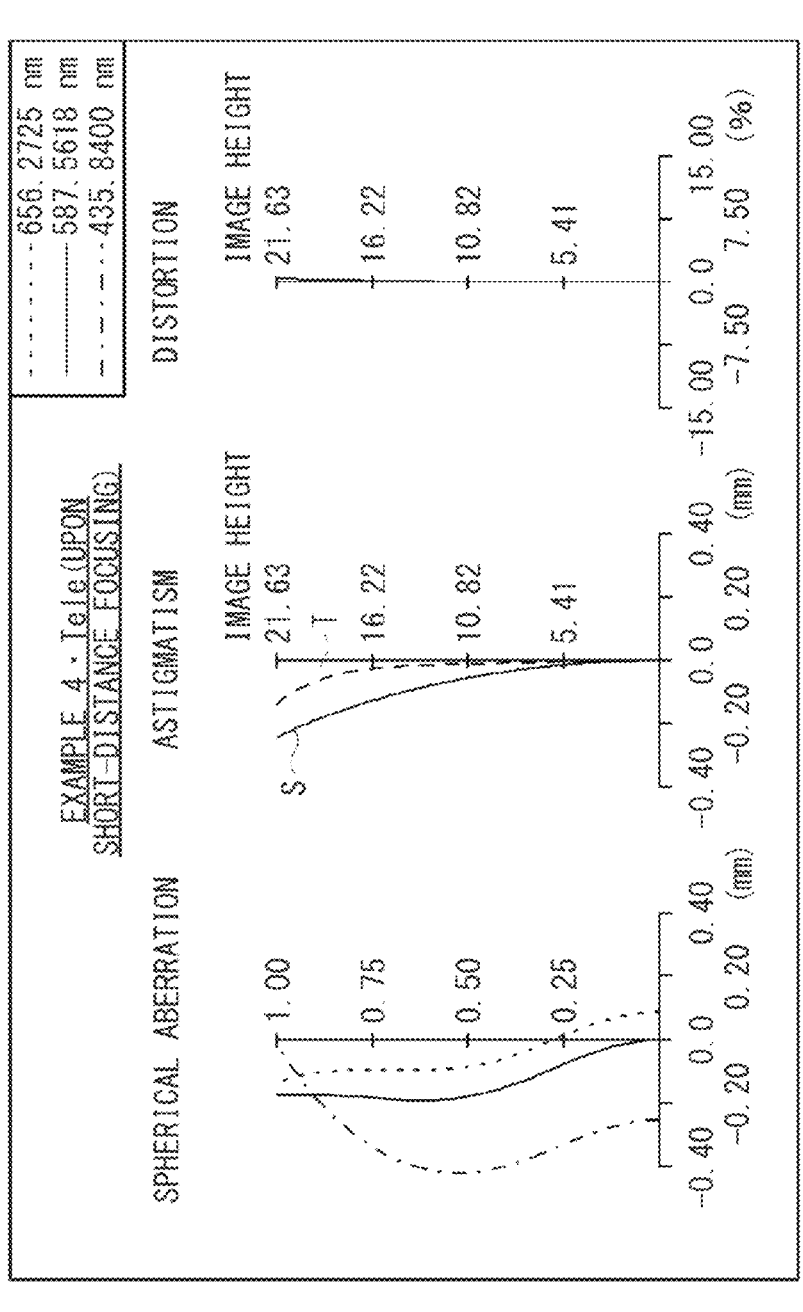
FIG. 46 is an aberration diagram illustrating longitudinal aberration upon short-distance focusing at the telephoto end of the zoom lens according to Example 4.
Figure 47:
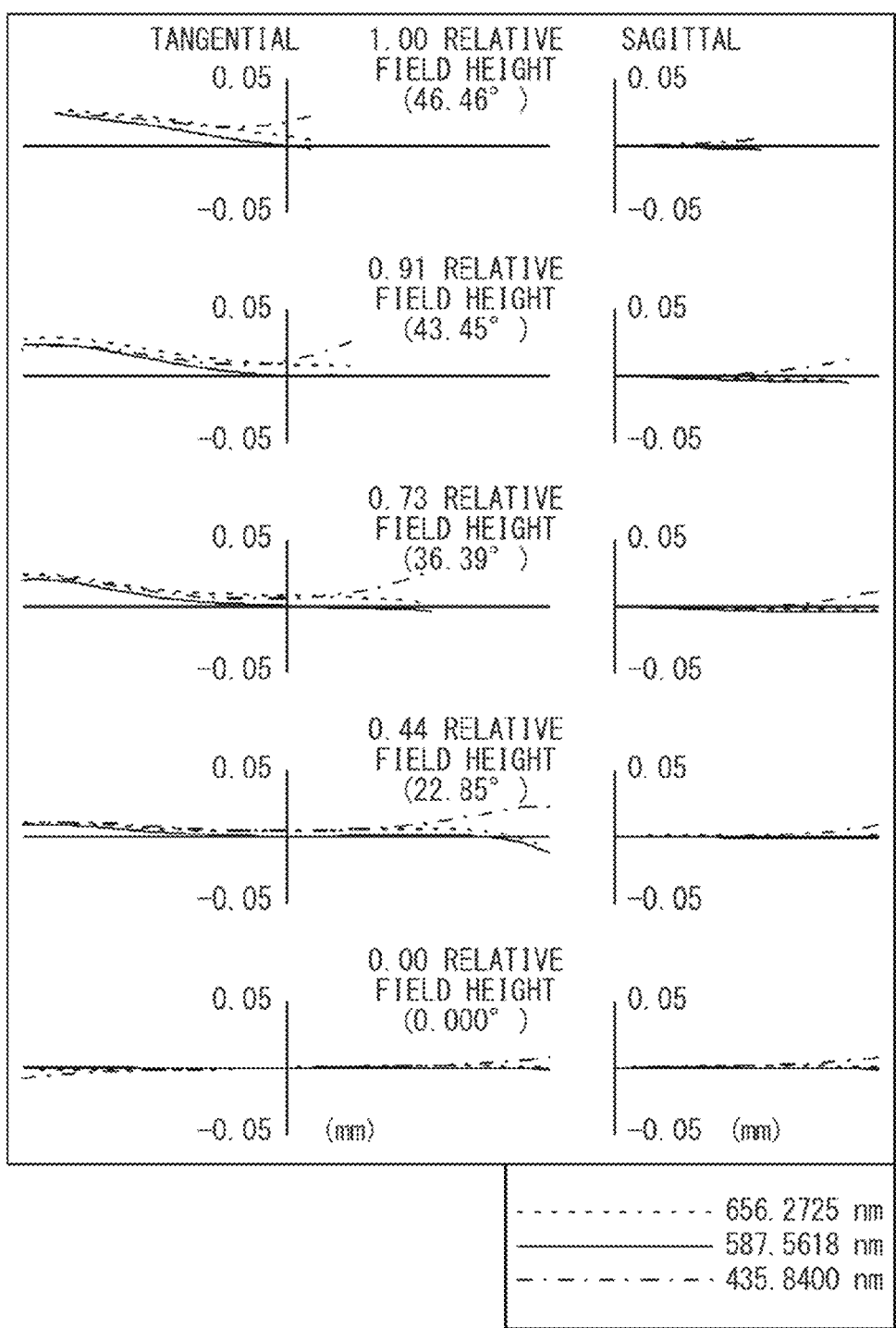
FIG. 47 is an aberration diagram illustrating lateral aberration upon infinity focusing at the wide-angle end of the zoom lens according to Example 4.
Figure 48:
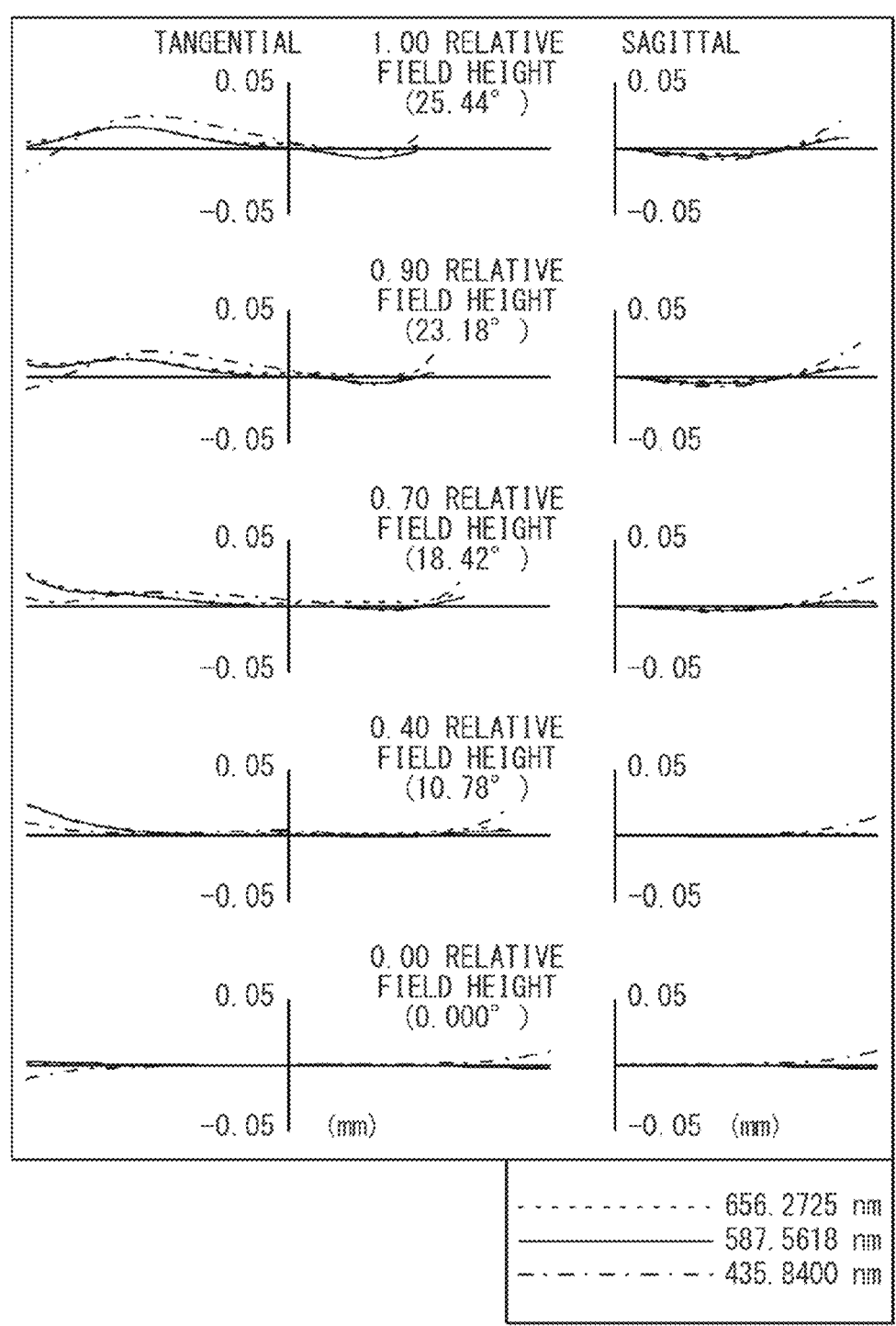
FIG. 48 is an aberration diagram illustrating lateral aberration upon infinity focusing at the intermediate position of the zoom lens according to Example 4.
Figure 49:
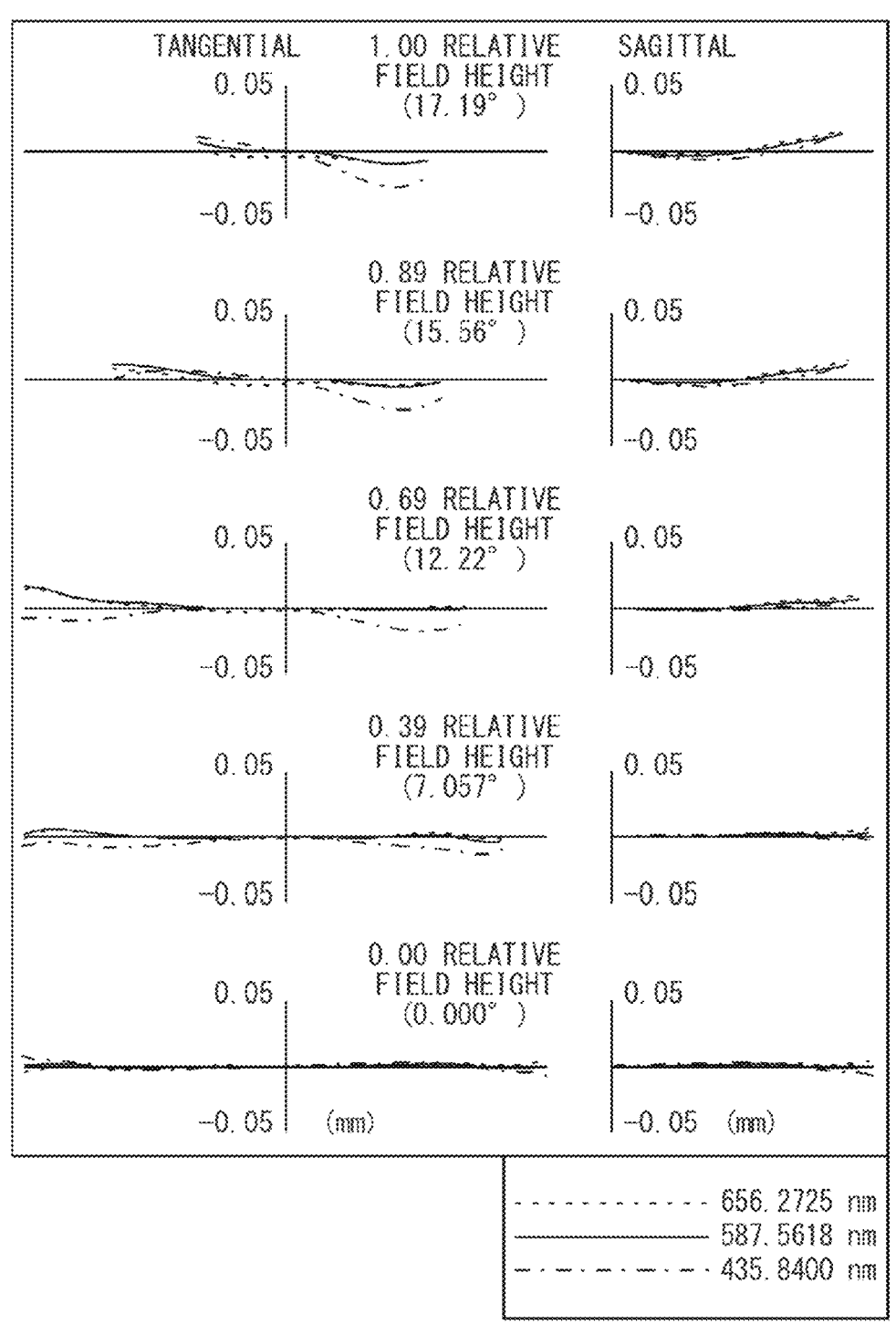
FIG. 49 is an aberration diagram illustrating lateral aberration upon infinity focusing at the telephoto end of the zoom lens according to Example 4.
Figure 50:
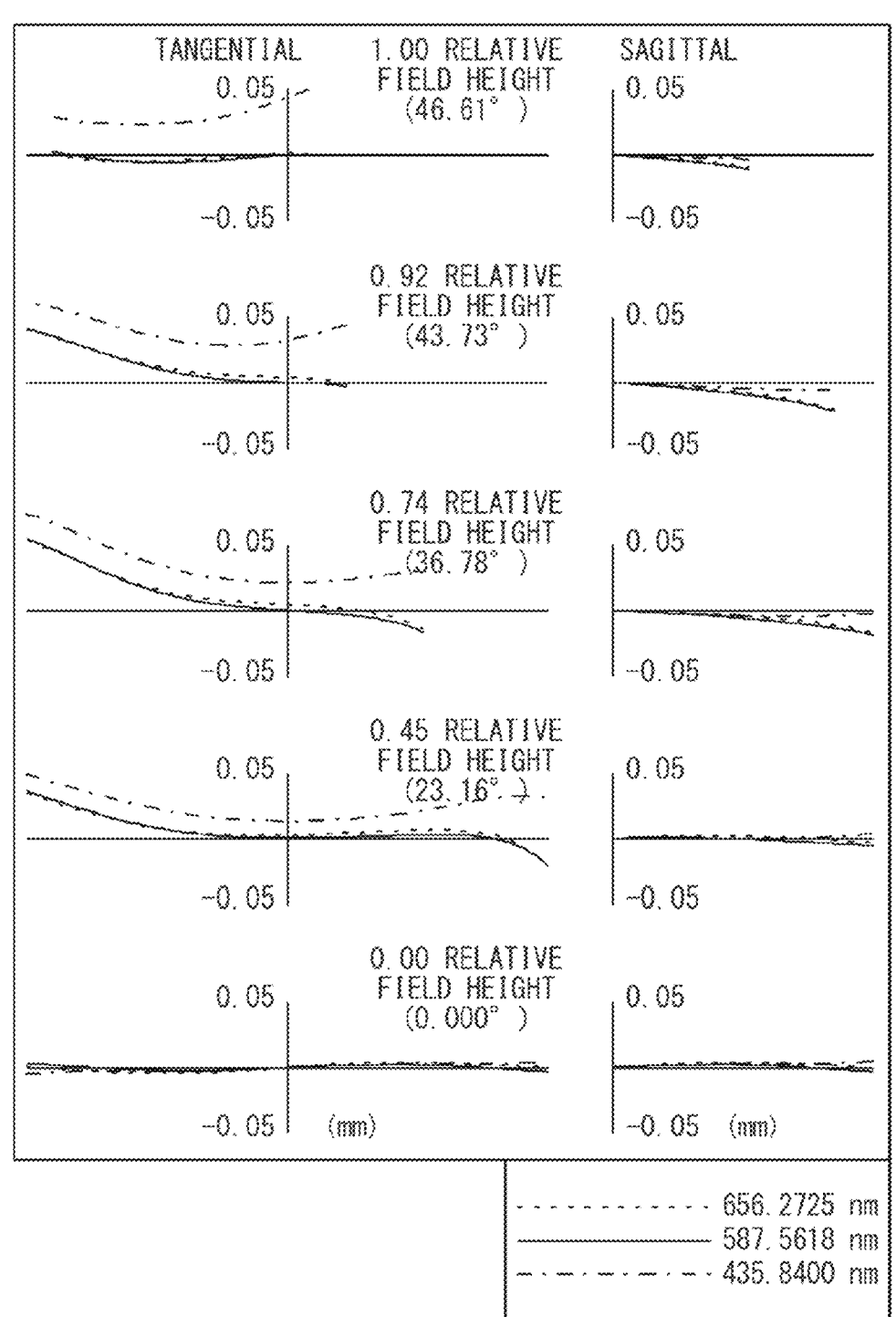
FIG. 50 is an aberration diagram illustrating lateral aberration upon short-distance focusing at the wide-angle end of the zoom lens according to Example 4.
Figure 51:
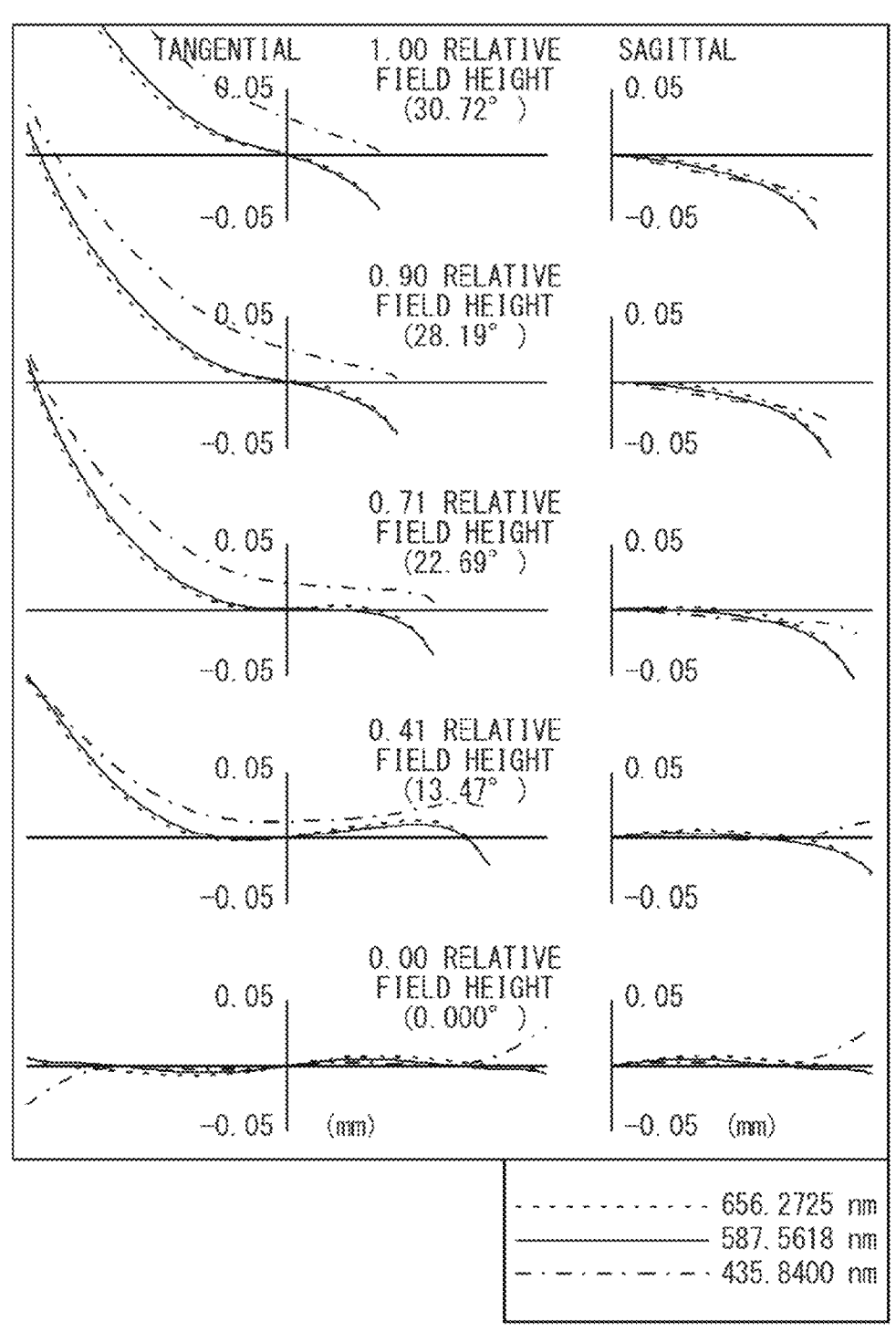
FIG. 51 is an aberration diagram illustrating lateral aberration upon short-distance focusing at the intermediate position of the zoom lens according to Example 4.
Figure 52:
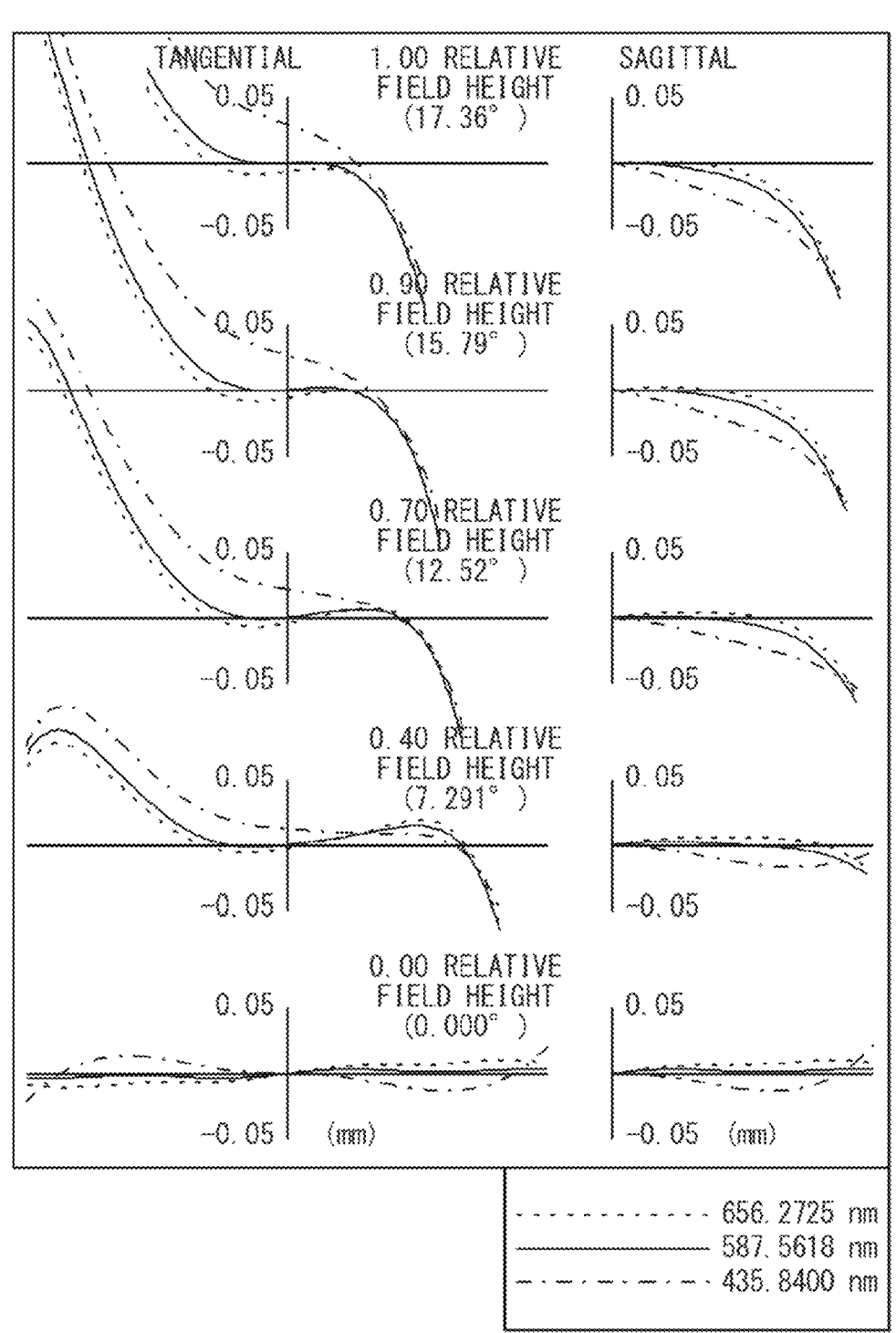
FIG. 52 is an aberration diagram illustrating lateral aberration upon short-distance focusing at the telephoto end of the zoom lens according to Example 4.

FIG. 41 illustrates longitudinal aberration upon infinity focusing at a wide-angle end of the zoom lens 4 according to Example 4. FIG. 42 illustrates longitudinal aberration upon infinity focusing at an intermediate position of the zoom lens 4 according to Example 4. FIG. 43 illustrates longitudinal aberration upon infinity focusing at a telephoto end of the zoom lens 4 according to Example 4. FIG. 44 illustrates longitudinal aberration upon short-distance focusing at the wide-angle end of the zoom lens 4 according to Example 4. FIG. 45 illustrates longitudinal aberration upon short-distance focusing at the intermediate position of the zoom lens 4 according to Example 4. FIG. 46 illustrates longitudinal aberration upon short-distance focusing at the telephoto end of the zoom lens 4 according to Example 4. FIG. 47 illustrates lateral aberration upon infinity focusing at the wide-angle end of the zoom lens 4 according to Example 4. FIG. 48 illustrates lateral aberration upon infinity focusing at the intermediate position of the zoom lens 4 according to Example 4. FIG. 49 illustrates lateral aberration upon infinity focusing at the telephoto end of the zoom lens 4 according to Example 4. FIG. 50 illustrates lateral aberration upon short-distance focusing at the wide-angle end of the zoom lens 4 according to Example 4. FIG. 51 illustrates lateral aberration upon short-distance focusing at the intermediate position of the zoom lens 4 according to Example 4. FIG. 52 illustrates lateral aberration upon short-distance focusing at the telephoto end of the zoom lens 4 according to Example 4.

As appreciated from each of the aberration diagrams, the zoom lens 4 according to Example 4 undergoes favorable correction of various aberrations, and thus has superior image-forming performance.

Example 5

Table 21 exhibits basic lens data of the zoom lens 5 according to Example 5 illustrated in FIG. 53. Table 22 exhibits values of the focal distance f of the total system, the F-value, the total angle of view 2c, the image height Y, and the total optical length L in the zoom lens 5 according to Example 5. Table 23 exhibits data on a surface interval that is variable upon zooming and focusing in the zoom lens 5 according to Example 5. It is to be noted that Table 22 exhibits values for each of the wide-angle end (Wide), the intermediate position (Mid), and the telephoto end (Tele) in a case where the object distance (d0) is infinity. Table 23 exhibits values for each of the wide-angle end (Wide), the intermediate position (Mid), and the telephoto end (Tele) in the case where the object distance (d0) is infinity and in a case where the object distance (d0) is a short distance. Table 24 exhibits values of coefficients indicating shapes of aspherical surfaces in the zoom lens 5 according to Example 5. Table 25 exhibits a starting surface and a focal distance (unit: mm) of each of lens groups of the zoom lens 5 according to Example 5.

The zoom lens 5 according to Example 5 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having positive refractive power are disposed in order from the object side toward the image plane side.

The zoom lens 5 according to Example 5 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11. The lens L11 is a positive lens of a biconvex shape.

The second lens group G2 includes the lenses L21 to L24 in order from the object side toward the image plane side. The lens L21 is a negative meniscus lens with a convex surface opposed to the object side. The lens L22 is a negative lens of a biconcave shape including an aspherical surface on both sides. The lens L23 is a positive lens of a biconvex shape. The lens L24 is a negative meniscus lens with a concave surface opposed to the object side.

The third lens group G3 includes the lens L31. The lens L31 is a positive meniscus lens including an aspherical surface on both sides, with a convex surface opposed to the object side.

The fourth lens group G4 includes the lenses L41 to L44 in order from the object side toward the image plane side. The lens L41 is a negative meniscus lens with a convex surface opposed to the object side. The lens L42 is a positive lens of a biconvex shape. The lens L41 and the lens L42 constitute a cemented lens in which the lens L41 and the lens L42 are attached to each other. The lens L43 is a negative lens of a concave surface shape on the image plane side with a flat surface on the object side. The lens L44 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61 and the lens L62 in order from the object side toward the image plane side. The lens L61 is a positive meniscus lens with a convex surface opposed to the object side. The lens L62 is a negative meniscus lens with a concave surface opposed to the object side.

The above-described configuration allows for achievement of a zoom lens having a high variable magnification ratio while covering a wide-angle region despite a

TABLE 21

| | | Example 5 | | | |
|---|---|---|---|---|---|
| Si | ri | di | ndi | vdi | φi |
| 0 (OBJ) | | (d0) | | | |
| 1 | 104.347 | 5.24 | 1.49700 | 81.6 | 57.20 |
| 2 | −2061.281 | (d2) | | | 52.56 |
| 3 | 78.344 | 1.30 | 1.70709 | 53.1 | 35.81 |
| 4 | 15.539 | 9.93 | | | 25.90 |
| 5 (ASP) | −89.663 | 1.51 | 1.55160 | 69.2 | 23.64 |
| 6 (ASP) | 52.339 | 0.20 | | | 22.07 |
| 7 | 37.688 | 4.94 | 1.79400 | 27.4 | 21.64 |
| 8 | −387.566 | 2.01 | | | 19.68 |
| 9 | −26.758 | 1.00 | 1.59282 | 68.6 | 19.23 |
| 10 | −1435.007 | (d10) | | | 19.40 |
| 11 (STO) | ∞ | 1.50 | | | 19.97 |
| 12 (ASP) | 34.731 | 3.25 | 1.69350 | 53.2 | 22.23 |
| 13 (ASP) | 828.669 | (d13) | | | 22.30 |
| 14 | 22.965 | 1.30 | 1.95375 | 32.3 | 23.21 |
| 15 | 15.599 | 12.42 | 1.49700 | 81.6 | 22.03 |
| 16 | −38.695 | 0.64 | | | 22.01 |
| 17 | ∞ | 1.00 | 1.85451 | 25.2 | 21.32 |
| 18 | 67.180 | 1.76 | | | 21.02 |
| 19 (ASP) | 30.479 | 6.20 | 1.49700 | 81.5 | 20.92 |
| 20 (ASP) | −28.126 | (d20) | | | 20.40 |
| 21 | −42.688 | 1.88 | 1.94595 | 18.0 | 20.48 |
| 22 | −28.572 | 0.20 | | | 20.77 |
| 23 (ASP) | −44.322 | 1.00 | 1.76802 | 49.2 | 20.55 |
| 24 (ASP) | 31.740 | (d24) | | | 20.97 |
| 25 | 65.955 | 2.31 | 1.59349 | 67.0 | 27.96 |
| 26 | 274.814 | 6.19 | | | 28.14 |
| 27 | −31.029 | 1.00 | 1.80420 | 46.5 | 28.86 |
| 28 | −38.180 | (d28) | | | 29.82 |
| 29 (IMG) | ∞ | 0.00 | | | 43.66 |

TABLE 22

| | Example 5 (Zoom Ratio: 3.12) | | |
|---|---|---|---|
| | Wide | Mid | Tele |
| f (mm) | 21.63 | 40.25 | 67.55 |
| Fno | 4.18 | 4.18 | 4.77 |
| 2ω (°) | 85.75 | 56.48 | 35.50 |
| Y (mm) | 20.08 | 21.62 | 21.63 |
| L (mm) | 116.05 | 136.26 | 166.05 |

TABLE 23

| | | | | Example 5 • Variable Data | | |
|---|---|---|---|---|---|---|
| | Wide | Mid | Tele | Wide | Mid | Tele |
| d0 | ∞ | ∞ | ∞ | 299 mm | 299 mm | 299 mm |
| d2 | 0.80 | 16.24 | 23.50 | 0.80 | 16.24 | 23.50 |
| d10 | 12.98 | 5.41 | 2.00 | 12.98 | 5.41 | 2.00 |
| d13 | 10.52 | 3.53 | 0.80 | 10.52 | 3.53 | 0.80 |
| d20 | 3.30 | 3.22 | 2.00 | 4.18 | 4.86 | 4.64 |
| d24 | 4.09 | 15.06 | 10.44 | 3.21 | 13.42 | 7.80 |
| d28 | 17.58 | 26.02 | 60.54 | 17.58 | 26.02 | 60.54 |

TABLE 24

| Si | k | A4 | A6 | A8 | A10 | A12 |
|---|---|---|---|---|---|---|
| | | | Example 5•Aspherical Data | | | |
| 5 | 0.00000E+00 | 3.17953E−05 | −3.18674E−07 | 2.33673E−09 | −7.88411E−12 | −1.80336E−14 |
| 6 | 0.00000E+00 | 1.68460E−05 | −3.53212E−07 | 2.39446E−09 | −7.99465E−12 | −1.57217E−14 |
| 12 | 0.00000E+00 | −1.53606E−06 | 2.24564E−08 | −7.45815E−12 | 1.00499E−12 | 0.00000E+00 |
| 13 | 0.00000E+00 | 8.62020E−06 | 3.60805E−08 | −6.34010E−11 | 1.35691E−12 | 0.00000E+00 |
| 19 | 0.00000E+00 | −2.24165E−05 | −3.23444E−08 | 1.07854E−10 | −2.09419E−12 | 1.00104E−14 |
| 20 | 0.00000E+00 | 1.80445E−05 | −6.64730E−08 | −4.48916E−11 | −7.26821E−13 | 4.37272E−15 |
| 23 | 0.00000E+00 | −4.42641E−07 | −6.70181E−08 | 2.03049E−11 | 0.00000E+00 | 0.00000E+00 |
| 24 | 0.00000E+00 | −5.55904E−07 | −3.95789E−08 | 3.49027E−11 | 0.00000E+00 | 0.00000E+00 |

TABLE 25

| Lens Group | Starting Surface | Focal Distance |
|---|---|---|
| | Example 5 | |
| G1 | 1 | 200.00 |
| G2 | 3 | −16.67 |
| G3 | 12 | 52.18 |
| G4 | 14 | 25.54 |
| G5 | 21 | −32.53 |
| G6 | 25 | 401.91 |

Figure 54:
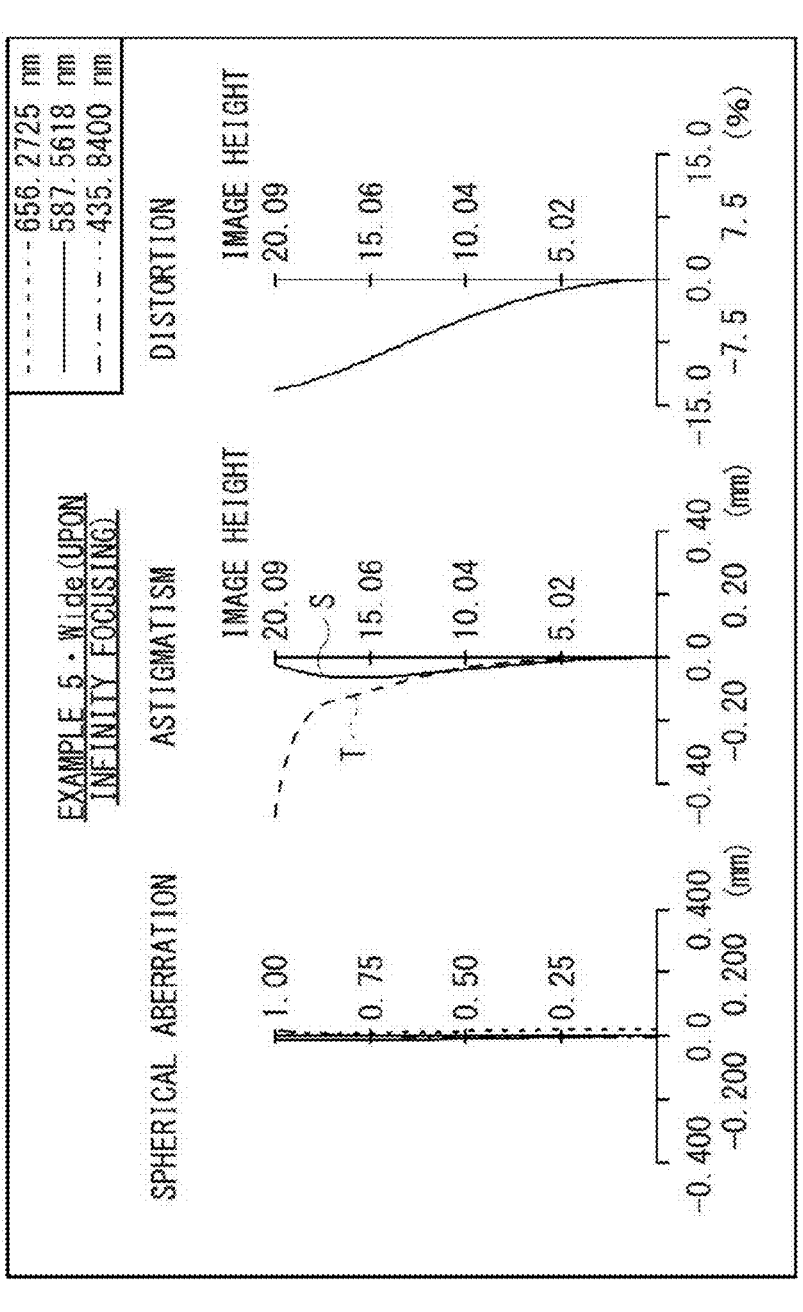
FIG. 54 is an aberration diagram illustrating longitudinal aberration upon infinity focusing at a wide-angle end of the zoom lens according to Example 5.
Figure 55:
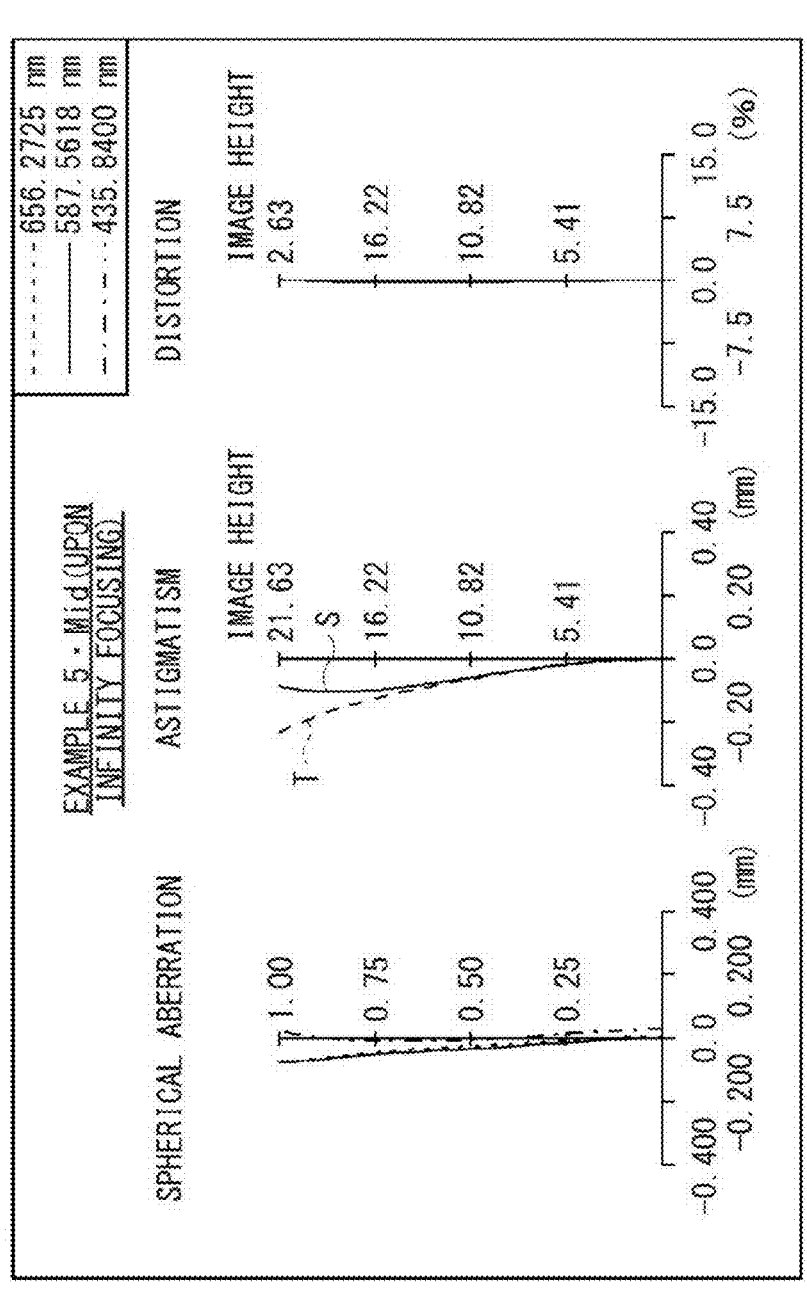
FIG. 55 is an aberration diagram illustrating longitudinal aberration upon infinity focusing at an intermediate position of the zoom lens according to Example 5.
Figure 56:
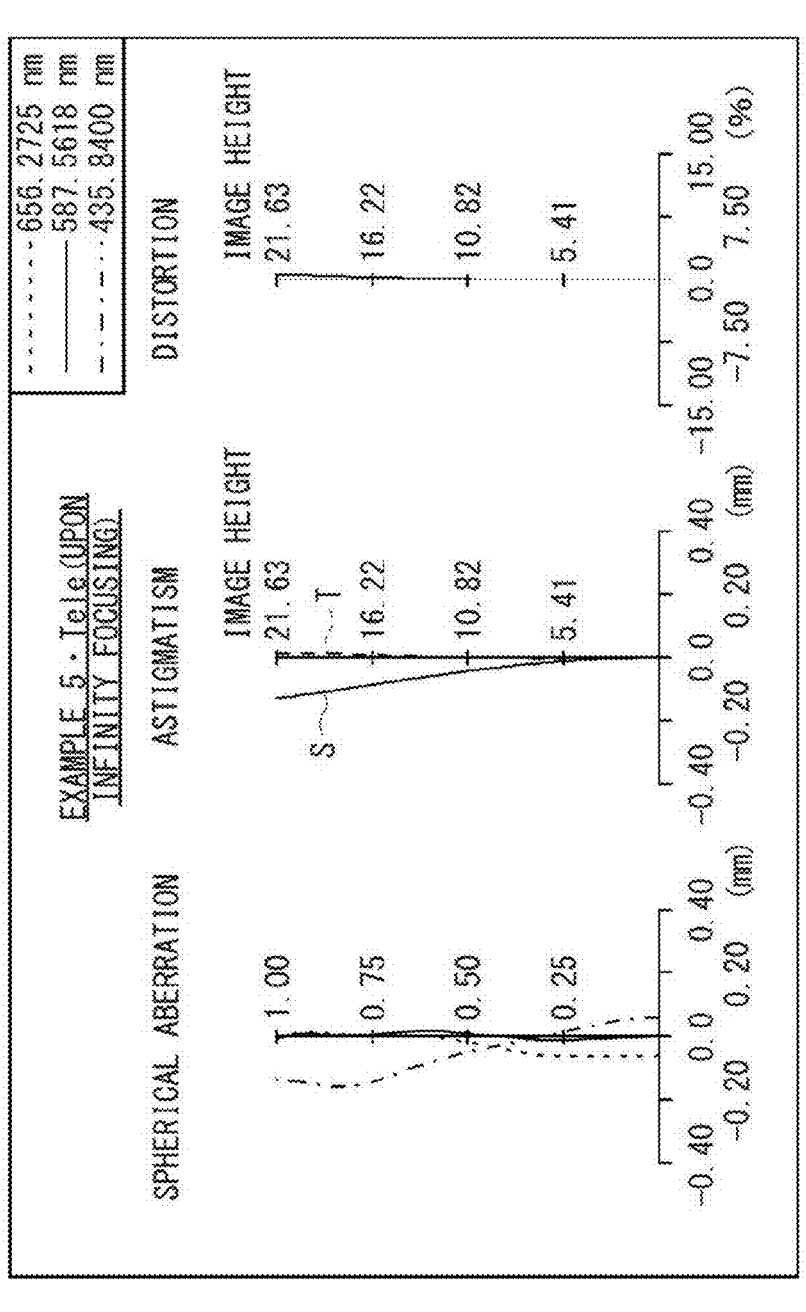
FIG. 56 is an aberration diagram illustrating longitudinal aberration upon infinity focusing at a telephoto end of the zoom lens according to Example 5.
Figure 57:
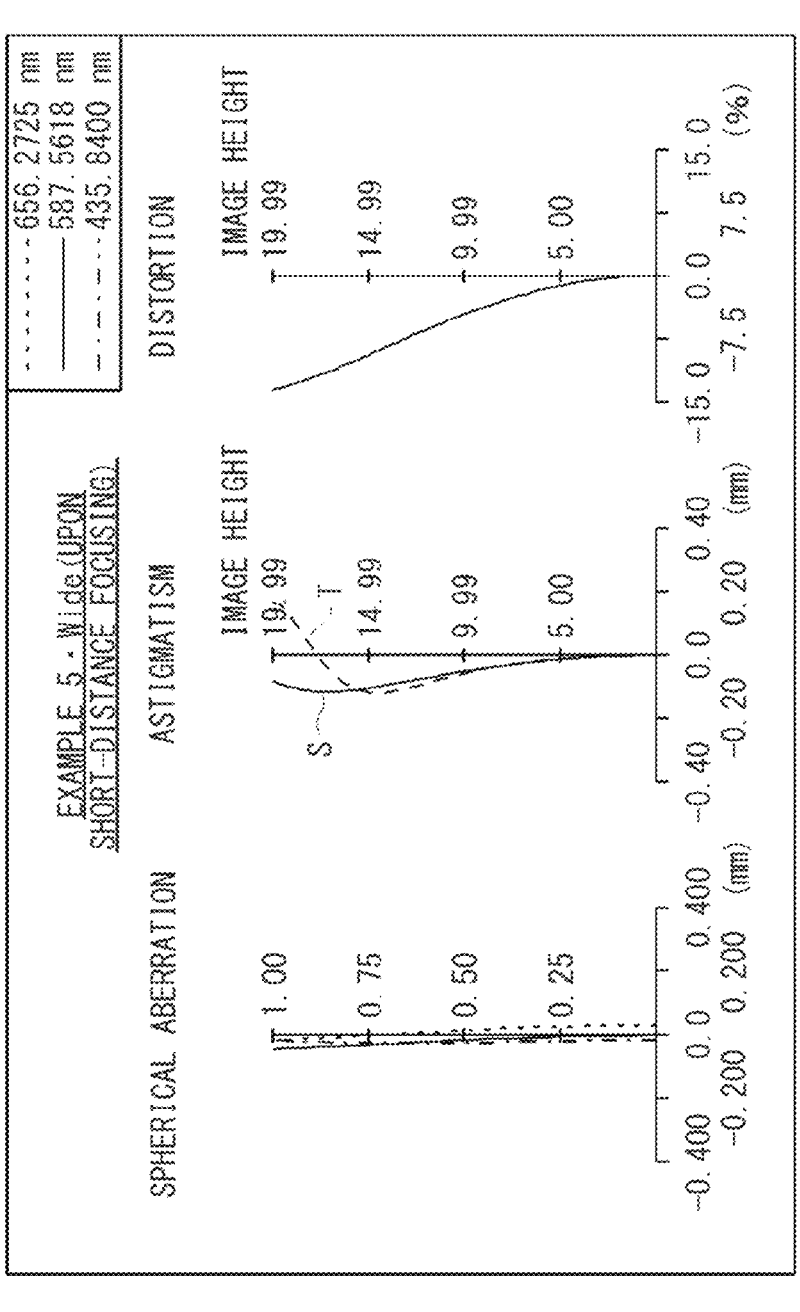
FIG. 57 is an aberration diagram illustrating longitudinal aberration upon short-distance focusing at the wide-angle end of the zoom lens according to Example 5.
Figure 58:
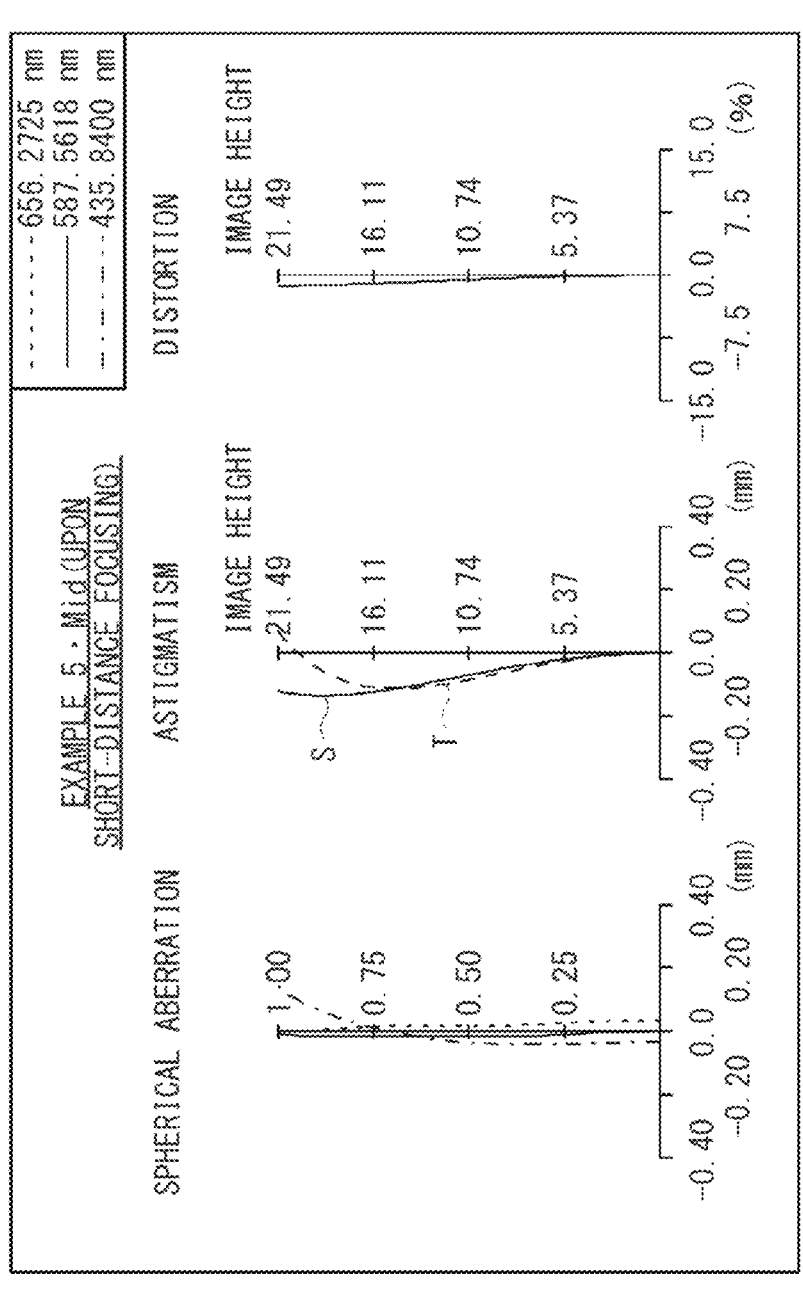
FIG. 58 is an aberration diagram illustrating longitudinal aberration upon short-distance focusing at the intermediate position of the zoom lens according to Example 5.
Figure 59:
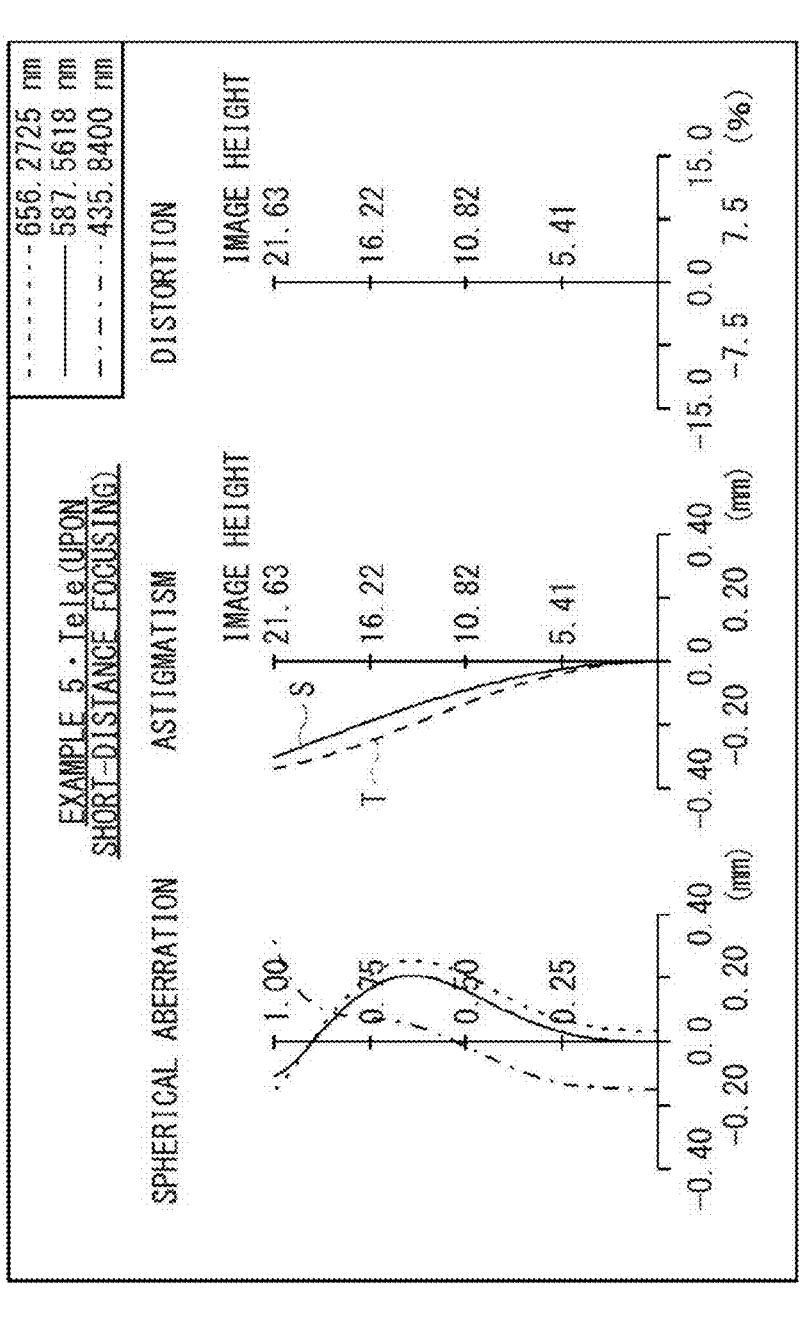
FIG. 59 is an aberration diagram illustrating longitudinal aberration upon short-distance focusing at the telephoto end of the zoom lens according to Example 5.
Figure 60:
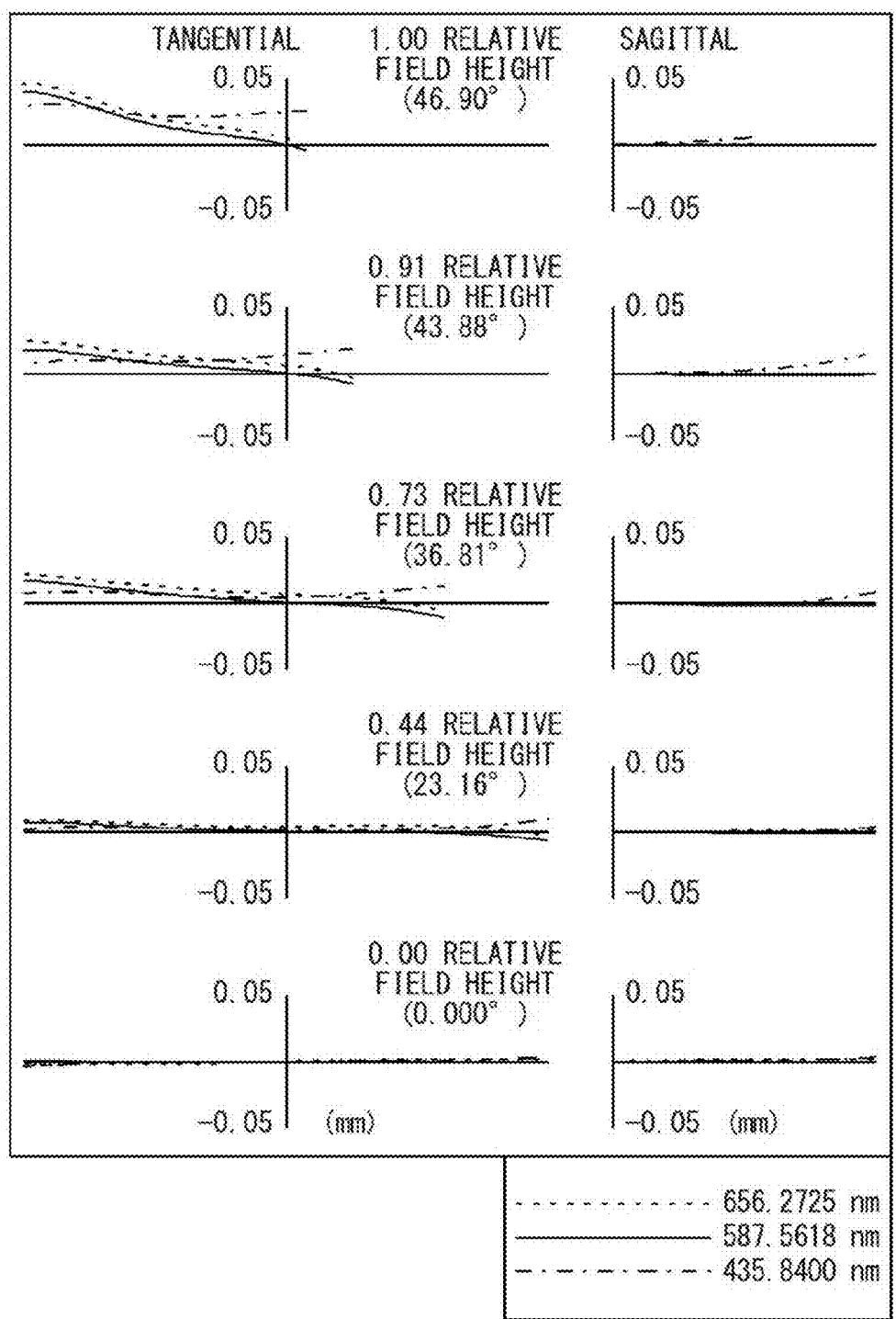
FIG. 60 is an aberration diagram illustrating lateral aberration upon infinity focusing at the wide-angle end of the zoom lens according to Example 5.
Figure 61:
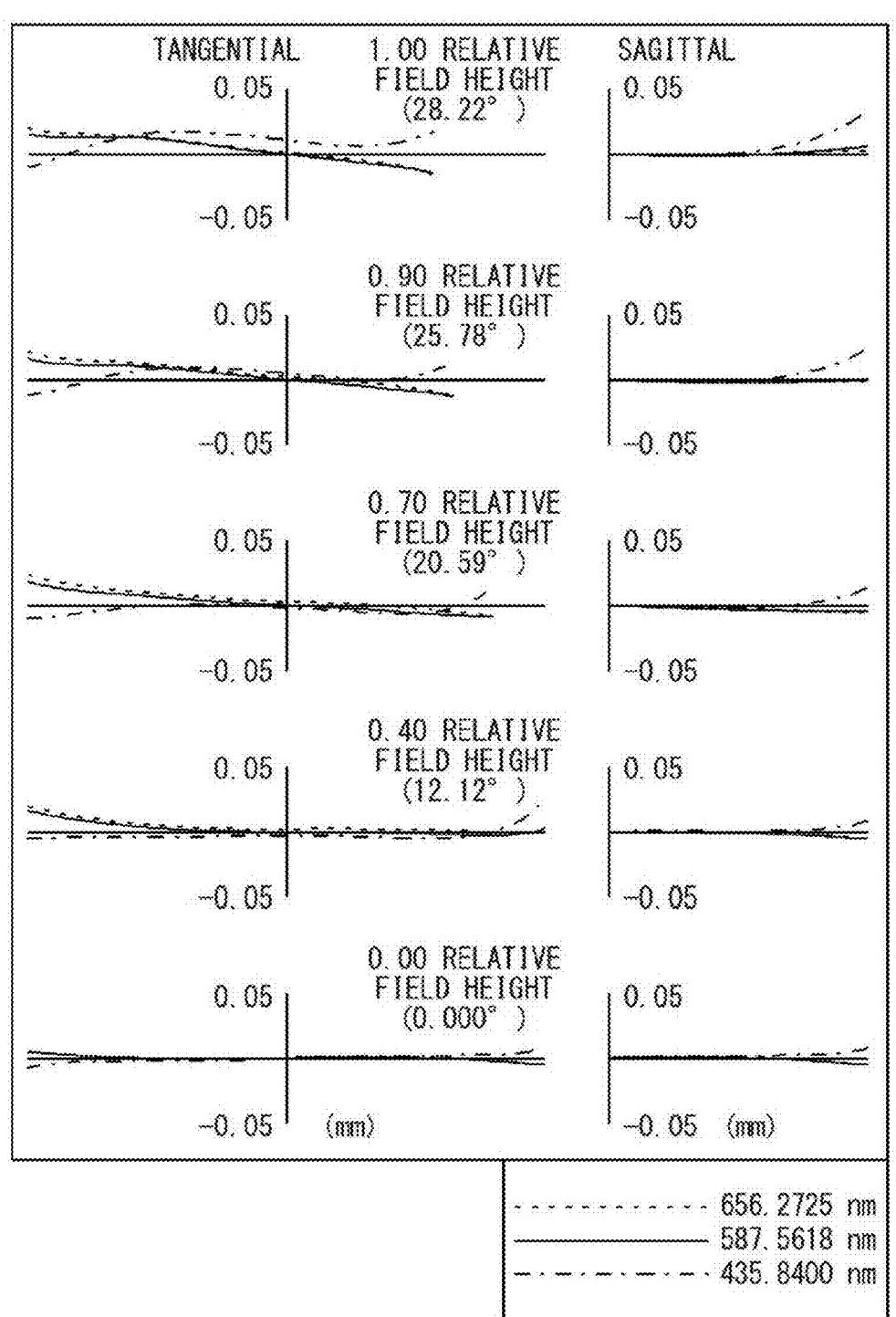
FIG. 61 is an aberration diagram illustrating lateral aberration upon infinity focusing at the intermediate position of the zoom lens according to Example 5.
Figure 62:
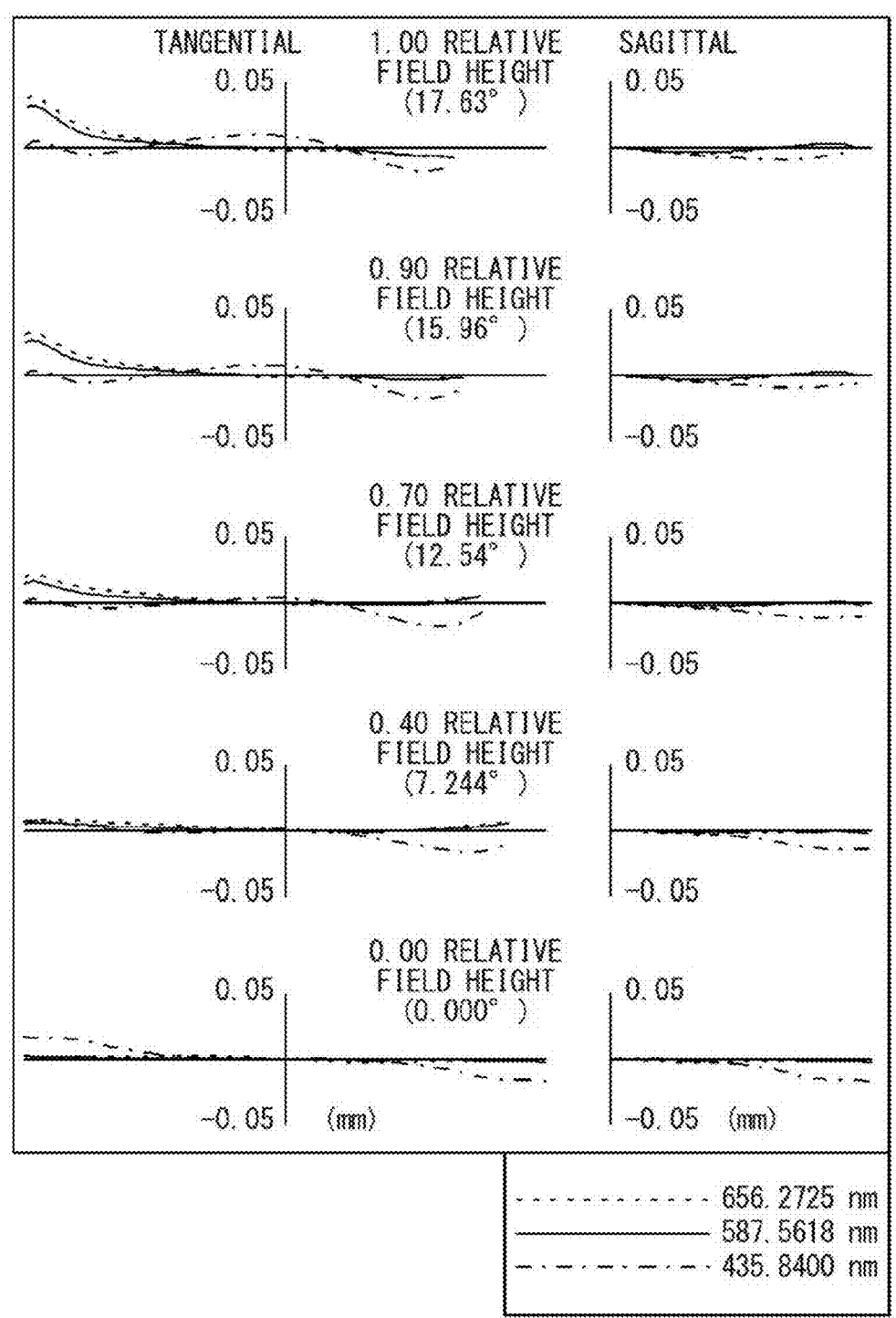
FIG. 62 is an aberration diagram illustrating lateral aberration upon infinity focusing at the telephoto end of the zoom lens according to Example 5.
Figure 63:
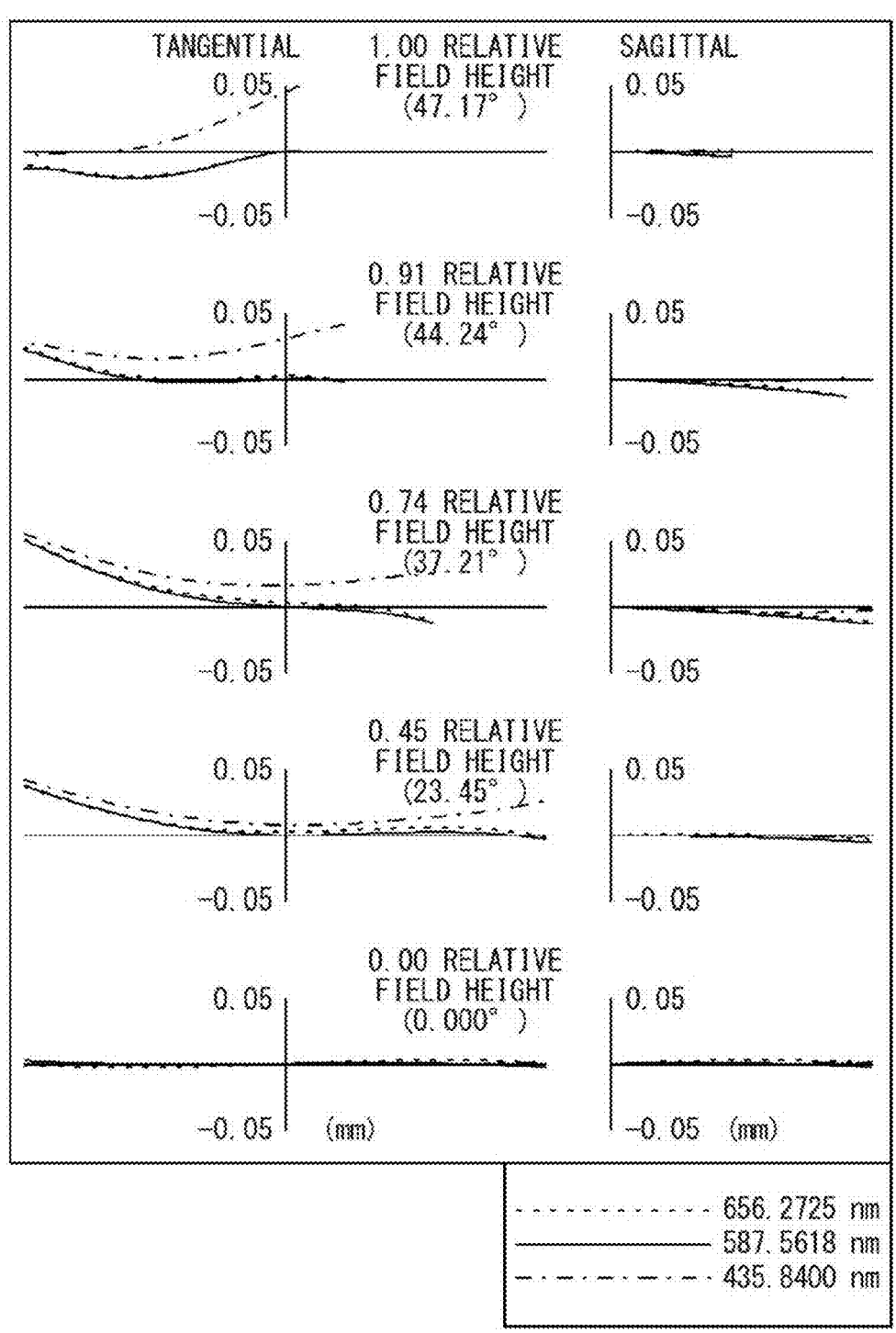
FIG. 63 is an aberration diagram illustrating lateral aberration upon short-distance focusing at the wide-angle end of the zoom lens according to Example 5.
Figure 64:
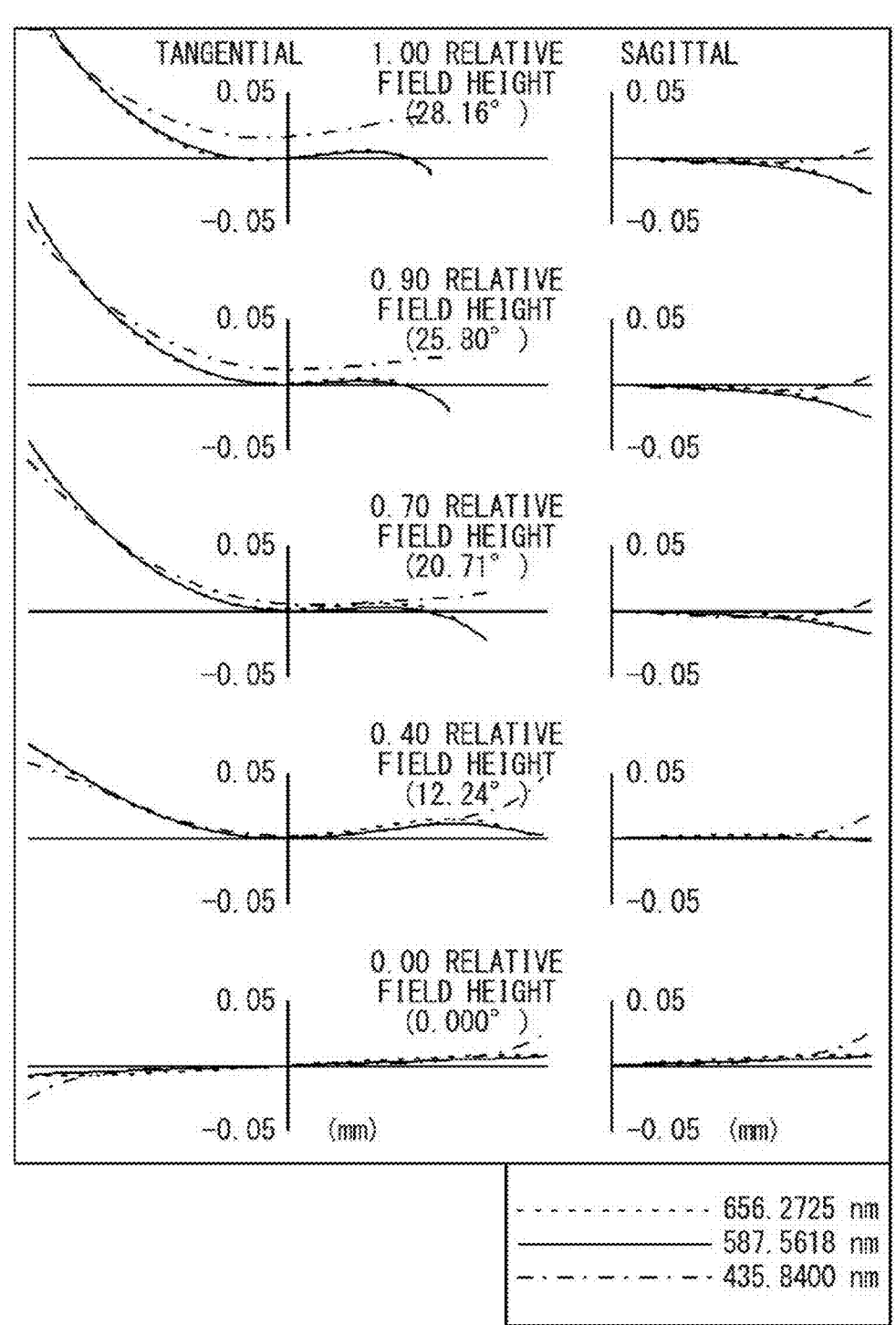
FIG. 64 is an aberration diagram illustrating lateral aberration upon short-distance focusing at the intermediate position of the zoom lens according to Example 5.
Figure 65:
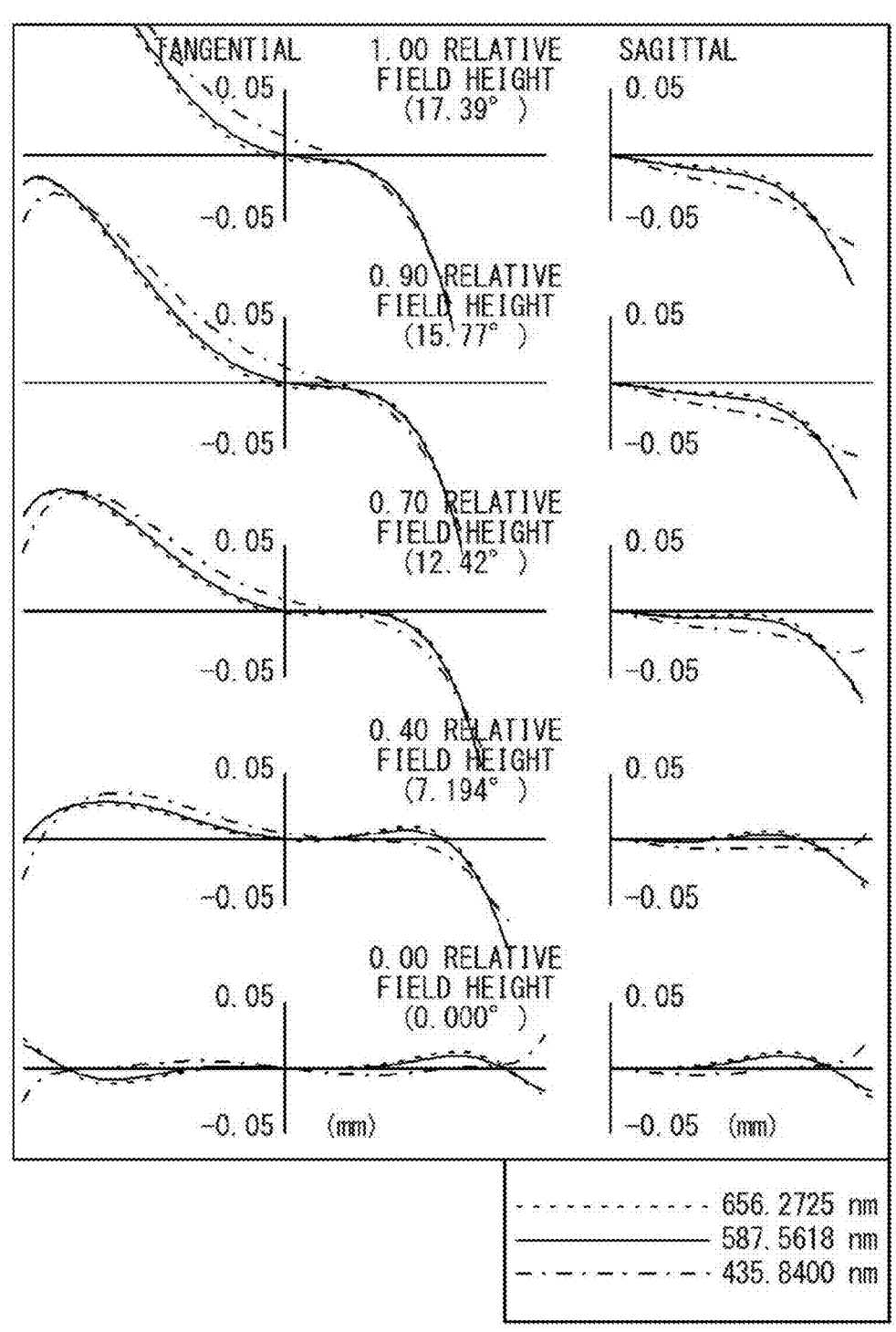
FIG. 65 is an aberration diagram illustrating lateral aberration upon short-distance focusing at the telephoto end of the zoom lens according to Example 5.

FIG. 54 illustrates longitudinal aberration upon infinity focusing at a wide-angle end of the zoom lens 5 according to Example 5. FIG. 55 illustrates longitudinal aberration upon infinity focusing at an intermediate position of the zoom lens 5 according to Example 5. FIG. 56 illustrates longitudinal aberration upon infinity focusing at a telephoto end of the zoom lens 5 according to Example 5. FIG. 57 illustrates longitudinal aberration upon short-distance focusing at the wide-angle end of the zoom lens 5 according to Example 5. FIG. 58 illustrates longitudinal aberration upon short-distance focusing at the intermediate position of the zoom lens 5 according to Example 5. FIG. 59 illustrates longitudinal aberration upon short-distance focusing at the telephoto end of the zoom lens 5 according to Example 5. FIG. 60 illustrates lateral aberration upon infinity focusing at the wide-angle end of the zoom lens 5 according to Example 5. FIG. 61 illustrates lateral aberration upon infinity focusing at the intermediate position of the zoom lens 5 according to Example 5. FIG. 62 illustrates lateral aberration upon infinity focusing at the telephoto end of the zoom lens 5 according to Example 5. FIG. 63 illustrates lateral aberration upon short-distance focusing at the wide-angle end of the zoom lens 5 according to Example 5. FIG. 64 illustrates lateral aberration upon short-distance focusing at the intermediate position of the zoom lens 5 according to Example 5. FIG. 65 illustrates lateral aberration upon short-distance focusing at the telephoto end of the zoom lens 5 according to Example 5.

As appreciated from each of the aberration diagrams, the zoom lens 5 according to Example 5 undergoes favorable correction of various aberrations, and thus has superior image-forming performance.

Example 6

Table 26 exhibits basic lens data of the zoom lens 6 according to Example 6 illustrated in FIG. 66. Table 27 exhibits values of the focal distance f of the total system, the F-value, the total angle of view 2c, the image height Y, and the total optical length L in the zoom lens 6 according to Example 6. Table 28 exhibits data on a surface interval that is variable upon zooming and focusing in the zoom lens 6 according to Example 6. It is to be noted that Table 27 exhibits values for each of the wide-angle end (Wide), the intermediate position (Mid), and the telephoto end (Tele) in a case where the object distance (d0) is infinity. Table 28 exhibits values for each of the wide-angle end (Wide), the intermediate position (Mid), and the telephoto end (Tele) in the case where the object distance (d0) is infinity and in a case where the object distance (d0) is a short distance. Table 29 exhibits values of coefficients indicating shapes of aspherical surfaces in the zoom lens 6 according to Example 6. Table 30 exhibits a starting surface and a focal distance (unit: mm) of each of lens groups of the zoom lens 6 according to Example 6.

The zoom lens 6 according to Example 6 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 6 according to Example 6 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a concave surface opposed to the object side. The lens L23 is a positive lens of a biconvex shape. The lens L24 is a negative lens of a biconcave shape.

with a concave surface opposed to the object side.

The third lens group G3 includes the lens L31 and a lens L32 in order from the object side toward the image plane side. The lens L31 is a positive lens of a biconvex shape including an aspherical surface on both sides. The lens L32 is a negative lens of a biconcave shape.

The fourth lens group G4 includes the lenses L41 to L45 in order from the object side toward the image plane side. The lens L41 is a positive lens of a biconvex shape. The lens L42 is a negative lens of a biconcave shape. The lens L41 and the lens L42 constitute a cemented lens in which the lens L41 and the lens L42 are attached to each other. The lens L43 is a negative meniscus lens with a convex surface opposed to the object side. The lens L44 is a positive meniscus lens with a convex surface opposed to the object side. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61. The lens L61 is a negative meniscus lens with a concave surface opposed to the object side.

The above-described configuration allows for achievement of a zoom lens having a high variable magnification ratio while covering a wide-angle region despite a miniaturized optical system.

TABLE 26

| | | Example 6 | | | |
|---|---|---|---|---|---|
| Si | ri | di | ndi | vdi | φi |
| 0 (OBJ) | | (d0) | | | |
| 1 | 64.868 | 1.70 | 1.94595 | 18.0 | 52.40 |
| 2 | 54.200 | 7.27 | 1.64000 | 60.2 | 50.70 |
| 3 | 350.152 | (d3) | | | 49.54 |
| 4 | 153.171 | 1.30 | 1.77250 | 49.6 | 33.61 |
| 5 | 14.703 | 8.24 | | | 23.98 |
| 6 (ASP) | −61.448 | 1.17 | 1.85135 | 40.1 | 23.17 |

TABLE 26-continued

| | | Example 6 | | | |
|---|---|---|---|---|---|
| Si | ri | di | ndi | vdi | φi |
| 7 (ASP) | −500.000 | 0.20 | | | 22.83 |
| 8 | 54.600 | 3.73 | 1.85478 | 24.8 | 21.85 |
| 9 | −62.514 | 1.23 | | | 20.94 |
| 10 | −30.258 | 1.00 | 1.65100 | 56.2 | 20.36 |
| 11 | 10576.554 | (d11) | | | 19.20 |
| 12 (STO) | ∞ | 1.50 | | | 18.20 |
| 13 (ASP) | 27.708 | 4.72 | 1.69350 | 53.2 | 19.85 |
| 14 (ASP) | −41.441 | 2.16 | | | 19.93 |
| 15 | −36.371 | 1.00 | 1.77250 | 49.6 | 19.24 |
| 16 | 154.010 | (d16) | | | 19.42 |
| 17 | 1459.617 | 2.13 | 1.60311 | 60.6 | 19.58 |
| 18 | −51.309 | 1.00 | 1.84666 | 23.8 | 19.73 |
| 19 | 678.416 | 0.20 | | | 20.07 |
| 20 | 28.504 | 1.00 | 1.74400 | 44.8 | 20.77 |
| 21 | 15.565 | 5.50 | 1.49700 | 81.5 | 20.35 |
| 22 | 4380.892 | 1.77 | | | 20.54 |
| 23 (ASP) | 26.423 | 6.20 | 1.49710 | 81.6 | 21.13 |
| 24 (ASP) | −21.382 | (d24) | | | 21.00 |
| 25 | −1338.244 | 1.70 | 1.94595 | 18.0 | 20.87 |
| 26 | −88.320 | 0.20 | | | 20.87 |
| 27 (ASP) | −83.421 | 1.00 | 1.76802 | 49.2 | 20.80 |
| 28 (ASP) | 30.224 | (d28) | | | 20.58 |
| 29 | −27.729 | 1.00 | 1.78472 | 25.7 | 25.57 |
| 30 | −34.130 | (d30) | | | 26.61 |
| 31 (IMG) | ∞ | 0.00 | | | 43.33 |

TABLE 27

| | Example 6 (Zoom Ratio: 3.29) | | |
|---|---|---|---|
| | Wide | Mid | Tele |
| f (mm) | 20.61 | 35.28 | 67.90 |
| Fno | 4.11 | 4.10 | 4.08 |
| 2ω (°) | 87.57 | 62.78 | 35.31 |
| Y (mm) | 19.75 | 21.53 | 21.61 |
| L (mm) | 115.05 | 127.34 | 155.05 |

TABLE 28

| | Example 6 • Variable Data | | | | | |
|---|---|---|---|---|---|---|
| | Wide | Mid | Tele | Wide | Mid | Tele |
| d0 | ∞ | ∞ | ∞ | 299 mm | 379 mm | 379 mm |
| d3 | 0.80 | 11.78 | 33.95 | 0.80 | 11.78 | 33.95 |
| d11 | 19.16 | 9.80 | 2.00 | 19.16 | 9.80 | 2.00 |
| d16 | 5.82 | 2.88 | 1.00 | 5.82 | 2.88 | 1.00 |
| d24 | 2.81 | 1.68 | 2.36 | 3.72 | 2.77 | 4.92 |
| d28 | 13.91 | 17.98 | 19.18 | 13.00 | 16.89 | 16.62 |
| d30 | 15.63 | 26.29 | 39.64 | 15.63 | 26.29 | 39.64 |

TABLE 29

| | | | Example 6•Aspherical Data | | | |
|---|---|---|---|---|---|---|
| Si | k | A4 | A6 | A8 | A10 | A12 |
| 6 | 0.00000E+00 | 3.93352E−05 | −4.22033E−07 | 2.05132E−09 | −4.96399E−12 | 0.00000E+00 |
| 7 | 0.00000E+00 | 2.49496E−05 | −4.43150E−07 | 2.05677E−09 | −5.13689E−12 | 0.00000E+00 |
| 13 | 0.00000E+00 | −1.50359E−05 | −1.15441E−08 | −2.02309E−10 | −7.28396E−13 | 0.00000E+00 |
| 14 | 0.00000E+00 | −8.83178E−06 | 1.23163E−08 | −1.83022E−10 | −5.81571E−13 | 0.00000E+00 |
| 23 | 0.00000E+00 | −2.93397E−05 | −1.72426E−08 | −2.31911E−10 | 8.70744E−13 | 0.00000E+00 |
| 24 | 0.00000E+00 | 3.26976E−05 | −1.45165E−07 | 4.82668E−10 | −1.40647E−12 | 0.00000E+00 |
| 27 | 0.00000E+00 | 2.74636E−05 | −2.44679E−07 | 1.59636E−09 | −4.78118E−12 | 0.00000E+00 |
| 28 | 0.00000E+00 | 2.51352E−05 | −1.55019E−07 | 1.02585E−09 | −4.05604E−12 | 0.00000E+00 |

US 12,574,644 B2

41

TABLE 30

| Example 6 | | |
|---|---|---|
| Lens Group | Starting Surface | Focal Distance |
| G1 | 1 | 137.39 |
| G2 | 4 | −18.48 |
| G3 | 13 | 53.93 |
| G4 | 17 | 23.18 |
| G5 | 25 | −40.74 |
| G6 | 29 | −202.30 |

Figure 67:
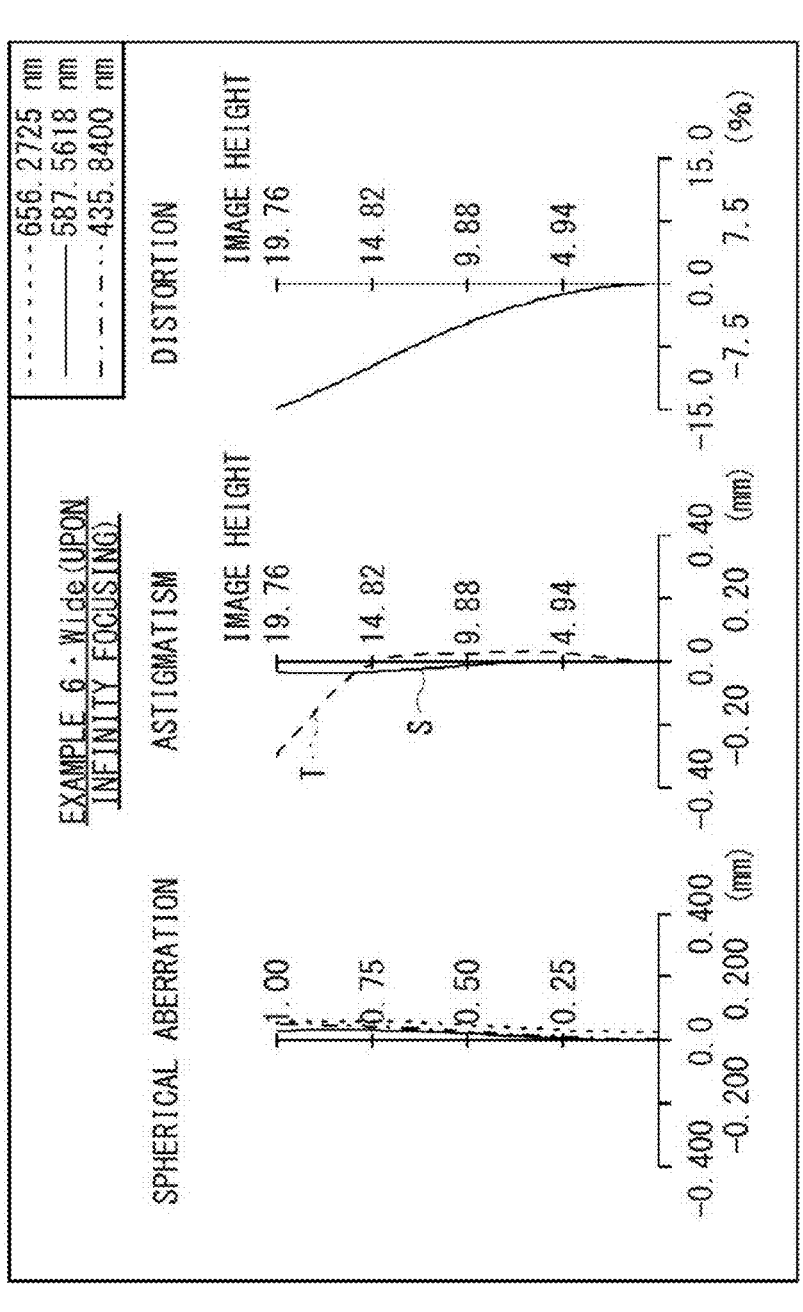
FIG. 67 is an aberration diagram illustrating longitudinal aberration upon infinity focusing at a wide-angle end of the zoom lens according to Example 6.
Figure 68:
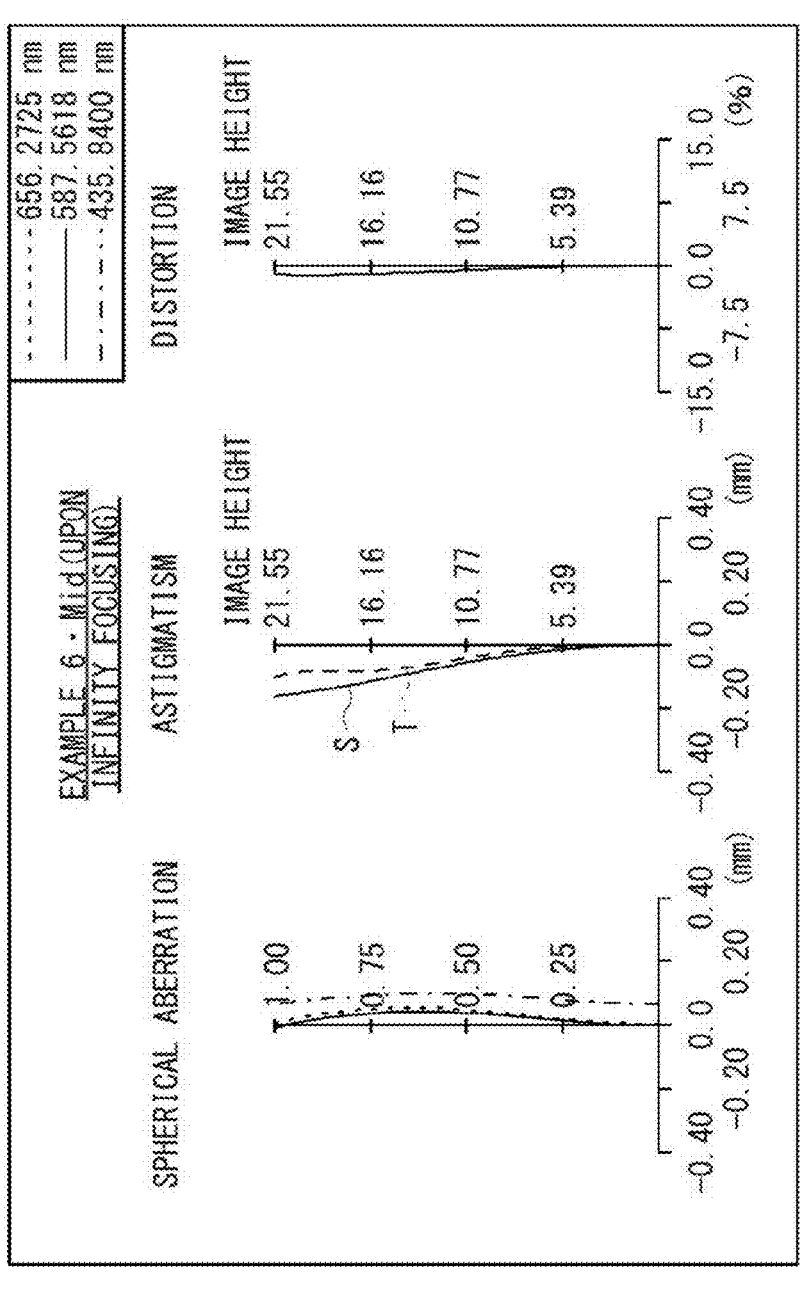
FIG. 68 is an aberration diagram illustrating longitudinal aberration upon infinity focusing at an intermediate position of the zoom lens according to Example 6.
Figure 69:
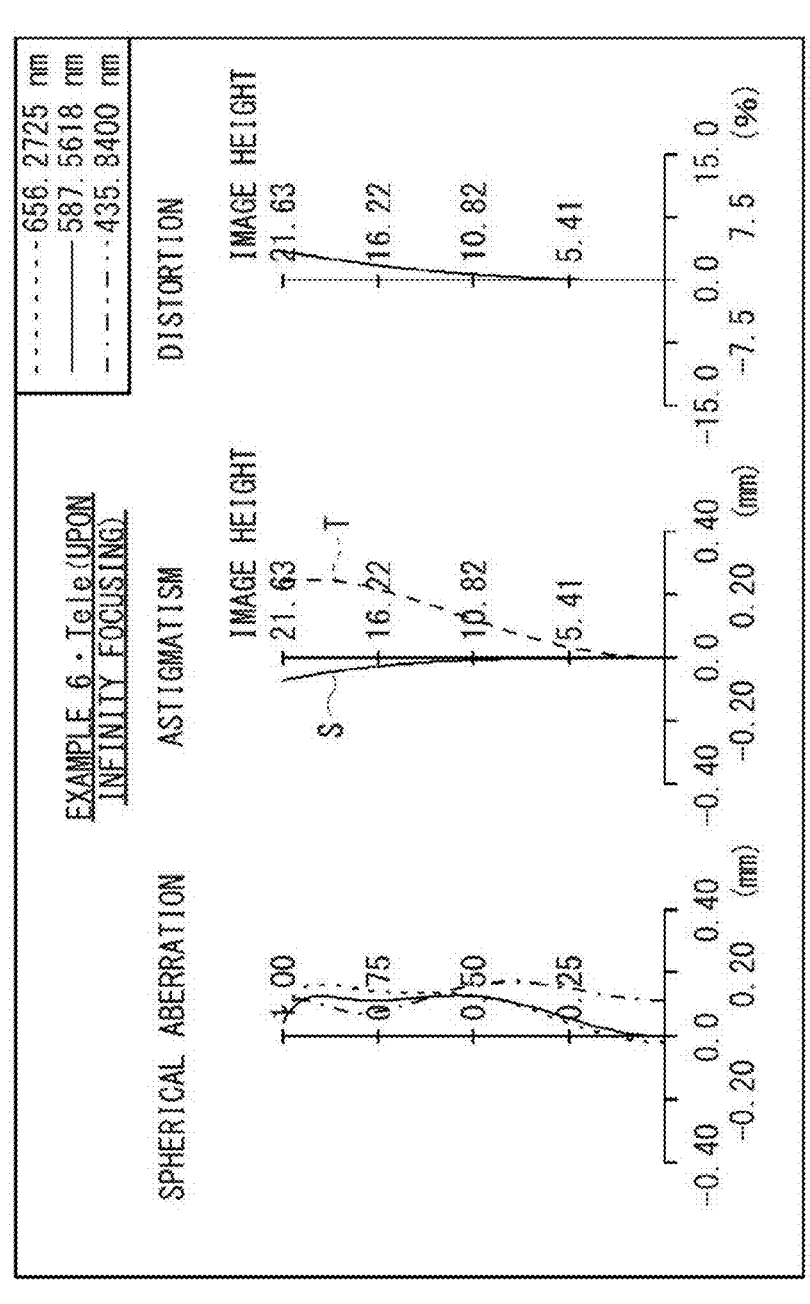
FIG. 69 is an aberration diagram illustrating longitudinal aberration upon infinity focusing at a telephoto end of the zoom lens according to Example 6.
Figure 70:
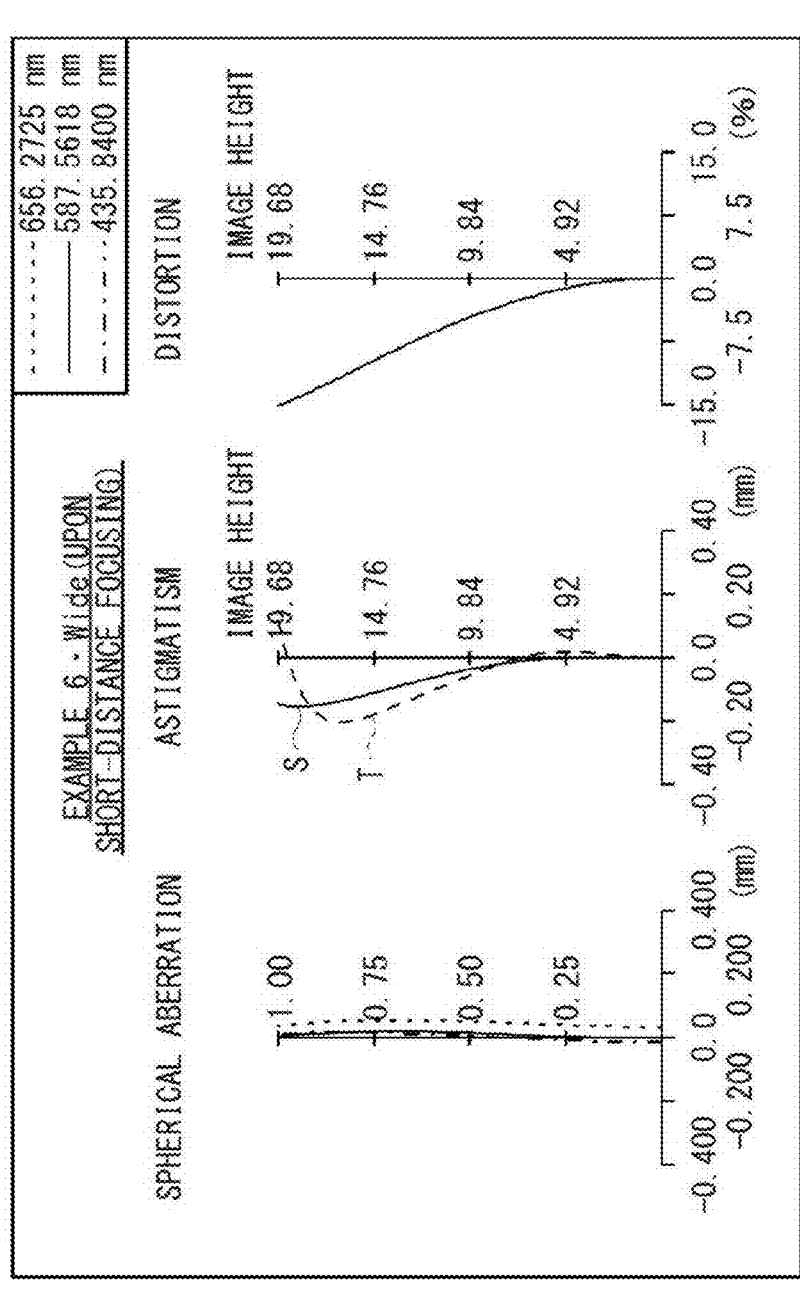
FIG. 70 is an aberration diagram illustrating longitudinal aberration upon short-distance focusing at the wide-angle end of the zoom lens according to Example 6.
Figure 71:
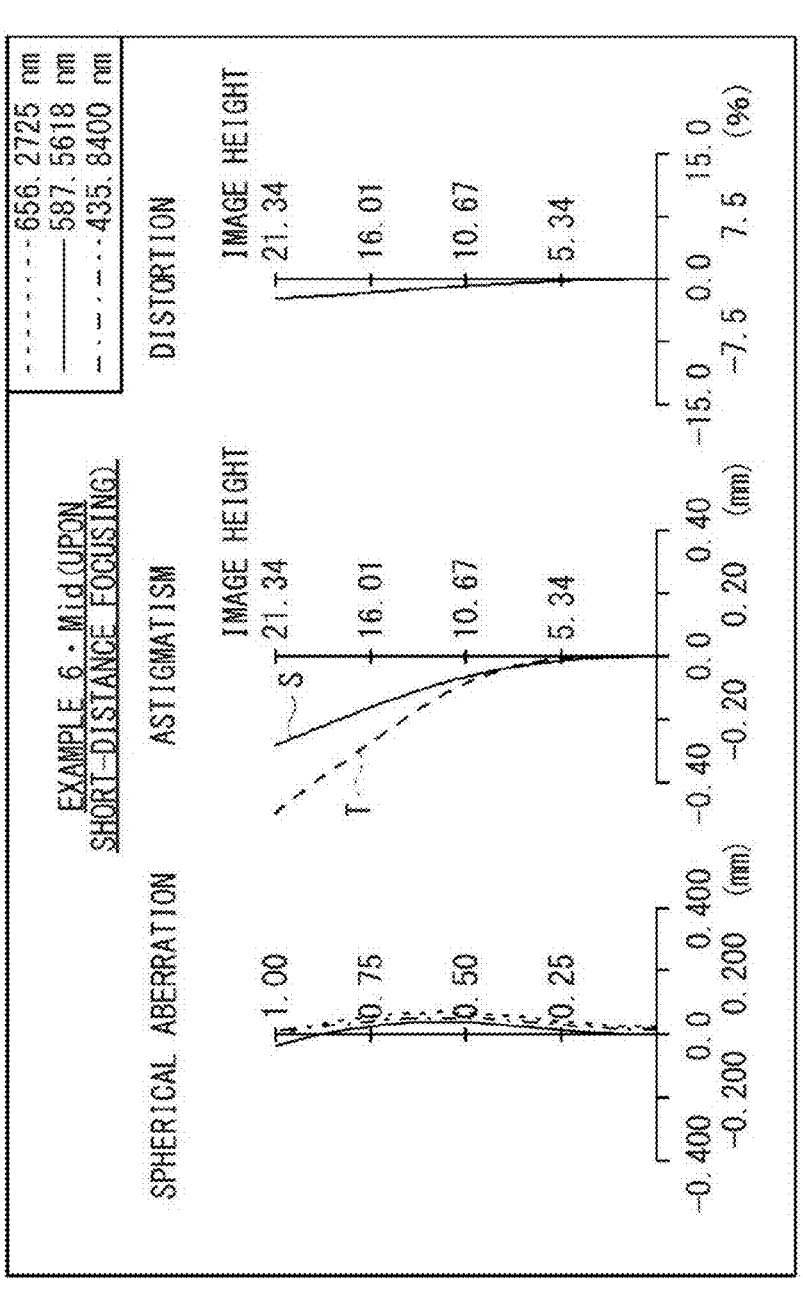
FIG. 71 is an aberration diagram illustrating longitudinal aberration upon short-distance focusing at the intermediate position of the zoom lens according to Example 6.
Figure 72:
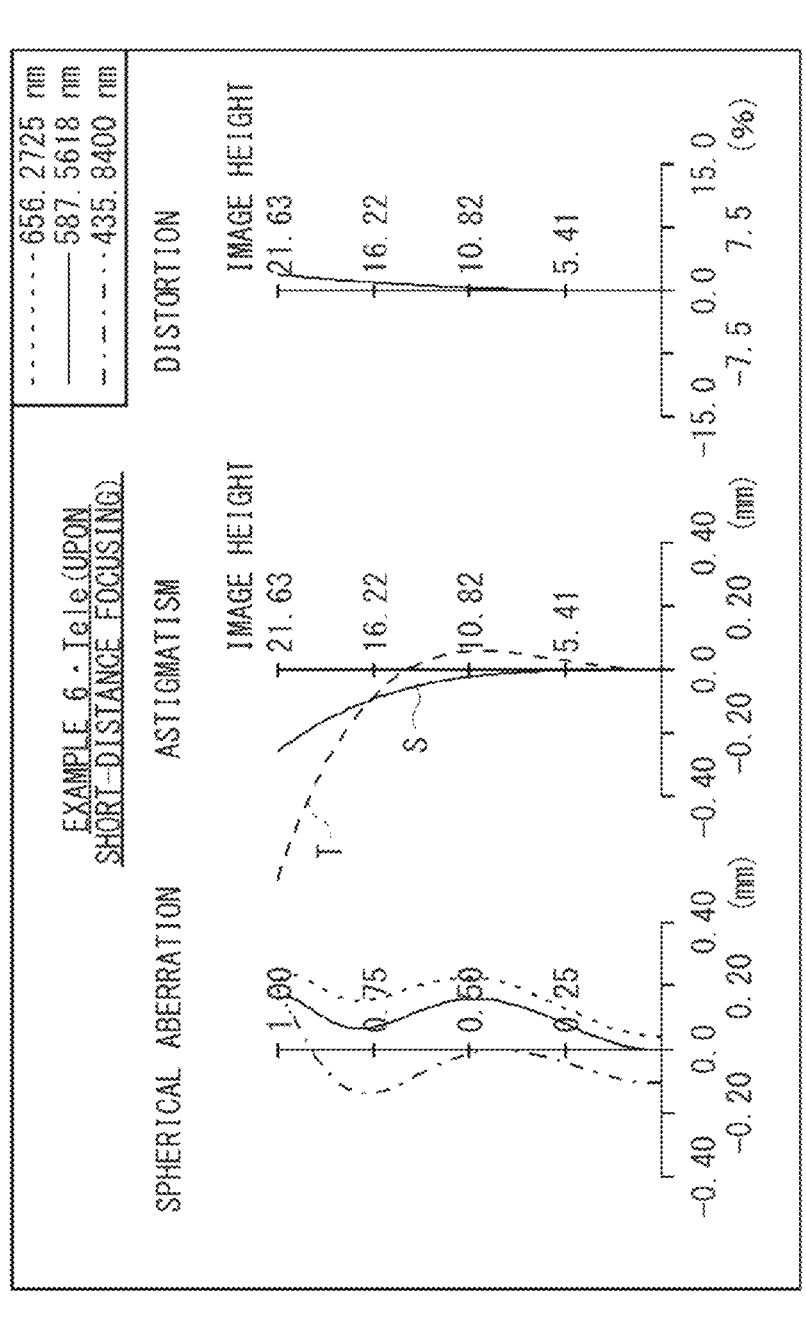
FIG. 72 is an aberration diagram illustrating longitudinal aberration upon short-distance focusing at the telephoto end of the zoom lens according to Example 6.
Figure 73:
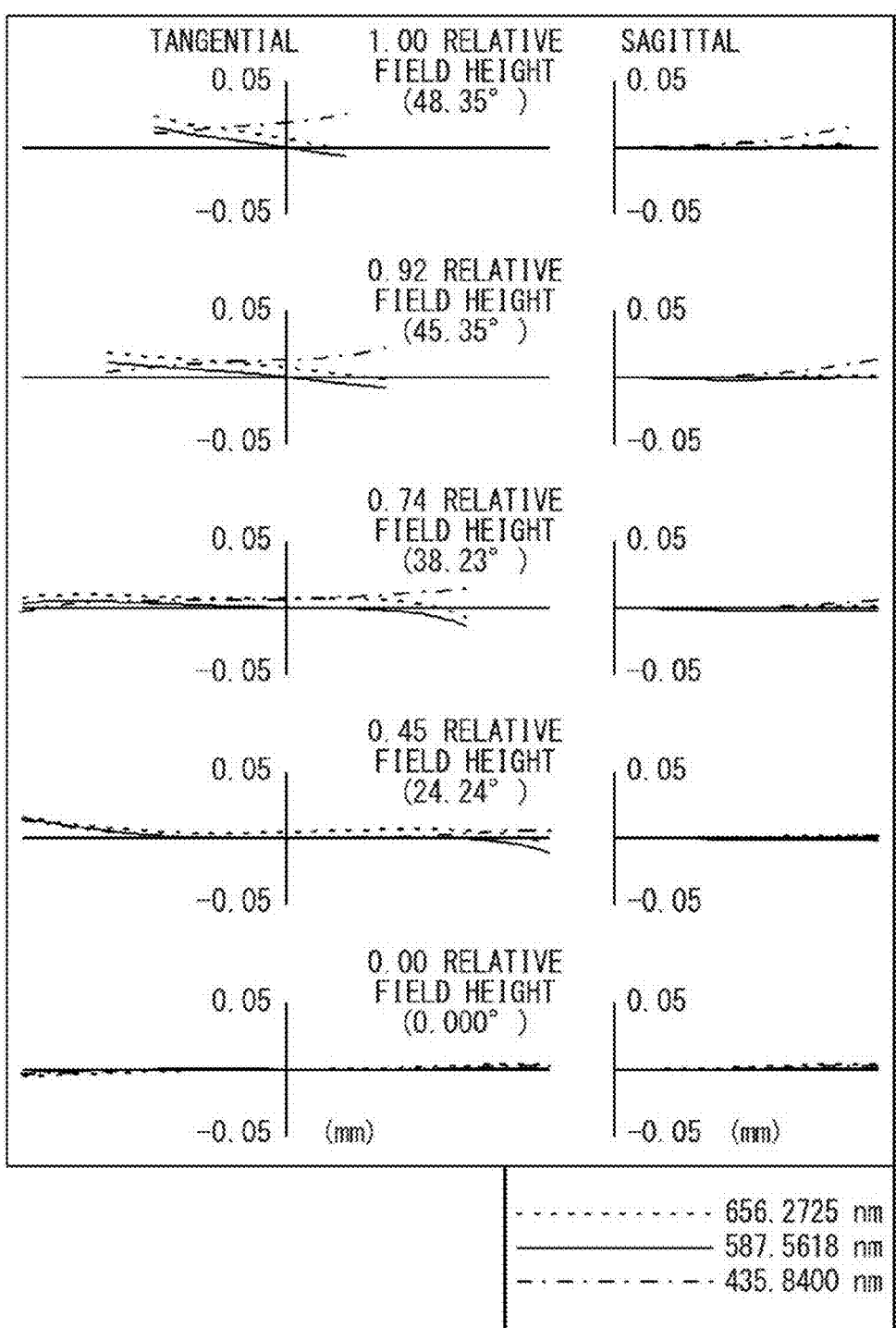
FIG. 73 is an aberration diagram illustrating lateral aberration upon infinity focusing at the wide-angle end of the zoom lens according to Example 6.
Figure 74:
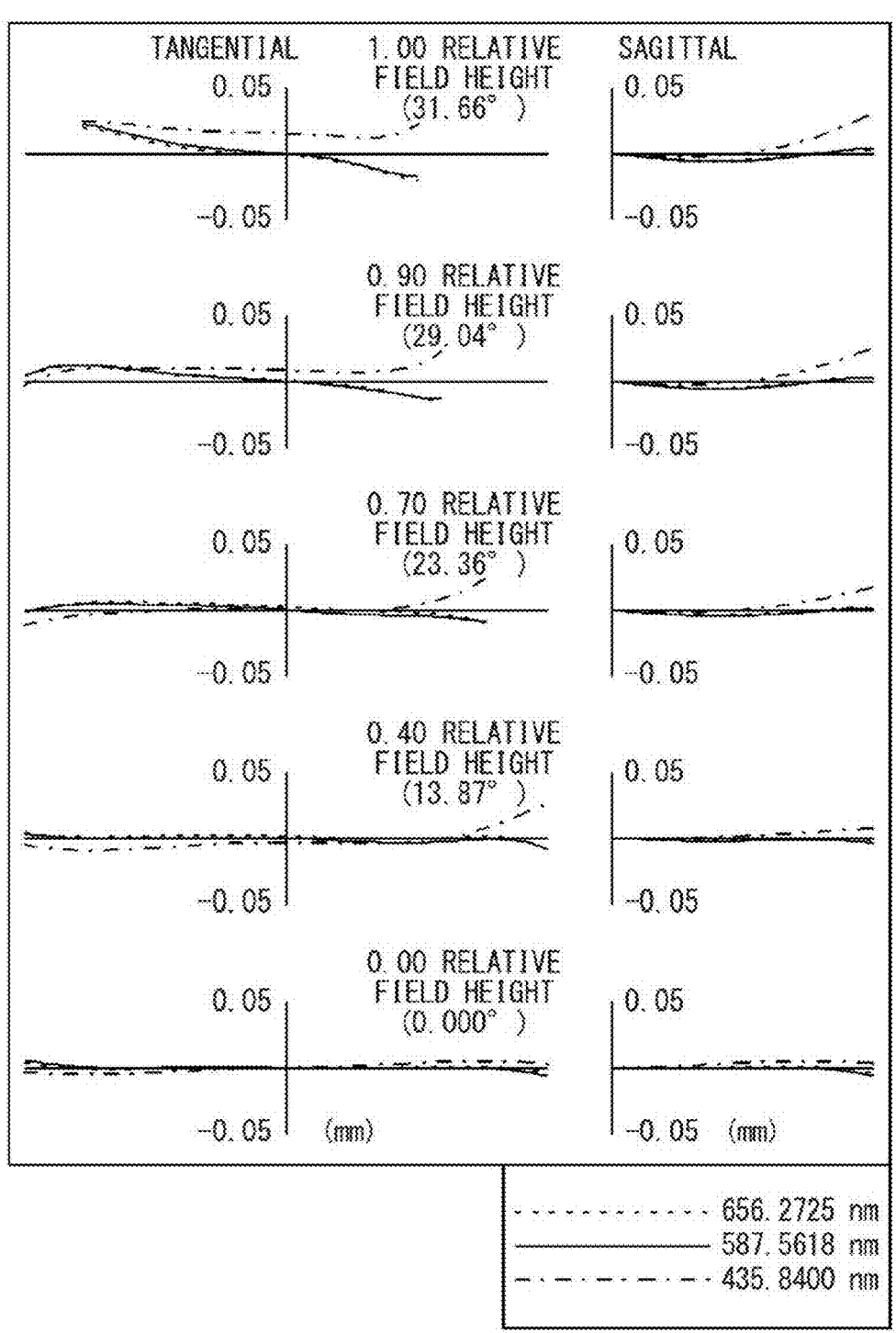
FIG. 74 is an aberration diagram illustrating lateral aberration upon infinity focusing at the intermediate position of the zoom lens according to Example 6.
Figure 75:
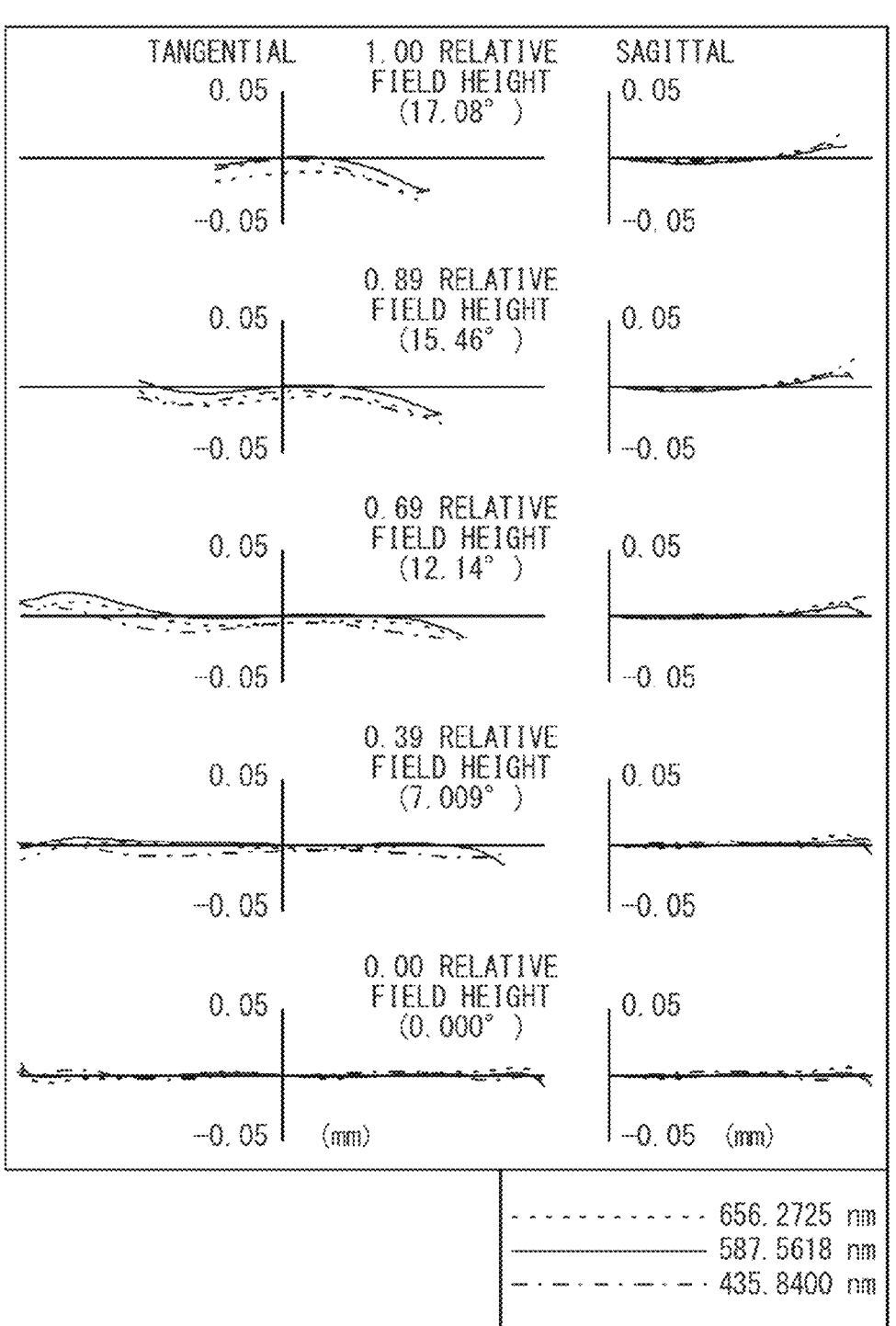
FIG. 75 is an aberration diagram illustrating lateral aberration upon infinity focusing at the telephoto end of the zoom lens according to Example 6.
Figure 76:
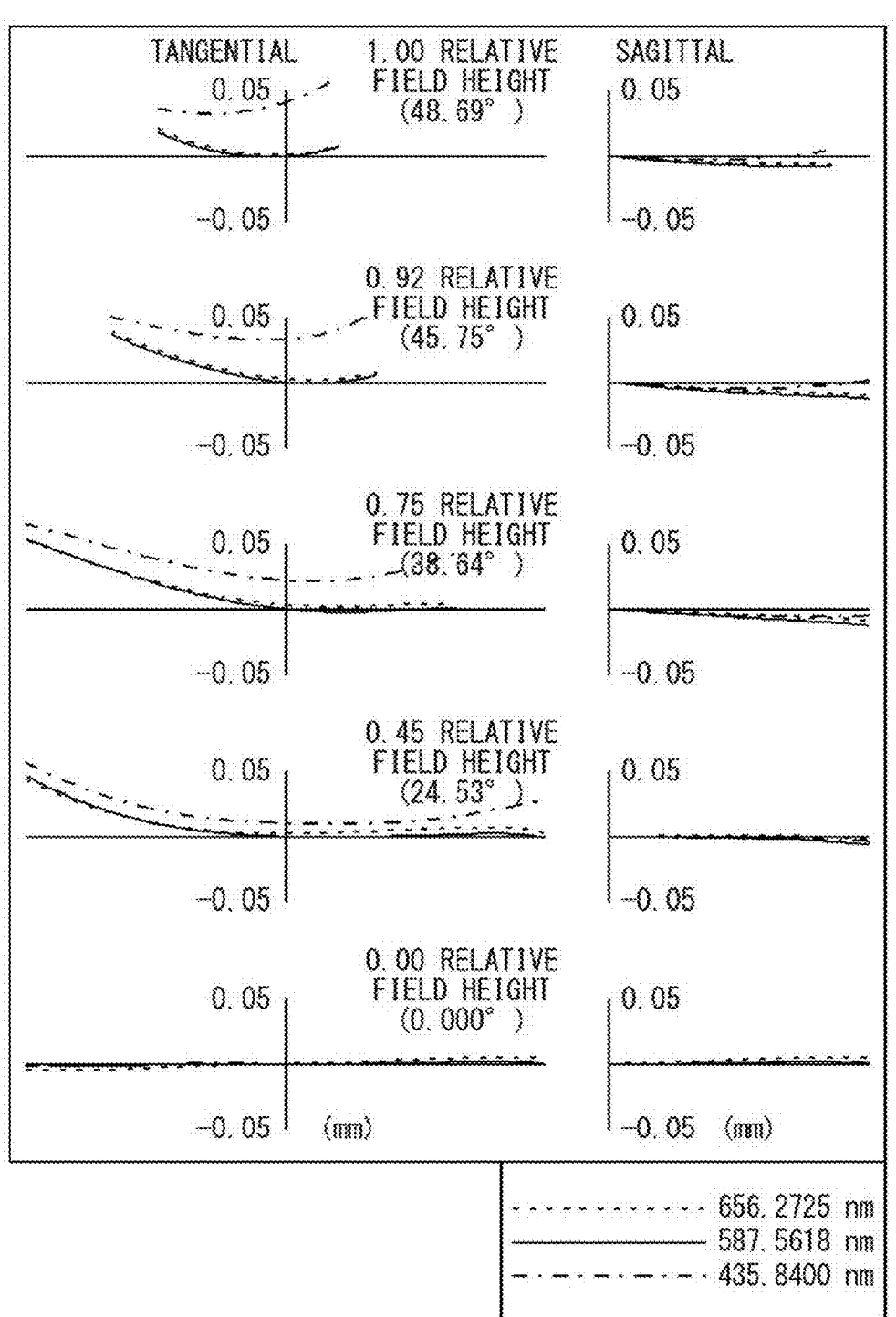
FIG. 76 is an aberration diagram illustrating lateral aberration upon short-distance focusing at the wide-angle end of the zoom lens according to Example 6.
Figure 77:
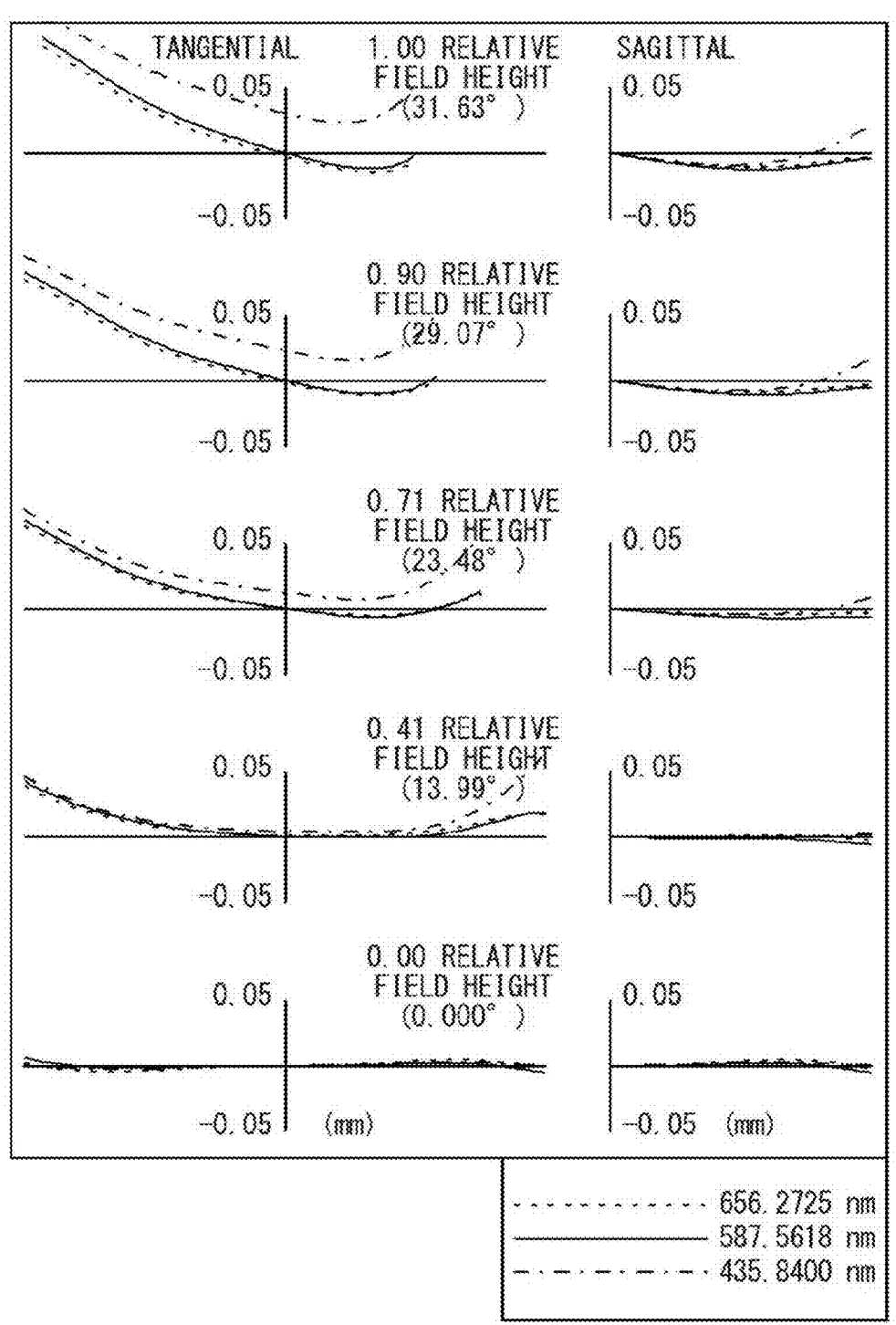
FIG. 77 is an aberration diagram illustrating lateral aberration upon short-distance focusing at the intermediate position of the zoom lens according to Example 6.
Figure 78:
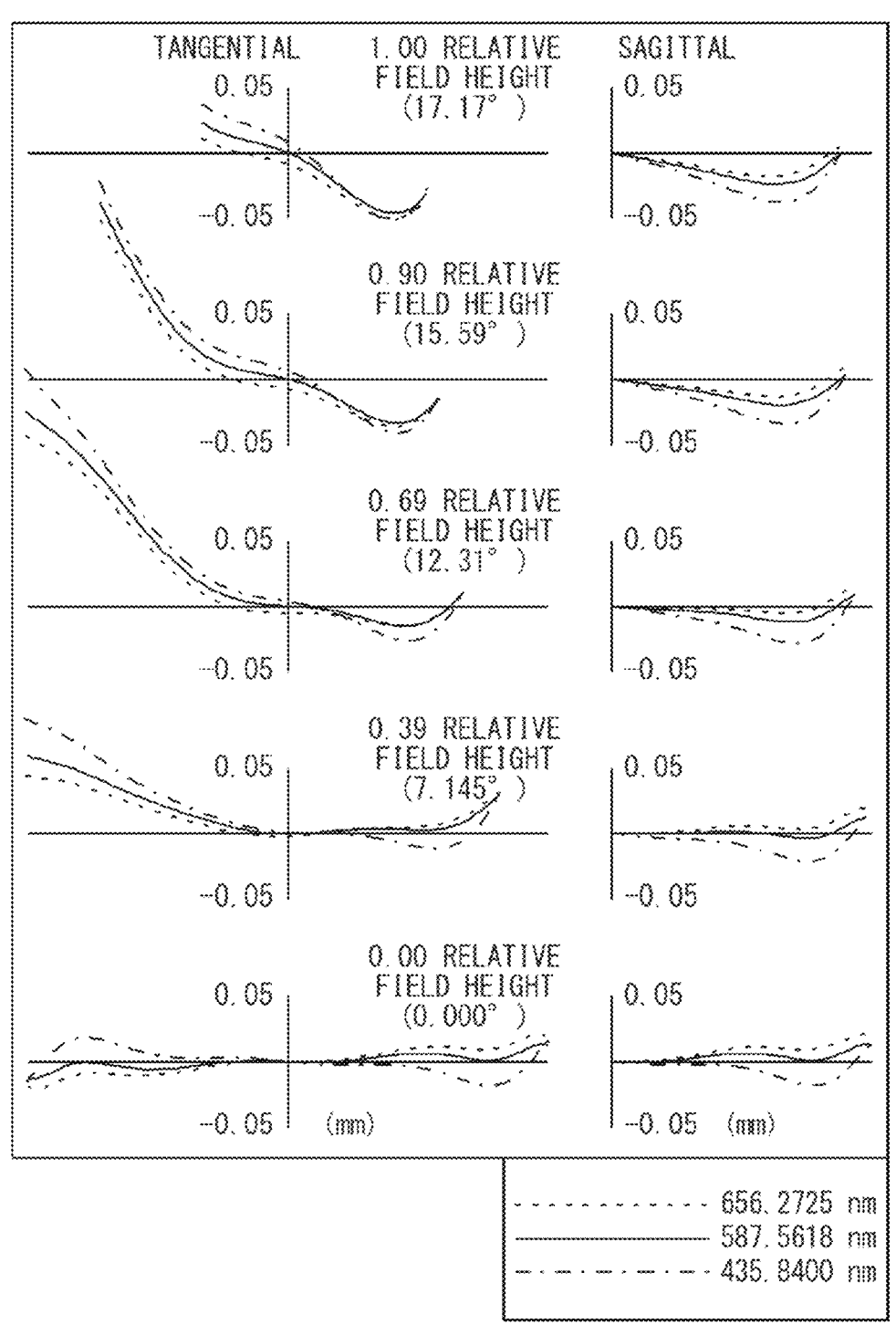
FIG. 78 is an aberration diagram illustrating lateral aberration upon short-distance focusing at the telephoto end of the zoom lens according to Example 6.

FIG. 67 illustrates longitudinal aberration upon infinity focusing at a wide-angle end of the zoom lens 6 according to Example 6. FIG. 68 illustrates longitudinal aberration upon infinity focusing at an intermediate position of the zoom lens 6 according to Example 6. FIG. 69 illustrates longitudinal aberration upon infinity focusing at a telephoto end of the zoom lens 6 according to Example 6. FIG. 70 illustrates longitudinal aberration upon short-distance focusing at the wide-angle end of the zoom lens 6 according to Example 6. FIG. 71 illustrates longitudinal aberration upon short-distance focusing at the intermediate position of the zoom lens 6 according to Example 6. FIG. 72 illustrates longitudinal aberration upon short-distance focusing at the telephoto end of the zoom lens 6 according to Example 6. FIG. 73 illustrates lateral aberration upon infinity focusing at the wide-angle end of the zoom lens 6 according to Example 6. FIG. 74 illustrates lateral aberration upon infinity focusing at the intermediate position of the zoom lens 6 according to Example 6. FIG. 75 illustrates lateral aberration upon infinity focusing at the telephoto end of the zoom lens 6 according to Example 6. FIG. 76 illustrates lateral aberration upon short-distance focusing at the wide-angle end of the zoom lens 6 according to Example 6. FIG. 77 illustrates lateral aberration upon short-distance focusing at the intermediate position of the zoom lens 6 according to Example 6. FIG. 78 illustrates lateral aberration upon short-distance focusing at the telephoto end of the zoom lens 6 according to Example 6.

As appreciated from each of the aberration diagrams, the zoom lens 6 according to Example 6 undergoes favorable correction of various aberrations, and thus has superior image-forming performance.

Example 7

Table 31 exhibits basic lens data of the zoom lens 7 according to Example 7 illustrated in FIG. 79. Table 32 exhibits values of the focal distance f of the total system, the F-value, the total angle of view 2c, the image height Y, and the total optical length L in the zoom lens 7 according to Example 7. Table 33 exhibits data on a surface interval that is variable upon zooming and focusing in the zoom lens 7 according to Example 7. It is to be noted that Table 32 exhibits values for each of the wide-angle end (Wide), the intermediate position (Mid), and the telephoto end (Tele) in a case where the object distance (d0) is infinity. Table 33 exhibits values for each of the wide-angle end (Wide), the intermediate position (Mid), and the telephoto end (Tele) in the case where the object distance (d0) is infinity and in a case where the object distance (d0) is a short distance. Table 34 exhibits values of coefficients indicating shapes of aspherical surfaces in the zoom lens 7 according to Example 7. Table 35 exhibits a starting surface and a focal distance (unit: mm) of each of lens groups of the zoom lens 7 according to Example 7.

The zoom lens 7 according to Example 7 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 7 according to Example 7 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a concave surface opposed to the object side. The lens L23 is a positive lens of a biconvex shape. The lens L24 is a negative meniscus lens with a concave surface opposed to the object side.

The third lens group G3 includes the lens L31. The lens L31 is a positive meniscus lens including an aspherical surface on both sides, with a convex surface opposed to the object side.

The fourth lens group G4 includes the lenses L41 to L45 in order from the object side toward the image plane side. The lens L41 is a negative meniscus lens with a convex surface opposed to the object side. The lens L42 is a positive meniscus lens with a convex surface opposed to the object side. The lens L41 and the lens L42 constitute a cemented lens in which the lens L41 and the lens L42 are attached to each other. The lens L43 is a negative lens of a biconcave shape. The lens 44 is a positive lens of a biconvex shape. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61. The lens L61 is a negative meniscus lens with a concave surface opposed to the object side.

The above-described configuration allows for achievement of a zoom lens having a high variable magnification ratio while covering a wide-angle region despite a

TABLE 31

| | | | Example 7 | | |
|---|---|---|---|---|---|
| Si | ri | di | ndi | νdi | φi |
| 0 (OBJ) | | (d0) | | | |
| 1 | 69.298 | 1.70 | 1.94595 | 18.0 | 52.40 |
| 2 | 57.006 | 7.45 | 1.64000 | 60.2 | 50.79 |
| 3 | 835.904 | (d3) | | | 49.74 |
| 4 | 312.067 | 1.30 | 1.77250 | 49.6 | 33.24 |
| 5 | 14.700 | 7.95 | | | 23.76 |
| 6 (ASP) | −59.488 | 1.30 | 1.85135 | 40.1 | 23.10 |
| 7 (ASP) | −500.000 | 0.20 | | | 22.78 |
| 8 | 67.968 | 3.51 | 1.85478 | 24.8 | 22.00 |

TABLE 33

| | | Example 7 • Variable Data | | | | |
|---|---|---|---|---|---|---|
| | Wide | Mid | Tele | Wide | Mid | Tele |
| d0 | ∞ | ∞ | ∞ | 299 mm | 299 mm | 292 mm |
| d3 | 0.80 | 13.00 | 32.49 | 0.80 | 13.00 | 32.49 |
| d11 | 19.24 | 9.31 | 2.00 | 19.24 | 9.31 | 2.00 |
| d14 | 8.01 | 4.74 | 2.93 | 8.01 | 4.74 | 2.93 |
| d22 | 3.44 | 2.34 | 2.30 | 4.44 | 4.09 | 6.20 |
| d26 | 13.92 | 18.29 | 20.14 | 12.93 | 16.55 | 16.24 |
| d28 | 14.51 | 24.53 | 39.01 | 14.51 | 24.53 | 39.01 |

TABLE 34

| | | | Example 7•Aspherical Data | | | |
|---|---|---|---|---|---|---|
| Si | k | A4 | A6 | A8 | A10 | A12 |
| 6 | 0.00000E+00 | 4.02380E−05 | −3.17228E−07 | 1.41243E−09 | −3.91512E−12 | 0.00000E+00 |
| 7 | 0.00000E+00 | 2.24112E−05 | −3.19988E−07 | 1.16417E−09 | −3.60639E−12 | 0.00000E+00 |
| 13 | 0.00000E+00 | −1.25167E−05 | 4.26745E−08 | 5.22711E−12 | 0.00000E+00 | 0.00000E+00 |
| 14 | 0.00000E+00 | −4.80651E−06 | 5.00659E−08 | 1.84170E−10 | −2.21615E−13 | 0.00000E+00 |
| 21 | 0.00000E+00 | −3.09834E−05 | 4.05707E−09 | −9.65635E−11 | 0.00000E+00 | 0.00000E+00 |
| 22 | 0.00000E+00 | 2.05093E−05 | −4.07156E−08 | −1.75395E−10 | 0.00000E+00 | 0.00000E+00 |
| 25 | 0.00000E+00 | 7.06252E−06 | −1.27692E−07 | 2.43130E−10 | 0.00000E+00 | 0.00000E+00 |
| 26 | 0.00000E+00 | 1.29028E−05 | −1.06178E−07 | 2.17290E−10 | 0.00000E+00 | 0.00000E+00 |

TABLE 31-continued

| | | | Example 7 | | |
|---|---|---|---|---|---|
| Si | ri | di | ndi | νdi | φi |
| 9 | −55.349 | 1.47 | | | 21.28 |
| 10 | −26.244 | 1.00 | 1.61997 | 63.9 | 20.68 |
| 11 | −98.154 | (d11) | | | 19.80 |
| 12 (STO) | ∞ | 1.50 | | | 18.54 |
| 13 (ASP) | 27.610 | 4.26 | 1.69350 | 53.2 | 20.16 |
| 14 (ASP) | 72.458 | (d14) | | | 20.05 |
| 15 | 21.103 | 1.50 | 1.93486 | 33.3 | 20.90 |
| 16 | 13.928 | 5.25 | 1.49700 | 81.6 | 19.65 |
| 17 | 80.672 | 2.25 | | | 19.57 |
| 18 | −71.782 | 1.00 | 1.87267 | 26.4 | 19.62 |
| 19 | 158.656 | 2.47 | 1.56354 | 52.5 | 19.94 |
| 20 | −55.238 | 0.26 | | | 20.20 |
| 21 (ASP) | 27.854 | 5.90 | 1.49710 | 81.6 | 20.63 |
| 22 (ASP) | −22.458 | (d22) | | | 20.50 |
| 23 | −55.316 | 1.63 | 1.94595 | 18.0 | 20.60 |
| 24 | −36.692 | 1.22 | | | 20.81 |
| 25 (ASP) | −81.287 | 1.00 | 1.76802 | 49.2 | 20.43 |
| 26 (ASP) | 32.006 | (d26) | | | 20.55 |
| 27 | −62.487 | 1.00 | 1.84666 | 23.8 | 27.32 |
| 28 | −83.559 | (d28) | | | 27.99 |
| 29 (IMG) | ∞ | 0.00 | | | 43.37 |

TABLE 32

| | Example 7 (Zoom Ratio: 3.30) | | |
|---|---|---|---|
| | Wide | Mid | Tele |
| f (mm) | 20.61 | 36.05 | 67.91 |
| Fno | 4.12 | 4.12 | 4.12 |
| 2ω (°) | 87.64 | 61.91 | 35.30 |
| Y (mm) | 19.78 | 21.63 | 21.61 |
| L (mm | 115.05 | 127.34 | 153.99 |

TABLE 35

| | Example 7 | |
|---|---|---|
| Lens Group | Starting Surface | Focal Distance |
| G1 | 1 | 131.23 |
| G2 | 4 | −19.07 |
| G3 | 13 | 61.91 |
| G4 | 15 | 25.49 |
| G5 | 23 | −40.80 |
| G6 | 27 | −299.18 |

Figure 80:
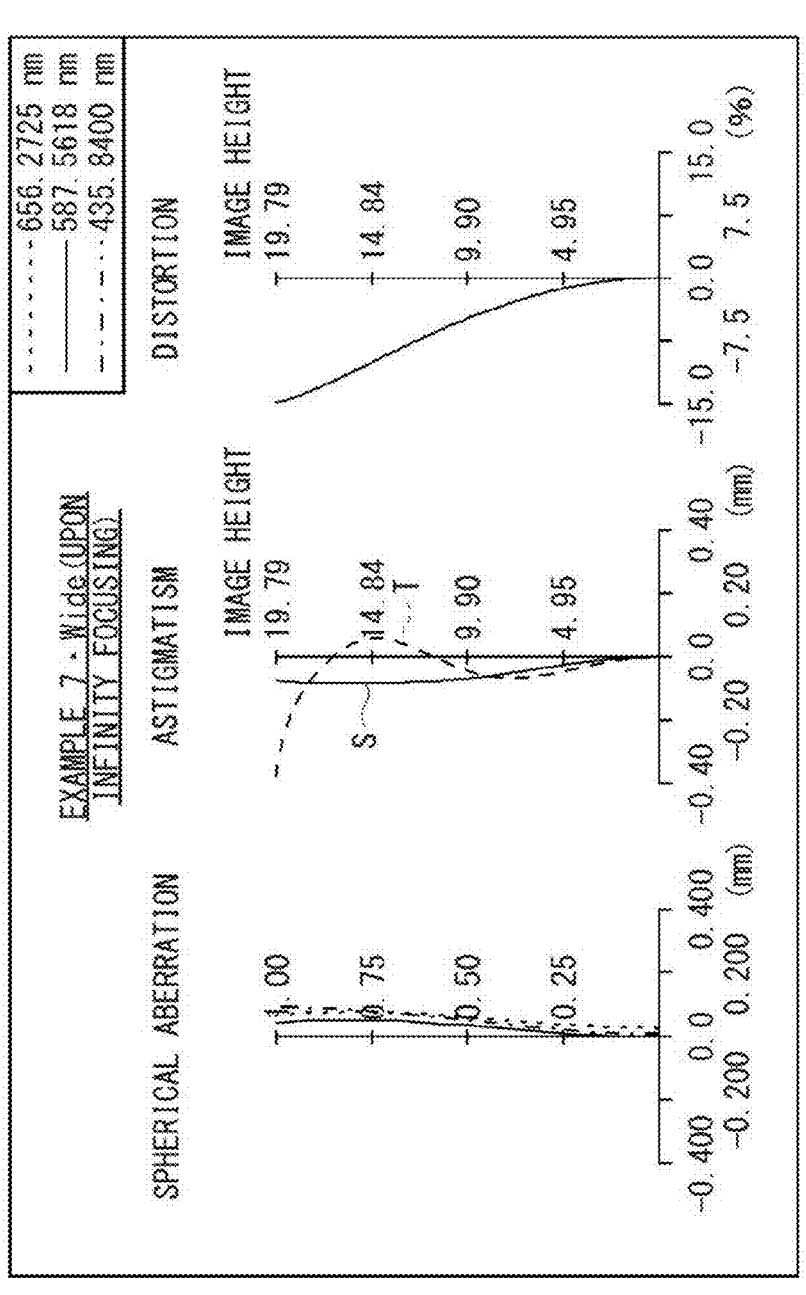
FIG. 80 is an aberration diagram illustrating longitudinal aberration upon infinity focusing at a wide-angle end of the zoom lens according to Example 7.
Figure 81:
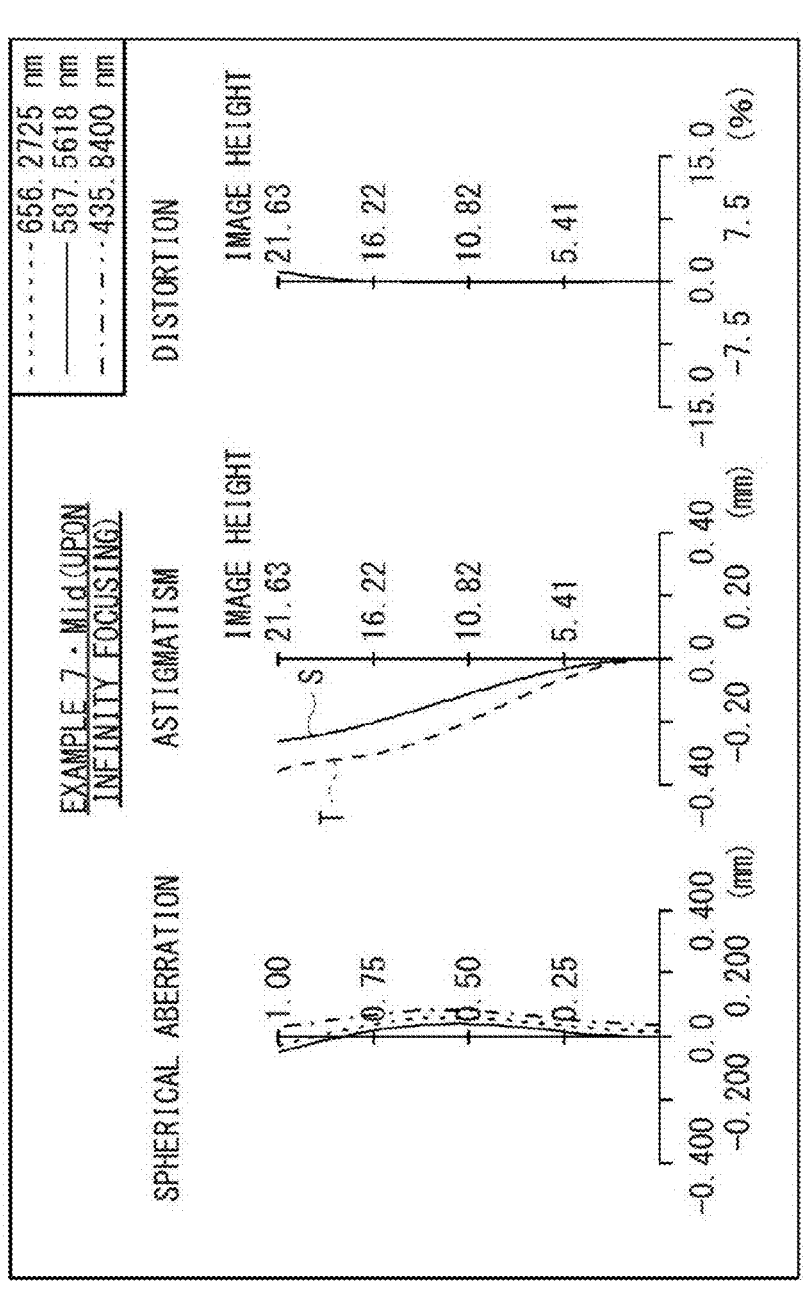
FIG. 81 is an aberration diagram illustrating longitudinal aberration upon infinity focusing at an intermediate position of the zoom lens according to Example 7.
Figure 82:
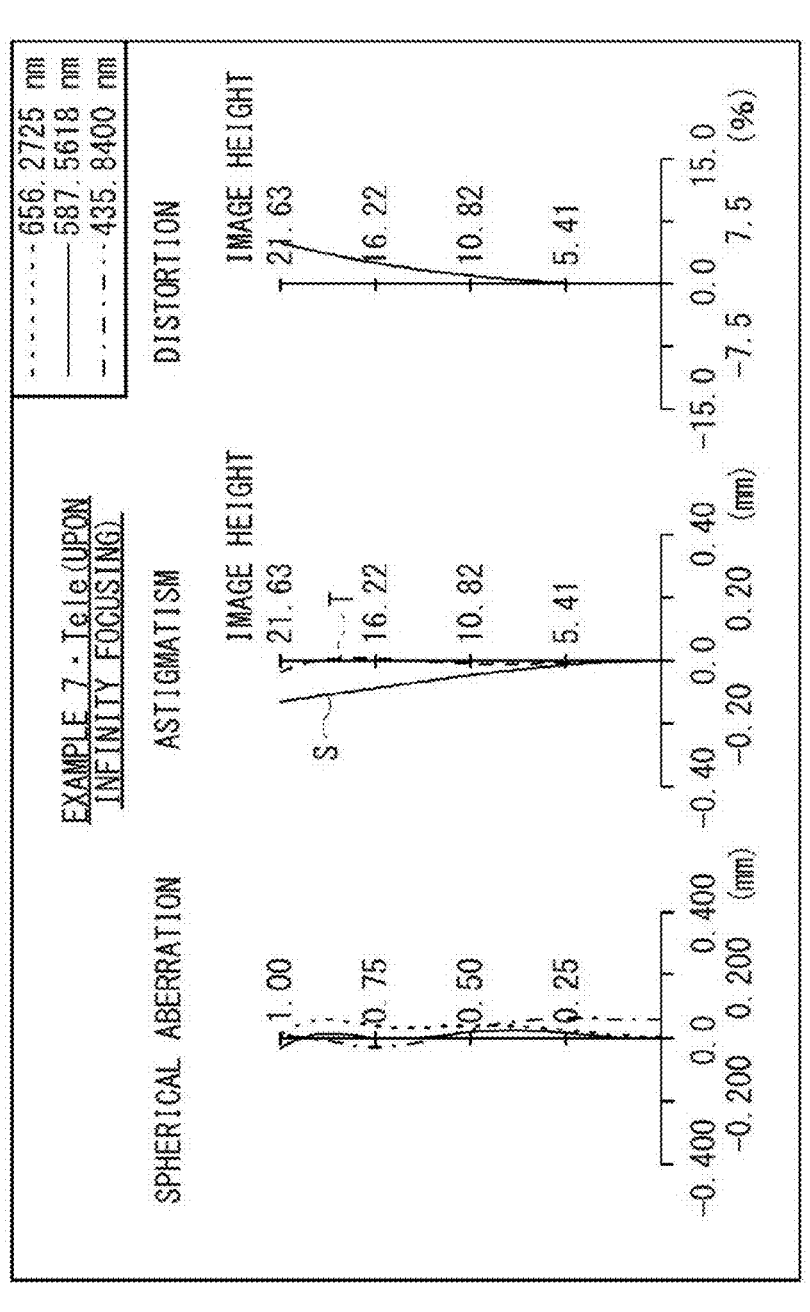
FIG. 82 is an aberration diagram illustrating longitudinal aberration upon infinity focusing at a telephoto end of the zoom lens according to Example 7.
Figure 83:
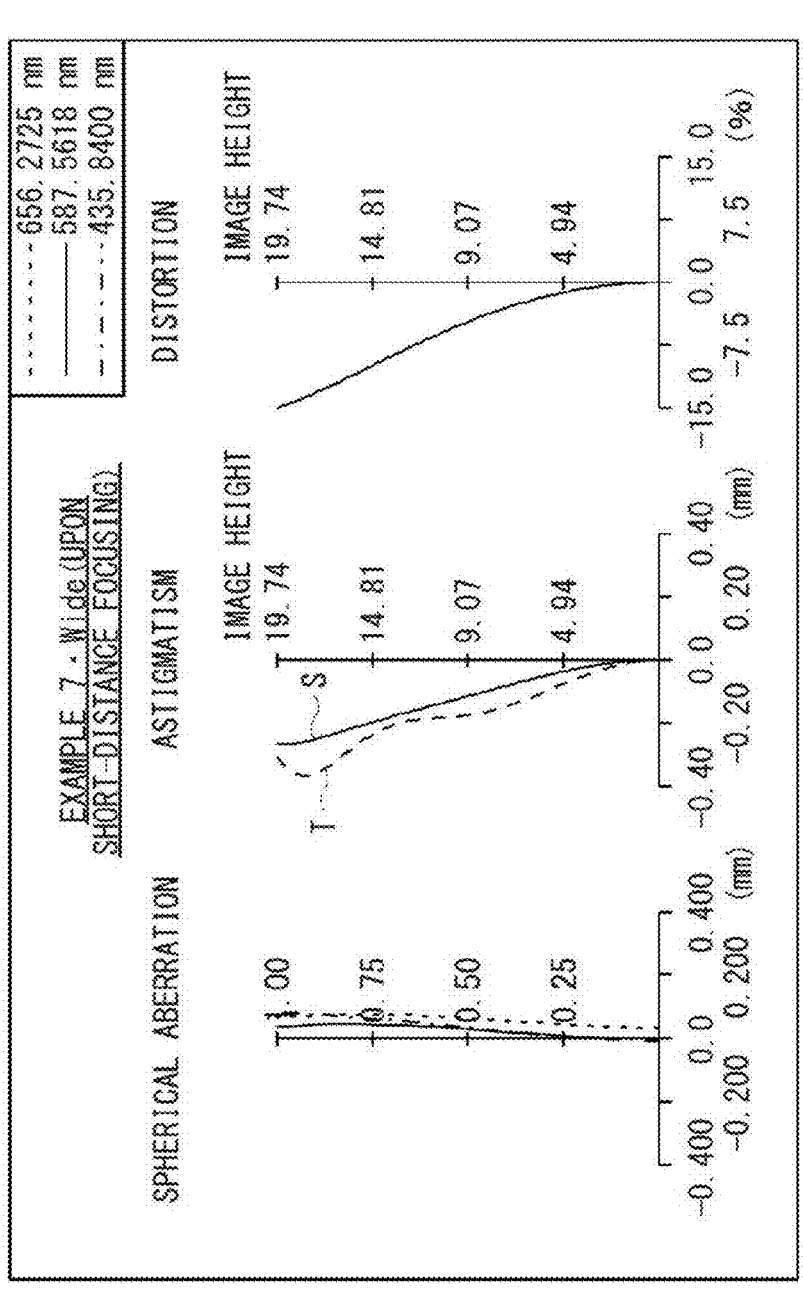
FIG. 83 is an aberration diagram illustrating longitudinal aberration upon short-distance focusing at the wide-angle end of the zoom lens according to Example 7.
Figure 84:
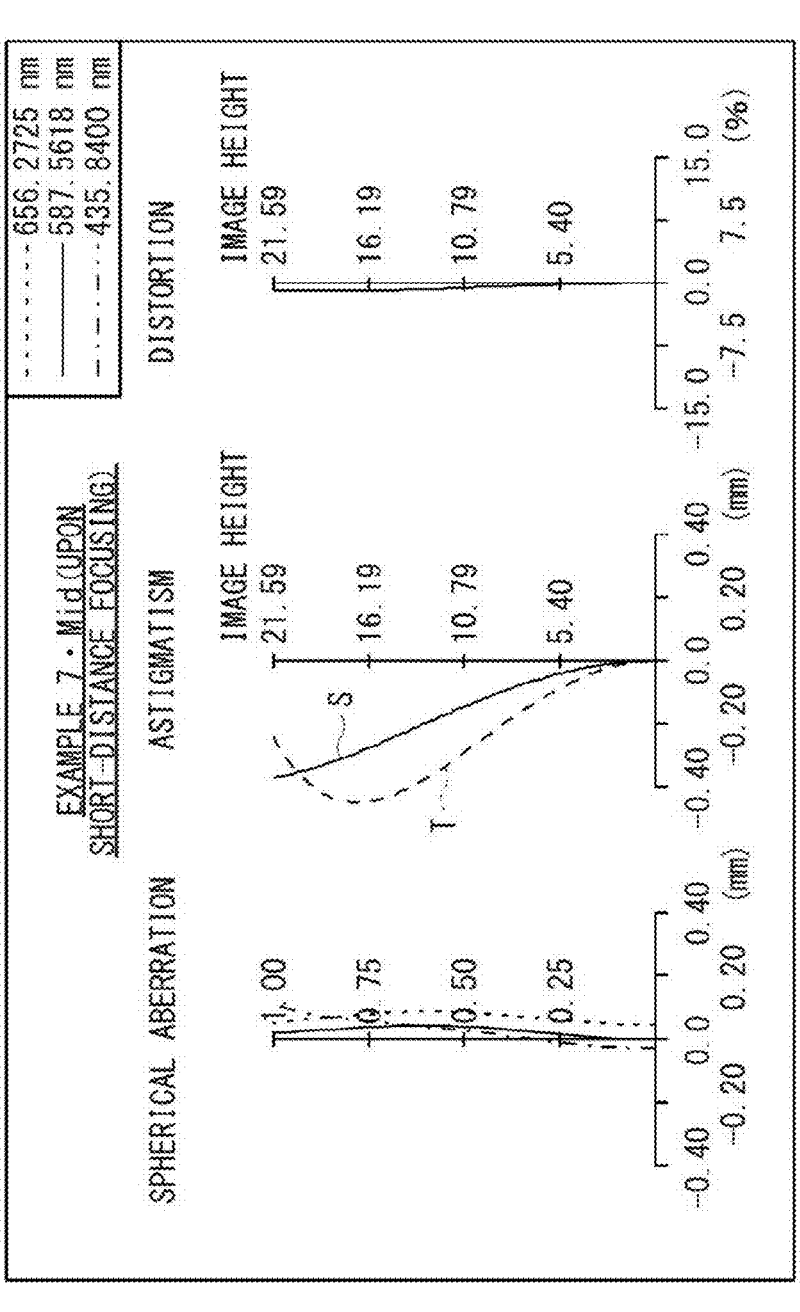
FIG. 84 is an aberration diagram illustrating longitudinal aberration upon short-distance focusing at the intermediate position of the zoom lens according to Example 7.
Figure 85:
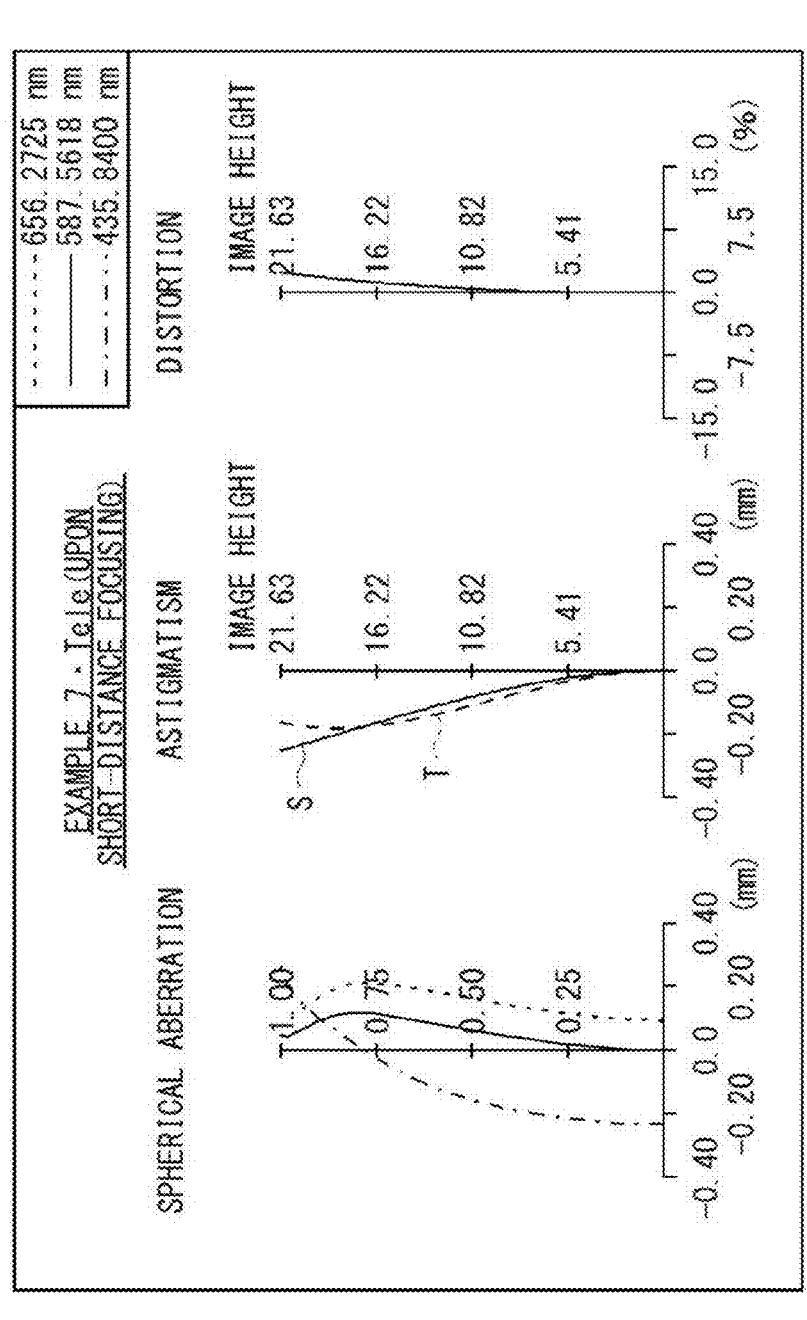
FIG. 85 is an aberration diagram illustrating longitudinal aberration upon short-distance focusing at the telephoto end of the zoom lens according to Example 7.
Figure 86:
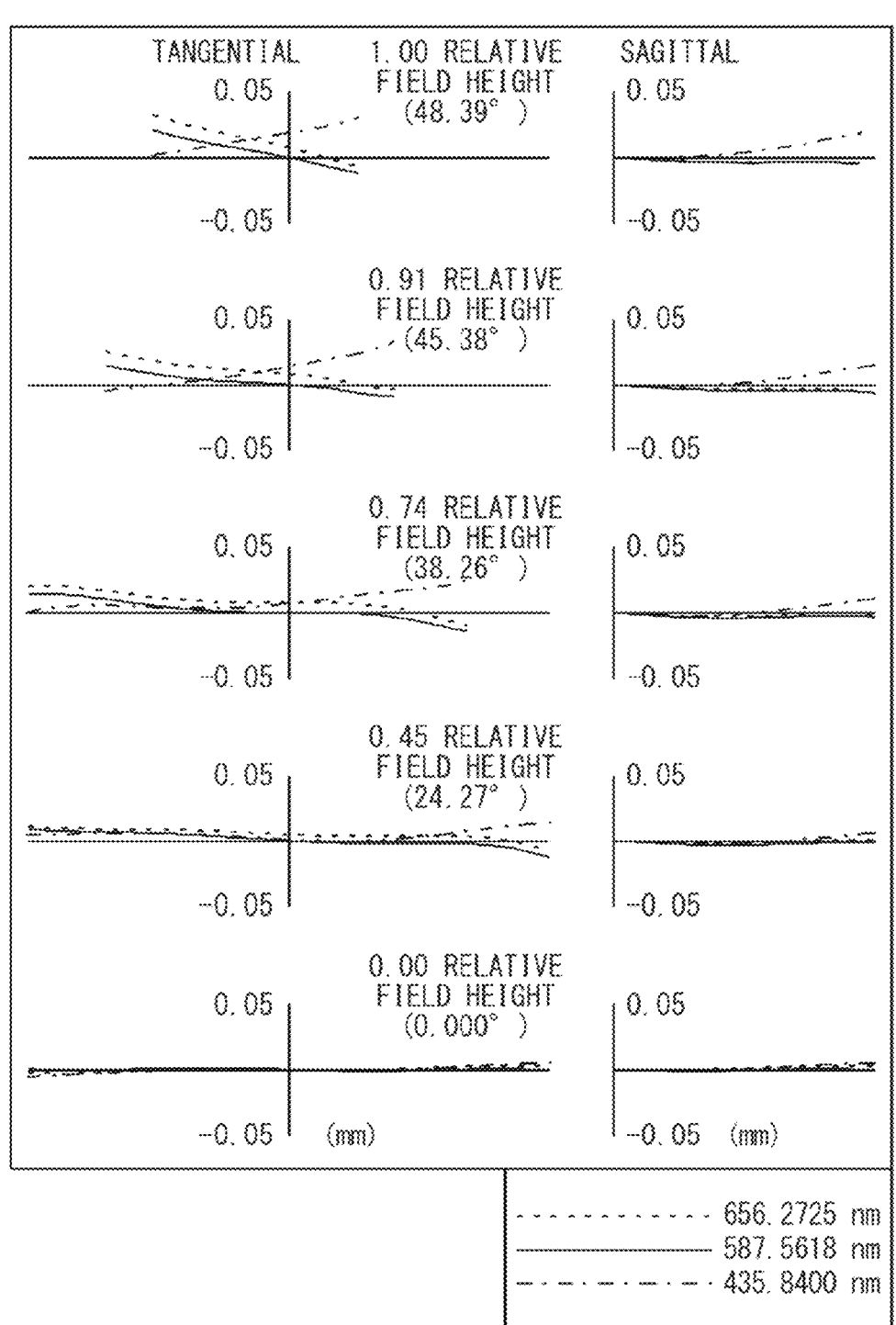
FIG. 86 is an aberration diagram illustrating lateral aberration upon infinity focusing at the wide-angle end of the zoom lens according to Example 7.
Figure 87:
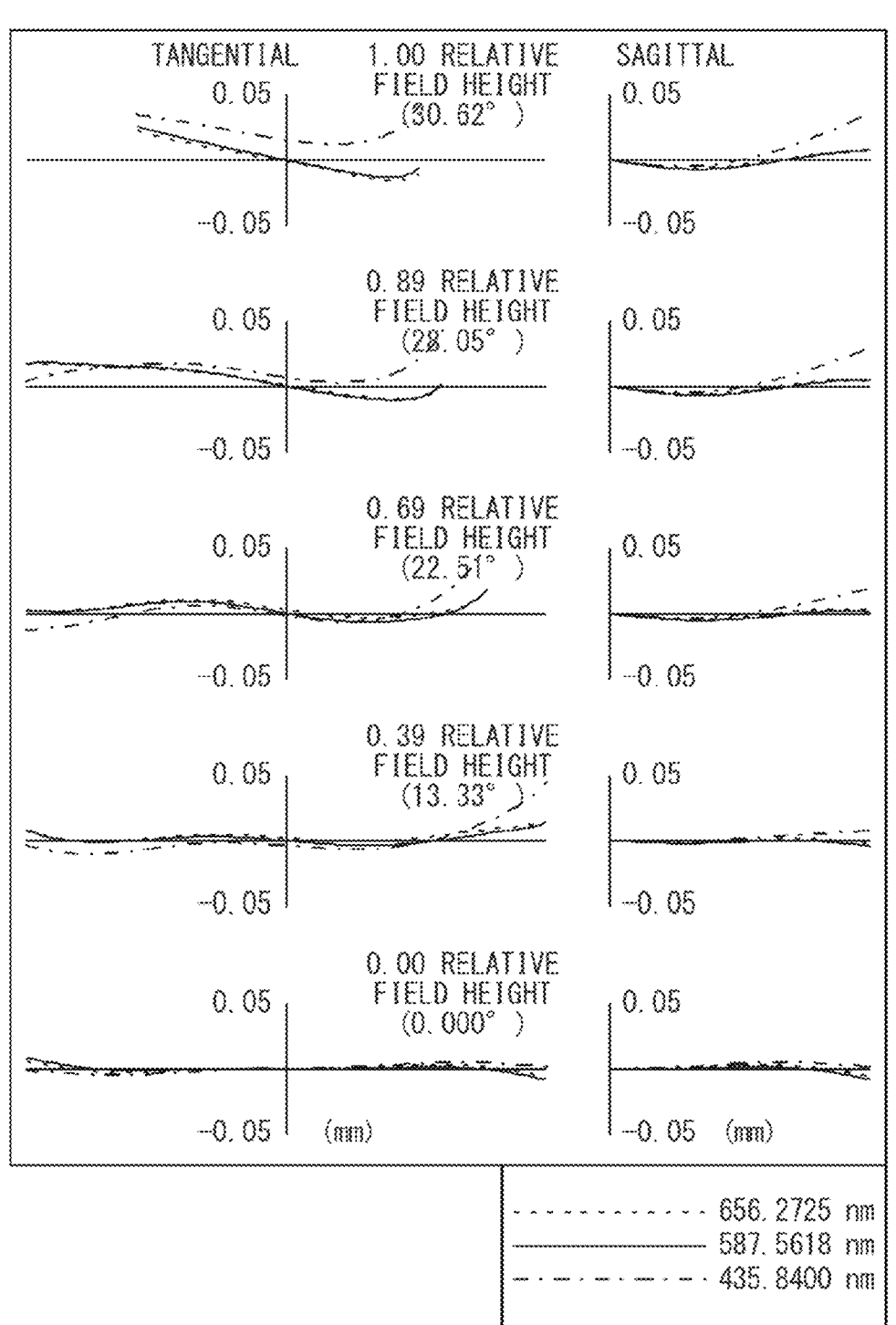
FIG. 87 is an aberration diagram illustrating lateral aberration upon infinity focusing at the intermediate position of the zoom lens according to Example 7.
Figure 88:
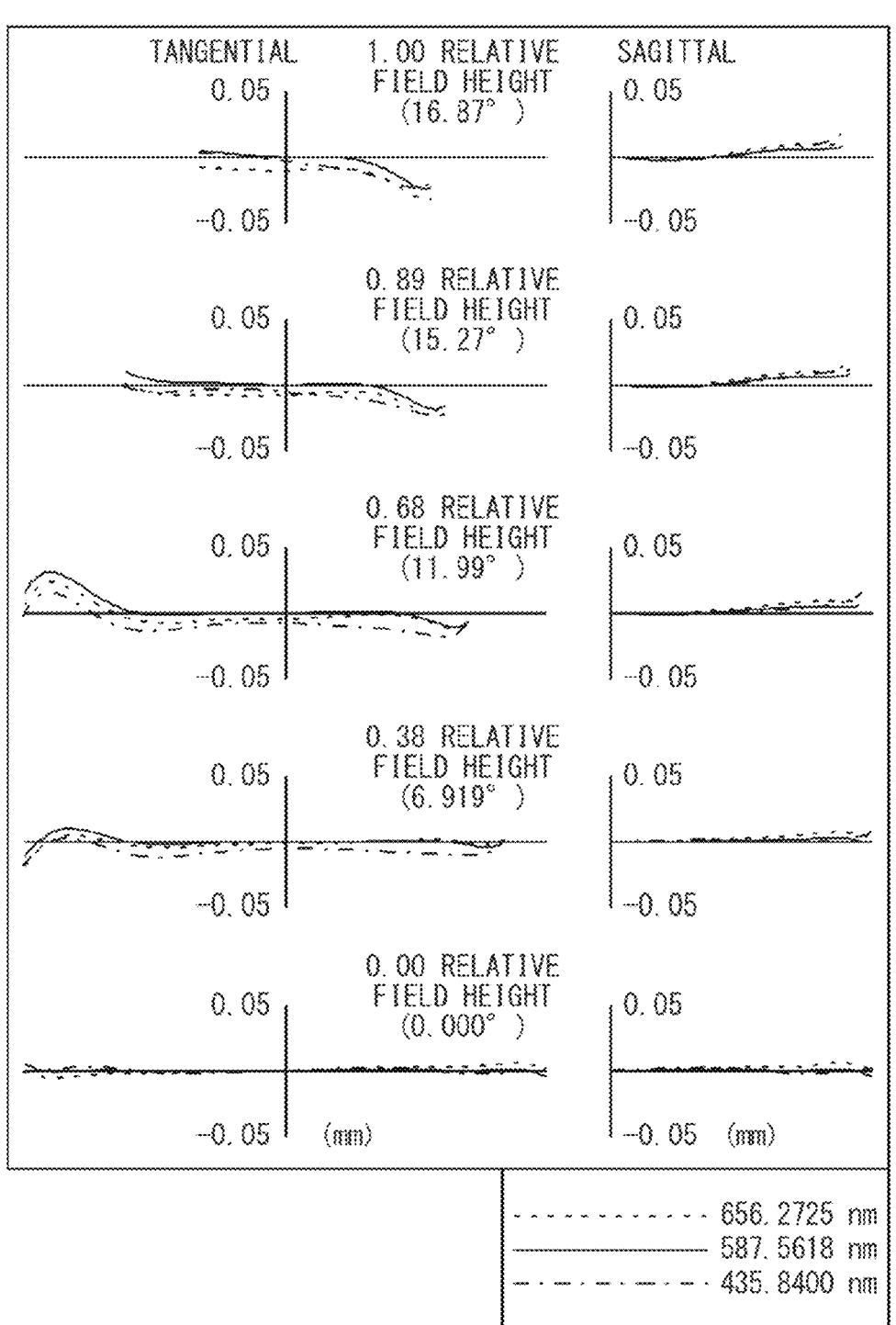
FIG. 88 is an aberration diagram illustrating lateral aberration upon infinity focusing at the telephoto end of the zoom lens according to Example 7.
Figure 89:
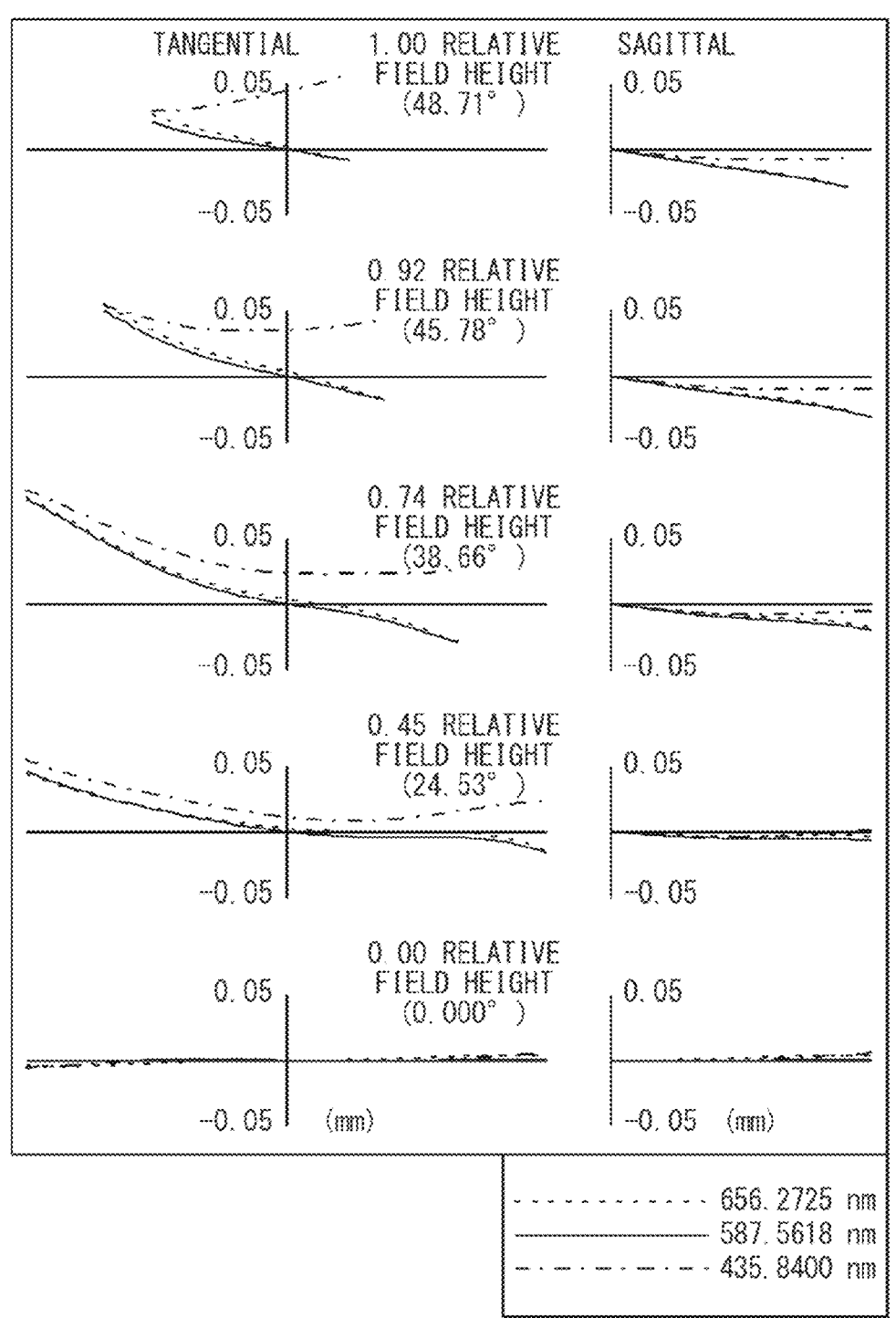
FIG. 89 is an aberration diagram illustrating lateral aberration upon short-distance focusing at the wide-angle end of the zoom lens according to Example 7.
Figure 90:
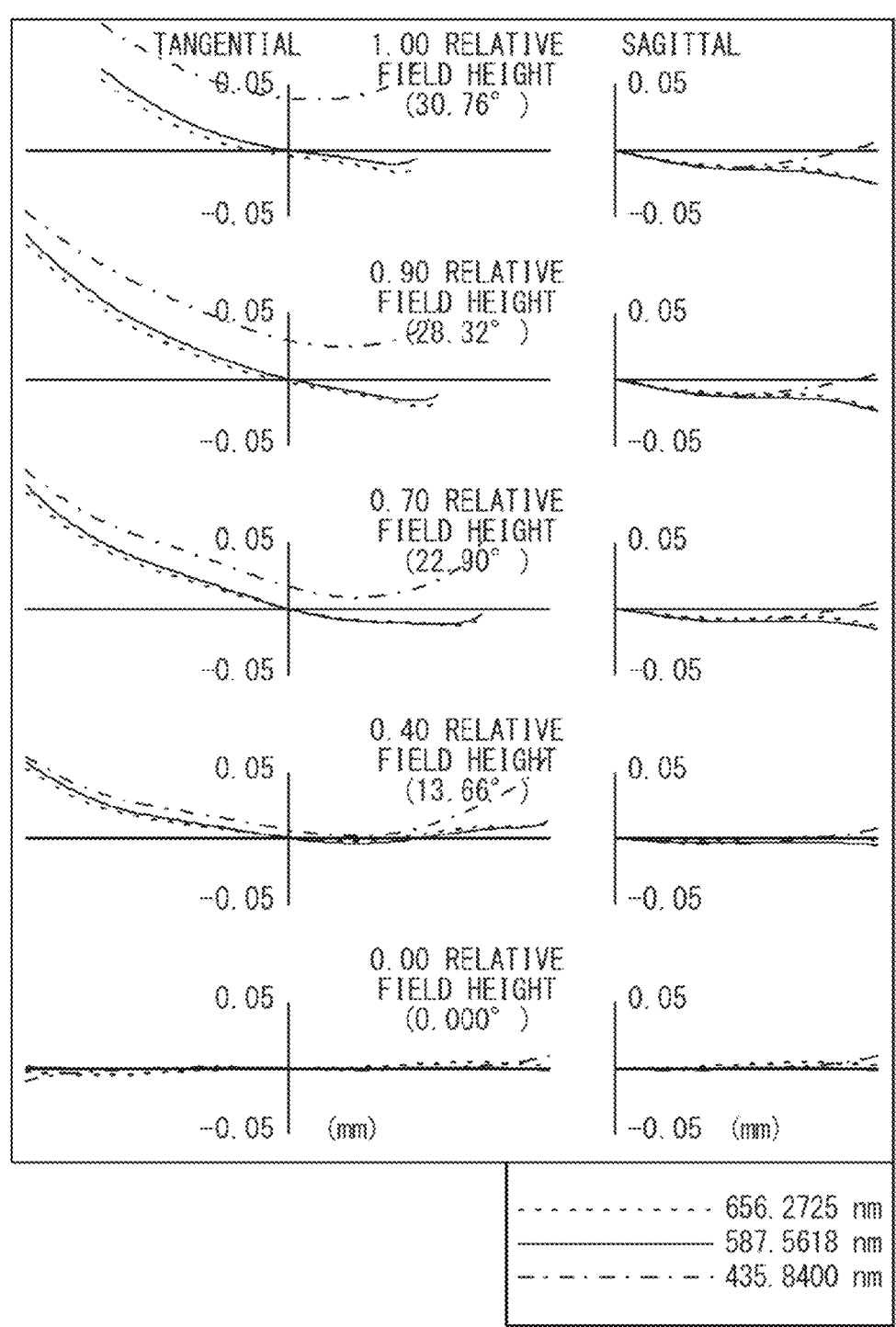
FIG. 90 is an aberration diagram illustrating lateral aberration upon short-distance focusing at the intermediate position of the zoom lens according to Example 7.
Figure 91:
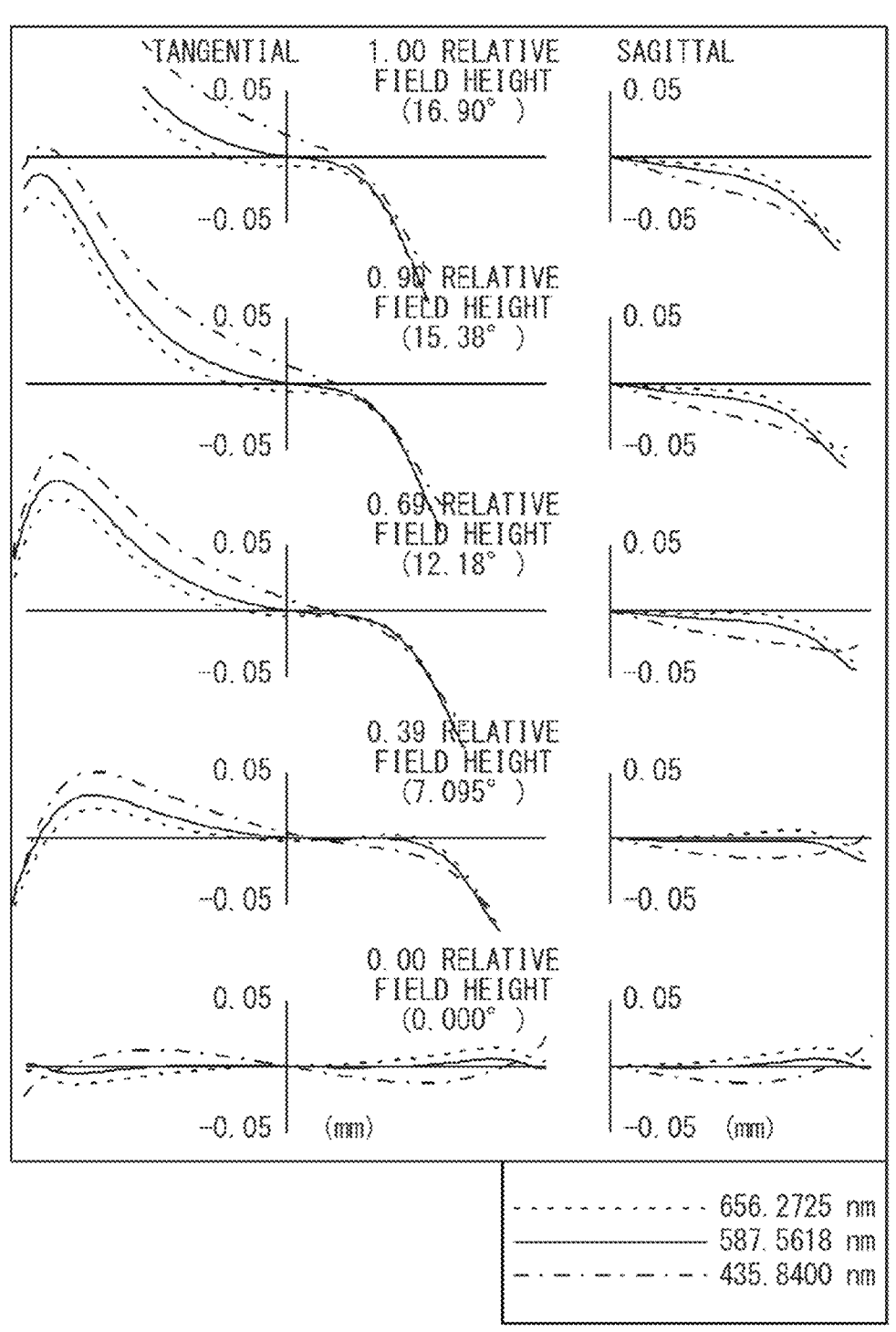
FIG. 91 is an aberration diagram illustrating lateral aberration upon short-distance focusing at the telephoto end of the zoom lens according to Example 7.

FIG. 80 illustrates longitudinal aberration upon infinity focusing at a wide-angle end of the zoom lens 7 according to Example 7. FIG. 81 illustrates longitudinal aberration upon infinity focusing at an intermediate position of the zoom lens 7 according to Example 7. FIG. 82 illustrates longitudinal aberration upon infinity focusing at a telephoto end of the zoom lens 7 according to Example 7. FIG. 83 illustrates longitudinal aberration upon short-distance focusing at the wide-angle end of the zoom lens 7 according to Example 7. FIG. 84 illustrates longitudinal aberration upon short-distance focusing at the intermediate position of the zoom lens 7 according to Example 7. FIG. 85 illustrates longitudinal aberration upon short-distance focusing at the telephoto end of the zoom lens 7 according to Example 7. FIG. 86 illustrates lateral aberration upon infinity focusing at the wide-angle end of the zoom lens 7 according to Example 7. FIG. 87 illustrates lateral aberration upon infinity focusing at the intermediate position of the zoom lens 7 according to Example 7. FIG. 88 illustrates lateral aberration upon infinity focusing at the telephoto end of the zoom lens 7 according to Example 7. FIG. 89 illustrates lateral aberration upon short-distance focusing at the wide-angle end of the zoom lens 7 according to Example 7. FIG. 90 illustrates lateral aberration upon short-distance focusing at the intermediate position of the zoom lens 7 according to Example 7. FIG. 91 illustrates lateral aberration upon short-distance focusing at the telephoto end of the zoom lens 7 according to Example 7.

As appreciated from each of the aberration diagrams, the zoom lens 7 according to Example 7 undergoes favorable correction of various aberrations, and thus has superior image-forming performance.

Example 8

Table 36 exhibits basic lens data of the zoom lens 8 according to Example 8 illustrated in FIG. 92. Table 37 exhibits values of the focal distance f of the total system, the F-value, the total angle of view 2c, the image height Y, and the total optical length L in the zoom lens 8 according to Example 8. Table 38 exhibits data on a surface interval that is variable upon zooming and focusing in the zoom lens 8 according to Example 8. It is to be noted that Table 37 exhibits values for each of the wide-angle end (Wide), the intermediate position (Mid), and the telephoto end (Tele) in a case where the object distance (d0) is infinity. Table 38 exhibits values for each of the wide-angle end (Wide), the intermediate position (Mid), and the telephoto end (Tele) in the case where the object distance (d0) is infinity and in a case where the object distance (d0) is a short distance. Table 39 exhibits values of coefficients indicating shapes of aspherical surfaces in the zoom lens 8 according to Example 8. Table 40 exhibits a starting surface and a focal distance (unit: mm) of each of lens groups of the zoom lens 8 according to Example 8.

The zoom lens 8 according to Example 8 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 8 according to Example 8 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a concave surface opposed to the object side. The lens L23 is a positive lens of a biconvex shape. The lens L24 is a negative meniscus lens with a concave surface opposed to the object side.

The third lens group G3 includes the lens L31. The lens L31 is a positive meniscus lens including an aspherical surface on both sides, with a convex surface opposed to the object side.

The fourth lens group G4 includes the lenses L41 to L45 in order from the object side toward the image plane side. The lens L41 is a negative meniscus lens with a convex surface opposed to the object side. The lens L42 is a positive lens of a biconvex shape. The lens L41 and the lens L42 constitute a cemented lens in which the lens L41 and the lens L42 are attached to each other. The lens L43 is a positive meniscus lens with a concave surface opposed to the object side. The lens L44 is a negative meniscus lens with a concave surface opposed to the object side. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61 and the lens L62 in order from the object side toward the image plane side. The lens L61 is a positive lens of a biconvex shape. The lens L62 is a negative meniscus lens with a concave surface opposed to the object side.

The above-described configuration allows for achievement of a zoom lens having a high variable magnification ratio while covering a wide-angle region despite a miniaturized optical system.

TABLE 36

| | | Example 8 | | | |
|---|---|---|---|---|---|
| Si | ri | di | ndi | νdi | φi |
| 0 (OBJ) | | (d0) | | | |
| 1 | 64.762 | 1.70 | 1.94595 | 18.0 | 52.40 |
| 2 | 55.331 | 7.50 | 1.59282 | 68.6 | 50.82 |
| 3 | 760.618 | (d3) | | | 49.78 |
| 4 | 183.794 | 1.30 | 1.77250 | 49.6 | 32.88 |
| 5 | 14.722 | 8.42 | | | 23.55 |
| 6 (ASP) | −47.619 | 1.30 | 1.85155 | 40.1 | 22.47 |
| 7 (ASP) | −704.225 | 0.20 | | | 22.08 |
| 8 | 86.286 | 3.96 | 1.85478 | 24.8 | 21.48 |
| 9 | −45.020 | 1.49 | | | 20.62 |
| 10 | −23.082 | 1.00 | 1.59282 | 68.6 | 19.97 |
| 11 | −65.076 | (d11) | | | 19.20 |
| 12 (STO) | ∞ | 1.50 | | | 18.87 |
| 13 (ASP) | 28.485 | 3.87 | 1.69350 | 53.2 | 20.63 |
| 14 (ASP) | 105.907 | (d14) | | | 20.39 |
| 15 | 23.941 | 1.39 | 1.95375 | 32.3 | 20.76 |
| 16 | 14.925 | 5.50 | 1.49700 | 81.6 | 19.69 |
| 17 | −1850.404 | 4.88 | | | 19.69 |
| 18 | −106.096 | 2.64 | 1.60342 | 38.0 | 19.73 |
| 19 | −27.492 | 1.00 | 1.85451 | 25.2 | 19.84 |
| 20 | −82.109 | 0.30 | | | 20.24 |
| 21 (ASP) | 42.022 | 5.90 | 1.49700 | 81.5 | 20.47 |
| 22 (ASP) | −20.182 | (d22) | | | 20.40 |
| 23 | −46.070 | 1.80 | 1.94595 | 18.0 | 20.77 |
| 24 | −31.379 | 1.16 | | | 21.07 |
| 25 (ASP) | −44.196 | 1.00 | 1.77002 | 49.4 | 20.77 |
| 26 (ASP) | 43.227 | (d26) | | | 21.24 |
| 27 | 431.390 | 2.45 | 1.59349 | 67.0 | 24.37 |
| 28 | −76.074 | 5.76 | | | 24.76 |
| 29 | −30.895 | 1.00 | 1.72047 | 34.7 | 25.90 |
| 30 | −64.954 | (d30) | | | 27.37 |
| 31 (IMG) | ∞ | 0.00 | | | 43.30 |

TABLE 37

| | Example 8 (Zoom Ratio: 3.26) | | |
|---|---|---|---|
| | Wide | Mid | Tele |
| f (mm) | 20.71 | 36.05 | 67.56 |
| Fno | 4.12 | 4.12 | 4.12 |

TABLE 37-continued

| Example 8 (Zoom Ratio: 3.26) | | | |
|---|---|---|---|
| | Wide | Mid | Tele |
| 2ω (°) | 87.81 | 61.92 | 35.49 |
| Y (mm) | 19.93 | 21.63 | 21.62 |
| L (mm) | 115.05 | 127.29 | 155.00 |

TABLE 38

| Example 8 • Variable Data | | | | | | |
|---|---|---|---|---|---|---|
| | Wide | Mid | Tele | Wide | Mid | Tele |
| d0 | ∞ | ∞ | ∞ | 299 mm | 299 mm | 299 mm |
| d3 | 0.80 | 13.41 | 32.60 | 0.80 | 13.41 | 32.60 |
| d11 | 18.34 | 8.53 | 2.00 | 18.34 | 8.53 | 2.00 |
| d14 | 5.97 | 2.77 | 1.00 | 5.97 | 2.77 | 1.00 |
| d22 | 3.44 | 2.77 | 2.30 | 4.49 | 4.63 | 6.12 |
| d26 | 4.96 | 8.83 | 11.07 | 3.91 | 6.97 | 7.25 |
| d30 | 14.51 | 23.95 | 39.01 | 14.51 | 23.95 | 39.01 |

TABLE 39

| Example 8•Aspherical Data | | | | | | |
|---|---|---|---|---|---|---|
| Si | k | A4 | A6 | A8 | A10 | A12 |
| 6 | 0.00000E+00 | 3.45711E−05 | −2.90267E−07 | 1.21010E−09 | −2.89546E−12 | 0.00000E+00 |
| 7 | 0.00000E+00 | 1.82987E−05 | −3.14005E−07 | 1.20140E−09 | −3.43951E−12 | 0.00000E+00 |
| 13 | 0.00000E+00 | 9.97900E−07 | 2.32833E−08 | 4.07896E−10 | 0.00000E+00 | 0.00000E+00 |
| 14 | 0.00000E+00 | 1.00265E−05 | 3.82113E−08 | 4.33990E−10 | 7.09846E−13 | 0.00000E+00 |
| 21 | 0.00000E+00 | −1.99923E−05 | 1.43766E−08 | −8.84773E−11 | 0.00000E+00 | 0.00000E+00 |
| 22 | 0.00000E+00 | 2.97360E−05 | −5.24644E−08 | −2.28818E−11 | 0.00000E+00 | 0.00000E+00 |
| 25 | 0.00000E+00 | 5.12601E−06 | −6.94200E−08 | 8.91091E−11 | 0.00000E+00 | 0.00000E+00 |
| 26 | 0.00000E+00 | 2.56539E−06 | −1.42392E−08 | 7.41628E−11 | 0.00000E+00 | 0.00000E+00 |

TABLE 40

| Example 8 | | |
|---|---|---|
| Lens Group | Starting Surface | Focal Distance |
| G1 | 1 | 132.15 |
| G2 | 4 | −18.76 |
| G3 | 13 | 55.06 |
| G4 | 15 | 27.24 |
| G5 | 23 | −39.41 |
| G6 | 27 | −432.40 |

Figure 93:
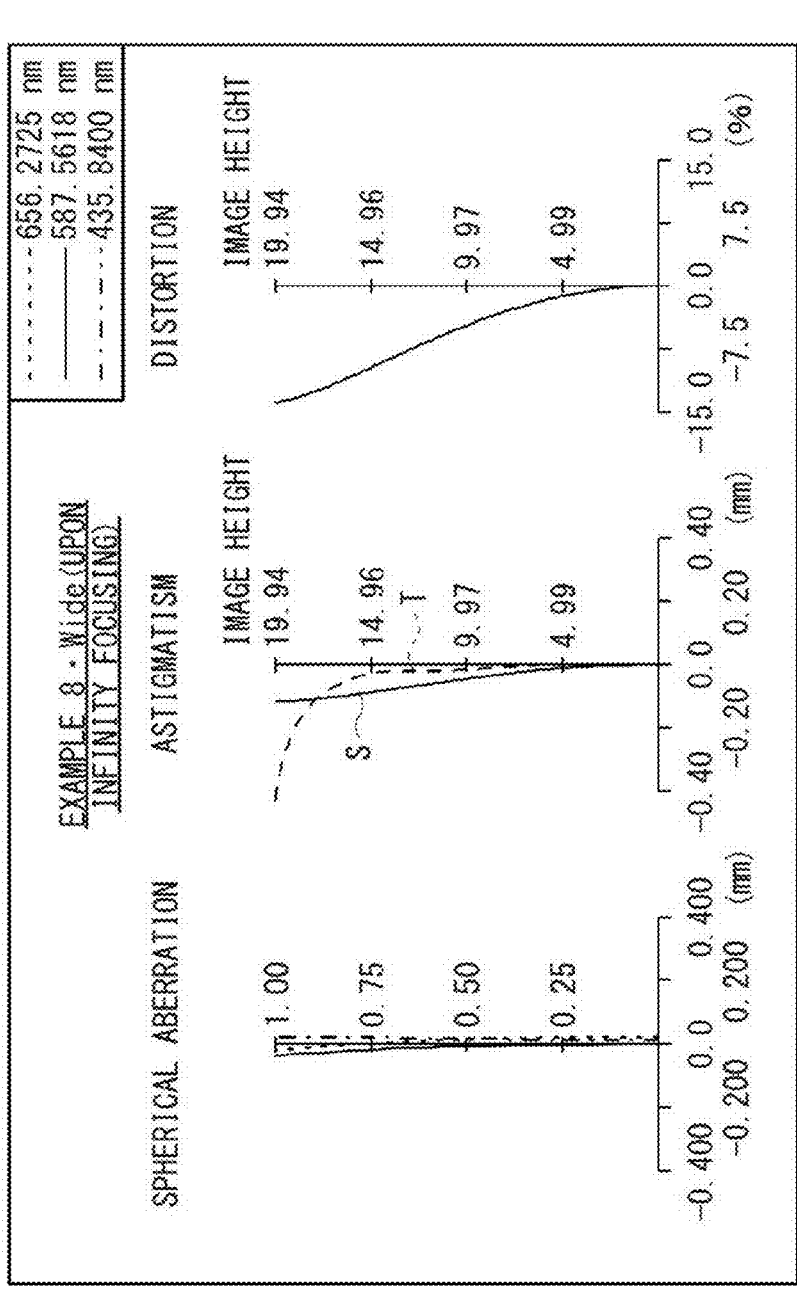
FIG. 93 is an aberration diagram illustrating longitudinal aberration upon infinity focusing at a wide-angle end of the zoom lens according to Example 8.
Figure 94:
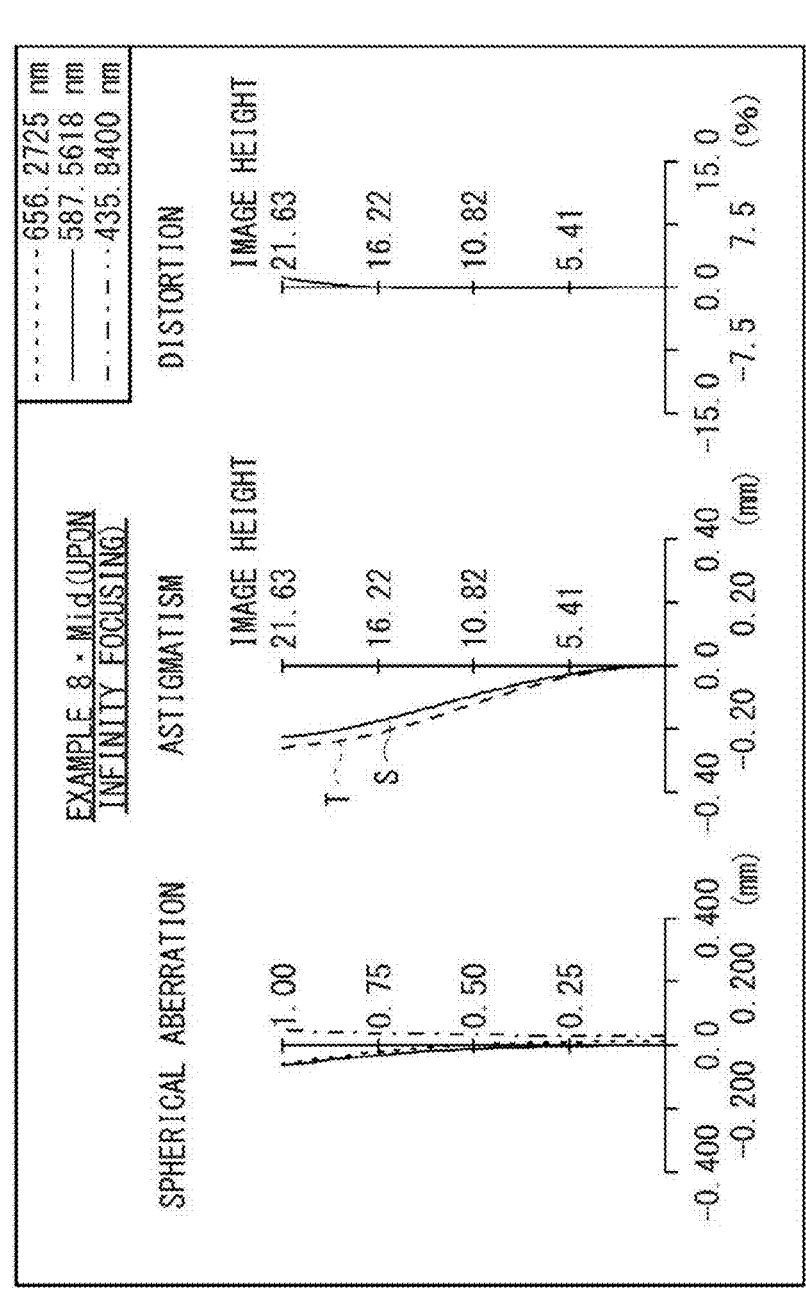
FIG. 94 is an aberration diagram illustrating longitudinal aberration upon infinity focusing at an intermediate position of the zoom lens according to Example 8.
Figure 95:
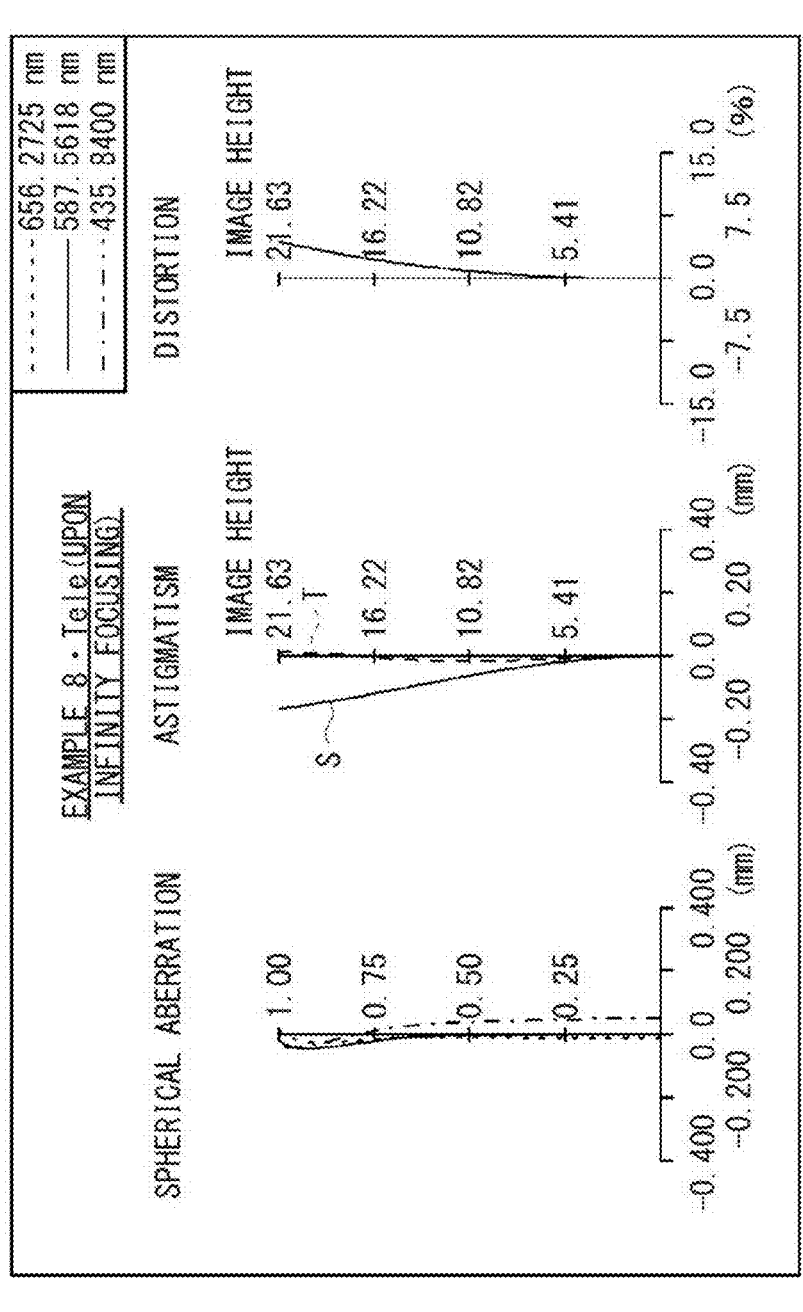
FIG. 95 is an aberration diagram illustrating longitudinal aberration upon infinity focusing at a telephoto end of the zoom lens according to Example 8.
Figure 96:
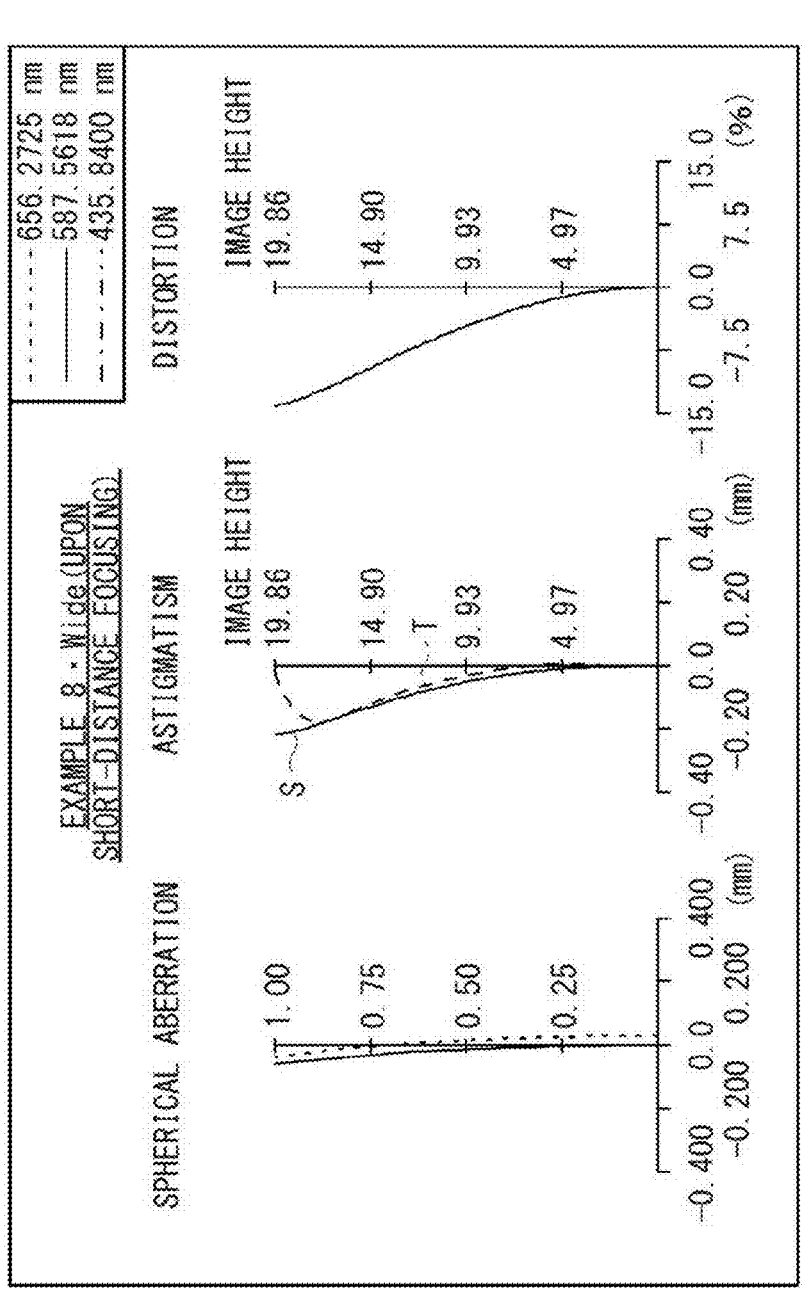
FIG. 96 is an aberration diagram illustrating longitudinal aberration upon short-distance focusing at the wide-angle end of the zoom lens according to Example 8.
Figure 97:
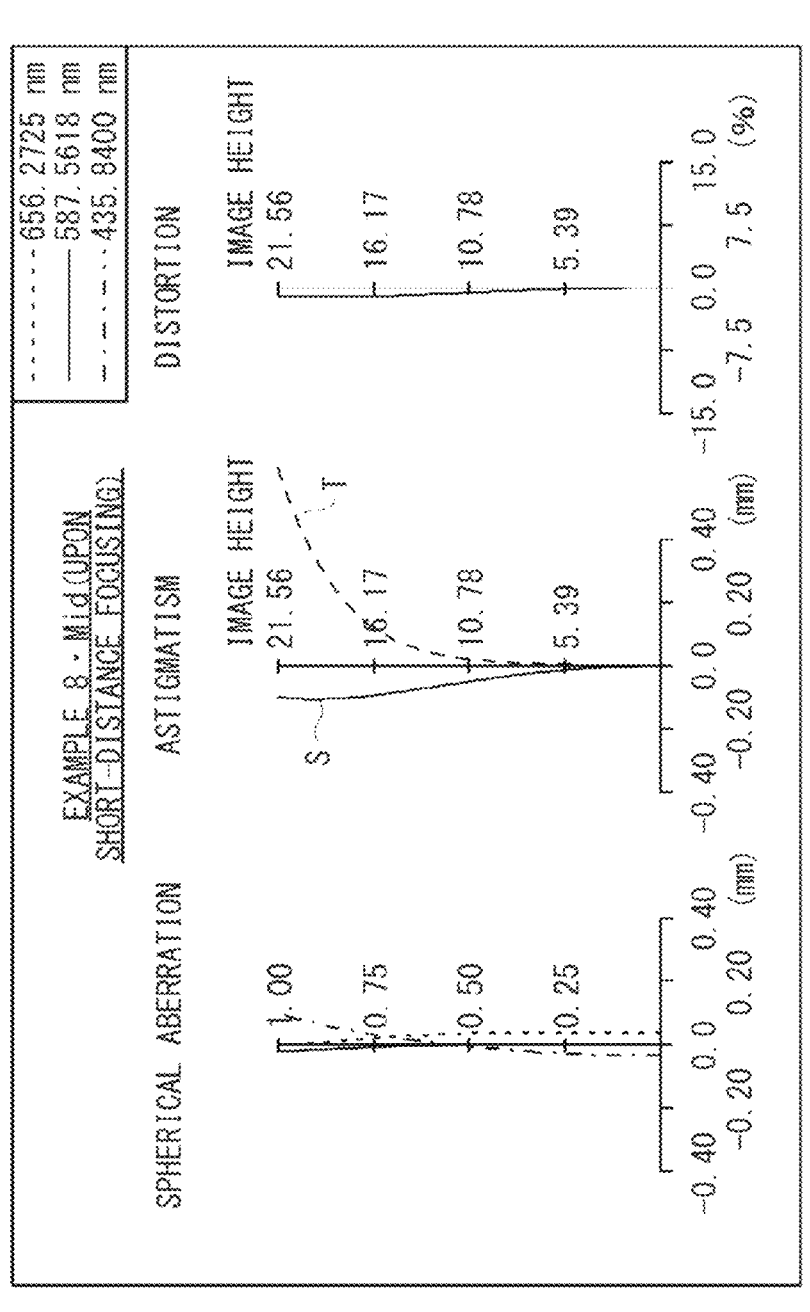
FIG. 97 is an aberration diagram illustrating longitudinal aberration upon short-distance focusing at the intermediate position of the zoom lens according to Example 8.
Figure 98:
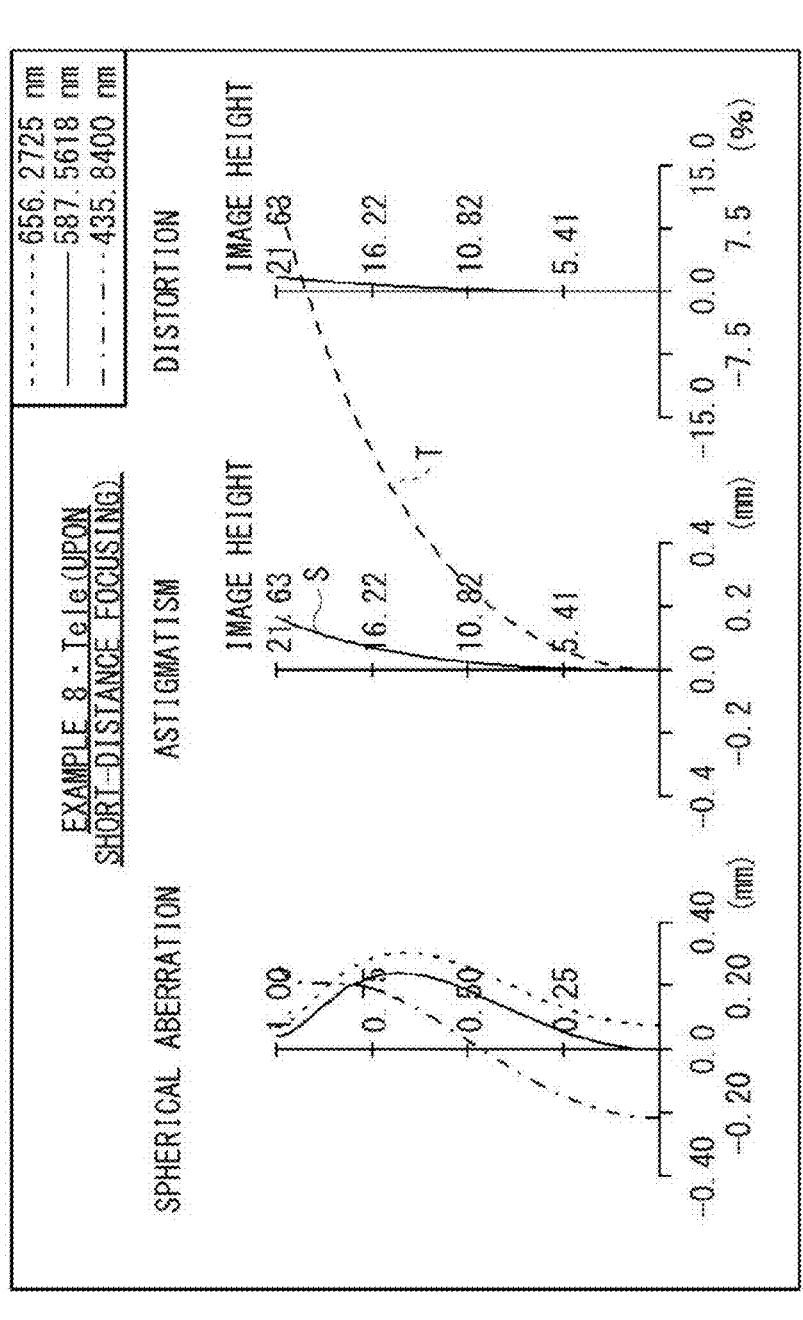
FIG. 98 is an aberration diagram illustrating longitudinal aberration upon short-distance focusing at the telephoto end of the zoom lens according to Example 8.
Figure 99:
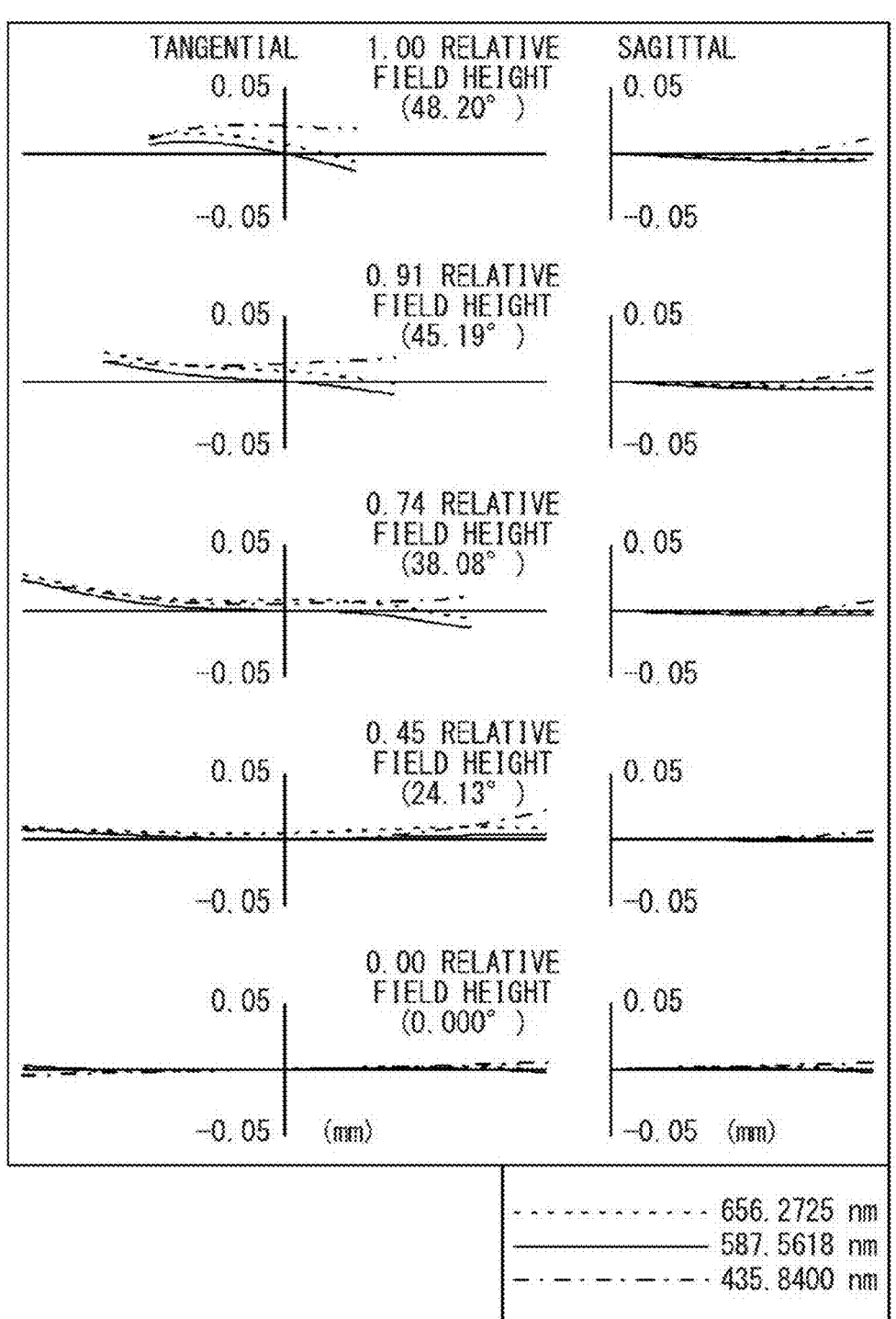
FIG. 99 is an aberration diagram illustrating lateral aberration upon infinity focusing at the wide-angle end of the zoom lens according to Example 8.
Figure 100:
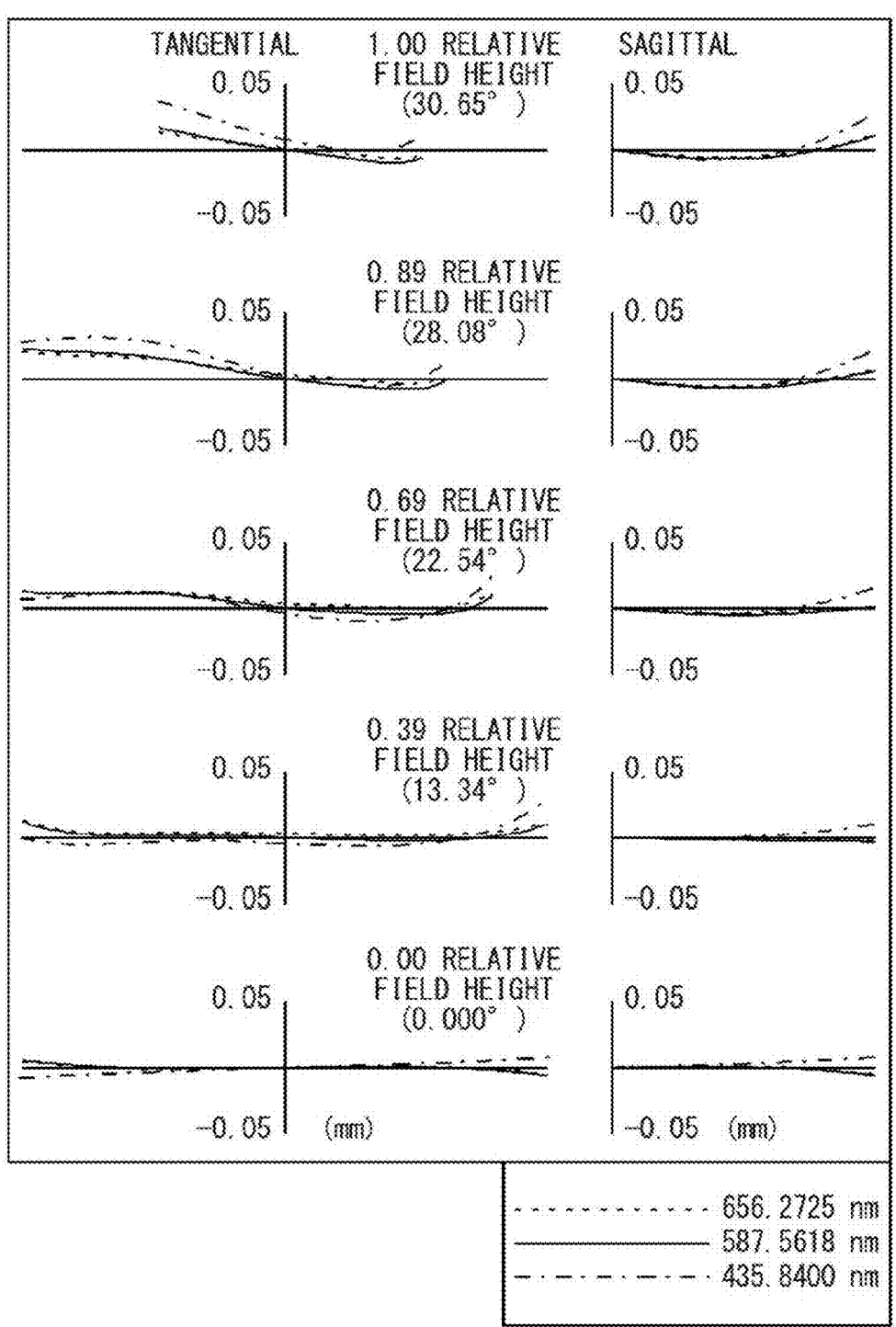
FIG. 100 is an aberration diagram illustrating lateral aberration upon infinity focusing at the intermediate position of the zoom lens according to Example 8.
Figure 101:
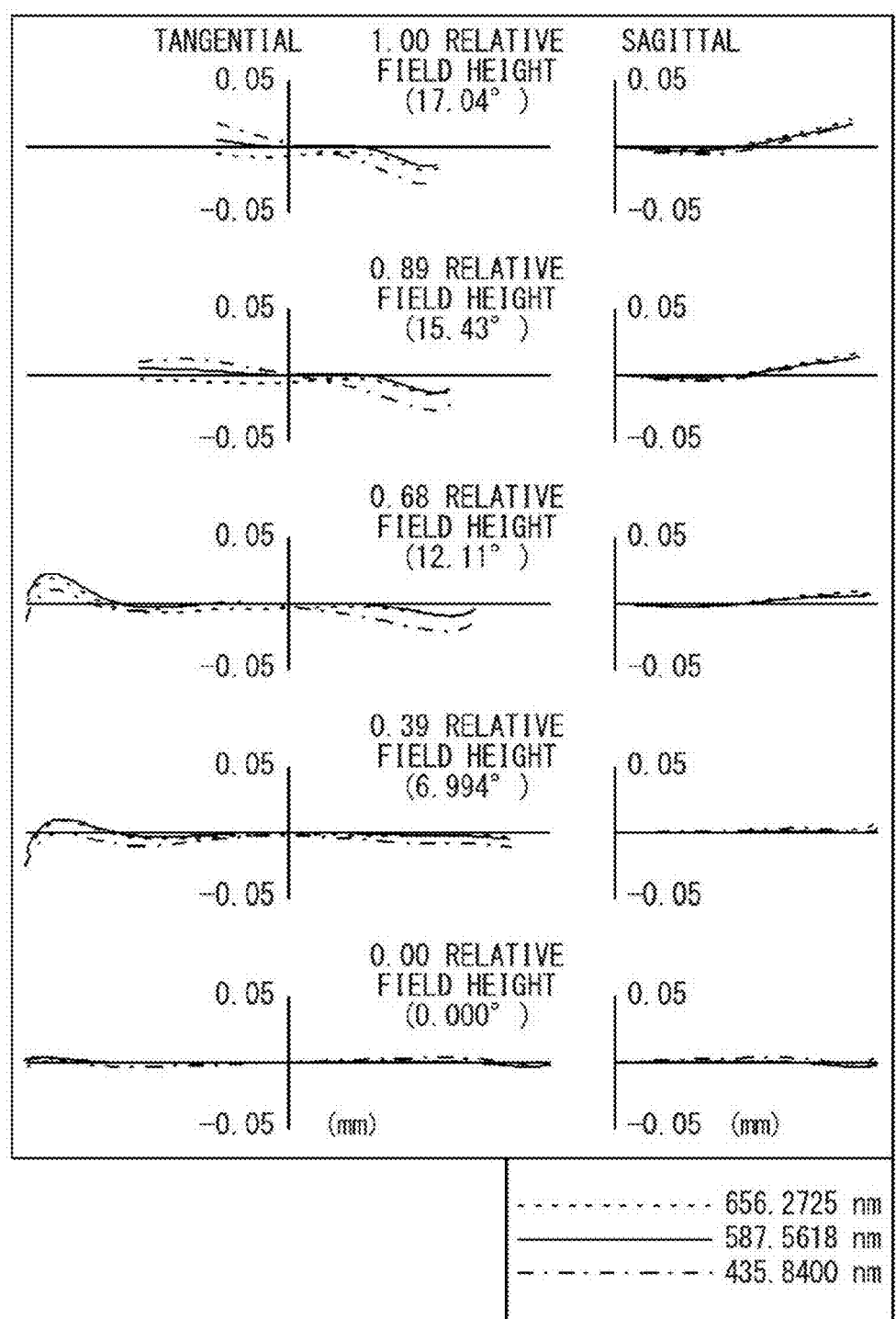
FIG. 101 is an aberration diagram illustrating lateral aberration upon infinity focusing at the telephoto end of the zoom lens according to Example 8.
Figure 102:
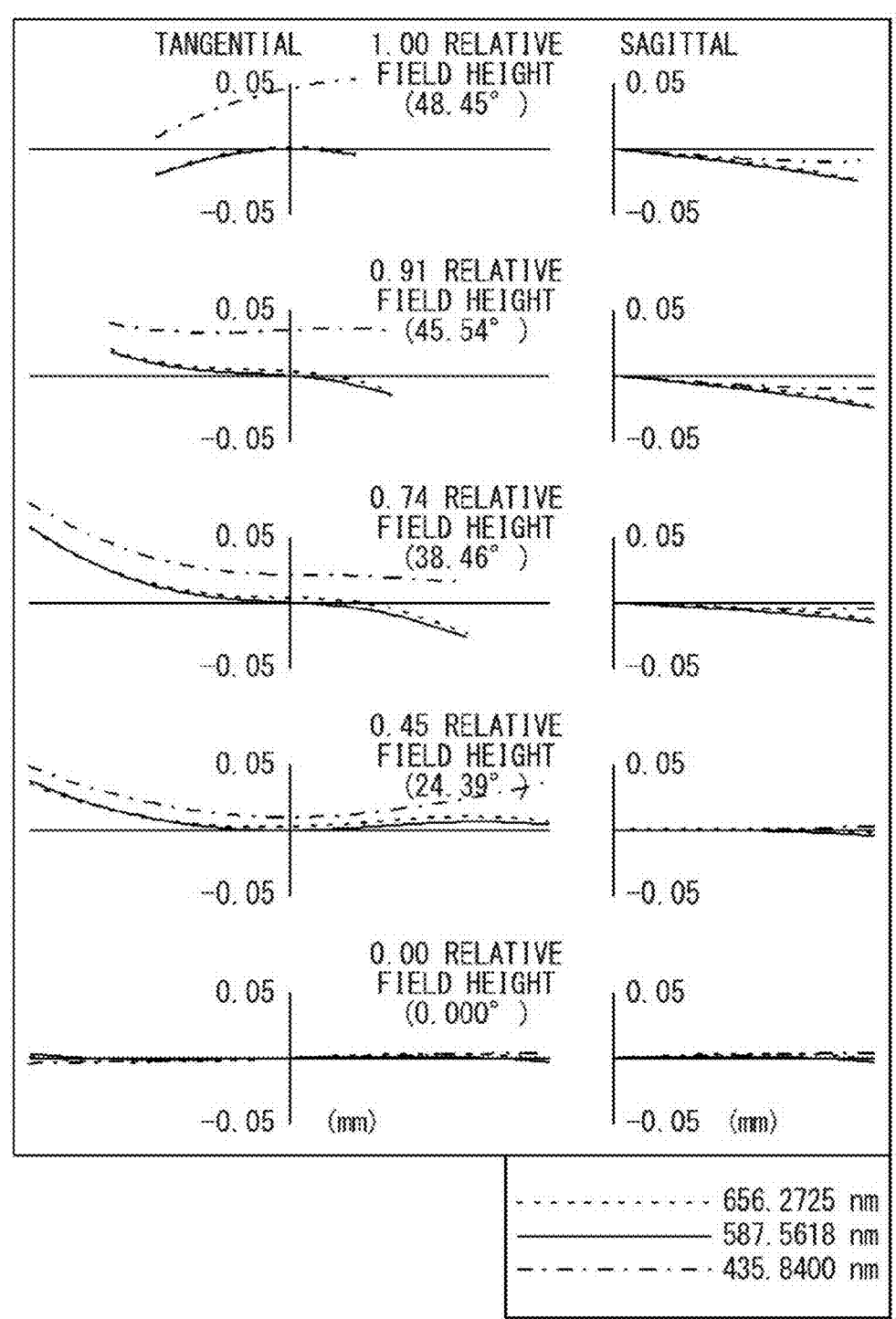
FIG. 102 is an aberration diagram illustrating lateral aberration upon short-distance focusing at the wide-angle end of the zoom lens according to Example 8.
Figure 103:
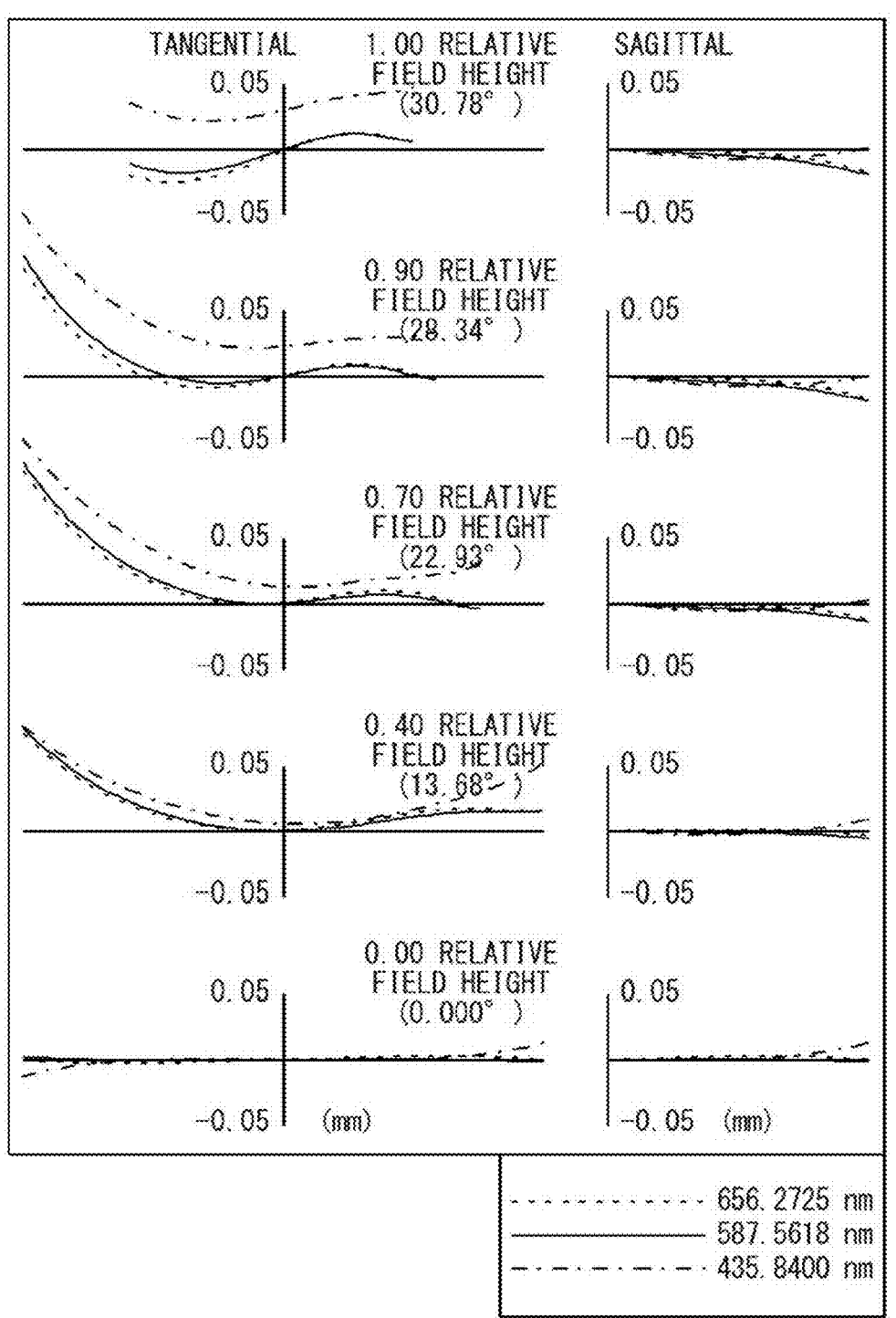
FIG. 103 is an aberration diagram illustrating lateral aberration upon short-distance focusing at the intermediate position of the zoom lens according to Example 8.
Figure 104:
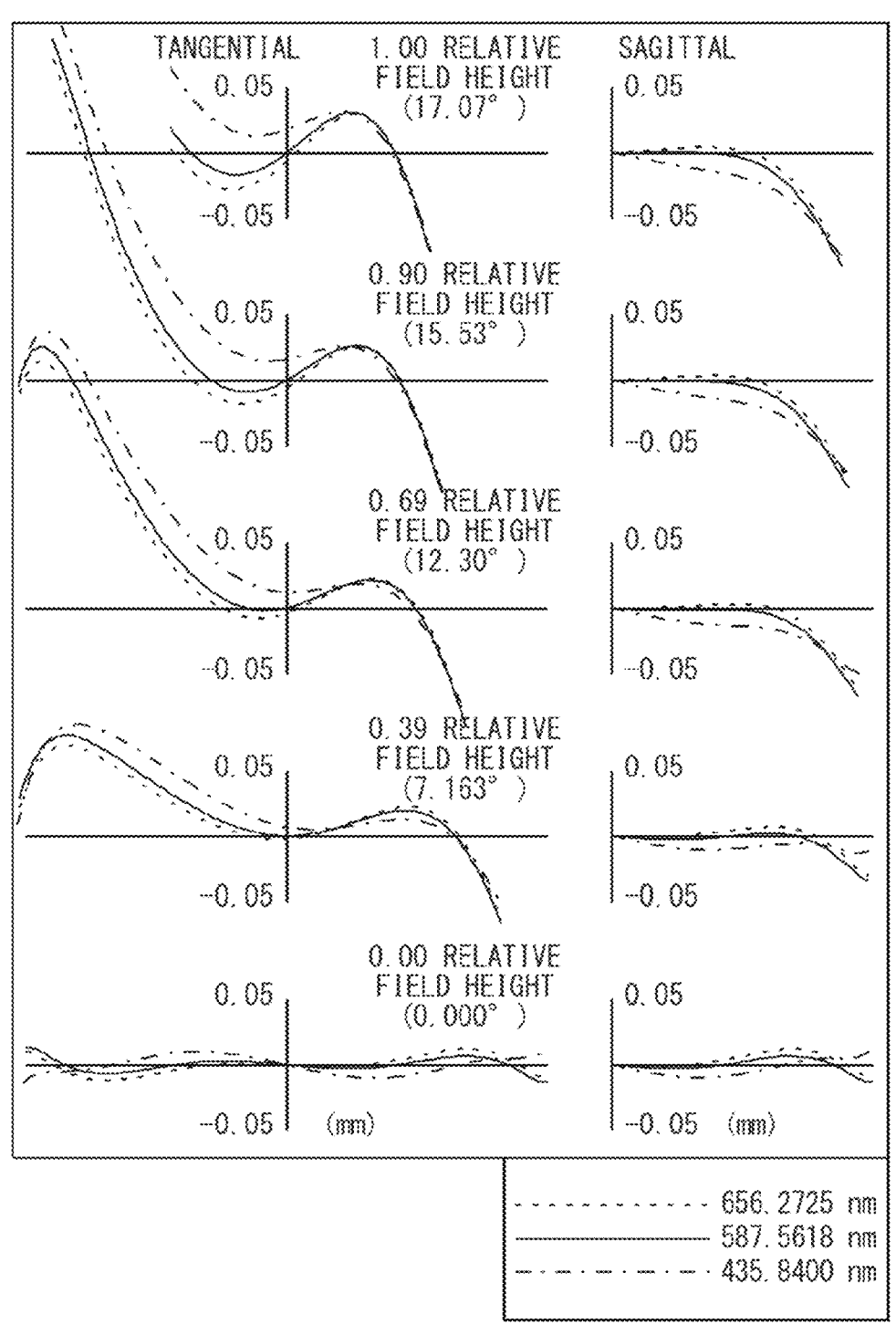
FIG. 104 is an aberration diagram illustrating lateral aberration upon short-distance focusing at the telephoto end of the zoom lens according to Example 8.

FIG. 93 illustrates longitudinal aberration upon infinity focusing at a wide-angle end of the zoom lens 8 according to Example 8. FIG. 94 illustrates longitudinal aberration upon infinity focusing at an intermediate position of the zoom lens 8 according to Example 8. FIG. 95 illustrates longitudinal aberration upon infinity focusing at a telephoto end of the zoom lens 8 according to Example 8. FIG. 96 illustrates longitudinal aberration upon short-distance focusing at the wide-angle end of the zoom lens 8 according to Example 8. FIG. 97 illustrates longitudinal aberration upon short-distance focusing at the intermediate position of the zoom lens 8 according to Example 8. FIG. 98 illustrates longitudinal aberration upon short-distance focusing at the telephoto end of the zoom lens 8 according to Example 8. FIG. 99 illustrates lateral aberration upon infinity focusing at the wide-angle end of the zoom lens 8 according to Example 8. FIG. 100 illustrates lateral aberration upon infinity focusing at the intermediate position of the zoom lens 8 according to Example 8. FIG. 101 illustrates lateral aberration upon infinity focusing at the telephoto end of the zoom lens 8 according to Example 8. FIG. 102 illustrates lateral aberration upon short-distance focusing at the wide-angle end of the zoom lens 8 according to Example 8. FIG. 103 illustrates lateral aberration upon short-distance focusing at the intermediate position of the zoom lens 8 according to Example 8. FIG. 104 illustrates lateral aberration upon short-distance focusing at the telephoto end of the zoom lens 8 according to Example 8.

As appreciated from each of the aberration diagrams, the zoom lens 8 according to Example 8 undergoes favorable correction of various aberrations, and thus has superior image-forming performance.

Example 9

Table 41 exhibits basic lens data of the zoom lens 9 according to Example 9 illustrated in FIG. 105. Table 42 exhibits values of the focal distance f of the total system, the F-value, the total angle of view 2c, the image height Y, and the total optical length L in the zoom lens 9 according to Example 9. Table 43 exhibits data on a surface interval that is variable upon zooming and focusing in the zoom lens 9 according to Example 9. It is to be noted that Table 42 exhibits values for each of the wide-angle end (Wide), the intermediate position (Mid), and the telephoto end (Tele) in a case where the object distance (d0) is infinity. Table 43 exhibits values for each of the wide-angle end (Wide), the intermediate position (Mid), and the telephoto end (Tele) in the case where the object distance (d0) is infinity and in a case where the object distance (d0) is a short distance. Table 44 exhibits values of coefficients indicating shapes of aspherical surfaces in the zoom lens 9 according to Example 9. Table 45 exhibits a starting surface and a focal distance (unit: mm) of each of lens groups of the zoom lens 9 according to Example 9.

The zoom lens 9 according to Example 9 has a configuration in which the first lens group G1 having positive refractive power, the second lens group G2 having negative refractive power, the aperture stop St, the third lens group G3 having positive refractive power, the fourth lens group G4 having positive refractive power, and the fifth lens group G5 having negative refractive power are disposed in order from the object side toward the image plane side.

The zoom lens 9 according to Example 9 moves to allow an interval between adjacent lens groups to vary upon zooming. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative lens of a biconcave shape including an aspherical surface on both sides. The lens L23 is a positive lens of a biconvex shape. The lens L24 is a negative meniscus lens with a concave surface opposed to the object side.

The third lens group G3 includes lenses L31 to L33 in order from the object side toward the image plane side. The lens L31 is a positive lens of a biconvex shape including an aspherical surface on both sides. The lens L32 is a positive meniscus lens with a concave surface opposed to the object side. The lens L33 is a negative lens of a biconcave shape. The lens L32 and the lens L33 constitute a cemented lens in which the lens L32 and the lens L33 are attached to each other.

The fourth lens group G4 includes the lens L41. The lens L41 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The above-described configuration allows for achievement of a zoom lens having a high variable magnification ratio while covering a wide-angle region despite a miniaturized optical system.

TABLE 41

| Example 9 | | | | | |
|---|---|---|---|---|---|
| Si | ri | di | ndi | νdi | φi |
| 0 (OBJ) | | (d0) | | | |
| 1 | 73.623 | 1.70 | 1.86966 | 20.0 | 51.60 |
| 2 | 54.681 | 7.00 | 1.72916 | 54.7 | 49.76 |
| 3 | 332.373 | (d3) | | | 48.67 |
| 4 | 112.822 | 1.30 | 1.76385 | 48.5 | 33.70 |
| 5 | 14.111 | 8.51 | | | 23.63 |

TABLE 41-continued

| Example 9 | | | | | |
|---|---|---|---|---|---|
| Si | ri | di | ndi | νdi | φi |
| 6 (ASP) | −57.867 | 1.00 | 1.76802 | 49.2 | 22.82 |
| 7 (ASP) | 46.635 | 0.20 | | | 22.02 |
| 8 | 31.025 | 6.12 | 1.77047 | 29.7 | 21.89 |
| 9 | −48.121 | 1.32 | | | 20.71 |
| 10 | −24.359 | 1.00 | 1.49700 | 81.6 | 20.46 |
| 11 | −48.664 | (d11) | | | 19.71 |
| 12 (STO) | ∞ | 1.55 | | | 20.30 |
| 13 (ASP) | 26.696 | 7.98 | 1.58313 | 59.5 | 21.88 |
| 14 (ASP) | −28.778 | 0.20 | | | 21.52 |
| 15 | −73.914 | 5.89 | 1.49700 | 81.6 | 20.67 |
| 16 | −13.975 | 1.00 | 1.74950 | 35.3 | 19.95 |
| 17 | 471.087 | (d17) | | | 20.27 |
| 18 (ASP) | 46.673 | 5.77 | 1.49710 | 81.6 | 20.64 |
| 19 (ASP) | −17.742 | (d19) | | | 20.60 |
| 20 | −49.406 | 2.02 | 1.84666 | 23.8 | 21.30 |
| 21 | −29.740 | 0.96 | | | 21.58 |
| 22 (ASP) | −48.807 | 2.34 | 1.76802 | 49.2 | 21.24 |
| 23 (ASP) | 33.290 | (d23) | | | 22.07 |
| 24 (IMG) | ∞ | 0.00 | | | 43.48 |

TABLE 42

| Example 9 (Zoom Ratio: 3.30) | | | |
|---|---|---|---|
| | Wide | Mid | Tele |
| f (mm) | 20.61 | 36.06 | 67.92 |
| Fno | 4.12 | 4.12 | 4.12 |
| 2ω (°) | 87.86 | 61.90 | 35.30 |
| Y (mm | 19.86 | 21.62 | 21.61 |
| L (mm) | 113.64 | 125.80 | 153.64 |

TABLE 43

| Example 9 • Variable Data | | | | | | |
|---|---|---|---|---|---|---|
| | Wide | Mid | Tele | Wide | Mid | Tele |
| d0 | ∞ | ∞ | ∞ | 379 mm | 379 mm | 379 mm |
| d3 | 0.80 | 15.33 | 31.36 | 0.80 | 15.33 | 31.36 |
| d11 | 21.74 | 9.47 | 2.00 | 21.74 | 9.47 | 2.00 |
| d17 | 5.84 | 4.22 | 1.71 | 5.84 | 4.22 | 1.71 |
| d19 | 6.18 | 4.92 | 2.50 | 7.05 | 6.44 | 5.22 |
| d23 | 23.22 | 36.01 | 60.22 | 22.36 | 34.49 | 57.50 |

TABLE 44

| Example 9•Aspherical Data | | | | | | |
|---|---|---|---|---|---|---|
| Si | k | A4 | A6 | A8 | A10 | A12 |
| 6 | 0.00000E+00 | 1.75046E−06 | −1.54524E−08 | 3.07598E−11 | 0.00000E+00 | 0.00000E+00 |
| 7 | 0.00000E+00 | −4.09005E−06 | −2.24898E−08 | −4.87715E−11 | 0.00000E+00 | 0.00000E+00 |
| 13 | 0.00000E+00 | −7.41920E−07 | 3.73579E−09 | 4.74642E−11 | 0.00000E+00 | 0.00000E+00 |
| 14 | 0.00000E+00 | 1.67881E−05 | −5.31183E−08 | 3.80372E−10 | −1.74110E−12 | 0.00000E+00 |
| 18 | 0.00000E+00 | −5.70619E−06 | −4.64821E−08 | 0.00000E+00 | 0.00000E+00 | 0.00000E+00 |
| 19 | 0.00000E+00 | 4.47491E−05 | −7.21873E−08 | 1.89339E−10 | 0.00000E+00 | 0.00000E+00 |
| 22 | 0.00000E+00 | −3.84662E−06 | −9.73329E−08 | 9.91278E−11 | 0.00000E+00 | 0.00000E+00 |
| 23 | 0.00000E+00 | −4.68484E−06 | −9.19649E−09 | −7.46306E−11 | 0.00000E+00 | 0.00000E+00 |

TABLE 45

| | Example 9 | |
| --- | --- | --- |
| Lens Group | Starting Surface | Focal Distance |
| G1 | 1 | 139.23 |
| G2 | 4 | −22.93 |
| G3 | 13 | 51.95 |
| G4 | 18 | 26.65 |
| G5 | 20 | −36.57 |

Figure 106:
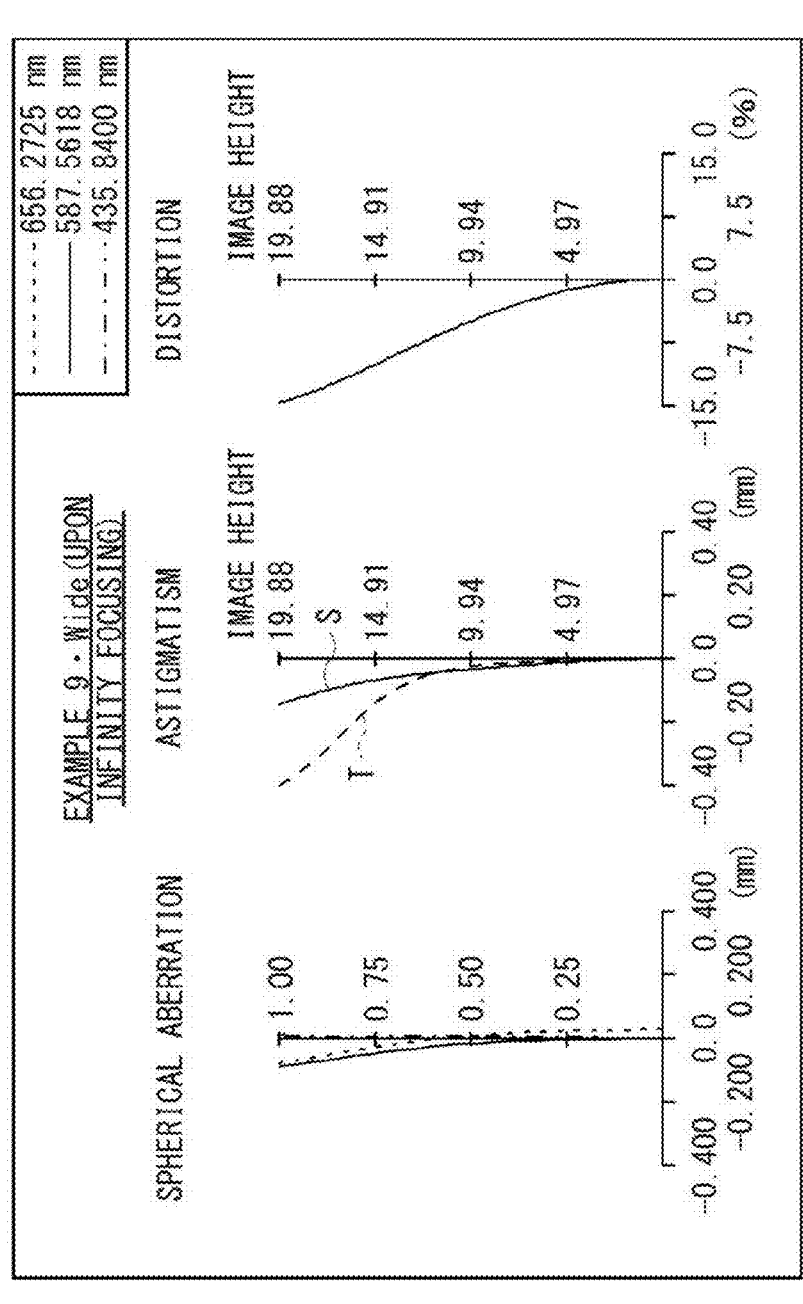
FIG. 106 is an aberration diagram illustrating longitudinal aberration upon infinity focusing at a wide-angle end of the zoom lens according to Example 9.
Figure 107:
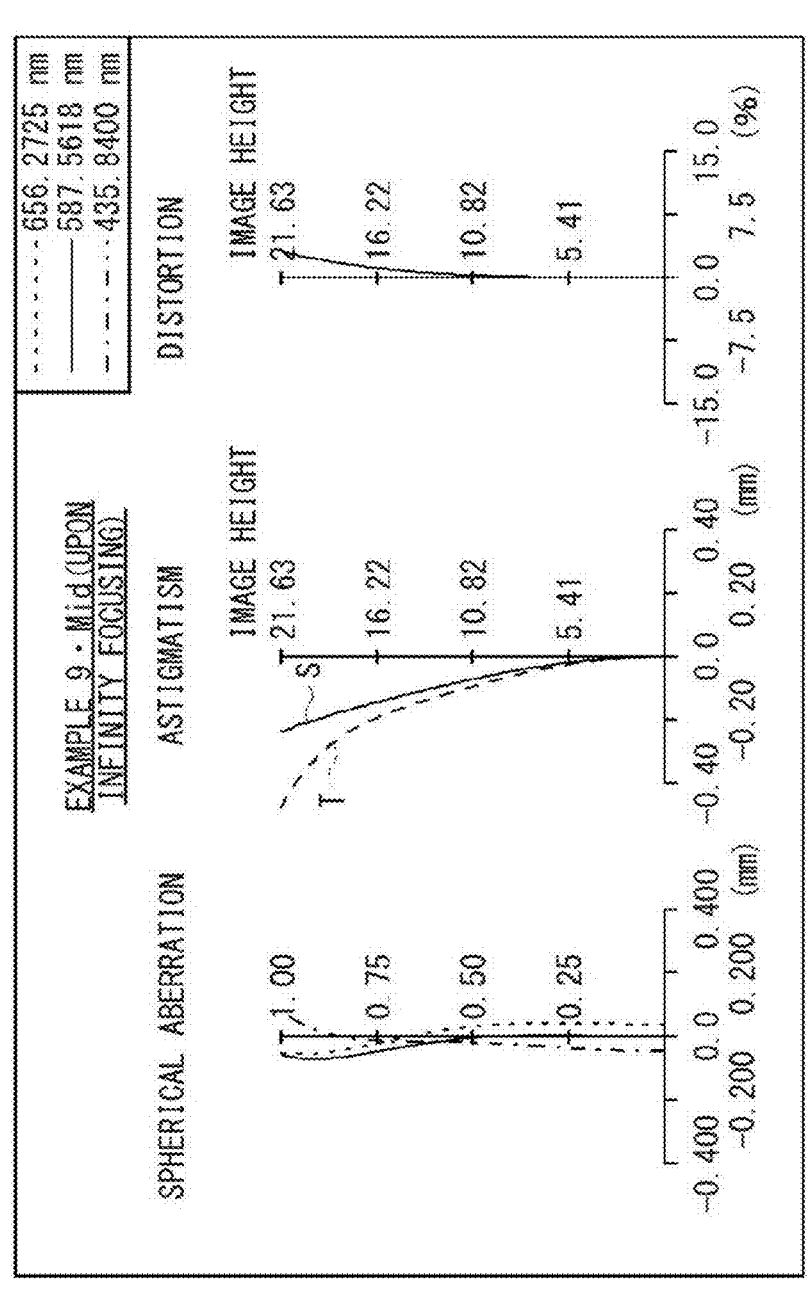
FIG. 107 is an aberration diagram illustrating longitudinal aberration upon infinity focusing at an intermediate position of the zoom lens according to Example 9.
Figure 108:
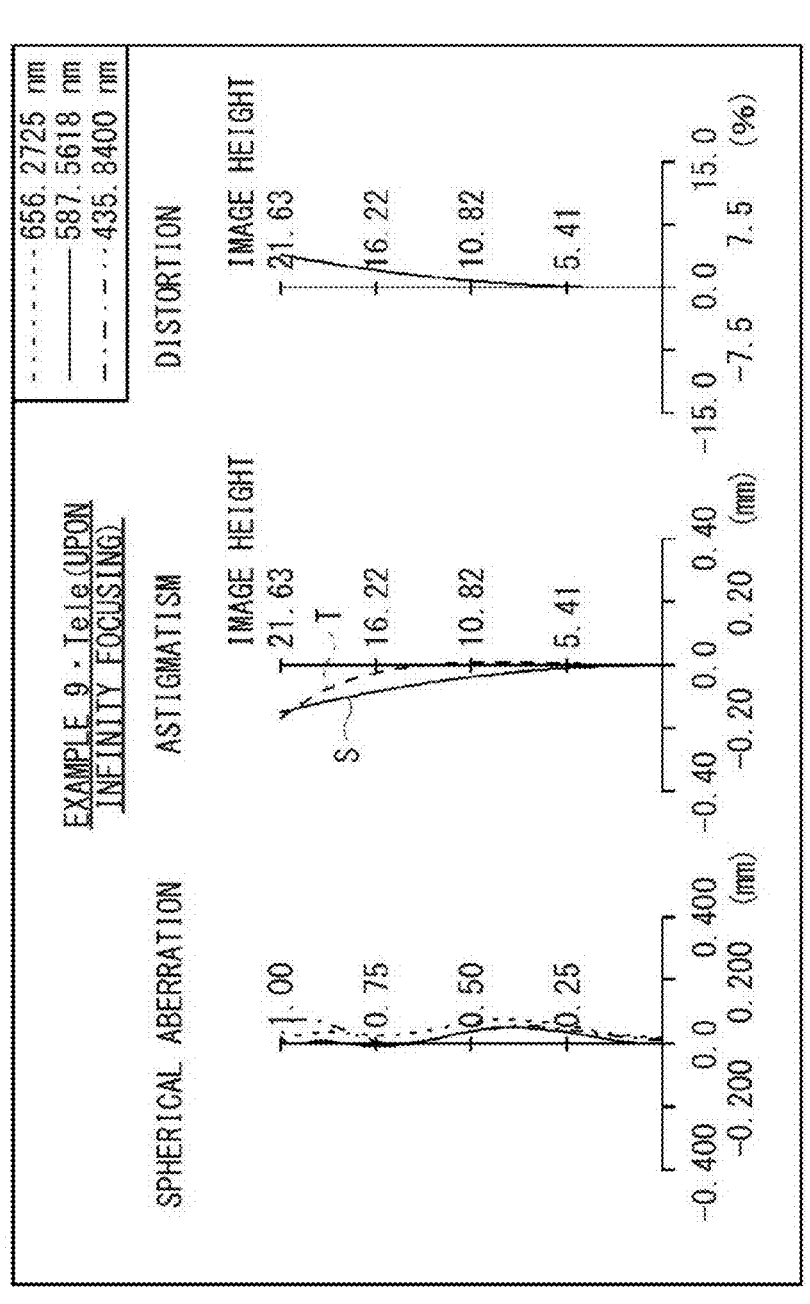
FIG. 108 is an aberration diagram illustrating longitudinal aberration upon infinity focusing at a telephoto end of the zoom lens according to Example 9.
Figure 109:
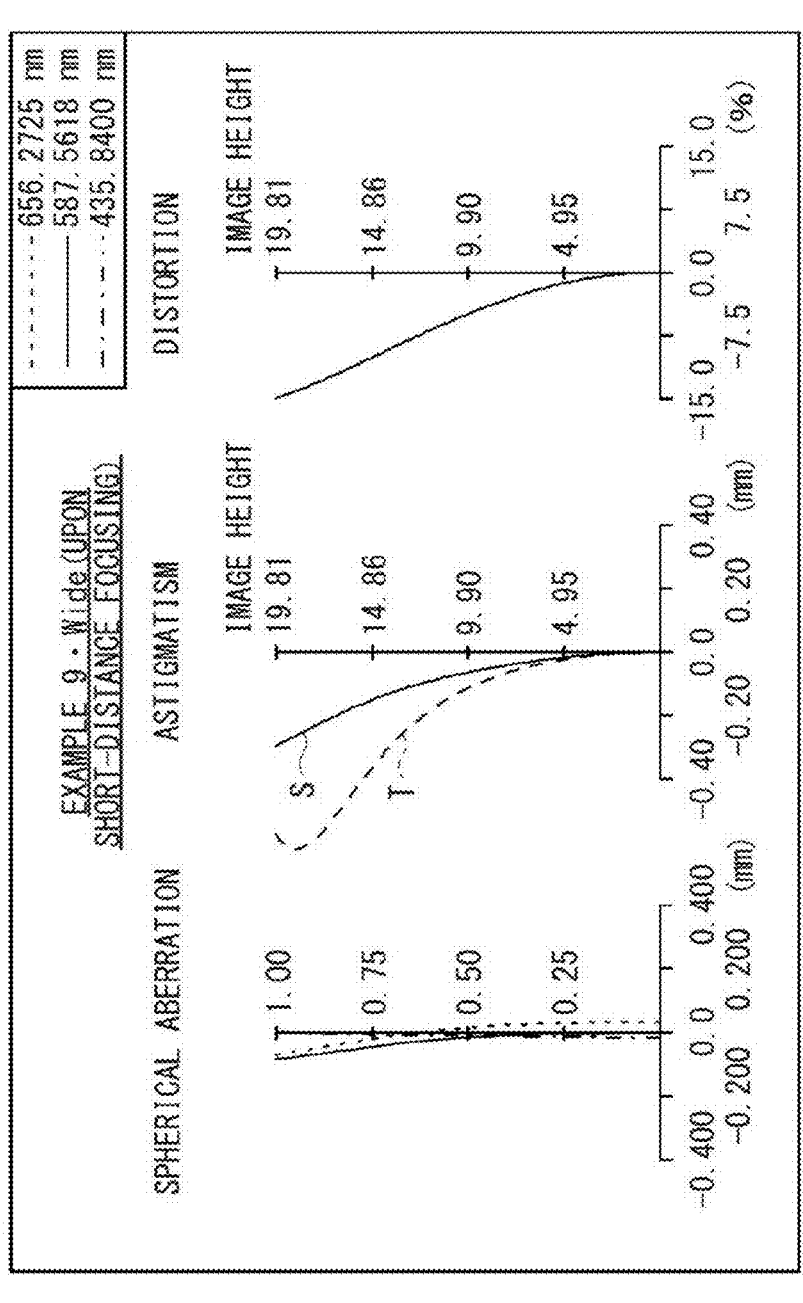
FIG. 109 is an aberration diagram illustrating longitudinal aberration upon short-distance focusing at the wide-angle end of the zoom lens according to Example 9.
Figure 110:
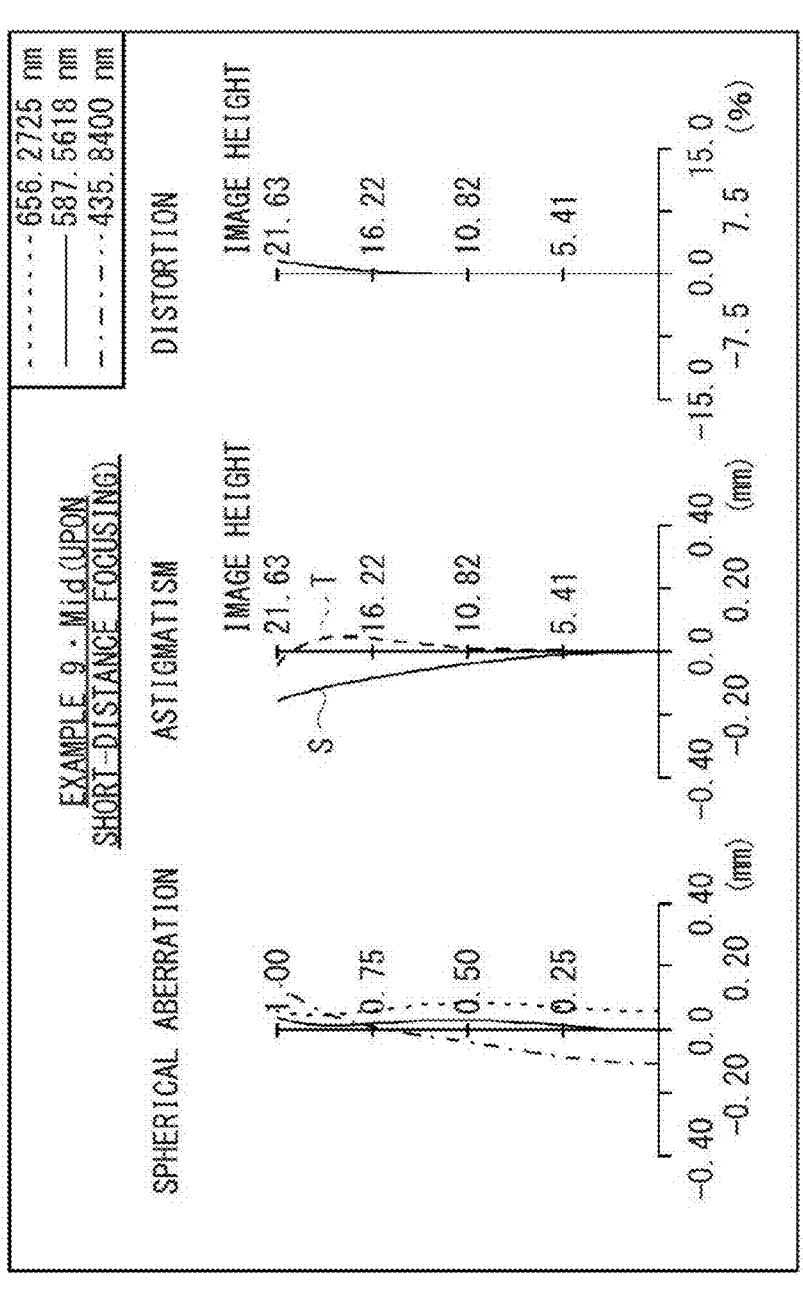
FIG. 110 is an aberration diagram illustrating longitudinal aberration upon short-distance focusing at the intermediate position of the zoom lens according to Example 9.
Figure 111:
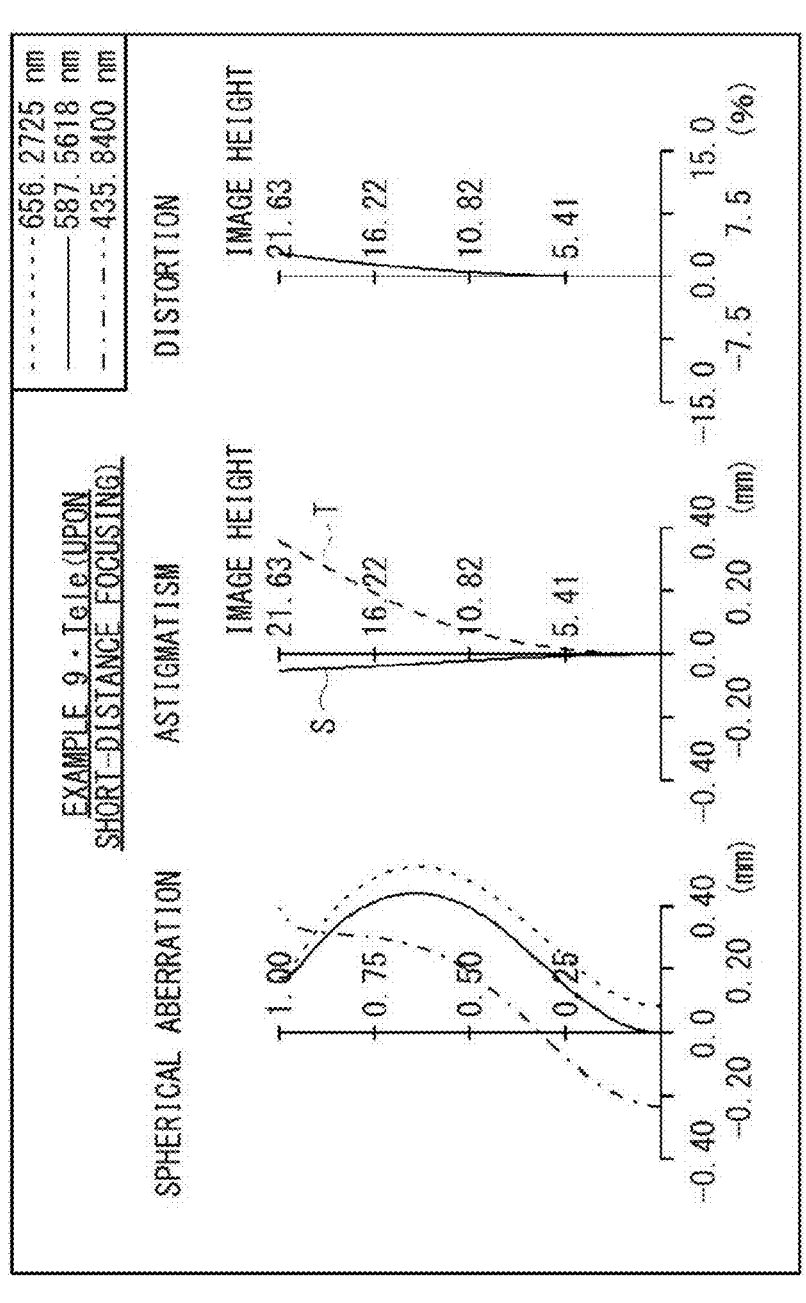
FIG. 111 is an aberration diagram illustrating longitudinal aberration upon short-distance focusing at the telephoto end of the zoom lens according to Example 9.
Figure 113:
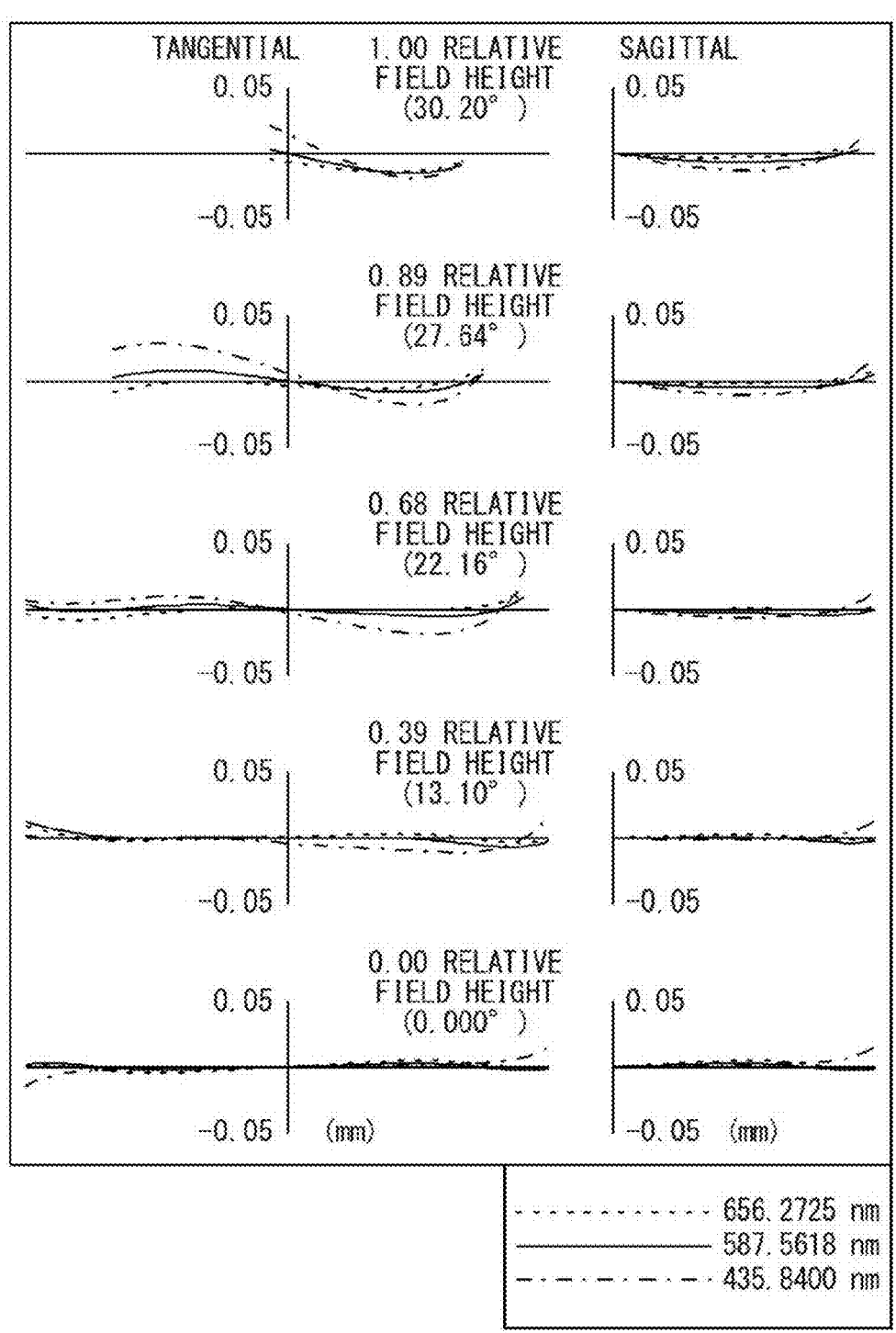
FIG. 113 is an aberration diagram illustrating lateral aberration upon infinity focusing at the intermediate position of the zoom lens according to Example 9.
Figure 114:
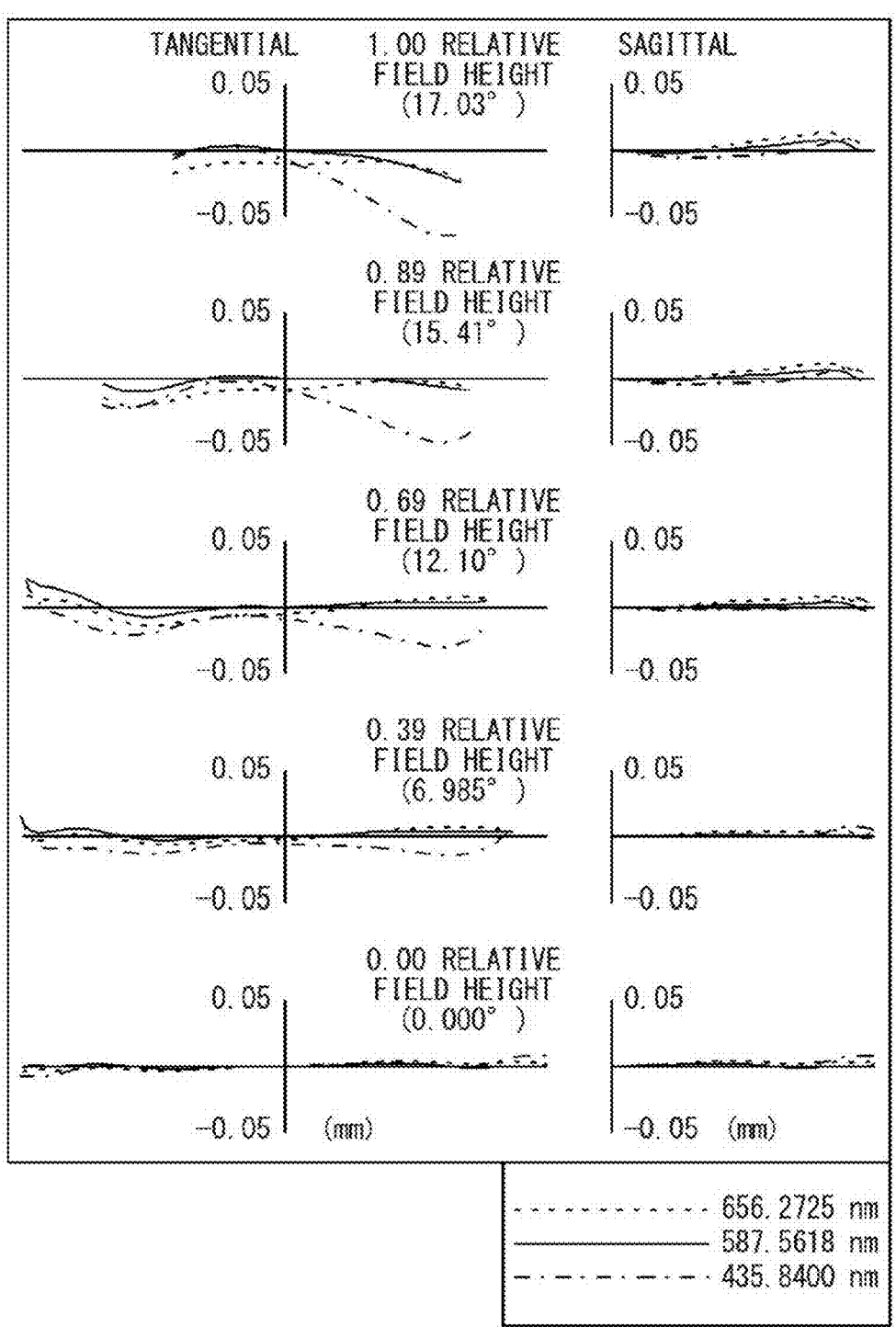
FIG. 114 is an aberration diagram illustrating lateral aberration upon infinity focusing at the telephoto end of the zoom lens according to Example 9.
Figure 115:
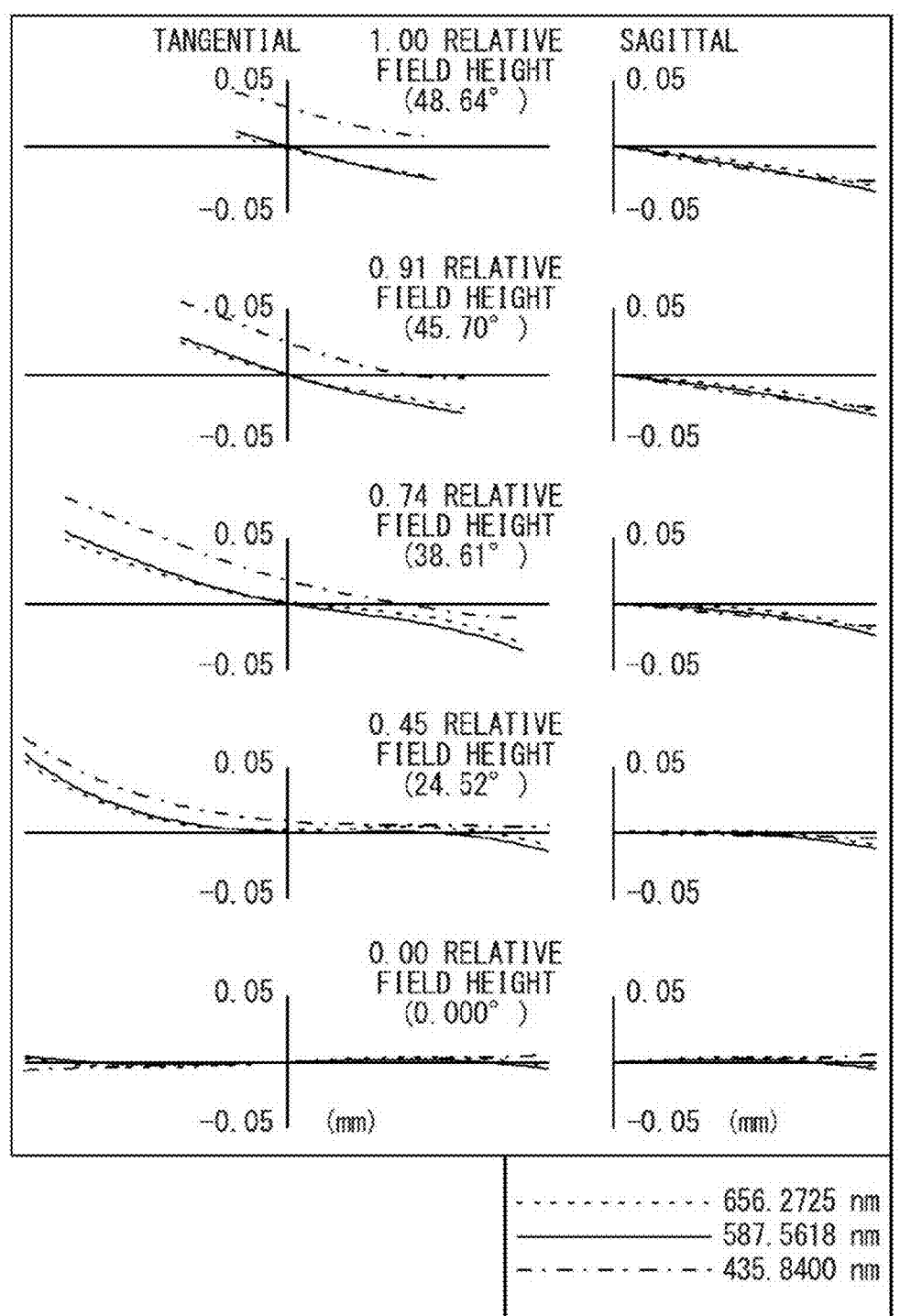
FIG. 115 is an aberration diagram illustrating lateral aberration upon short-distance focusing at the wide-angle end of the zoom lens according to Example 9.
Figure 116:
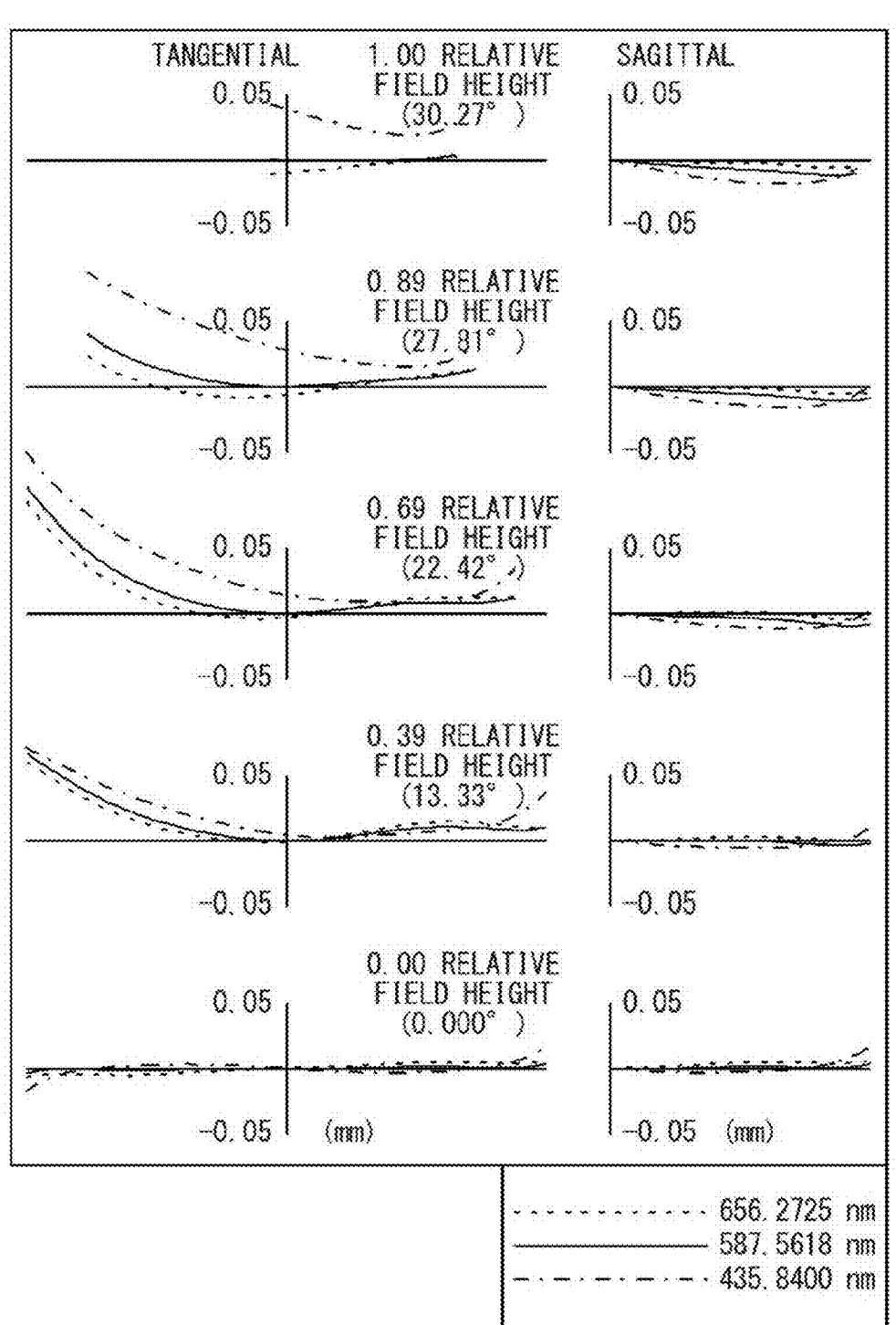
FIG. 116 is an aberration diagram illustrating lateral aberration upon short-distance focusing at the intermediate position of the zoom lens according to Example 9.
Figure 117:
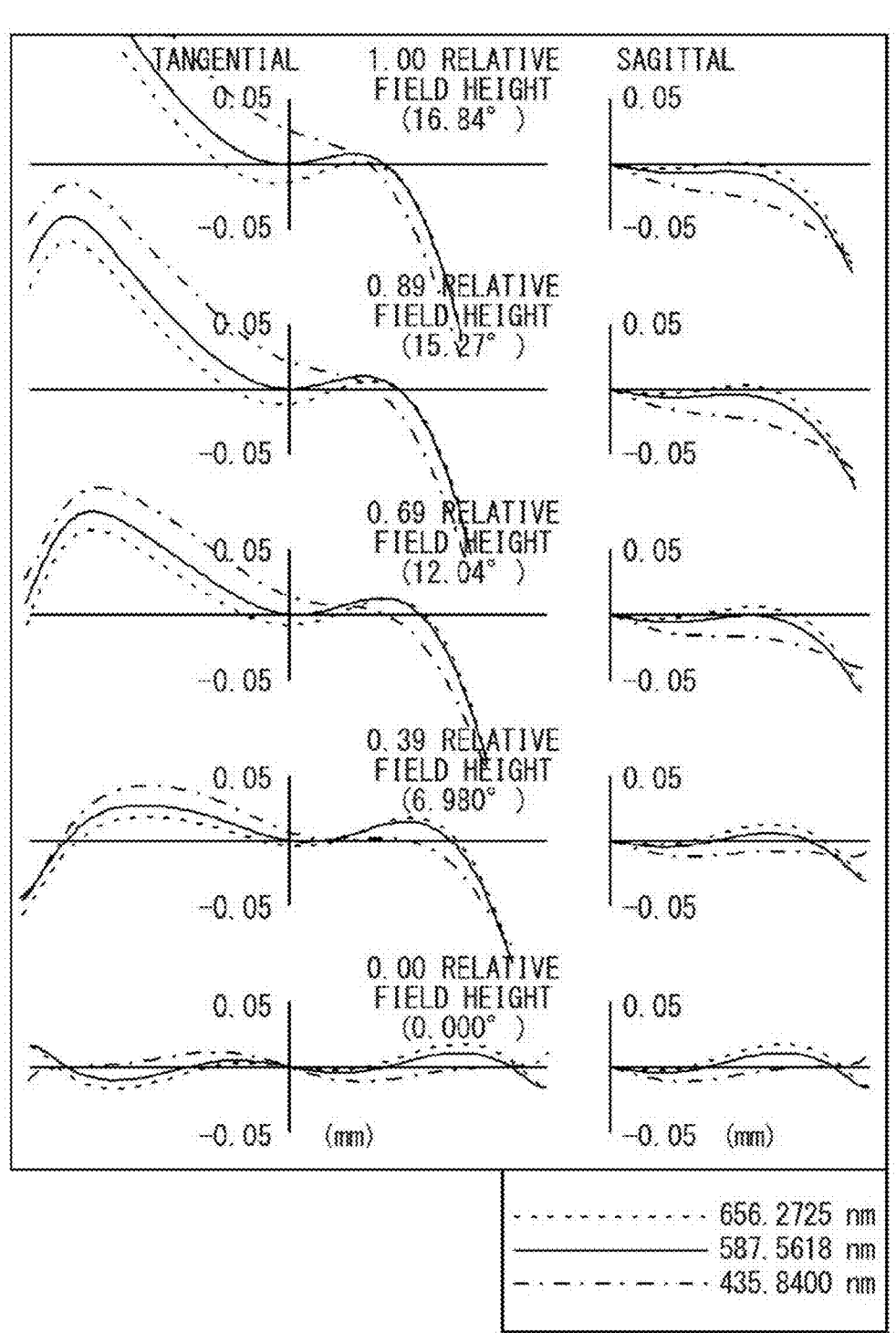
FIG. 117 is an aberration diagram illustrating lateral aberration upon short-distance focusing at the telephoto end of the zoom lens according to Example 9.

FIG. 106 illustrates longitudinal aberration upon infinity focusing at a wide-angle end of the zoom lens 9 according to Example 9. FIG. 107 illustrates longitudinal aberration upon infinity focusing at an intermediate position of the zoom lens 9 according to Example 9. FIG. 108 illustrates longitudinal aberration upon infinity focusing at a telephoto end of the zoom lens 9 according to Example 9. FIG. 109 illustrates longitudinal aberration upon short-distance focusing at the wide-angle end of the zoom lens 9 according to Example 9. FIG. 110 illustrates longitudinal aberration upon short-distance focusing at the intermediate position of the zoom lens 9 according to Example 9. FIG. 111 illustrates longitudinal aberration upon short-distance focusing at the telephoto end of the zoom lens 9 according to Example 9. FIG. 112 illustrates lateral aberration upon infinity focusing at the wide-angle end of the zoom lens 9 according to Example 9. FIG. 113 illustrates lateral aberration upon infinity focusing at the intermediate position of the zoom lens 9 according to Example 9. FIG. 114 illustrates lateral aberration upon infinity focusing at the telephoto end of the zoom lens 9 according to Example 9. FIG. 115 illustrates lateral aberration upon short-distance focusing at the wide-angle end of the zoom lens 9 according to Example 9. FIG. 116 illustrates lateral aberration upon short-distance focusing at the intermediate position of the zoom lens 9 according to Example 9. FIG. 117 illustrates lateral aberration upon short-distance focusing at the telephoto end of the zoom lens 9 according to Example 9.

As appreciated from each of the aberration diagrams, the zoom lens 9 according to Example 9 undergoes favorable correction of various aberrations, and thus has superior image-forming performance.

Example 10

Table 46 exhibits basic lens data of the zoom lens 10 according to Example 10 illustrated in FIG. 118. Table 47 exhibits values of the focal distance f of the total system, the F-value, the total angle of view 2w, the image height Y, and the total optical length L in the zoom lens 10 according to Example 10. Table 48 exhibits data on a surface interval that is variable upon zooming and focusing in the zoom lens 10 according to Example 10. It is to be noted that Table 47 exhibits values for each of the wide-angle end (Wide), the intermediate position (Mid), and the telephoto end (Tele) in a case where the object distance (d0) is infinity. Table 48 exhibits values for each of the wide-angle end (Wide), the intermediate position (Mid), and the telephoto end (Tele) in the case where the object distance (d0) is infinity and in a case where the object distance (d0) is a short distance. Table 49 exhibits values of coefficients indicating shapes of aspherical surfaces in the zoom lens 10 according to Example 10. Table 50 exhibits a starting surface and a focal distance (unit: mm) of each of lens groups of the zoom lens 10 according to Example 10.

The zoom lens 10 according to Example 10 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 10 according to Example 10 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative lens of a biconcave shape including an aspherical surface on both sides. The lens L23 is a positive lens of a biconvex shape. The lens L24 is a negative meniscus lens with a concave surface opposed to the object side.

The third lens group G3 includes lenses L31 to L35 in order from the object side toward the image plane side. The lens L31 is a positive lens of a biconvex shape including an aspherical surface on both sides. The lens L32 is a positive meniscus lens with a concave surface opposed to the object side. The lens L33 is a negative meniscus lens with a concave surface opposed to the object side. The lens L32 and the lens L33 constitute a cemented lens in which the lens L32 and the lens L33 are attached to each other. The lens L34 is a negative lens of a biconcave shape. The lens L35 is a positive meniscus lens with a convex surface opposed to the object side. The lens L34 and the lens L35 constitute a cemented lens in which the lens L34 and the lens L35 are attached to each other.

The fourth lens group G4 includes the lens L41. The lens L41 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61. The lens L61 is a negative meniscus lens with a concave surface opposed to the object side.

The above-described configuration allows for achievement of a zoom lens having a high variable magnification ratio while covering a wide-angle region despite a

TABLE 46

Example 10

| Si | ri | di | ndi | νdi | φi |
|---|---|---|---|---|---|
| 0 (OBJ) | | (d0) | | | |
| 1 | 78.067 | 1.70 | 1.86966 | 20.0 | 52.40 |
| 2 | 57.117 | 7.00 | 1.72916 | 54.7 | 50.55 |
| 3 | 380.913 | (d3) | | | 49.46 |
| 4 | 67.046 | 1.30 | 1.95375 | 32.3 | 30.67 |
| 5 | 14.241 | 8.09 | | | 22.67 |
| 6 (ASP) | −40.993 | 1.00 | 1.76802 | 49.2 | 21.86 |
| 7 (ASP) | 91.614 | 0.33 | | | 21.35 |
| 8 | 37.960 | 4.52 | 1.85451 | 25.2 | 21.12 |
| 9 | −42.270 | 1.21 | | | 20.49 |
| 10 | −23.829 | 1.00 | 1.49700 | 81.6 | 20.16 |
| 11 | −111.397 | (d11) | | | 19.11 |
| 12 (STO) | ∞ | 3.64 | | | 20.30 |
| 13 (ASP) | 23.381 | 6.70 | 1.63858 | 55.2 | 23.56 |
| 14 (ASP) | −33.091 | 0.20 | | | 23.33 |
| 15 | −273.257 | 6.48 | 1.49700 | 81.6 | 22.34 |
| 16 | −15.516 | 1.00 | 1.95375 | 32.3 | 21.55 |
| 17 | −20.780 | 0.20 | | | 22.01 |
| 18 | −30.314 | 1.00 | 1.80610 | 40.7 | 20.39 |
| 19 | 20.810 | 3.23 | 1.49700 | 81.6 | 19.65 |

TABLE 47

Example 10 (Zoom Ratio: 3.30)

| | Wide | Mid | Tele |
|---|---|---|---|
| f (mm) | 20.61 | 35.93 | 67.93 |
| Fno | 4.12 | 4.12 | 4.12 |
| 2ω (°) | 87.75 | 62.09 | 35.31 |
| Y (mm) | 19.82 | 21.63 | 21.62 |
| L (mm) | 113.05 | 125.34 | 153.05 |

TABLE 48

Example 10 • Variable Data

| | Wide | Mid | Tele | Wide | Mid | Tele |
|---|---|---|---|---|---|---|
| d0 | ∞ | ∞ | ∞ | 375 mm | 375 mm | 375 mm |
| d3 | 0.80 | 14.71 | 35.35 | 0.80 | 14.71 | 35.35 |
| d11 | 20.21 | 8.56 | 2.00 | 20.21 | 8.56 | 2.00 |
| d20 | 4.02 | 3.54 | 1.20 | 4.02 | 3.54 | 1.20 |
| d22 | 2.29 | 3.14 | 2.30 | 3.13 | 4.71 | 5.32 |
| d26 | 9.68 | 9.31 | 12.50 | 8.85 | 7.74 | 9.47 |
| d28 | 15.51 | 25.53 | 39.17 | 15.51 | 25.53 | 39.17 |

TABLE 49

Example 10 • Aspherical Data

| Si | k | A4 | A6 | A8 |
|---|---|---|---|---|
| 6 | 0.00000E+00 | 6.25668E−06 | −9.62733E−08 | 3.43699E−10 |
| 7 | 0.00000E+00 | 1.11747E−07 | −9.51503E−08 | 3.08546E−10 |
| 13 | 0.00000E+00 | −1.20206E−05 | −6.78434E−09 | 5.05074E−11 |
| 14 | 0.00000E+00 | 1.68789E−05 | −1.29804E−08 | 2.00819E−10 |
| 21 | 0.00000E+00 | −1.61288E−05 | −4.50657E−08 | 2.85993E−11 |
| 22 | 0.00000E+00 | 3.40694E−05 | −5.33512E−08 | 9.10212E−12 |
| 25 | 0.00000E+00 | 1.73831E−05 | −8.90958E−08 | −1.98760E−10 |
| 26 | 0.00000E+00 | 2.15253E−05 | −1.42720E−08 | −3.69060E−10 |

| Si | A10 | A12 |
|---|---|---|
| 6 | 0.00000E+00 | 0.00000E+00 |
| 7 | 0.00000E+00 | 0.00000E+00 |
| 13 | 0.00000E+00 | 0.00000E+00 |
| 14 | −3.66149E−13 | 0.00000E+00 |
| 21 | 0.00000E+00 | 0.00000E+00 |
| 22 | 0.00000E+00 | 0.00000E+00 |
| 25 | 0.00000E+00 | 0.00000E+00 |
| 26 | 0.00000E+00 | 0.00000E+00 |

TABLE 46-continued

Example 10

| Si | ri | di | ndi | νdi | φi |
|---|---|---|---|---|---|
| 20 | 81.327 | (d20) | | | 19.71 |
| 21 (ASP) | 27.102 | 6.27 | 1.49710 | 81.6 | 20.16 |
| 22 (ASP) | −19.310 | (d22) | | | 20.00 |
| 23 | −65.562 | 2.35 | 1.64769 | 33.8 | 20.08 |
| 24 | −32.528 | 0.51 | | | 20.28 |
| 25 (ASP) | −56.954 | 1.80 | 1.76802 | 49.2 | 20.00 |
| 26 (ASP) | 45.510 | (d26) | | | 20.15 |
| 27 | −22.834 | 1.00 | 1.59349 | 67.0 | 22.82 |
| 28 | −48.914 | (d28) | | | 24.65 |
| 29 (IMG) | ∞ | 0.00 | | | 43.32 |

TABLE 50

Example 10

| Lens Group | Starting Surface | Focal Distance |
|---|---|---|
| G1 | 1 | 145.40 |
| G2 | 4 | −19.45 |
| G3 | 13 | 44.30 |
| G4 | 21 | 23.75 |
| G5 | 23 | −49.09 |
| G6 | 27 | −73.21 |

Figure 119:
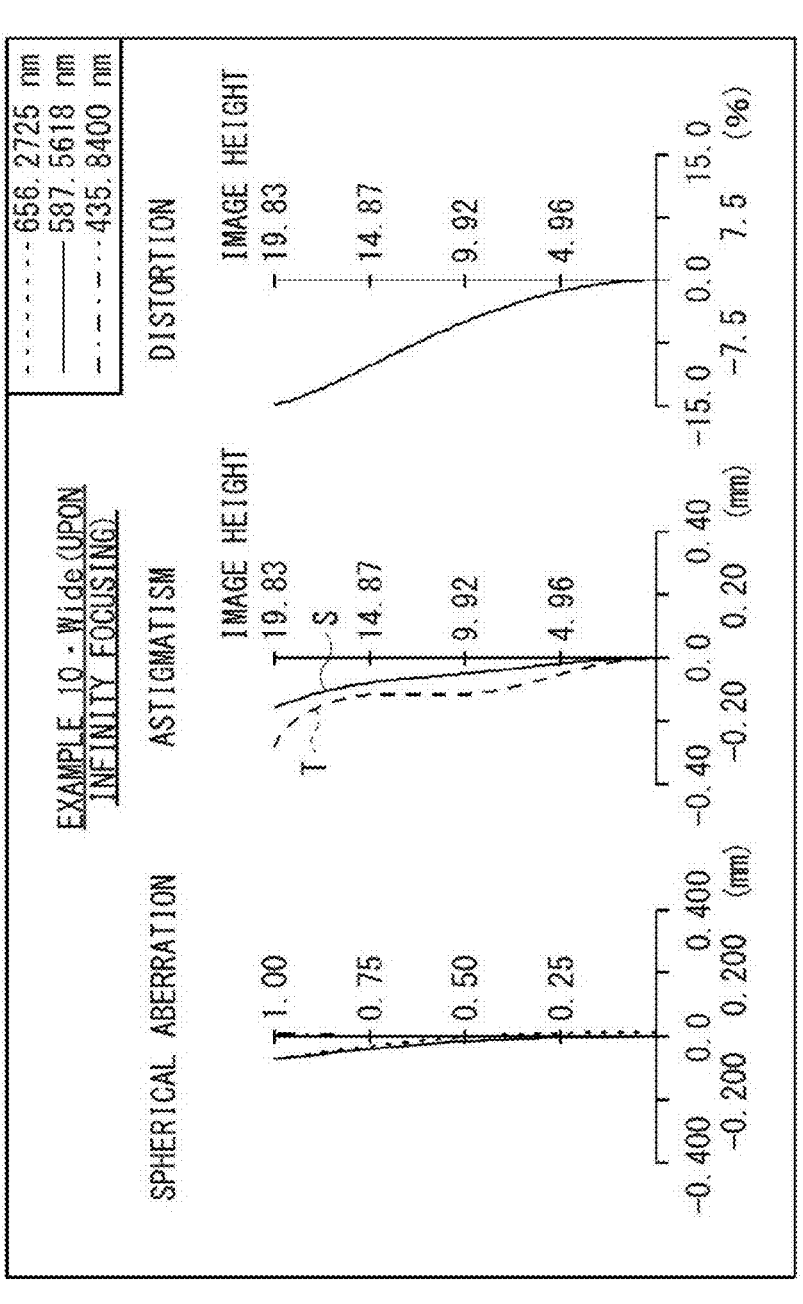
FIG. 119 is an aberration diagram illustrating longitudinal aberration upon infinity focusing at a wide-angle end of the zoom lens according to Example 10.
Figure 120:
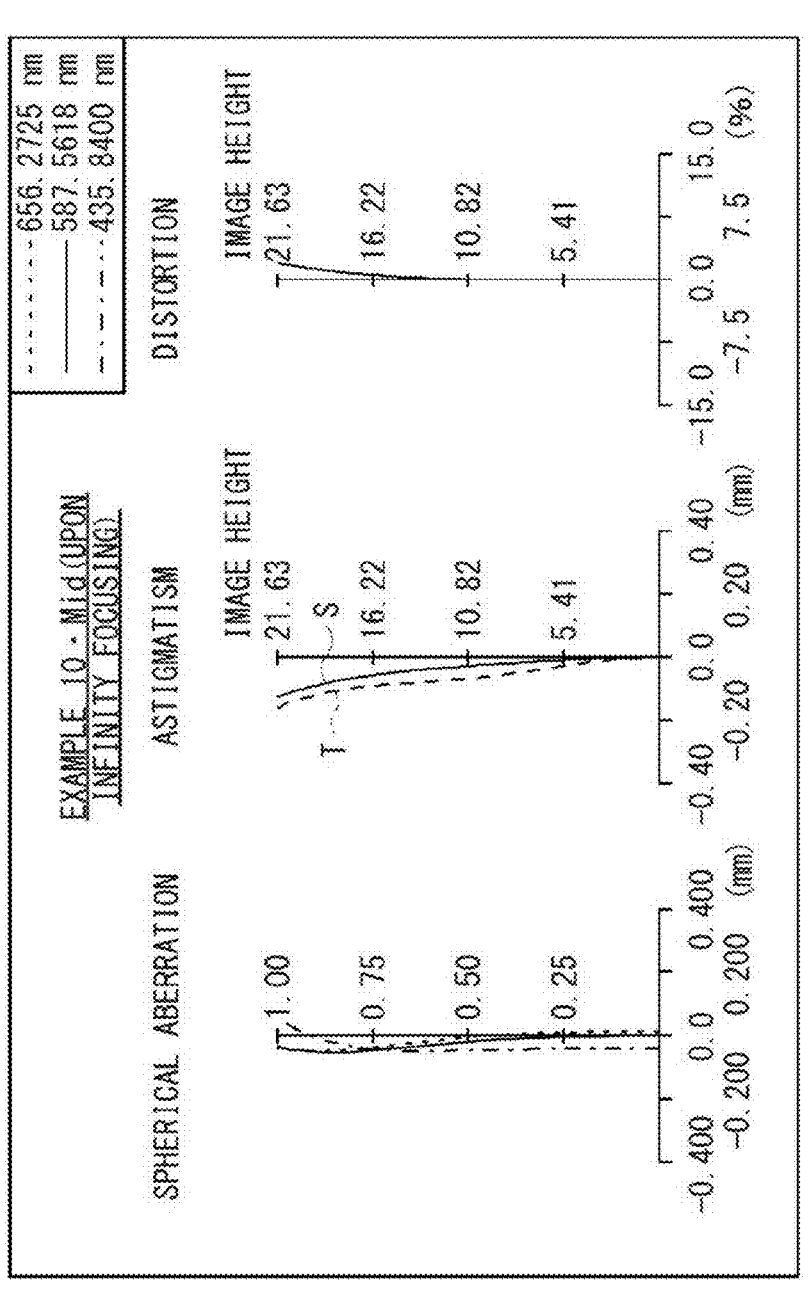
Figure 121:
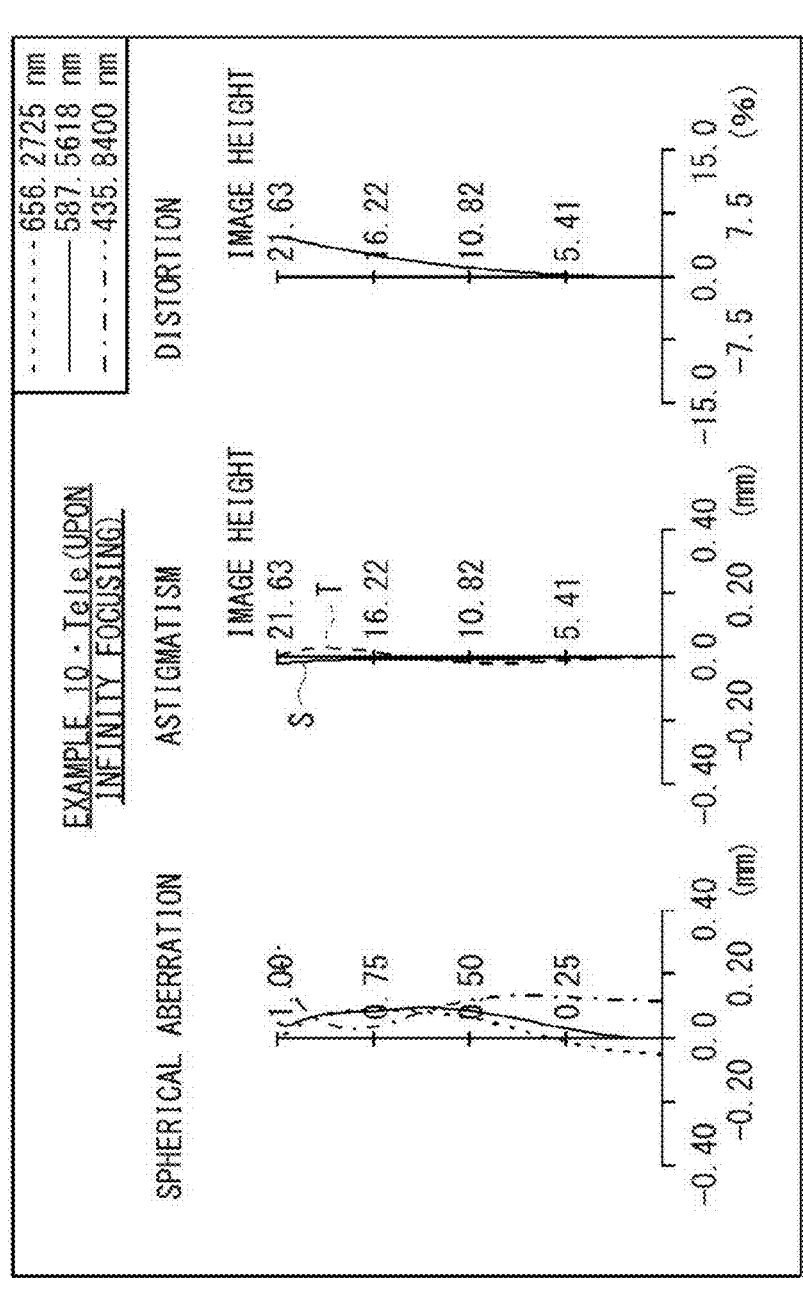
Figure 122:
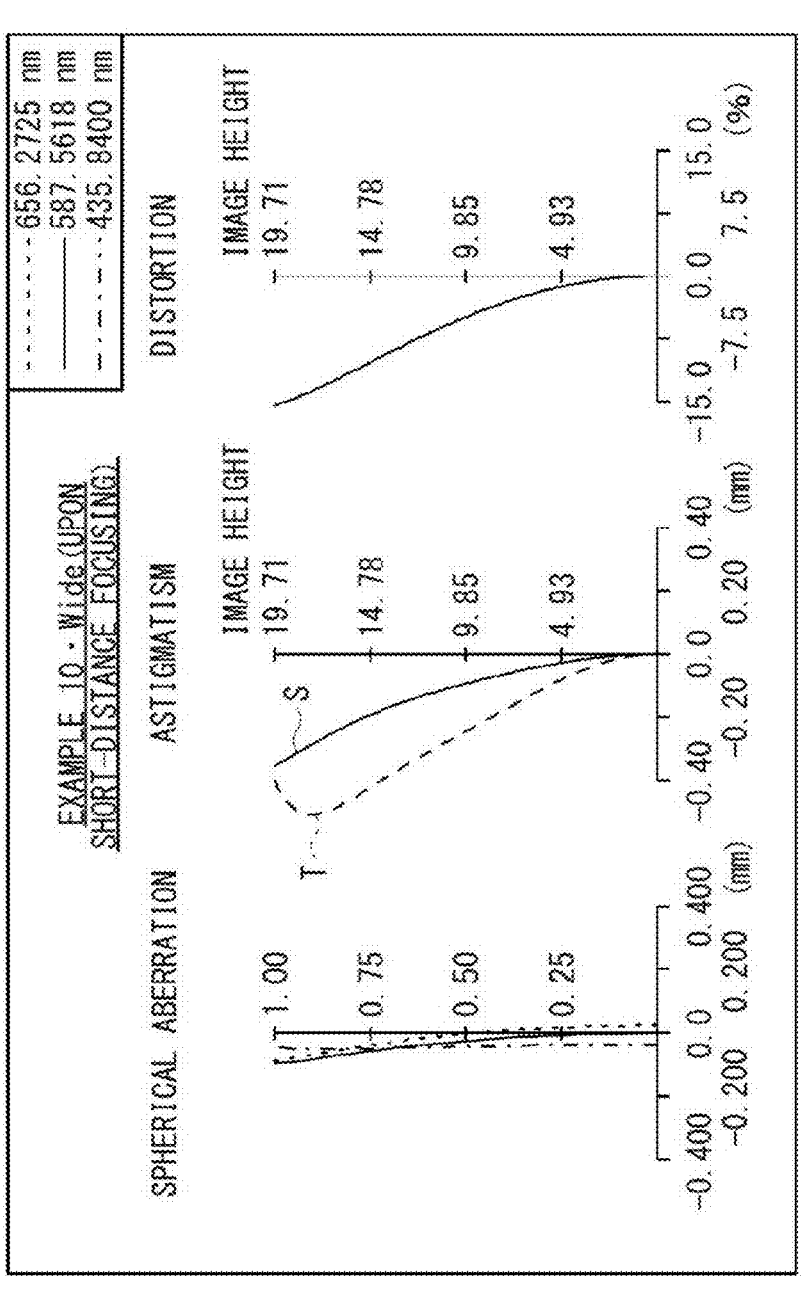
Figure 123:
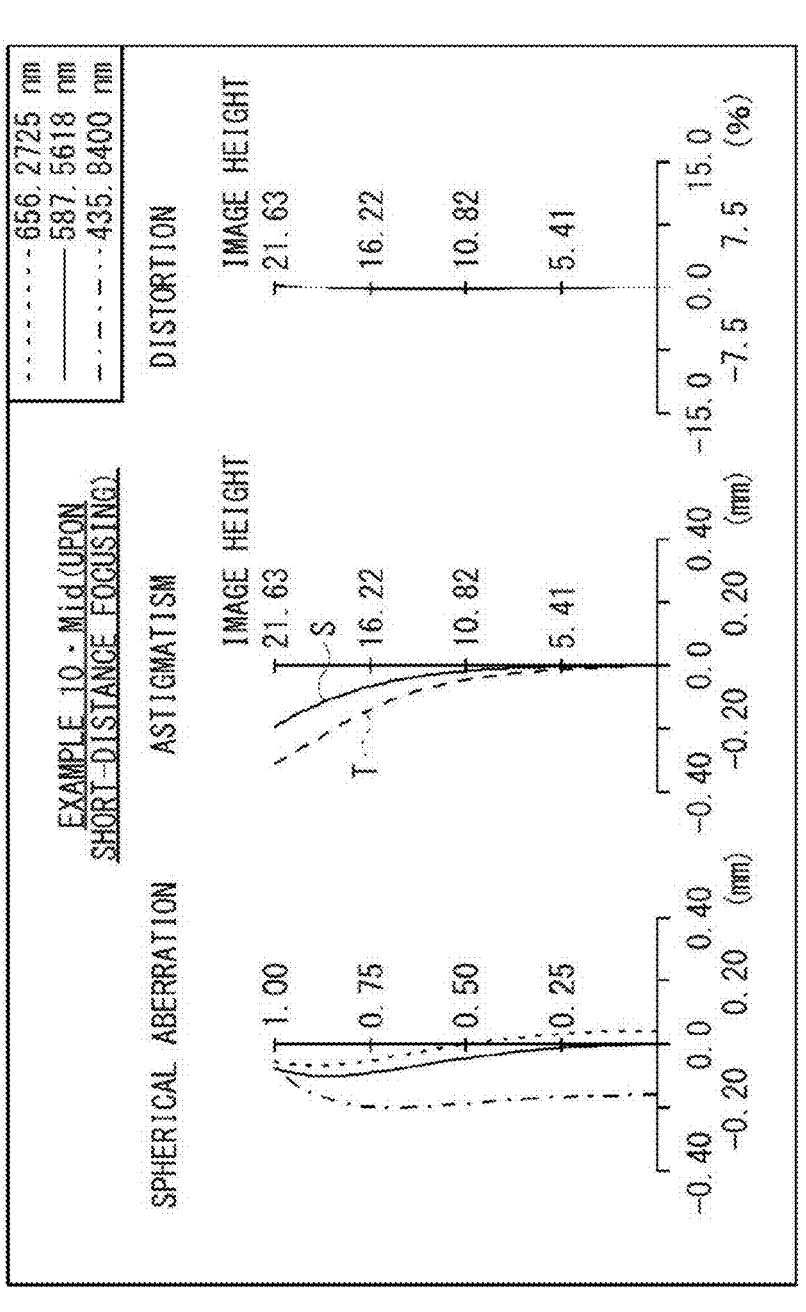
Figure 124:
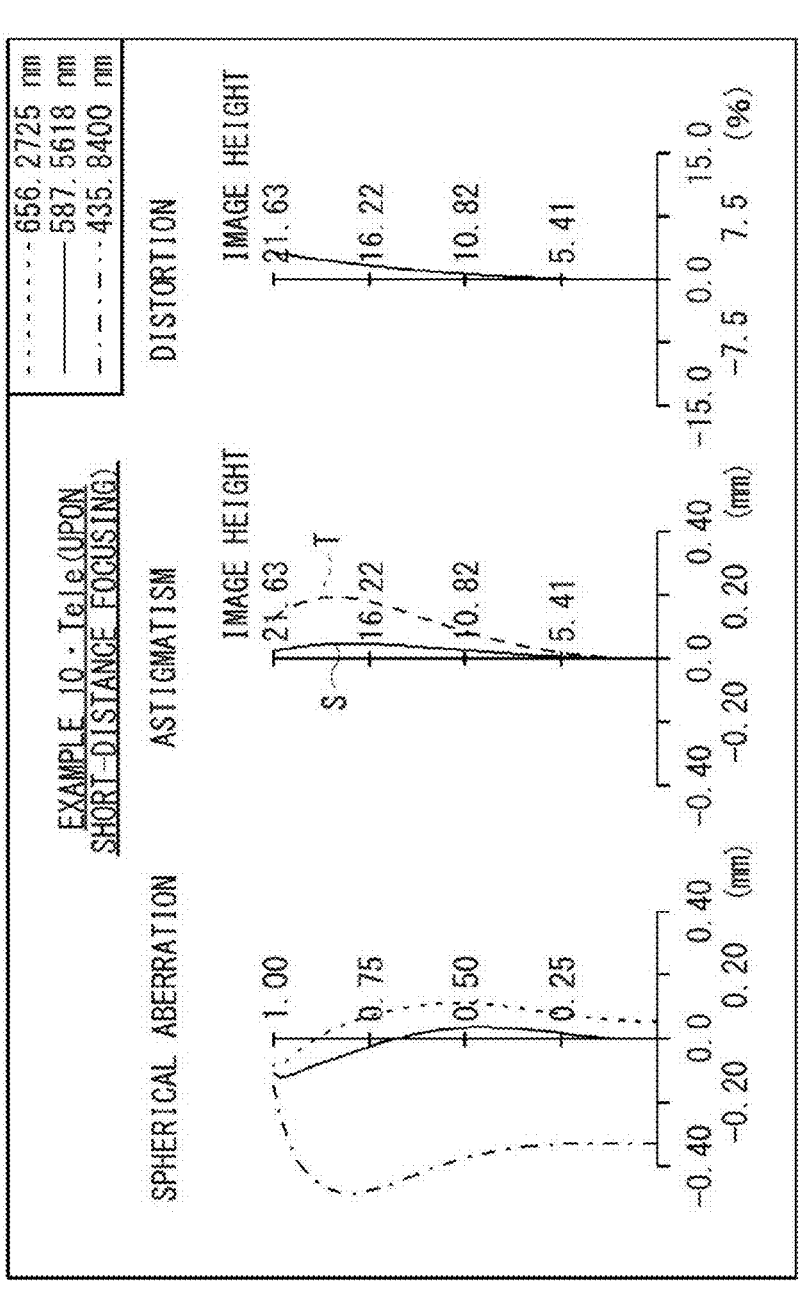
Figure 126:
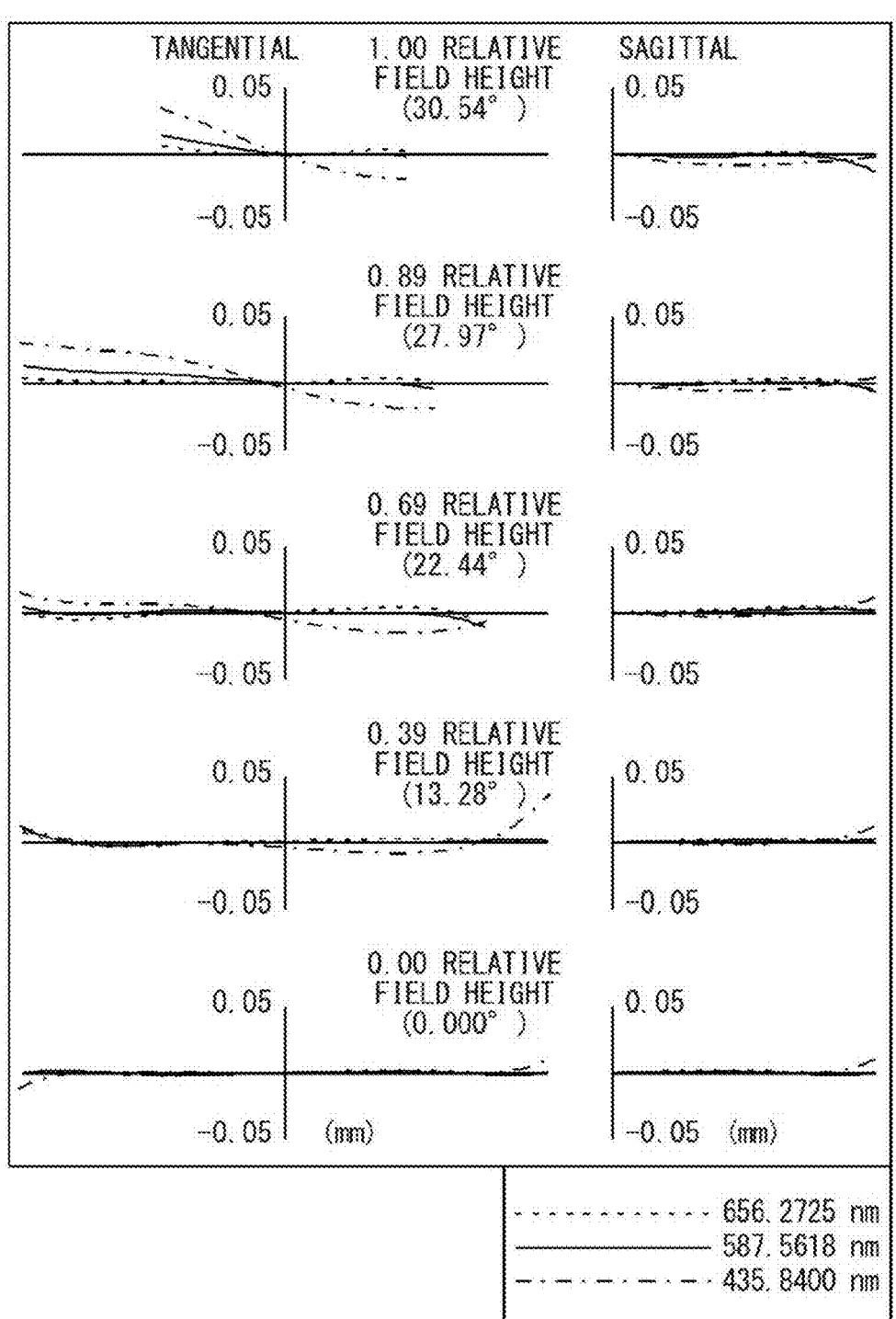
Figure 127:
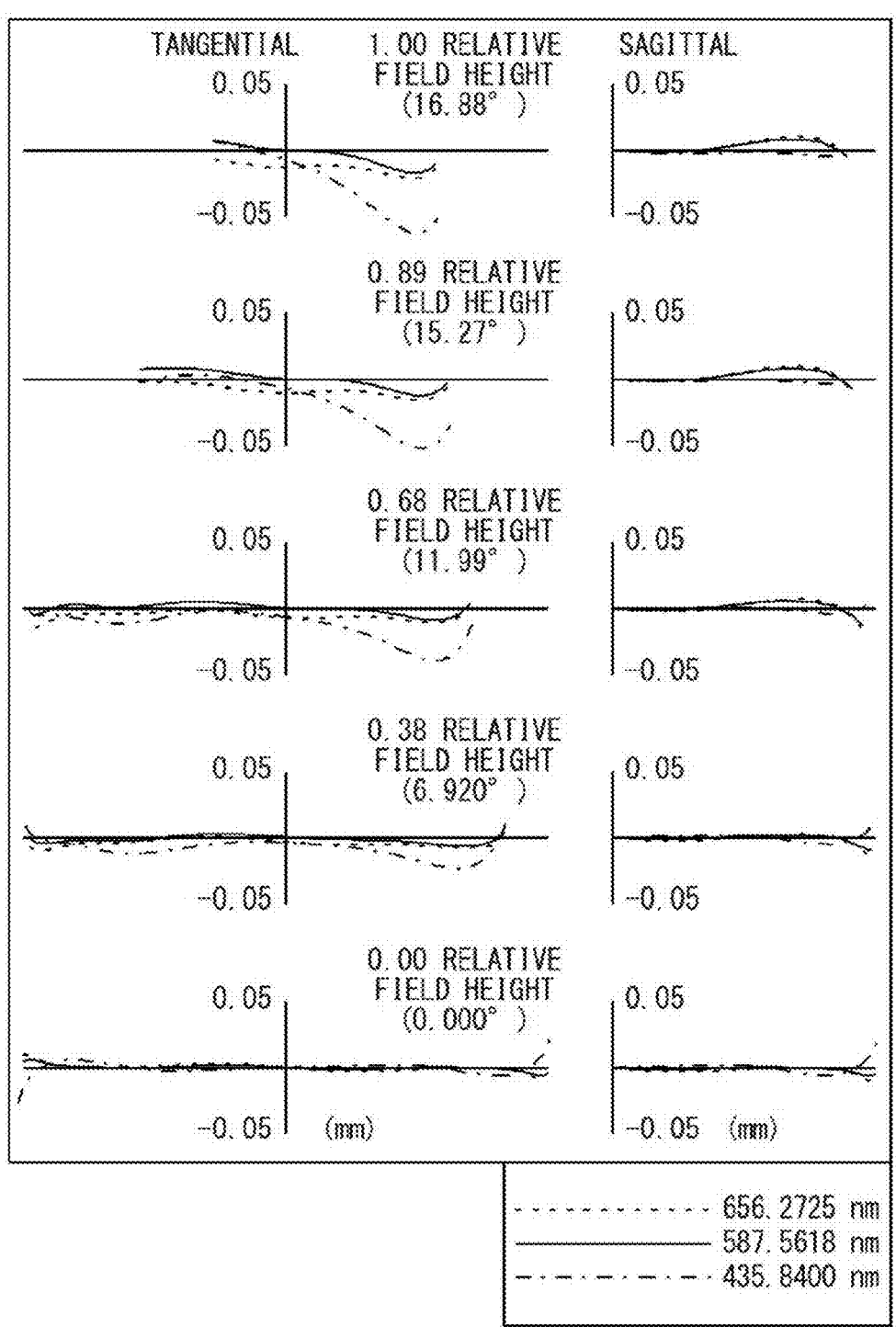
Figure 128:
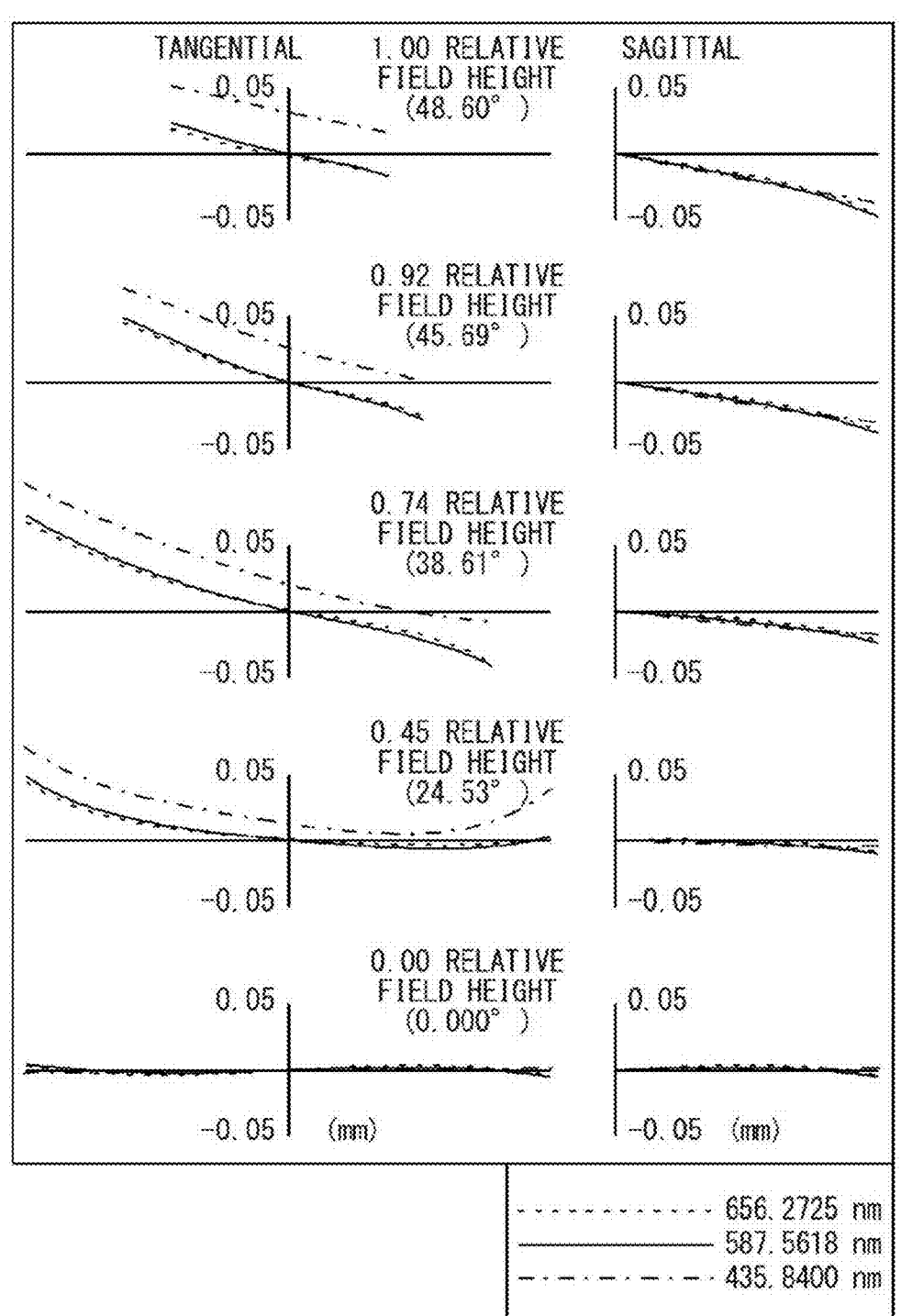
Figure 129:
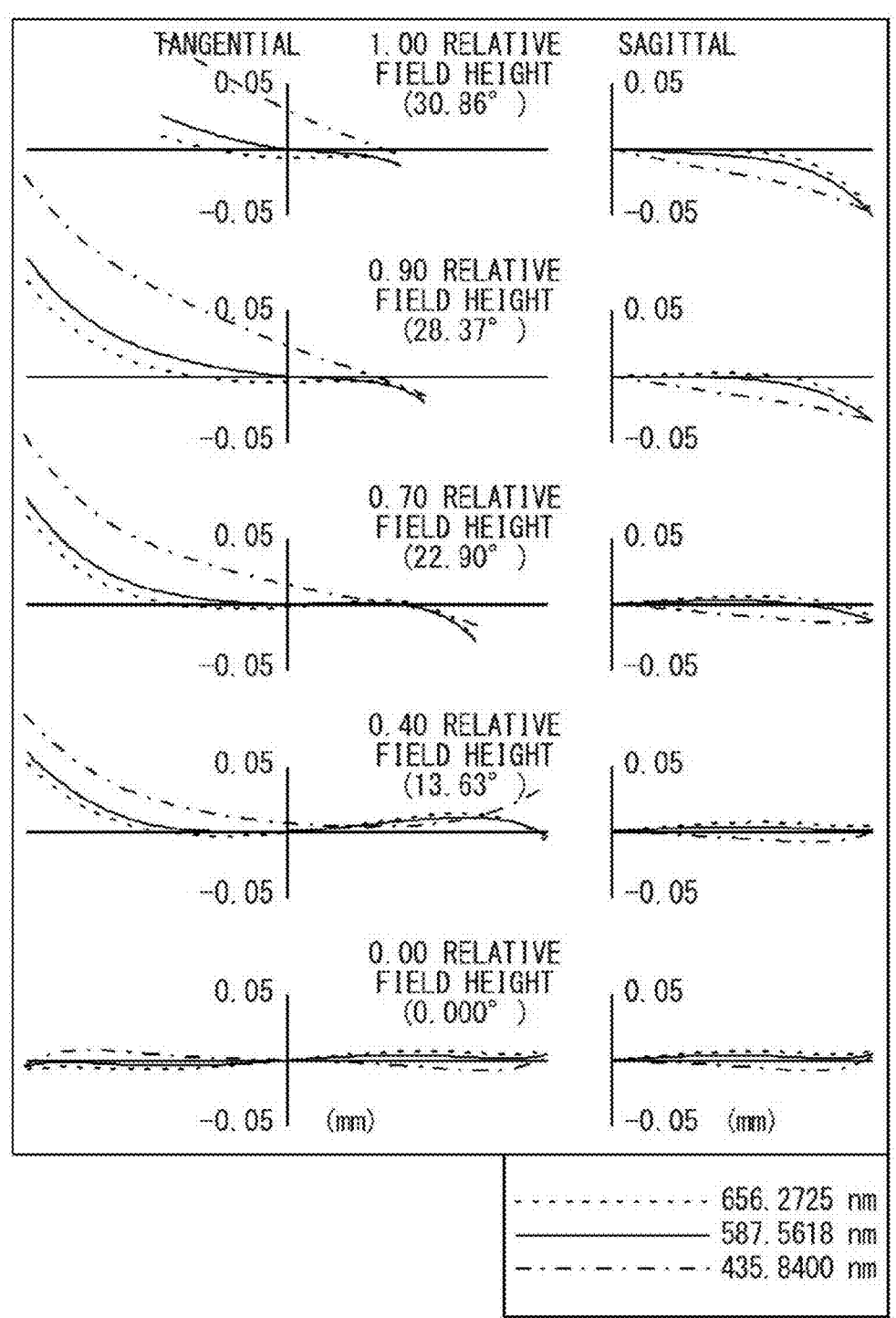
Figure 130:
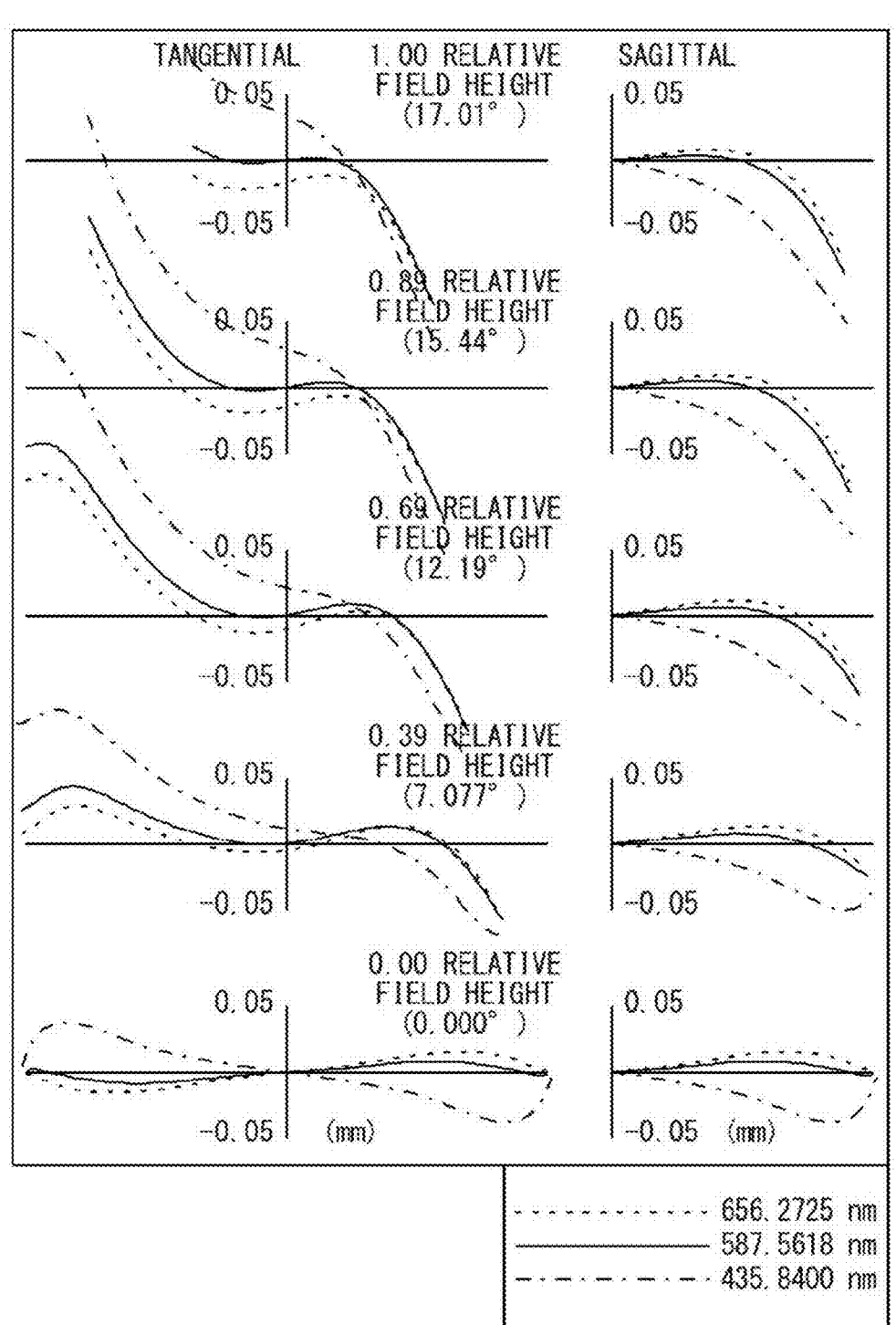

FIG. 119 illustrates longitudinal aberration upon infinity focusing at a wide-angle end of the zoom lens 10 according to Example 10. FIG. 120 illustrates longitudinal aberration upon infinity focusing at an intermediate position of the zoom lens 10 according to Example 10. FIG. 121 illustrates longitudinal aberration upon infinity focusing at a telephoto end of the zoom lens 10 according to Example 10. FIG. 122 illustrates longitudinal aberration upon short-distance focusing at the wide-angle end of the zoom lens 10 according to Example 10. FIG. 123 illustrates longitudinal aberration upon short-distance focusing at the intermediate position of the zoom lens 10 according to Example 10. FIG. 124 illustrates longitudinal aberration upon short-distance focusing at the telephoto end of the zoom lens 10 according to Example 10. FIG. 125 illustrates lateral aberration upon infinity focusing at the wide-angle end of the zoom lens 10 according to Example 10. FIG. 126 illustrates lateral aberration upon infinity focusing at the intermediate position of the zoom lens 10 according to Example 10. FIG. 127 illustrates lateral aberration upon infinity focusing at the telephoto end of the zoom lens 10 according to Example 10. FIG. 128 illustrates lateral aberration upon short-distance focusing at the wide-angle end of the zoom lens 10 according to Example 10. FIG. 129 illustrates lateral aberration upon short-distance focusing at the intermediate position of the zoom lens 10 according to Example 10. FIG. 130 illustrates lateral aberration upon short-distance focusing at the telephoto end of the zoom lens 10 according to Example 10.

As appreciated from each of the aberration diagrams, the zoom lens 10 according to Example 10 undergoes favorable correction of various aberrations, and thus has superior image-forming performance.

Example 11

Table 51 exhibits basic lens data of the zoom lens 11 according to Example 11 illustrated in FIG. 131. Table 52 exhibits values of the focal distance f of the total system, the F-value, the total angle of view 2o, the image height Y, and the total optical length L in the zoom lens 11 according to Example 11. Table 53 exhibits data on a surface interval that is variable upon zooming and focusing in the zoom lens 11 according to Example 11. It is to be noted that Table 52 exhibits values for each of the wide-angle end (Wide), the intermediate position (Mid), and the telephoto end (Tele) in a case where the object distance (d0) is infinity. Table 53 exhibits values for each of the wide-angle end (Wide), the intermediate position (Mid), and the telephoto end (Tele) in the case where the object distance (d0) is infinity and in a case where the object distance (d0) is a short distance. Table 54 exhibits values of coefficients indicating shapes of aspherical surfaces in the zoom lens 11 according to Example 11. Table 55 exhibits a starting surface and a focal distance (unit: mm) of each of lens groups of the zoom lens 11 according to Example 11.

The zoom lens 11 according to Example 11 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 11 according to Example 11 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative lens of a biconcave shape including an aspherical surface on both sides. The lens L23 is a positive lens of a biconvex shape. The lens L24 is a negative meniscus lens with a concave surface opposed to the object side.

The third lens group G3 includes lenses L31 to L34 in order from the object side toward the image plane side. The lens L31 is a positive lens of a biconvex shape including an aspherical surface on both sides. The lens L32 is a positive lens of a biconvex shape. The lens L33 is a negative meniscus lens with a concave surface opposed to the object side. The lens L32 and the lens L33 constitute a cemented lens in which the lens L32 and the lens L33 are attached to each other. The lens L34 is a negative meniscus lens with a concave surface opposed to the object side.

The fourth lens group G4 includes the lens L41. The lens L41 is a positive lens of a biconvex shape including an aspherical surface on both sides.

The fifth lens group G5 includes the lens L51 and the lens L52 in order from the object side toward the image plane side. The lens L51 is a positive lens of a biconvex shape. The lens L52 is a negative lens of a biconcave shape including an aspherical surface on both sides.

The sixth lens group G6 includes the lens L61. The lens L61 is a negative meniscus lens with a concave surface opposed to the object side.

The above-described configuration allows for achievement of a zoom lens having a high variable magnification ratio while covering a wide-angle region despite a

TABLE 51

| | | Example 11 | | | |
|---|---|---|---|---|---|
| Si | ri | di | ndi | vdi | φi |
| 0 (OBJ) | | (d0) | | | |
| 1 | 81.992 | 1.70 | 1.86966 | 20.0 | 52.40 |
| 2 | 59.539 | 6.93 | 1.72916 | 54.7 | 50.62 |
| 3 | 606.557 | (d3) | | | 49.63 |
| 4 | 102.401 | 1.30 | 1.77250 | 49.6 | 32.19 |
| 5 | 14.527 | 7.70 | | | 23.10 |
| 6 (ASP) | −45.354 | 1.00 | 1.76802 | 49.2 | 22.50 |
| 7 (ASP) | 63.357 | 0.20 | | | 21.65 |
| 8 | 39.522 | 4.17 | 1.76510 | 25.9 | 21.38 |
| 9 | −46.114 | 1.87 | | | 20.75 |
| 10 | −21.316 | 1.00 | 1.49700 | 81.6 | 19.97 |
| 11 | −62.555 | (d11) | | | 19.16 |
| 12 (STO) | ∞ | 1.50 | | | 19.63 |
| 13 (ASP) | 21.371 | 6.70 | 1.58151 | 64.6 | 22.02 |
| 14 (ASP) | −97.562 | 2.80 | | | 21.57 |
| 15 | 41.556 | 6.80 | 1.49700 | 81.6 | 19.81 |
| 16 | −15.675 | 1.00 | 1.95375 | 32.3 | 18.77 |
| 17 | −221.343 | 1.81 | | | 19.00 |
| 18 | −27.907 | 1.46 | 1.49700 | 81.6 | 19.01 |
| 19 | −43.623 | (d19) | | | 19.53 |
| 20 (ASP) | 26.707 | 6.18 | 1.49710 | 81.6 | 20.17 |
| 21 (ASP) | −19.704 | (d21) | | | 20.00 |
| 22 | 242.535 | 2.38 | 1.84666 | 23.8 | 20.43 |
| 23 | −55.745 | 0.20 | | | 20.43 |
| 24 (ASP) | −44.317 | 1.00 | 1.76802 | 49.2 | 20.37 |
| 25 (ASP) | 36.495 | (d25) | | | 20.22 |
| 26 | −21.191 | 1.00 | 1.49700 | 81.6 | 23.80 |
| 27 | −33.000 | (d27) | | | 25.47 |
| 28 (IMG) | ∞ | 0.00 | | | 43.35 |

TABLE 52

| Example 11 (Zoom Ratio: 3.29) | | | |
|---|---|---|---|
| | Wide | Mid | Tele |
| f (mm) | 20.61 | 35.77 | 67.89 |
| Fno | 4.12 | 4.13 | 4.14 |
| 2ω (°) | 87.68 | 62.28 | 35.33 |
| Y (mm) | 19.79 | 21.61 | 21.62 |
| L (mm) | 113.05 | 125.34 | 153.05 |

TABLE 53

| | Example 11 • Variable Data | | | | | |
|---|---|---|---|---|---|---|
| | Wide | Mid | Tele | Wide | Mid | Tele |
| d0 | ∞ | ∞ | ∞ | 379 mm | 379 mm | 379 mm |
| d3 | 0.80 | 11.55 | 33.18 | 0.80 | 11.55 | 33.18 |
| d11 | 20.05 | 10.07 | 2.00 | 20.05 | 10.07 | 2.00 |
| d19 | 3.69 | 1.80 | 1.20 | 3.69 | 1.80 | 1.20 |
| d21 | 2.29 | 2.00 | 4.57 | 3.19 | 3.52 | 8.25 |
| d25 | 12.01 | 14.19 | 12.23 | 11.11 | 12.67 | 8.54 |
| d27 | 15.51 | 27.03 | 41.18 | 15.51 | 27.03 | 41.18 |

TABLE 54

| | Example 11 • Aspherical Data | | |
|---|---|---|---|
| Si | k | A4 | A6 | A8 |
|---|---|---|---|---|
| 6 | 0.00000E+00 | 7.33601E−06 | −9.43638E−08 | 3.19056E−10 |
| 7 | 0.00000E+00 | −2.37393E−06 | −1.12512E−07 | 3.66476E−10 |
| 13 | 0.00000E+00 | −1.54686E−07 | 2.46310E−08 | 4.39748E−11 |
| 14 | 0.00000E+00 | −2.16974E−06 | 1.82551E−08 | 2.59121E−11 |
| 20 | 0.00000E+00 | −2.89996E−05 | −1.98848E−09 | −8.38739E−11 |
| 21 | 0.00000E+00 | 3.89148E−05 | −3.56449E−08 | 1.48904E−10 |
| 24 | 0.00000E+00 | 3.04171E−05 | −1.22718E−07 | 4.44147E−10 |
| 25 | 0.00000E+00 | 3.04735E−05 | −4.96099E−08 | 1.76974E−11 |

| Si | A10 | A12 |
|---|---|---|
| 6 | 3.51810E−13 | 0.00000E+00 |
| 7 | 0.00000E+00 | 0.00000E+00 |
| 13 | 0.00000E+00 | 0.00000E+00 |
| 14 | −6.99778E−13 | 0.00000E+00 |
| 20 | 0.00000E+00 | 0.00000E+00 |
| 21 | 0.00000E+00 | 0.00000E+00 |
| 24 | −6.10321E−13 | 0.00000E+00 |
| 25 | 0.00000E+00 | 0.00000E+00 |

TABLE 55

| Example 11 | | |
|---|---|---|
| Lens Group | Starting Surface | Focal Distance |
| G1 | 1 | 140.47 |
| G2 | 4 | −17.72 |
| G3 | 13 | 42.96 |
| G4 | 20 | 23.86 |
| G5 | 22 | −51.46 |
| G6 | 26 | −122.60 |

FIG. 132 illustrates longitudinal aberration upon infinity focusing at a wide-angle end of the zoom lens 11 according to Example 11. FIG. 133 illustrates longitudinal aberration upon infinity focusing at an intermediate position of the zoom lens 11 according to Example 11. FIG. 134 illustrates longitudinal aberration upon infinity focusing at a telephoto end of the zoom lens 11 according to Example 11. FIG. 135 illustrates longitudinal aberration upon short-distance focusing at the wide-angle end of the zoom lens 11 according to Example 11. FIG. 136 illustrates longitudinal aberration upon short-distance focusing at the intermediate position of the zoom lens 11 according to Example 11. FIG. 137 illustrates longitudinal aberration upon short-distance focusing at the telephoto end of the zoom lens 11 according to Example 11. FIG. 138 illustrates lateral aberration upon infinity focusing at the wide-angle end of the zoom lens 11 according to Example 11. FIG. 139 illustrates lateral aberration upon infinity focusing at the intermediate position of the zoom lens 11 according to Example 11. FIG. 140 illustrates lateral aberration upon infinity focusing at the telephoto end of the zoom lens 11 according to Example 11. FIG. 141 illustrates lateral aberration upon short-distance focusing at the wide-angle end of the zoom lens 11 according to Example 11. FIG. 142 illustrates lateral aberration upon short-distance focusing at the intermediate position of the zoom lens 11 according to Example 11. FIG. 143 illustrates lateral aberration upon short-distance focusing at the telephoto end of the zoom lens 11 according to Example 11.

As appreciated from each of the aberration diagrams, the zoom lens 11 according to Example 11 undergoes favorable correction of various aberrations, and thus has superior image-forming performance.

Example 12

Table 56 exhibits basic lens data of the zoom lens 12 according to Example 12 illustrated in FIG. 144. Table 57 exhibits values of the focal distance f of the total system, the F-value, the total angle of view 2*o*, the image height Y, and the total optical length L in the zoom lens 12 according to Example 12. Table 58 exhibits data on a surface interval that is variable upon zooming and focusing in the zoom lens 12 according to Example 12. It is to be noted that Table 57 exhibits values for each of the wide-angle end (Wide), the intermediate position (Mid), and the telephoto end (Tele) in a case where the object distance (d0) is infinity. Table 58 exhibits values for each of the wide-angle end (Wide), the intermediate position (Mid), and the telephoto end (Tele) in the case where the object distance (d0) is infinity and in a case where the object distance (d0) is a short distance. Table 59 exhibits values of coefficients indicating shapes of aspherical surfaces in the zoom lens 12 according to Example 12. Table 60 exhibits a starting surface and a focal distance (unit: mm) of each of lens groups of the zoom lens 12 according to Example 12.

The zoom lens 12 according to Example 12 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 12 according to Example 12 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative meniscus lens including an aspherical surface on both sides, with a convex surface opposed to the object side. The lens L23 is a positive lens of a biconvex shape. The lens L24 is a negative meniscus lens with a concave surface opposed to the object side.

The third lens group G3 includes the lenses L31 to L33 in order from the object side toward the image plane side. The lens L31 is a positive meniscus lens including an aspherical surface on both sides, with a convex surface opposed to the object side. The lens L32 is a negative meniscus lens with a convex surface opposed to the object side. The lens L33 is a positive meniscus lens with a convex surface opposed to the object side. The lens L32 and the lens L33 constitute a cemented lens in which the lens L32 and the lens L33 are attached to each other.

The fourth lens group G4 includes the lens L41 to L43 in order from the object side toward the image plane side. The lens L41 is a positive lens of a biconvex shape. The lens L42 is a negative lens of a biconcave shape. The lens L41 and the lens L42 constitute a cemented lens in which the lens L41 and the lens L42 are attached to each other. The lens L43 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61. The lens L61 is a negative meniscus lens with a concave surface opposed to the object side.

The above-described configuration allows for achievement of a zoom lens having a high variable magnification ratio while covering a wide-angle region despite a miniaturized optical system.

TABLE 56

| | | Example 12 | | | |
|---|---|---|---|---|---|
| Si | ri | di | ndi | vdi | φi |
| 0 (OBJ) | | (d0) | | | |
| 1 | 70.664 | 1.70 | 1.94595 | 18.0 | 52.40 |
| 2 | 57.456 | 7.20 | 1.64000 | 60.2 | 50.74 |
| 3 | 640.516 | (d3) | | | 49.70 |
| 4 | 157.642 | 1.30 | 1.77250 | 49.6 | 32.37 |
| 5 | 14.219 | 8.49 | | | 23.08 |
| 6 (ASP) | −50.958 | 1.04 | 1.76802 | 49.2 | 22.19 |
| 7 (ASP) | −500.000 | 0.20 | | | 22.05 |
| 8 | 113.244 | 3.15 | 1.85478 | 24.8 | 21.30 |
| 9 | −48.972 | 1.56 | | | 20.70 |
| 10 | −23.517 | 1.00 | 1.49700 | 81.6 | 20.13 |
| 11 | −71.945 | (d11) | | | 19.20 |
| 12 (STO) | ∞ | 1.50 | | | 19.26 |
| 13 (ASP) | 33.936 | 3.23 | 1.76802 | 49.2 | 21.09 |
| 14 (ASP) | 58.291 | 0.20 | | | 20.59 |
| 15 | 16.650 | 1.00 | 1.87070 | 40.7 | 21.43 |
| 16 | 12.223 | 5.92 | 1.48749 | 70.4 | 20.07 |
| 17 | 33.788 | (d17) | | | 19.85 |

TABLE 56-continued

| | | Example 12 | | | |
|---|---|---|---|---|---|
| Si | ri | di | ndi | vdi | φi |
| 18 | 27.133 | 4.57 | 1.49700 | 81.6 | 20.07 |
| 19 | −46.112 | 1.00 | 1.80610 | 33.3 | 19.81 |
| 20 | 59.459 | 3.03 | | | 19.67 |
| 21 (ASP) | 27.462 | 6.20 | 1.49710 | 81.6 | 20.41 |
| 22 (ASP) | −19.811 | (d22) | | | 20.40 |
| 23 | −81.140 | 3.10 | 1.85478 | 24.8 | 20.87 |
| 24 | −32.992 | 0.20 | | | 21.19 |
| 25 (ASP) | −40.386 | 1.00 | 1.76802 | 49.2 | 21.01 |
| 26 (ASP) | 53.043 | (d26) | | | 21.25 |
| 27 | −25.104 | 1.00 | 1.84666 | 23.8 | 24.29 |
| 28 | −33.333 | (d28) | | | 25.42 |
| 29 (IMG) | ∞ | 0.00 | | | 43.28 |

TABLE 57

| Example 12 (Zoom Ratio: 3.29) | | | |
|---|---|---|---|
| | Wide | Mid | Tele |
| f (mm) | 20.61 | 36.05 | 67.90 |
| Fno | 4.12 | 4.12 | 4.12 |
| 2ω (°) | 87.69 | 61.88 | 35.30 |
| Y (mm | 19.79 | 21.61 | 21.60 |
| L (mm) | 115.05 | 127.34 | 155.05 |

TABLE 58

| | Example 12 • Variable Data | | | | | |
|---|---|---|---|---|---|---|
| | Wide | Mid | Tele | Wide | Mid | Tele |
| d0 | ∞ | ∞ | ∞ | 299 mm | 379 mm | 379 mm |
| d3 | 0.80 | 14.14 | 33.84 | 0.80 | 14.14 | 33.84 |
| d11 | 20.00 | 9.32 | 2.00 | 20.00 | 9.32 | 2.00 |
| d17 | 5.59 | 2.59 | 1.00 | 5.59 | 2.59 | 1.00 |
| d22 | 3.37 | 2.41 | 2.30 | 4.67 | 4.06 | 5.80 |
| d26 | 10.37 | 14.33 | 16.03 | 9.08 | 12.69 | 12.53 |
| d28 | 17.32 | 26.95 | 42.28 | 17.32 | 26.95 | 42.28 |

TABLE 59

| | Example 12 • Aspherical Data | | |
|---|---|---|---|
| Si | k | A4 | A6 | A8 |
|---|---|---|---|---|
| 6 | 0.00000E+00 | 8.38159E−06 | −2.19323E−07 | 9.07387E−10 |
| 7 | 0.00000E+00 | −9.34360E−06 | −2.31682E−07 | 6.57539E−10 |
| 13 | 0.00000E+00 | 2.31312E−05 | 1.39769E−07 | −3.73230E−10 |
| 14 | 0.00000E+00 | 3.13530E−05 | 1.74534E−07 | −3.77148E−10 |
| 21 | 0.00000E+00 | −3.47161E−05 | 1.97142E−08 | −5.57216E−10 |
| 22 | 0.00000E+00 | 3.30726E−05 | −5.12963E−08 | −8.95613E−11 |
| 25 | 0.00000E+00 | 1.76298E−05 | −1.38470E−07 | 4.27292E−10 |
| 26 | 0.00000E+00 | 1.90553E−05 | −9.73622E−08 | 5.63201E−10 |

| Si | A10 | A12 |
|---|---|---|
| 6 | −3.96897E−12 | 0.00000E+00 |
| 7 | −2.83771E−12 | 0.00000E+00 |
| 13 | 1.77318E−12 | 0.00000E+00 |
| 14 | 2.30157E−12 | 0.00000E+00 |
| 21 | −5.10292E−13 | 0.00000E+00 |
| 22 | −2.12878E−12 | 0.00000E+00 |
| 25 | −1.18477E−12 | 0.00000E+00 |
| 26 | −2.55699E−12 | 0.00000E+00 |

TABLE 60

| | Example 12 | |
| --- | --- | --- |
| Lens Group | Starting Surface | Focal Distance |
| G1 | 1 | 139.43 |
| G2 | 4 | −19.04 |
| G3 | 13 | 51.32 |
| G4 | 18 | 26.20 |
| G5 | 23 | −55.01 |
| G6 | 27 | −127.20 |

FIG. 145 illustrates longitudinal aberration upon infinity focusing at a wide-angle end of the zoom lens 12 according to Example 12. FIG. 146 illustrates longitudinal aberration upon infinity focusing at an intermediate position of the zoom lens 12 according to Example 12. FIG. 147 illustrates longitudinal aberration upon infinity focusing at a telephoto end of the zoom lens 12 according to Example 12. FIG. 148 illustrates longitudinal aberration upon short-distance focusing at the wide-angle end of the zoom lens 12 according to Example 12. FIG. 149 illustrates longitudinal aberration upon short-distance focusing at the intermediate position of the zoom lens 12 according to Example 12. FIG. 150 illustrates longitudinal aberration upon short-distance focusing at the telephoto end of the zoom lens 12 according to Example 12. FIG. 151 illustrates lateral aberration upon infinity focusing at the wide-angle end of the zoom lens 12 according to Example 12. FIG. 152 illustrates lateral aberration upon infinity focusing at the intermediate position of the zoom lens 12 according to Example 12. FIG. 153 illustrates lateral aberration upon infinity focusing at the telephoto end of the zoom lens 12 according to Example 12. FIG. 154 illustrates lateral aberration upon short-distance focusing at the wide-angle end of the zoom lens 12 according to Example 12. FIG. 155 illustrates lateral aberration upon short-distance focusing at the intermediate position of the zoom lens 12 according to Example 12. FIG. 156 illustrates lateral aberration upon short-distance focusing at the telephoto end of the zoom lens 12 according to Example 12.

As appreciated from each of the aberration diagrams, the zoom lens 12 according to Example 12 undergoes favorable correction of various aberrations, and thus has superior image-forming performance.

Example 13

Table 61 exhibits basic lens data of the zoom lens 13 according to Example 13 illustrated in FIG. 157. Table 62 exhibits values of the focal distance f of the total system, the F-value, the total angle of view 2o, the image height Y, and the total optical length L in the zoom lens 13 according to Example 13. Table 63 exhibits data on a surface interval that is variable upon zooming and focusing in the zoom lens 13 according to Example 13. It is to be noted that Table 62 exhibits values for each of the wide-angle end (Wide), the intermediate position (Mid), and the telephoto end (Tele) in a case where the object distance (d0) is infinity. Table 63 exhibits values for each of the wide-angle end (Wide), the intermediate position (Mid), and the telephoto end (Tele) in the case where the object distance (d0) is infinity and in a case where the object distance (d0) is a short distance. Table 64 exhibits values of coefficients indicating shapes of aspherical surfaces in the zoom lens 13 according to Example 13. Table 65 exhibits a starting surface and a focal distance (unit: mm) of each of lens groups of the zoom lens 13 according to Example 13.

The zoom lens 13 according to Example 13 has a configuration in which the first lens group G1 having positive refractive power, the second lens group G2 having negative refractive power, the aperture stop St, the third lens group G3 having positive refractive power, the fourth lens group G4 having positive refractive power, the fifth lens group G5 having negative refractive power, and the sixth lens group G6 having negative refractive power are disposed in order from the object side toward the image plane side.

The zoom lens 13 according to Example 13 moves to allow an interval between adjacent lens groups to vary upon zooming. Upon zooming from the wide-angle end to the telephoto end, the third lens group G3 and the sixth lens group G6 as the final lens group GR move in the same trajectory. Upon focusing in the object distance from infinity to a short distance, the fifth lens group G5 moves in the optical axis direction to the image plane side.

The first lens group G1 includes the lens L11 and the lens L12 in order from the object side toward the image plane side. The lens L11 is a negative meniscus lens with a convex surface opposed to the object side. The lens L12 is a positive meniscus lens with a convex surface opposed to the object side. The lens L11 and the lens L12 constitute a cemented lens in which the lens L11 and the lens L12 are attached to each other.

The second lens group G2 includes the lenses L21 to L24 in order from the object side toward the image plane side. The lens L21 is a negative meniscus lens with a convex surface opposed to the object side. The lens L22 is a negative lens of a biconcave shape including an aspherical surface on both sides. The lens L23 is a positive lens of a biconvex shape. The lens L24 is a negative lens of a biconcave shape.

The third lens group G3 includes the lens L31. The lens L31 is a positive meniscus lens including an aspherical surface on both sides, with a convex surface opposed to the object side.

The fourth lens group G4 includes the lenses L41 to L45 in order from the object side toward the image plane side. The lens L41 is a negative meniscus lens with a convex surface opposed to the object side. The lens L42 is a positive meniscus lens with a convex surface opposed to the object side. The lens L41 and the lens L42 constitute a cemented lens in which the lens L41 and the lens L42 are attached to each other. The lens L43 is a positive lens of a biconvex shape. The lens L44 is a negative lens of a biconcave shape. The lens L43 and the lens L44 constitute a cemented lens in which the lens L43 and the lens L44 are attached to each other. The lens L45 is a positive lens of a biconvex shape including an aspherical surface on both sides.

The fifth lens group G5 includes the lens L51 and the lens L52 in order from the object side toward the image plane side. The lens L51 is a positive meniscus lens with a concave surface opposed to the object side. The lens L52 is a negative lens of a biconcave shape including an aspherical surface on both sides.

The sixth lens group G6 includes the lens L61 and the lens L62 in order from the object side toward the image plane side. The lens L61 is a positive lens of a biconvex shape. The lens L62 is a negative meniscus lens with a concave surface opposed to the object side.

The above-described configuration allows for achievement of a zoom lens having a high variable magnification ratio while covering a wide-angle region despite a miniaturized optical system.

TABLE 61

Example 13

| Si | ri | di | ndi | vdi | φi |
|---|---|---|---|---|---|
| 0 (OBJ) | | (d0) | | | |
| 1 | 66.370 | 1.70 | 1.94595 | 18.0 | 52.40 |
| 2 | 55.751 | 7.39 | 1.64000 | 60.2 | 50.76 |
| 3 | 406.601 | (d3) | | | 49.50 |
| 4 | 152.916 | 1.30 | 1.77250 | 49.6 | 33.33 |
| 5 | 14.958 | 7.84 | | | 23.93 |
| 6 (ASP) | -132.021 | 1.00 | 1.77002 | 49.4 | 22.71 |
| 7 (ASP) | 36.856 | 0.20 | | | 21.57 |
| 8 | 29.493 | 4.64 | 1.77047 | 29.7 | 21.38 |
| 9 | -65.485 | 1.41 | | | 20.47 |
| 10 | -30.699 | 0.90 | 1.49700 | 81.6 | 19.64 |
| 11 | 1260.631 | (d11) | | | 18.40 |
| 12 (STO) | ∞ | 1.50 | | | 18.23 |
| 13 (ASP) | 27.260 | 2.87 | 1.69350 | 53.2 | 19.98 |
| 14 (ASP) | 70.183 | (d14) | | | 19.86 |
| 15 | 25.777 | 1.30 | 1.87070 | 40.7 | 20.52 |
| 16 | 13.500 | 6.00 | 1.59349 | 67.0 | 19.53 |
| 17 | 216.196 | 1.81 | | | 19.52 |
| 18 | 143.475 | 3.02 | 1.59282 | 68.6 | 19.60 |
| 19 | -35.930 | 0.90 | 1.73037 | 32.2 | 19.57 |
| 20 | 122.988 | 1.82 | | | 19.68 |
| 21 (ASP) | 30.759 | 6.20 | 1.49710 | 81.6 | 20.22 |
| 22 (ASP) | -19.698 | (d22) | | | 20.20 |
| 23 | -93.436 | 2.17 | 1.85478 | 24.8 | 20.48 |
| 24 | -34.291 | 0.38 | | | 20.62 |
| 25 (ASP) | -33.054 | 1.00 | 1.77002 | 49.4 | 20.46 |
| 26 (ASP) | 40.969 | (d26) | | | 20.77 |
| 27 | 107.798 | 3.35 | 1.49700 | 81.6 | 24.13 |
| 28 | -135.326 | 5.63 | | | 24.67 |
| 29 | -28.271 | 1.00 | 1.64000 | 60.2 | 25.59 |
| 30 | -55.581 | (d30) | | | 26.95 |
| 31 (IMG) | ∞ | 0.00 | | | 43.31 |

TABLE 62

Example 13 (Zoom Ratio: 3.30)

| | Wide | Mid | Tele |
|---|---|---|---|
| f (mm) | 20.61 | 35.10 | 67.91 |
| Fno | 4.12 | 4.12 | 4.12 |
| 2ω (°) | 87.71 | 63.06 | 35.31 |
| Y (mm) | 19.80 | 21.54 | 21.62 |
| L (mm) | 115.05 | 127.34 | 155.05 |

TABLE 63

Example 13 • Variable Data

| | Wide | Mid | Tele | Wide | Mid | Tele |
|---|---|---|---|---|---|---|
| d0 | ∞ | ∞ | ∞ | 279 mm | 299 mm | 379 mm |
| d3 | 0.80 | 12.02 | 33.40 | 0.80 | 12.02 | 33.40 |
| d11 | 17.65 | 9.03 | 2.00 | 17.65 | 9.03 | 2.00 |
| d14 | 7.91 | 4.62 | 2.01 | 7.91 | 4.62 | 2.01 |
| d22 | 3.19 | 2.30 | 2.69 | 4.21 | 3.84 | 5.27 |
| d26 | 4.83 | 9.02 | 11.24 | 3.82 | 7.48 | 8.66 |
| d30 | 15.34 | 25.03 | 38.39 | 15.34 | 25.03 | 38.39 |

TABLE 64

Example 13 • Aspherical Data

| Si | k | A4 | A6 | A8 |
|---|---|---|---|---|
| 6 | 0.00000E+00 | 8.99165E-06 | -2.37679E-08 | 3.86666E-11 |
| 7 | 0.00000E+00 | -1.16328E-06 | -3.28239E-08 | -6.30053E-11 |
| 13 | 0.00000E+00 | -1.02247E-05 | 6.37612E-08 | 3.68381E-10 |
| 14 | 0.00000E+00 | -3.32252E-06 | 8.10131E-08 | 5.22332E-10 |

TABLE 64-continued

Example 13 • Aspherical Data

| 21 | 0.00000E+00 | -3.31923E-05 | -1.84740E-08 | 1.44535E-10 |
|---|---|---|---|---|
| 22 | 0.00000E+00 | 1.69633E-05 | -4.06098E-09 | -1.66768E-10 |
| 25 | 0.00000E+00 | 2.45643E-05 | -8.69498E-08 | -9.23112E-11 |
| 26 | 0.00000E+00 | 2.60724E-05 | -1.03880E-07 | 4.22200E-11 |

| Si | A10 | A12 |
|---|---|---|
| 6 | 0.00000E+00 | 0.00000E+00 |
| 7 | 0.00000E+00 | 0.00000E+00 |
| 13 | -1.71654E-13 | 0.00000E+00 |
| 14 | 0.00000E+00 | 0.00000E+00 |
| 21 | 0.00000E+00 | 0.00000E+00 |
| 22 | 0.00000E+00 | 0.00000E+00 |
| 25 | 0.00000E+00 | 0.00000E+00 |
| 26 | 0.00000E+00 | 0.00000E+00 |

TABLE 65

Example 13

| Lens Group | Starting Surface | Focal Distance |
|---|---|---|
| G1 | 1 | 136.21 |
| G2 | 4 | -18.29 |
| G3 | 13 | 62.56 |
| G4 | 15 | 25.11 |
| G5 | 23 | -38.00 |
| G6 | 27 | -463.93 |

FIG. 158 illustrates longitudinal aberration upon infinity focusing at a wide-angle end of the zoom lens 13 according to Example 13. FIG. 159 illustrates longitudinal aberration upon infinity focusing at an intermediate position of the zoom lens 13 according to Example 13. FIG. 160 illustrates longitudinal aberration upon infinity focusing at a telephoto end of the zoom lens 13 according to Example 13. FIG. 161 illustrates longitudinal aberration upon short-distance focusing at the wide-angle end of the zoom lens 13 according to Example 13. FIG. 162 illustrates longitudinal aberration upon short-distance focusing at the intermediate position of the zoom lens 13 according to Example 13. FIG. 163 illustrates longitudinal aberration upon short-distance focusing at the telephoto end of the zoom lens 13 according to Example 13. FIG. 164 illustrates lateral aberration upon infinity focusing at the wide-angle end of the zoom lens 13 according to Example 13. FIG. 165 illustrates lateral aberration upon infinity focusing at the intermediate position of the zoom lens 13 according to Example 13. FIG. 166 illustrates lateral aberration upon infinity focusing at the telephoto end of the zoom lens 13 according to Example 13. FIG. 167 illustrates lateral aberration upon short-distance focusing at the wide-angle end of the zoom lens according to Example 13. FIG. 168 illustrates lateral aberration upon short-distance focusing at the intermediate position of the zoom lens 13 according to Example 13. FIG. 169 illustrates lateral aberration upon short-distance focusing at the telephoto end of the zoom lens 13 according to Example 13.

As appreciated from each of the aberration diagrams, the zoom lens 13 according to Example 13 undergoes favorable correction of various aberrations, and thus has superior image-forming performance.

[Other Numerical Data of Each Example]

Tables 66 to 68 summarize values related to the above-described respective conditional expressions for each of the Examples. As appreciated from Tables 66 to 68, the values of each of the Examples fall within the numerical ranges for the conditional expressions (1) to (6) and (8). The values of each of the Examples except Example 5 fall within the numerical ranges for the conditional expression (7).

TABLE 66

| Conditional | | Example | | | | |
|---|---|---|---|---|---|---|
| Expression | | 1 | 2 | 3 | 4 | 5 |
| (1) | f1/f2 | −8.9921 | −7.3830 | −11.2749 | −9.8216 | −12.0000 |
| (2) | f3/f4 | 1.8771 | 1.8162 | 4.0000 | 3.2742 | 2.0431 |
| (3) | f1/fw | 9.2487 | 6.9076 | 9.5717 | 8.3144 | 9.2464 |
| (4) | f4/ft | 0.4000 | 0.3363 | 0.3907 | 0.3527 | 0.3781 |
| (5) | vdPL1 | 81.5 | 81.5 | 81.5 | 81.5 | 81.5 |
| (6) | ΔPgFPL1 | 0.028 | 0.028 | 0.028 | 0.028 | 0.028 |
| (7) | vdLN1 | 18 | 18 | 18 | 18 | — |
| (8) | BFw/fw | 0.7825 | 0.7175 | 0.9324 | 0.7708 | 0.8128 |

TABLE 67

| Conditional | | Example | | | | |
|---|---|---|---|---|---|---|
| Expression | | 6 | 7 | 8 | 9 | 10 |
| (1) | f1/f2 | −7.4353 | −6.8821 | −7.0455 | −6.0724 | −7.4767 |
| (2) | f3/f4 | 2.3263 | 2.4286 | 2.0212 | 1.9491 | 1.8655 |
| (3) | f1/fw | 6.6685 | 6.3686 | 6.3830 | 6.7586 | 7.0583 |
| (4) | f4/ft | 0.3415 | 0.3755 | 0.4032 | 0.3925 | 0.3498 |
| (5) | vdPL1 | 81.6 | 81.6 | 81.5 | 81.6 | 81.6 |
| (6) | ΔPgFPL1 | 0.037 | 0.037 | 0.028 | 0.037 | 0.037 |
| (7) | vdLN1 | 18 | 18 | 18 | 20 | 20 |
| (8) | BFw/fw | 0.7587 | 0.7041 | 0.7007 | 1.1273 | 0.7528 |

TABLE 68

| Conditional | | Example | | |
|---|---|---|---|---|
| Expression | | 11 | 12 | 13 |
| (1) | f1/f2 | −7.9285 | −7.3246 | −7.4473 |
| (2) | f3/f4 | 1.8000 | 1.9590 | 2.4918 |
| (3) | f1/fw | 6.8189 | 6.7670 | 6.6094 |
| (4) | f4/ft | 0.3514 | 0.3858 | 0.3697 |
| (5) | vdPL1 | 81.6 | 81.6 | 81.6 |
| (6) | ΔPgFPL1 | 0.037 | 0.037 | 0.037 |
| (7) | vdLN1 | 20 | 18 | 18 |
| (8) | BFw/fw | 0.7528 | 0.8405 | 0.7441 |

5. Practical Application Examples

5.1 First Practical Application Example

A technology according to the present disclosure is applicable to various products. For example, the technology according to the present disclosure may be implemented as an apparatus to be mounted on a movable body of any kind of an automobile, an electric vehicle, a hybrid electric automobile, a motorcycle, a bicycle, a personal mobility, an airplane, a drone, a vessel, a robot, a construction machine, an agricultural machine (a tractor), and the like.

FIG. 171 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 171, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 171 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 172 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 172 depicts an example of photographing ranges of the respective imaging sections 7910, 7912, 7914, and 7916. An imaging range a represents the imaging range of the imaging section 7910 provided to the front nose.

Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 171, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device i/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 171, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 171 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the zoom lens and the imaging apparatus of the present disclosure are applicable to any of the imaging section 7410 and the imaging sections 7910, 7912, 7914, 7916, and 7918.

5.2 Second Practical Application Example

A technology according to the present disclosure is applicable to a medical imaging system. The medical imaging system is a medical system using an imaging technology, and is, for example, an endoscope system or a microscope system.

[Endoscope System]

An example of the endoscope system will be described using FIGS. 173 and 174. FIG. 173 is a diagram illustrating an example of a schematic configuration of an endoscope system 5000 to which the technology according to the present disclosure is applicable. FIG. 174 is a diagram illustrating an example of a configuration of an endoscope 5001 and a camera control unit (CCU) 5039. FIG. 173 illustrates a situation where an operator (for example, a doctor) 5067 who is a participant of an operation performs the operation on a patient 5071 on a patient bed 5069 using the endoscope system 5000. As illustrated in FIG. 173, the endoscope system 5000 includes the endoscope 5001 that is a medical imaging device, the CCU 5039, a light source device 5043, a recording device 5053, an output device 5055, and a support device 5027 for supporting the endoscope 5001.

In endoscopic surgery, insertion assisting tools called trocars 5025 are punctured into the patient 5071. Then, a scope 5003 connected to the endoscope 5001 and surgical tools 5021 are inserted into a body of the patient 5071 through the trocars 5025. The surgical tools 5021 include: an energy device such as an electric scalpel; and forceps, for example.

A surgical image that is a medical image in which the inside of the body of the patient 5071 is captured by the endoscope 5001 is displayed on a display device 5041. The operator 5067 performs a procedure on a surgical target using the surgical tools 5021 while viewing the surgical image displayed on the display device 5041. The medical image is not limited to the surgical image, and may be a diagnostic image captured during diagnosis.

[Endoscope]

The endoscope 5001 is an imaging section for capturing the inside of the body of the patient 5071, and is, for example, as illustrated in FIG. 174, a camera including a condensing optical system 50051 for condensing incident light, a zooming optical system 50052 capable of optical zooming by changing a focal length of the imaging section, a focusing optical system 50053 capable of focus adjustment by changing the focal length of the imaging section, and a light receiving sensor 50054. The endoscope 5001 condenses the light through the connected scope 5003 on the light receiving sensor 50054 to generate a pixel signal, and outputs the pixel signal through a transmission system to the CCU 5039. The scope 5003 is an insertion part that includes an objective lens at a distal end and guides the light from the connected light source device 5043 into the body of the patient 5071. The scope 5003 is, for example, a rigid scope for a rigid endoscope and a flexible scope for a flexible endoscope. The scope 5003 may be a direct viewing scope or an oblique viewing scope. The pixel signal only needs to be a signal based on a signal output from a pixel, and is, for example, a raw signal or an image signal. The transmission system connecting the endoscope 5001 to the CCU 5039 may include a memory, and the memory may store parameters related to the endoscope 5001 and the CCU 5039. The memory may be disposed at a connection portion of the transmission system or on a cable. For example, the memory of the transmission system may store the parameters before shipment of the endoscope 5001 or the parameters changed when current is applied, and an operation of the endoscope may be changed based on the parameters read from the memory. A set of the camera and the transmission system may be referred to as an endoscope. The light receiving sensor 50054 is a sensor for converting the received light into the pixel signal, and is, for example, a complementary metal-oxide-semiconductor (CMOS) imaging sensor. The light receiving sensor 50054 is preferably an imaging sensor having a Bayer array capable of color imaging. The light receiving sensor 50054 is also preferably an imaging sensor having a number of pixels corresponding to a resolution of, for example, 4K (3840 horizontal pixels×2160 vertical pixels), 8K (7680 horizontal pixels×4320 vertical pixels), or square 4K (3840 or more horizontal pixels×3840 or more vertical pixels). The light receiving sensor 50054 may be one sensor chip, or a plurality of sensor chips. For example, a prism may be provided to separate the incident light into predetermined wavelength bands, and the wavelength bands may be imaged by different light receiving sensors. A plurality of light receiving sensors may be provided for stereoscopic viewing. The light receiving sensor 50054 may be a sensor having a chip structure including an arithmetic processing circuit for image processing, or may be a sensor for time of flight (ToF). The transmission system is, for example, an optical fiber cable system or a wireless transmission system. The wireless transmission only needs to be capable of transmitting the pixel signal generated by the endoscope 5001, and, for example, the endoscope 5001 may be wirelessly connected to the CCU 5039, or the endoscope 5001 may be connected to the CCU 5039 via a base station in an operating room. At this time, the endoscope 5001 may transmit not only the pixel signal, but also simultaneously information (for example, a processing priority of the pixel signal and/or a synchronization signal) related to the pixel signal. In the endoscope, the scope may be integrated with the camera, and the light receiving sensor may be provided at the distal end of the scope.

[Camera Control Unit (CCU)]

The CCU 5039 is a control device for controlling the endoscope 5001 and the light source device 5043 connected to the CCU 5039 in an integrated manner, and is, for example, as illustrated in FIG. 174, an image processing device including a field-programmable gate array (FPGA) 50391, a central processing unit (CPU) 50392, a random access memory 50393, a read-only memory (ROM) 50394, a graphics processing unit (GPU) 50395, and an interface (I/F) 50396. The CCU 5039 may control the display device 5041, the recording device 5053, and the output device 5055 connected to the CCU 5039 in an integrated manner. The CCU 5039 controls, for example, irradiation timing, irradiation intensity, and a type of an irradiation light source of the light source device 5043. The CCU 5039 also performs image processing, such as development processing (for example, demosaic processing) and correction processing, on the pixel signal output from the endoscope 5001, and outputs the processed image signal (for example, an image) to an external device such as the display device 5041. The CCU 5039 also transmits a control signal to the endoscope 5001 to control driving of the endoscope 5001. The control signal is information on an imaging condition such as a magnification or the focal length of the imaging section. The CCU 5039 may have a function to down-convert the image, and may be configured to be capable of simultaneously outputting a higher-resolution (for example, 4K) image to the display device 5041 and a lower-resolution (for example, high-definition (HD)) image to the recording device 5053.

The CCU 5039 may be connected to external equipment (such as a recording device, a display device, an output device, and a support device) via an IP converter for converting the signal into a predetermined communication protocol (such as the Internet Protocol (IP)). The connection between the IP converter and the external equipment may be established using a wired network, or a part or the whole of the network may be established using a wireless network. For example, the IP converter on the CCU 5039 side may have a wireless communication function, and may transmit the received image to an IP switcher or an output side IP converter via a wireless communication network, such as the fifth-generation mobile communication system (5G) or the sixth-generation mobile communication system (6G).

[Light Source Device]

The light source device 5043 is a device capable of emitting the light having predetermined wavelength bands, and includes, for example, a plurality of light sources and a light source optical system for guiding the light of the light sources. The light sources are, for example, xenon lamps, light-emitting diode (LED) light sources, or laser diode (LD) light sources. The light source device 5043 includes, for example, the LED light sources corresponding to three respective primary colors of red (R), green (G), and blue (B), and controls output intensity and output timing of each of the light sources to emit white light. The light source device 5043 may include a light source capable of emitting special light used for special light observation, in addition to the light sources for emitting normal light for normal light observation. The special light is light having a predetermined wavelength band different from that of the normal light being light for the normal light observation, and is, for example, near-infrared light (light having a wavelength of 760 nm or longer), infrared light, blue light, or ultraviolet light. The normal light is, for example, the white light or green light. In narrow band imaging that is a kind of special light observation, blue light and green light are alternately emitted, and thus the narrow band imaging can image a predetermined tissue such as a blood vessel in a mucosal surface at high contrast using wavelength dependence of light absorption in the tissue of the body. In fluorescence observation that is a kind of special light observation, excitation light is emitted for exciting an agent injected into the tissue of the body, and fluorescence emitted by the tissue of the body or the agent as a label is received to obtain a fluorescent image, and thus the fluorescence observation can facilitate the operator to view, for example, the tissue of the body that is difficult to be viewed by the operator with the normal light. For example, in fluorescence observation using the infrared light, the infrared light having an excitation wavelength band is emitted to an agent, such as indocyanine green (ICG), injected into the tissue of the body, and the fluorescence light from the agent is received, whereby the fluorescence observation can facilitate viewing of a structure and an affected part of the tissue of the body. In the fluorescence observation, an agent (such as 5-aminolevulinic acid (5-ALA)) may be used that emits fluorescence in a red wavelength band by being excited by the special light in a blue wavelength band. The type of the irradiation light of the light source device 5043 is set by control of the CCU 5039. The CCU 5039 may have a mode of controlling the light source device 5043 and the endoscope 5001 to alternately perform the normal light observation and the special light observation. At this time, information based on a pixel signal obtained by the special light observation is preferably superimposed on a pixel signal obtained by the normal light observation. The special light observation may be an infrared light observation to observe a site inside the surface of an organ and a multi-spectrum observation utilizing hyperspectral spectroscopy. A photodynamic therapy may be incorporated.

[Recording Device]

The recording device 5053 is a device for recording the pixel signal (for example, an image) acquired from the CCU 5039, and is, for example, a recorder. The recording device 5053 records an image acquired from the CCU 5039 in a hard disk drive (HDD), a Super Density Disc (SDD), and/or an optical disc. The recording device 5053 may be connected to a network in a hospital to be accessible from equipment outside the operating room. The recording device 5053 may have a down-convert function or an up-convert function.

[Display Device]

The display device 5041 is a device capable of displaying the image, and is, for example, a display monitor. The display device 5041 displays a display image based on the pixel signal acquired from the CCU 5039. The display device 5041 may include a camera and a microphone to function as an input device that allows instruction input through gaze recognition, voice recognition, and gesture.

[Output Device]

The output device 5055 is a device for outputting the information acquired from the CCU 5039, and is, for example, a printer. The output device 5055 prints, for example, a print image based on the pixel signal acquired from the CCU 5039 on a sheet of paper.

[Support Device]

The support device 5027 is an articulated arm including a base 5029 including an arm control device 5045, an arm 5031 extending from the base 5029, and a holding part 5032 mounted at a distal end of the arm 5031. The arm control device 5045 includes a processor such as a CPU, and operates according to a predetermined computer program to control driving of the arm 5031. The support device 5027 uses the arm control device 5045 to control parameters including, for example, lengths of links 5035 constituting the arm 5031 and rotation angles and torque of joints 5033 so as to control, for example, the position and attitude of the endoscope 5001 held by the holding part 5032. This control can change the position or attitude of the endoscope 5001 to a desired position or attitude, makes it possible to insert the scope 5003 into the patient 5071, and can change the observed area in the body. The support device 5027 functions as an endoscope support arm for supporting the endoscope 5001 during the operation. Thus, the support device 5027 can play a role of a scopist who is an assistant holding the endoscope 5001. The support device 5027 may be a device for holding a microscope device 5301 to be described later, and can be called a medical support arm. The support device 5027 may be controlled using an autonomous control method by the arm control device 5045, or may be controlled using a control method in which the arm control device 5045 performs the control based on input of a user. The control method may be, for example, a master-slave method in which the support device 5027 serving as a slave device (replica device) that is a patient cart is controlled based on a movement of a master device (primary device) that is an operator console at a hand of the user. The support device 5027 may be remotely controllable from outside the operating room.

The example of the endoscope system 5000 to which the technology according to the present disclosure is applicable has been described above. For example, the technology according to the present disclosure may be applied to a microscope system.

[Microscope System]

FIG. 175 is a diagram illustrating an example of a schematic configuration of a microscopic surgery system to which the technology according to the present disclosure is applicable. In the following description, the same components as those of the endoscope system 5000 will be denoted by the same reference numerals, and the description thereof will not be repeated.

FIG. 175 schematically illustrates a situation where the operator 5067 performs an operation on the patient 5071 on the patient bed 5069 using a microscopic surgery system 5300. For the sake of simplicity, FIG. 175 does not illustrate a cart 5037 among the components of the microscopic surgery system 5300, and illustrates the microscope device 5301 instead of the endoscope 5001 in a simplified manner. The microscope device 5301 may refer to a microscope 5303 provided at the distal end of the links 5035, or may refer to the overall configuration including the microscope 5303 and the support device 5027.

As illustrated in FIG. 175, during the operation, the microscopic surgery system 5300 is used to display an image of a surgical site captured by the microscope device 5301 in a magnified manner on the display device 5041 installed in the operating room. The display device 5041 is installed in a position facing the operator 5067, and the operator 5067 performs various procedures, such as excision of an affected part, on the surgical site while observing the state of the surgical site using the image displayed on the display device 5041. The microscopic surgery system is used in, for example, ophthalmic operation and neurosurgical operation.

The respective examples of the endoscope system 5000 and the microscopic surgery system 5300 to which the technology according to the present disclosure is applicable have been described above. Systems to which the technology according to the present disclosure is applicable are not limited to such examples. For example, the support device 5027 can support, at the distal end thereof, another observation device or another surgical tool instead of the endoscope 5001 or the microscope 5303. Examples of the other applicable observation device include forceps, tweezers, a pneumoperitoneum tube for pneumoperitoneum, and an energy treatment tool for incising a tissue or sealing a blood vessel by cauterization. By using the support device to support the observation device or the surgical tool described above, the position thereof can be more stably fixed and the load of the medical staff can be lower than in a case where the medical staff manually supports the observation device or the surgical tool. The technology according to the present disclosure may be applied to a support device for supporting such a component other than the microscope.

The technology according to the present disclosure is suitably applicable to the camera 5005 among the configurations described above. In particular, the zoom lens of the present disclosure is suitably applicable to at least some of the optical systems of the condensing optical system 50051, the zooming optical system 50052, and the focusing optical system 50053 in the camera 5005.

6. Other Embodiments

The technology according to the present disclosure is not limited to the descriptions of the foregoing embodiment and examples, and may be modified and worked in a wide variety of ways.

For example, shapes and numerical values of the respective parts exemplified in the foregoing embodiment and examples are each a mere example of implementation of the present technology, and the technical scope of the present technology should not be construed as being limited by these examples.

In addition, for examples, a configuration may be employed that includes different number of lenses from the number of lenses exhibited in the foregoing embodiment and examples. Further, a configuration may be employed that further includes a lens having no substantial refractive power.

For example, the present technology may also have the following configurations.

According to the present technology of the following configurations, the configuration of each of the lens groups is optimized to enable achievement of compactness, high performance, and a high variable magnification ratio. This makes it possible to provide a compact and high-performance zoom lens having a high variable magnification ratio as well as an imaging apparatus including such a zoom lens.

[1]

A zoom lens including a plurality of lens groups including, in order from a side of an object toward a side of an image plane, a first lens group including two or less lenses and having positive refractive power, a second lens group having negative refractive power, a third lens group having positive refractive power, a fourth lens group having positive refractive power, and a fifth lens group having negative refractive power, in which upon zooming from a wide-angle end to a telephoto end, at least the first lens group, the third lens group, and the fourth lens group are configured to move to the side of the object, and the following conditional expressions are satisfied.

$$f1/f2 < -6.00 \tag{1}$$

$$1.75 < f3/f4 < 4.20 \tag{2}$$

where f1 denotes a focal distance of the first lens group, f2 denotes a focal distance of the second lens group, f3 denotes a focal distance of the third lens group, and f4 denotes a focal distance of the fourth lens group.

[2]

The zoom lens according to [1], in which the following conditional expression is further satisfied:

$$5.0 < f1/fw < 15.0 \tag{3}$$

where f1 denotes a focal distance of the first lens group, and fw denotes a focal distance of a total system at the wide-angle end.

[3]

The zoom lens according to [1] or [2], in which the following conditional expression is further satisfied:

$$0.10 < f4/ft < 0.60 \tag{4}$$

where f4 denotes a focal distance of the fourth lens group, and ft denotes a focal distance of a total system at the telephoto end.

[4]

The zoom lens according to any one of [1] to [3], in which focusing is configured to be performed by movement of the fifth lens group in an optical axis direction when an object distance varies from infinity to a short distance.

[5]

The zoom lens according to any one of [1] to [4], further including an aperture stop between the second lens group and the third lens group.

[6]

The zoom lens according to any one of [1] to [5], in which, upon zooming from the wide-angle end to the telephoto end, the third lens group and a final lens group in the plurality of lens groups move in a same trajectory.

[7]

The zoom lens according to any one of [1] to [6], in which the fourth lens group includes a positive lens having an aspherical surface and satisfying the following conditional expressions:

$$60.0 < vdPL1 < 100.0 \tag{5}$$

$$0.005 < \Delta PgFPL1 < 0.150 \tag{6}$$

where vdPL1 denotes Abbe number of the positive lens,

ΔPgFPL1 denotes anomalous dispersibility of the positive lens,

ΔPgFPL1=PgFPL1−0.64833+0.00180×vdPL1 holds true, and

PgFPL1 denotes a partial dispersion ratio between a g-line and an F-line of the positive lens.

[8]

The zoom lens according to any one of [1] to [7], in which the first lens group includes, on a side closest to the object, a negative lens that satisfies the following conditional expression:

$$10.0 < vdLN1 < 22.5 \tag{7}$$

US 12,574,644 B2

79 where vdL1 denotes Abbe number of the negative lens.

[9]

The zoom lens according to any one of [1] to [8], in which the following conditional expression is further satisfied:

$$0.3 < BFw/fw < 2.5 \tag{8}$$

where

BFw denotes a back focus at the wide-angle end, which is a distance from a surface on the side of the image plane of a lens on a side closest to the image plane to the image plane, at the wide-angle end, and fw denotes the focal distance of the total system at the wide-angle end.

[10]

An imaging apparatus including:

a zoom lens; and an imaging element that outputs an imaging signal corresponding to an optical image formed by the zoom lens, the zoom lens including a plurality of lens groups including, in order from a side of an object toward a side of an image plane, a first lens group including two or less lenses and having positive refractive power, a second lens group having negative refractive power, a third lens group having positive refractive power, a fourth lens group having positive refractive power, and a fifth lens group having negative refractive power, in which upon zooming from a wide-angle end to a telephoto end, at least the first lens group, the third lens group, and the fourth lens group are configured to move to the side of the object, and the following conditional expressions are satisfied:

$$f1/f2 < -6.00 \tag{1}$$
$$1.75 < f3/f4 < 4.20 \tag{2}$$

where f1 denotes a focal distance of the first lens group, f2 denotes a focal distance of the second lens group, f3 denotes a focal distance of the third lens group, and f4 denotes a focal distance of the fourth lens group.

[11]

The zoom lens according to any one of [1] to [9], further including a lens having no substantial refractive power.

[12]

The imaging apparatus according to [10], in which the zoom lens further includes a lens having no substantial refractive power.

The present application claims the benefit of Japanese Priority Patent Application JP 2022-19115 filed with the Japan Patent Office on Feb. 9, 2022, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

80

The invention claimed is:

1. A zoom lens comprising a plurality of lens groups including, in order from a side of an object toward a side of an image plane, a first lens group including two or less lenses and having positive refractive power, a second lens group having negative refractive power, a third lens group having positive refractive power, a fourth lens group having positive refractive power, and a fifth lens group having negative refractive power, wherein upon zooming from a wide-angle end to a telephoto end, at least the first lens group, the third lens group, and the fourth lens group are configured to move to the side of the object, and the following conditional expressions are satisfied:

$$f1/f2 < -6.00 \tag{1}$$
$$1.75 < f3/f4 < 4.20 \tag{2}$$

where f1 denotes a focal distance of the first lens group, f2 denotes a focal distance of the second lens group, f3 denotes a focal distance of the third lens group, and f4 denotes a focal distance of the fourth lens group.

2. The zoom lens according to claim 1, wherein the following conditional expression is further satisfied:

$$5.0 < f1/fw < 15.0 \tag{3}$$

where f1 denotes a focal distance of the first lens group, and fw denotes a focal distance of a total system at the wide-angle end.

3. The zoom lens according to claim 1, wherein the following conditional expression is further satisfied:

$$0.10 < f4/ft < 0.60 \tag{4}$$

where f4 denotes a focal distance of the fourth lens group, and ft denotes a focal distance of a total system at the telephoto end.

4. The zoom lens according to claim 1, wherein focusing is configured to be performed by movement of the fifth lens group in an optical axis direction when an object distance varies from infinity to a short distance.

5. The zoom lens according to claim 1, further comprising an aperture stop between the second lens group and the third lens group.

6. The zoom lens according to claim 1, wherein, upon zooming from the wide-angle end to the telephoto end, the third lens group and a final lens group in the plurality of lens groups move in a same trajectory.

7. The zoom lens according to claim 1, wherein the fourth lens group includes a positive lens having an aspherical surface and satisfying the following conditional expressions:

$$60.0 < vdPL1 < 100.0 \tag{5}$$
$$0.005 < \Delta PgFPL1 < 0.150 \tag{6}$$

where vdPL1 denotes Abbe number of the positive lens,

ΔPgFPL1 denotes anomalous dispersibility of the positive lens,

ΔPgFPL1=PgFPL1−0.64833+0.00180×vdPL1 holds true, and

PgFPL1 denotes a partial dispersion ratio between a g-line and an F-line of the positive lens.

8. The zoom lens according to claim 1, wherein the first lens group includes, on a side closest to the object, a negative lens that satisfies the following conditional expression:

$$10.0 < vdLN1 < 22.5 \qquad (7)$$

where vdL1 denotes Abbe number of the negative lens.

9. The zoom lens according to claim 1, wherein the following conditional expression is further satisfied:

$$0.3 < BFw/fw < 2.5 \qquad (8)$$

where

BFw denotes a back focus at the wide-angle end, which is a distance from a surface on the side of the image plane of a lens on a side closest to the image plane to the image plane, at the wide-angle end, and fw denotes a focal distance of a total system at the wide-angle end.

10. An imaging apparatus comprising:

a zoom lens; and an imaging element that outputs an imaging signal corresponding to an optical image formed by the zoom lens, the zoom lens including a plurality of lens groups including, in order from a side of an object toward a side of an image plane, a first lens group including two or less lenses and having positive refractive power, a second lens group having negative refractive power, a third lens group having positive refractive power, a fourth lens group having positive refractive power, and a fifth lens group having negative refractive power, wherein upon zooming from a wide-angle end to a telephoto end, at least the first lens group, the third lens group, and the fourth lens group are configured to move to the side of the object, and the following conditional expressions are satisfied:

$$f1/f2 < -6.00 \qquad (1)$$

$$1.75 < f3/f4 < 4.20 \qquad (2)$$

where f1 denotes a focal distance of the first lens group, f2 denotes a focal distance of the second lens group, f3 denotes a focal distance of the third lens group, and f4 denotes a focal distance of the fourth lens group.

\* \* \* \* \*